United States Patent [19]
Kosako

[11] Patent Number: 5,909,600
[45] Date of Patent: Jun. 1, 1999

[54] CAMERA STRUCTURE

[75] Inventor: Kosei Kosako, Tokyo, Japan

[73] Assignee: Asahi Kogaku Kogyo Kabushiki Kaisha, Tokyo, Japan

[21] Appl. No.: 08/866,220

[22] Filed: May 30, 1997

[30] Foreign Application Priority Data

| May 31, 1996 | [JP] | Japan | 8-138457 |
|---|---|---|---|
| Jul. 17, 1996 | [JP] | Japan | 8-187131 |
| Nov. 12, 1996 | [JP] | Japan | 8-300425 |
| Nov. 15, 1996 | [JP] | Japan | 8-304623 |
| Nov. 25, 1996 | [JP] | Japan | 8-313659 |
| Nov. 28, 1996 | [JP] | Japan | 8-317442 |
| Jan. 23, 1997 | [JP] | Japan | 9-010300 |
| Feb. 3, 1997 | [JP] | Japan | 9-020723 |
| Mar. 12, 1997 | [JP] | Japan | 9-057225 |
| Mar. 27, 1997 | [JP] | Japan | 9-075373 |
| Apr. 14, 1997 | [JP] | Japan | 9-095777 |

[51] Int. Cl.⁶ .................... G03B 17/04; G03B 17/02
[52] U.S. Cl. .................. 396/348; 396/287; 396/535; 396/538; 396/539
[58] Field of Search ................ 396/348, 349, 396/350, 440, 535, 538, 439, 373, 176, 177, 178, 374, 539, 287

[56] References Cited

U.S. PATENT DOCUMENTS

| 4,281,913 | 8/1981 | Shono et al. . | |
| 5,075,707 | 12/1991 | Shibayama et al. . | |
| 5,079,584 | 1/1992 | Nakamura . | |
| 5,150,140 | 9/1992 | Kitazawa . | |
| 5,298,930 | 3/1994 | Asakura et al. | 396/535 |
| 5,422,695 | 6/1995 | Katagiri | 396/538 |

FOREIGN PATENT DOCUMENTS

| 01061736 | 3/1989 | Japan . |
| 64061736 | 3/1989 | Japan . |
| 06011765 | 1/1994 | Japan . |
| 1475150 | 6/1997 | United Kingdom . |

OTHER PUBLICATIONS

English Language Patent Abstracts of Japan, vol. 18, No. 211 (P–1726).
English Language Patent Abstracts of Japan, vol. 13, No. 269 (P–888).
European Search Report in connection with European Patent Application No. 97 10 8819.

*Primary Examiner*—Alan A. Mathews
*Attorney, Agent, or Firm*—Greenblum & Bernstein P.L.C.

[57] ABSTRACT

A camera has a camera body in which a film is drawn out of a film cartridge to be wound by a film take-up spool positioned in a spool chamber. The camera has a film passage formed in the camera body for guiding the film drawn out of the film cartridge to the spool chamber. The rear surface of the camera body extends substantially in parallel to a plane connecting an axial center of the film take-up spool with an axial center of a cartridge spool of the film cartridge. The film passage is formed such that a surface of the film located in the film passage intersects the plane connecting the axial center of the film take-up spool with the axial center of the cartridge spool.

133 Claims, 70 Drawing Sheets

CAMERA STRUCTURE

BACKGROUND OF THE INVENTION

1. Field of the Invention

The present invention relates to a camera structure which uses a film cartridge or cassette containing a rolled film.

2. Description of the Related Art

Cameras using a film cartridge or cassette containing a rolled film such as a conventional 35 mm cassette or an IX240 cassette recently developed for use with a camera employing the Advanced Photo System are widely known. In such a type of camera, a cartridge chamber that accommodates the film cartridge, and a spool chamber that accommodates a film take-up spool which takes up the film from the cartridge, are respectively arranged on right and left sides within the camera body. The rectangular image plane of the film to be exposed is located on a focal plane and determined by the rectangular photographic aperture of the camera which forms the limits of each frame exposed. This plane is positioned between the cartridge chamber and the spool chamber, extending substantially parallel to the right/left (lengthwise) direction of the camera.

In a camera having such a structure, it is necessary for the cartridge chamber and the spool chamber to be separated from each other by a sufficient distance so as to form a light path (picture format) therebetween for leading light from the rear end of the photographic optical system to the film surface to be exposed. However, this restricts the ability to reduce the size of the camera, particularly for making the width of the camera short in the right/left direction thereof.

Furthermore, in the aforementioned type of camera having the conventional structure, in the case that the camera is provided with a well-known automatic film loading system, the film cassette is usually loaded in the camera according to the following procedure: opening the back lid of the camera and placing the cartridge in the cartridge chamber with the film slot of the cassette facing the film take-up spool; drawing out enough film to place the tongue (i.e., film leader) of the film across the film take-up spool, and finally closing the back lid of the camera. According to such a conventional film loading procedure, if the film tongue is not properly placed across the film take-up spool so as to be surely caught by the film take-up spool when the back lid is shut, the film tongue will not be caught, which results in a loading error.

SUMMARY OF THE INVENTION

It is an object of the present invention to provide a camera structure which uses a film cartridge or cassette containing a rolled film, that makes it possible to reduce the size of the camera, particularly for shortening the width of the camera in the right/left (lengthwise) direction thereof.

It is another object of the present invention to provide such a camera structure which further makes perspective control possible. Namely, the perspective control allows the photographic lens of the camera to shift downward, upward or sideways in a direction perpendicular to the direction of the optical axis of the photographic lens, or allows the photographic lens to tilt such that the optical axis thereof tilts horizontally relative to the image plane of a film.

It is still another object of the present invention to provide a camera structure which uses a film cartridge or cassette containing a rolled film. With such a camera structure the possibility of the occurrence of a film loading error is greatly reduced.

The aforementioned objects and other objects of the present invention will be appreciated from the descriptions as set forth below with regard to the preferred embodiments thereof.

According to an aspect of the present invention, there is provided a camera which include a camera body in which a film is drawn out of a film cartridge to be wound by a film take-up spool positioned in a spool chamber. A rear surface of the camera body extends substantially in parallel to a plane connecting an axial center of the film take-up spool with an axial center of a cartridge spool of the film cartridge. A film passage formed in the camera body guides the film drawn out of the film cartridge to the spool chamber such that a surface of the film located in the film passage intersects the plane connecting the axial center of the film take-up spool with the axial center of the cartridge spool. With this arrangement, the width of the camera is shortened in the right/left direction of the camera body.

Preferably, the camera includes a cartridge chamber formed in the camera body to accommodate the film cartridge therein, wherein the spool chamber and the cartridge chamber are positioned on respective sides of the surface of the film.

Preferably, a front surface of the camera body is substantially parallel to the rear surface.

Preferably, the camera further includes a lens base plate which supports a photographic lens. One end of the lens base plate is pivoted about a vertical shaft fixed to the camera body so that the lens base plate can be positioned in either an open or closed position of the lens base plate. An optical axis of the photographic lens extends normal to the surface of the film when the lens base plate is positioned in the open position.

Preferably, a front surface of the camera body is substantially parallel to the rear surface to form a wedge-shaped space in the camera body between the front surface and the surface of the film.

Preferably, the camera further includes a lens base plate which supports a photographic lens. One end of the lens base plate is pivoted about a first shaft fixed to the camera body so that the lens base plate can be positioned in either an open or closed position of the lens base plate.

Preferably, the first shaft is fixed to the camera body substantially along an end of the wedge-shaped space to extend in a vertical direction of the camera.

Preferably, the photographic lens is retracted into the wedge-shaped space when the lens base plate moves from the open position of the lens base plate to the closed position of the lens base plate.

Preferably, an optical axis of the photographic lens is perpendicular to the surface of the film when the lens base plate is positioned in the open position of the lens base plate.

Preferably, the camera further includes a finder optical system provided independent from the photographic lens, an optical axis of the finder optical system extends in parallel to the optical axis of the photographic lens when the lens base plate is positioned in the open position of the lens base plate.

Preferably, the lens base plate extends substantially parallel to the surface of the film when the lens base plate is positioned in the open position of the lens base plate.

Preferably, the camera further includes a shutter unit which supports the photographic lens, the shutter unit being fixed to the lens base plate. In this case, it is preferable that the shutter unit together with the photographic lens retract into the wedge-shaped space when the lens base plate moves from the open position of the lens base plate to the closed position of the lens base plate.

Preferably, the camera further includes a cover plate. One end of the cover plate is pivotally mounted to a second shaft fixed to the camera body so that the cover plate can be positioned in either an open or closed position of the cover plate. The second shaft is fixed to the camera body substantially along another end of the wedge-shaped space substantially parallel to the first shaft. The cover plate covers at least a part of a front surface of the lens base plate when in the closed position after the lens base plate has been moved to the closed position of the lens base plate.

The camera may further include an LCD panel for indicating photographic information. The LCD panel is preferably secured to an outer surface of the cover plate.

Preferably, the cover plate covers the front of the photographic lens when the cover plate is in the closed position of the cover plate after the lens base plate has moved to the closed position of the lens base plate.

Preferably, the front of the camera body becomes substantially flat when the lens base plate and the cover plate are respectively positioned in the closed position of the lens base plate and the closed position of the cover plate.

Preferably, each of the lens base plate and the cover plate extends substantially parallel to the rear surface of the camera body when the lens base plate and the cover plate are respectively positioned in the closed position of the lens base plate and the closed position of the cover plate.

Preferably, the camera further includes a mechanism which determines the open position of the lens base plate. A photographic optical axis of the photographic lens extends perpendicular to the surface of the film when the lens base plate is positioned in the open position of the lens base plate.

Preferably, the determining mechanism includes a groove formed on a rear surface of the cover plate. A part of the lens base plate is fitted in the groove when the lens base plate and the cover plate are respectively positioned in the open position of the lens base plate and the open position of the cover plate. Preferably, the part of the lens base plate is positioned at a free end of the lens base plate which is opposite to the pivoted one end of the lens base plate.

Preferably, a photographic optical axis extends perpendicular to the surface of the film and is inclined to the plane connecting the axial center of the film take-up spool with the axial center of the cartridge spool when the camera is in a photo-ready state.

Preferably, the camera further includes an aperture frame fixedly positioned in the camera body in parallel to, and immediately in front of, the surface of the film aperture frame includes a rectangular photographic opening which determines the limits of each frame of the film to be exposed. A pressure plate is fixedly positioned in the camera body in parallel to, and immediately behind, the surface of the film such that the film passage is formed between the aperture frame and the pressure plate.

Preferably, a plane in which the surface of the film lies intersects a plane in which the rear surface of the camera body lies.

Preferably, the camera further includes a finder optical system and an eyepiece window through which a finder view formed by the finder optical system can be seen. The eyepiece window is positioned on either a right or left side of the rear surface of the camera body in a lengthwise direction of the camera.

Preferably, the side of the rear surface on which the eyepiece window is positioned is located rearwardly with respect to the other side of the rear surface in a direction of a photographic optical axis.

The distance between a side end of the camera body which is located rearwardly with respect to the other side end of the camera body in a lengthwise direction of the camera and a center of the eyepiece window is preferably within a range of about 5 to 30 mm.

Preferably, at least a part of the side end of the camera body has a curved surface with a substantially arc shaped cross section.

Preferably, the part of the side end of the camera body is the rear most part of the camera body in the direction of the photographic optical axis.

Preferably, the camera further includes a cushioning member secured to the side end of the camera body.

Preferably, a side end of the camera body which is located rearwardly with respect to the other side end of the camera body in a lengthwise direction of the camera has a curved surface with a substantially arc shaped cross section. The eyepiece window is positioned in a vicinity of the side end of the camera body.

Preferably, the camera further includes a cushioning member secured to the side end of the camera body.

Preferably, a lengthwise direction of the camera body is horizontally tilted relative to a plane extending perpendicular to a photographic optical axis.

Preferably, the camera further includes a cartridge chamber in which the film cartridge is accommodated. The cartridge chamber is formed in the camera body in a vicinity of a side end of the camera body. The side end of the camera body being located forwardly with respect to an opposite side end of the camera body in a direction of the photographic optical axis. A rotational engaging projection for rotating the cartridge spool projects into the cartridge chamber from an upper end thereof to engage with an end of the cartridge spool. A flashlight emitter is provided in the camera body positioned in a space formed in front of the rotational engaging projection in the camera body.

Preferably, the spool chamber is positioned in a vicinity of the opposite side end of the camera body.

Preferably, the camera further includes a circuit block positioned in a space formed behind the rotational engaging projection in the camera body.

Preferably, the circuit block includes a mechanism which electrically controls an emission of the flashlight emitter.

Preferably, the camera further includes a gear positioned between an upper wall of the camera body and the cartridge chamber. The rotational engaging projection is coaxially fixed to the gear.

Preferably, the rotational engaging projection is integrally formed on the gear.

Preferably, the camera further includes a light-interceptive member provided between the lens base plate and the camera body to prevent ambient light from entering a photographic light path formed between the lens base plate and the surface of the film.

Preferably, the light-interceptive member is made of a flexible material.

Preferably, the flexible material is composed of rubber.

Preferably, the light-interceptive member includes bellows.

Preferably, the camera further includes a light-interceptive member provided between the lens base plate and the camera body to prevent ambient light from entering a photographic light path formed between the lens base plate and the surface of the film. The light-interceptive member is retracted into the wedge-shaped space when the lens base plate moves from the open position of the lens base plate to the closed position of the lens base plate.

Preferably, the camera further includes a lens-shifting device for shifting the photographic lens in a direction perpendicular to an optical axis of the photographic lens.

Preferably, the lens base plate is provided with the lens-shifting device. The lens-shifting device includes lens supporting member for supporting the photographic lens. A mechanism guides the lens supporting member in the direction perpendicular to the optical axis relative to the lens base plate.

Preferably, the camera further includes a shutter unit which supports the photographic lens, the shutter unit being fixed to the lens supporting member.

Preferably, the guiding mechanism includes at least one guide rail formed on the lens base plate to guide the lens supporting member in the direction perpendicular to the optical axis.

Preferably, the guiding mechanism includes two parallel guide rails formed on the lens base plate to guide the lens supporting member. The lens supporting member is slidably held between the two parallel guide rails in the direction perpendicular to the optical axis.

Preferably, the camera further includes a mechanism which visually indicates an amount of shift of the photographic lens.

Preferably, the indicating mechanism includes a scale.

Preferably, the indicating mechanism includes an LCD panel fixed on the camera body.

Preferably, the lens-shifting device shifts the photographic lens sideways relative to the lens base plate.

Preferably, the lens-shifting device shifts the photographic lens in a vertical direction of the camera relative to the lens base plate.

Preferably, the lens-shifting device shifts the photographic lens diagonally relative to the lens base plate.

Preferably, the lens-shifting device includes a rotational member which is supported by the lens base plate to rotate relative to the lens base plate about the optical axis of the photographic lens. A member supports the photographic lens which is supported by the rotational member. A mechanism guides the lens supporting member in the direction perpendicular to the optical axis relative to the rotational member.

Preferably, the camera further includes a shutter unit which supports the photographic lens, the shutter unit being fixed to the lens supporting member.

Preferably, the guiding mechanism includes at least one guide rail formed on the rotational member to guide the lens supporting member in the direction perpendicular to the optical axis.

Preferably, the guiding mechanism includes two parallel guide rails formed on the rotational member to guide the lens supporting member. The guide supporting member is slidably held between the two parallel guide rails in the direction perpendicular to the optical axis.

Preferably, the camera further includes a mechanism which visually indicates a position of the lens supporting member relative to the rotational member.

Preferably, the indicating mechanism includes a scale.

Preferably, the indicating mechanism includes an LCD panel fixed on the camera body.

Preferably, the camera further includes a mechanism which visually indicates a rotational position of the rotational member relative to the lens base plate.

Preferably, the indicating mechanism includes a scale.

Preferably, the indicating mechanism includes an LCD panel fixed on the camera body.

Preferably, the camera further includes a lens base plate which supports a photographic lens, one end of the lens base plate being pivoted about a vertical shaft fixed to the camera body so that the lens base plate can be selectively positioned in either a closed position or any one of a plurality of open positions which respectively correspond to a plurality of different angular positions of the lens base plate relative to the camera body.

Preferably, the camera further includes a lens-tilting device for tilting an optical axis of the photographic lens relative to the surface of the film.

Preferably, the camera further includes a lens-tilting device for tilting an optical axis of the photographic lens relative to the surface of the film. The open position of the lens base plate includes a plurality of open settings which respectively correspond to a plurality of different angular positions of the lens base plate relative to the camera body. The lens-tilting device includes a mechanism which selectively positions the lens base plate at any one of the plurality of open settings.

Preferably, the positioning mechanism includes a plurality of grooves formed on a rear surface of the cover plate to respectively correspond to the plurality of open settings such that a part of the lens base plate fits in a corresponding one of the plurality of grooves when the lens base plate is selectively positioned in any one of the plurality of open settings with the cover plate being positioned in the open position of the cover plate.

Preferably, the plurality of grooves are formed on the rear surface of the cover plate at substantially equi-intervals.

Preferably, the part of the lens base plate is formed at a free end of the lens base plate which is opposite to the pivoted one end of the lens base plate.

Preferably, the cover plate is continuously biased to rotate toward the closed position of the cover plate by a biasing member.

Preferably, the biasing member is a spring.

Preferably, the camera further includes an LCD panel for indicating photographic information, the LCD panel being secured to an outer surface of the cover plate.

Preferably, the LCD panel indicates a current angular position of the lens base plate relative to the camera body.

Preferably, the camera further includes at least one predetermined member positioned in the camera body in a space formed between the surface of the film and the rear surface of the camera body. The at least one predetermined member includes at least one of the following members: a motor for rotating the film take-up spool; a condenser for supplying electrical power to a built-in flashlight emitter of the camera; and a battery serving as a power source of the camera.

Preferably, the camera further includes a projection which extends from a bottom of the camera to project into the space. A female screw is coaxially formed in the projection. The projection and one of the motor, the condenser and the battery are substantially coaxially arranged in the space.

Preferably, the space is formed as a wedge-shaped space.

Preferably, the camera further includes a battery as a power source of the camera. The battery is positioned in the camera body in a space formed between the surface of the film and the rear surface of the camera body. The battery is inserted in or taken out of the space through an opening formed on a rear wall of the camera body.

Preferably, the camera further includes a lid supported by the rear wall for opening or closing the opening.

Preferably, the space is formed as a wedge-shaped space.

Preferably, the camera further includes an LCD panel positioned in the camera body in a space formed between the surface of the film and the rear surface of the camera body. A see-through window is provided on the rear of the camera body through which the LCD panel can be seen from the outside of the camera.

Preferably, the camera further includes a circuit board positioned in the space, the LCD panel being secured to the circuit board.

Preferably, the camera further includes at least one predetermined member positioned in the camera body such that a longitudinal direction of the at least one predetermined member is inclined with respect to the surface of the film while extending substantially in parallel to the rear surface of the camera body. The at least one predetermined member includes at least one of the following members: a motor for rotating the film take-up spool; a condenser for supplying electrical power to a built-in flashlight emitter of the camera; and a battery serving as a power source of the camera.

Preferably, the camera further includes a finder optical system positioned in the camera body. The finder optical system includes a subject side portion, a finder optical path bending portion and an eyepiece side portion in this order from a subject side to a user side in a direction of a photographic optical axis. The eyepiece side portion is separated from the subject side portion substantially in a direction of the film moving through the film passage. The finder optical path bending portion extends in a direction to traverse both the subject side portion and the eyepiece side portion to connect the subject side portion with the eyepiece side portion. At least a part of the at least one predetermined member is positioned between the finder optical path bending portion and an external wall of the camera body.

Preferably, the at least one predetermined member is positioned above an upper edge of the film.

Preferably the camera further includes a guide roller positioned in the camera body in a vicinity of the film take-up spool to extend in parallel to the film take-up spool. The film drawn out of the film cartridge is wound on the guide roller and subsequently wound on the film take-up spool from a side of the guide roller which is closer to the surface of the film.

Preferably, the camera further includes a predetermined member positioned in the camera body adjacent to both the guide roller and the spool chamber. The predetermined member is arranged such that a part of the predetermined member intersects a plane which is tangent to both the guide roller and the spool chamber.

Preferably, the predetermined member includes at least one of the following members: a motor for rotating the film take-up spool; a condenser for supplying electrical power to a built-in flashlight emitter of the camera; and a battery serving as a power source of the camera.

Preferably, the film take-up spool and the cartridge spool are driven to rotate in a common rotational direction during either a film winding or rewinding operation.

Preferably, the camera further includes a guide roller positioned in the camera body in a vicinity of a film slot of the film cartridge to extend in parallel to the film slot. The film coming out of the film slot firstly proceeds in a direction away from the film take-up spool and is subsequently turned back toward the film take-up spool by the guide roller to proceed to the surface of the film.

Preferably, the camera further includes a predetermined member positioned in the camera body adjacent to both the guide roller and the film cartridge. A part of the predetermined member intersects a tangent plane which is tangential to both the guide roller and the film cartridge.

Preferably, the predetermined member includes at least one of the following members: a motor for rotating the film take-up spool; a condenser for supplying electrical power to a built-in flashlight emitter of the camera; and a battery serving as a power source of the camera.

Preferably, the film take-up spool and the cartridge spool are driven to rotate in a common rotational direction during either a film winding or rewinding operation.

Preferably, the camera further includes a cartridge chamber formed in the camera body to accommodate the film cartridge therein. A bottom lid is provided at the bottom of the camera body for simultaneously opening or closing the cartridge chamber, the spool chamber and the film passage. At least one slot is formed on the film take-up spool in which a film leader of the film is inserted. The at least one slot extends in an axial direction of the film take-up spool and has an opening at a lower end of the at least one slot.

Preferably, the at least one slot includes a plurality of slots positioned at substantially equi-angular intervals in a circumferential direction of the film take-up spool.

Preferably, the camera further includes an aperture frame provided in the camera body positioned in parallel to, and immediately in front of, the surface of the film. The aperture frame includes a rectangular photographic opening which determines the limits of each frame of the film exposed. A pressure plate is positioned in the camera body parallel to, and immediately behind the surface of the film such that the film passage is formed between the aperture frame and the pressure plate. An upper end of the pressure plate is pivoted about a shaft which is fixed in the camera body to extend parallel to the direction of film moving through the film passage so that the pressure plate rotates in a rotational direction away from the aperture frame when the bottom lid is opened.

Preferably, the camera further includes a mechanism which continuously biases the pressure plate to rotate in the direction away from the photographic opening. A mechanism rotates the pressure plate in the opposite direction to make the pressure plate move back to an initial which the pressure plate is positioned in parallel to the aperture frame to form the film passage when the bottom lid is closed.

Preferably, the biasing mechanism includes a spring.

Preferably, the rotating mechanism includes a projection formed on the bottom lid to project into the camera body such that the projection contacts and pushes the pressure plate to rotate in the opposite direction for forming the film passage when the bottom lid is closed.

Preferably, the projection includes a beveled surface which contacts the part of the pressure plate when the bottom lid is closed.

Preferably, the camera body includes a front body piece and a rear body piece which are pivoted about a pivotal shaft.

Preferably, corresponding vertical side ends of the front body piece and the rear body piece are pivoted about the pivotal shaft which extends in a vertical direction of the camera.

Preferably, the front body piece includes a photographic lens. An aperture frame includes a rectangular photographic opening which determines the limits of each frame of the film to be exposed. The aperture frame is positioned immediately in front of the surface of the film when the front body piece is closed relative to the rear body piece. The rear body piece includes a pressure plate positioned immediately behind the surface of the film to form the film passage between the pressure plate and the aperture frame. A cartridge chamber accommodates the film cartridge therein.

Preferably, the spool chamber is positioned in the pivoted vertical side end of the rear body piece behind the surface of the film.

Preferably, the pivotal shaft is positioned rearwardly, separates from the axial center of the film take-up spool.

Preferably, the camera further includes a lens base plate which supports the photographic lens. One end of the lens base plate is pivoted about a first vertical shaft fixed to the front body piece so that the lens base plate can be positioned in either an open or closed position of the lens base plate. The first vertical shaft extends in the vertical direction of the camera.

Preferably, an optical axis of the photographic lens extends normal to the surface of the film when the lens base plate is positioned in the open position of the lens base plate while the front body piece is closed relative to the rear body piece.

Preferably, the lens base plate extends substantially parallel to the surface of the film when the lens base plate is positioned in the open position of the lens base plate while the front body piece is closed relative to the rear body piece.

Preferably, the camera further includes a wedge-shaped space formed in the camera body between a front surface of the front body piece and the surface of the film when the front body piece is closed relative to the rear body piece. The first vertical shaft is fixed to the front body piece substantially along an end of the wedge-shaped space to extend in the vertical direction of the camera.

Preferably, the camera further includes a cover plate. One end of the cover plate is pivoted about a second vertical shaft fixed to the front body piece so that the cover plate can be positioned in either an open position or a closed position of the cover plate. The second vertical shaft is fixed to the front body piece substantially along another end of the wedge-shaped space opposite to the one end of the wedge-shaped space to extend substantially parallel to the first vertical shaft. The cover plate covers at least a part of a front surface of the lens base plate when the cover plate is in the closed position of the cover plate after the lens base plate has been moved to the closed position of the lens base plate.

Preferably, the camera, further includes a shutter unit which supports the photographic lens, the shutter unit being fixed to the lens base plate.

According to another aspect of the present invention, there is provided a camera which includes a camera body having a cartridge chamber for accommodating a film cartridge therein. A film take-up chamber for accommodates a film drawn out of the film cartridge. A film passage is formed in the camera body for guiding the film drawn out of the film cartridge to the film take-up chamber such that a surface of the film located in the film passage lies in a plane horizontally tilted relative to a widthwise direction of the camera body.

According to yet another aspect of the present invention, there is provided a camera which includes a camera body in which a film is drawn out of a film cartridge to be wound by a film take-up spool. A lengthwise direction of the camera body is horizontally tilted relative to a plane which extends perpendicular to a photographic optical axis. A cartridge chamber in which the film cartridge is accommodated is formed in the camera body in a vicinity of a side end of the camera body, The side end of the camera body is located forward with respect to an opposite side end of the camera body in a direction of the photographic optical axis. A rotational engaging projection for rotating a cartridge spool of the film cartridge is accommodated in the cartridge chamber. The rotational engaging projection projects into the cartridge chamber from an upper end thereof to engage with an end of the cartridge spool. A flashlight emitter is provided in the camera body. The flashlight emitter is positioned in a space formed in front of the rotational engaging projection in the camera body.

Preferably, the camera further includes a spool chamber in which film take-up spool is arranged, the spool chamber being formed in the opposite side end of the camera body.

Preferably, the camera further includes a circuit block positioned in a space formed behind the rotational engaging projection in the camera body.

Preferably, the circuit block includes a mechanism which electrically controls an emission of the flashlight emitter.

Preferably, the camera further includes a gear positioned between an upper wall of the camera body and the cartridge chamber. The rotational engaging projection is coaxially fixed to the gear.

Preferably, the rotational engaging projection being integrally formed on the gear.

According to yet another aspect of the present invention, there is provided a camera having a camera body in which a film is drawn out of a film cartridge to be wound by a film take-up spool. The camera includes a cartridge chamber formed in the camera body to accommodate the film cartridge therein. A spool chamber is formed in the camera body in which the film take-up spool is positioned. A film passage is formed in the camera body for guiding the film drawn out of the film cartridge to the spool chamber. A bottom lid is provided at the bottom of the camera body for simultaneously opening or closing the cartridge chamber, the spool chamber and the film passage. At least one slot is formed on the film take-up spool in which a film leader of the film is inserted. The at least one slot extends in an axial direction of the film take-up spool and has an opening at a lower end of the at least one slot.

Preferably, the at least one slot includes a plurality of slots positioned at substantially equi-angular intervals in a circumferential direction of the film take-up spool.

Preferably, the camera further includes an aperture frame fixedly positioned in the camera body. The aperture frame includes a rectangular photographic opening which determines the limits of each frame of the film to be exposed A pressure plate is positioned in the camera body in parallel to, and immediately behind the surface of the film such that the film passage is formed between the aperture frame and the pressure plate. An upper end of the pressure plate is pivoted about a shaft which is fixedly positioned in the camera body to extend parallel to a direction of the film moving in the film passage so that the pressure plate rotates in a direction away from the aperture frame when the bottom lid is opened.

Preferably, the camera further includes a mechanism which continuously biases the pressure plate to rotate in the direction away from the photographic opening. A mechanism rotates the pressure plate in the opposite direction to make the pressure plate move back to an initial position in which the pressure plate is parallel to the aperture frame to form the film passage when the bottom lid is closed.

Preferably, the biasing mechanism includes a spring.

Preferably, the rotating mechanism includes a projection formed on the bottom lid to project into the camera body such that the projection contacts and pushes the pressure plate to rotate in the opposite direction for forming the film passage when the bottom lid is closed.

Preferably, the projection includes a beveled surface which contacts the part of the pressure plate when the bottom lid is closed.

The present disclosure relates to subject matter contained in Japanese Patent Application Nos. 8-138457 (filed on May 31, 1996), 8-187131 (filed on Jul. 17, 1996), 8-300425 (filed on Nov. 12, 1996), 8-304623 (filed on Nov. 15, 1996), 8-313659 (filed on Nov. 25, 1996), 8-317442 (filed on Nov. 28, 1996), 9-10300 (filed on Jan. 23, 1997), 9-20723 (filed on Feb. 3, 1997), 9-57225 (filed on Mar. 12, 1997), 9-75373 (filed on Mar. 27, 1997) and 9-95777 (filed on Apr. 14, 1997) which are expressly incorporated herein by reference in their entireties.

BRIEF DESCRIPTION OF THE DRAWINGS

The present invention will be more clearly understood from the description as set forth below with reference to the accompanying drawings, in which similar parts or elements are indicated by common reference numerals, and wherein.

DESCRIPTION OF THE PREFERRED EMBODIMENTS

Figure 1:
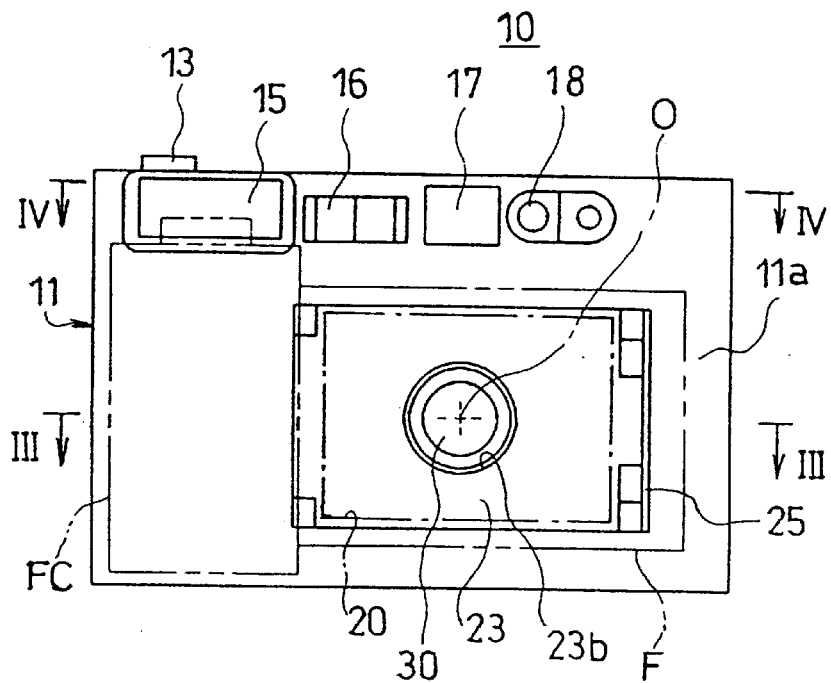
FIG. 1 is a front side view of a first embodiment of a lens shutter type camera in a photo-ready state as viewed from the front in the direction of the optical axis of the photographic lens of the camera.
Figure 3:
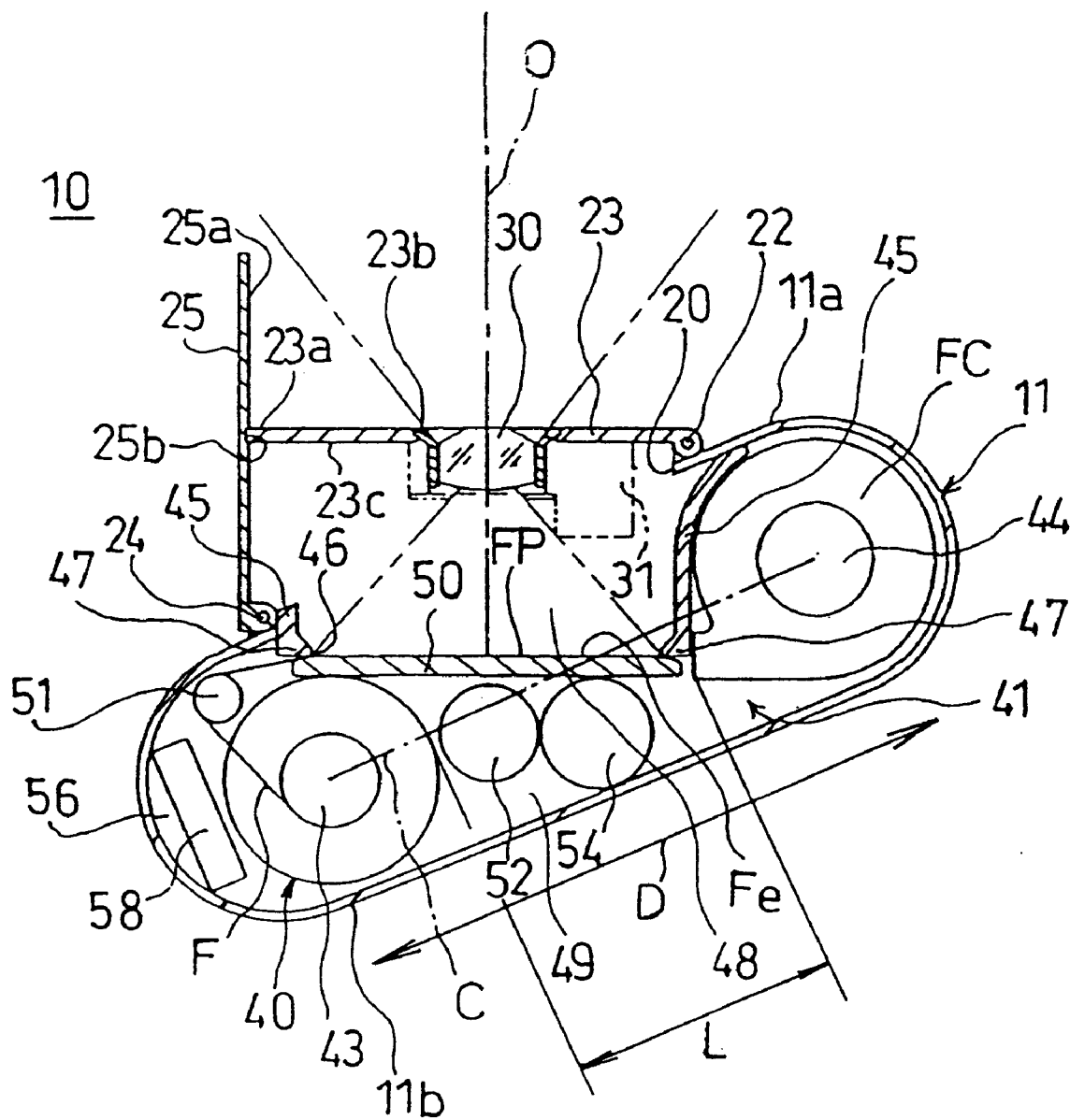
FIG. 3 is a sectional view of the lens shutter type camera taken along line III—III of FIG. 1.
Figure 4:
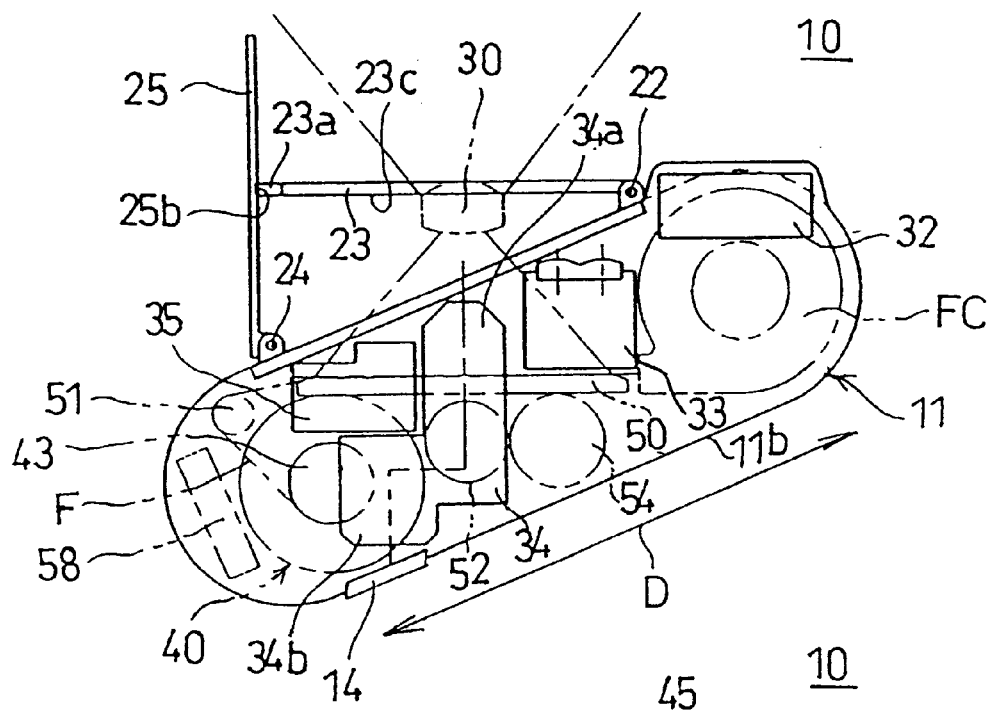
FIG. 4 is a sectional view of the lens shutter type camera taken along line IV—IV of FIG. 1.

The first embodiment of a lens shutter type camera 10 is a single focal point type of an AF compact lens shutter type camera which includes a photographic optical system and a finder optical system provided independently from the photographic optical system. The camera 10 is provided with a substantially box-shaped camera body 11. FIGS. 1, 3 and 4 each show the camera 10 in an active state while FIGS. 2 and 5 each show the camera 10 in a lens-retracted state, i.e., an inactive state.

Figure 2:
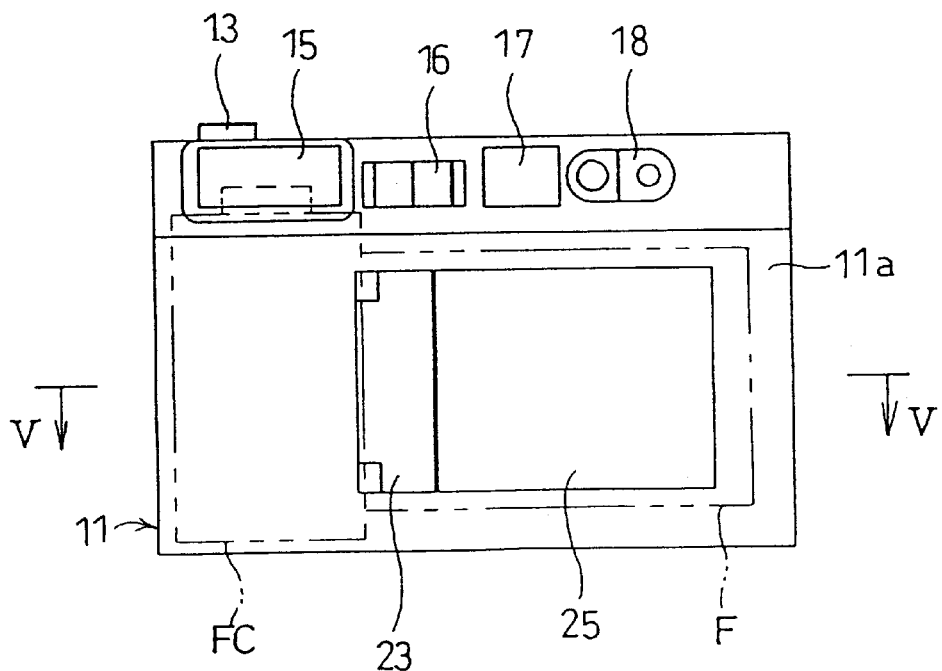
FIG. 2 is a front side view of the lens shutter type camera shown in FIG. 1 in a lens-retracted state as viewed from the front in the direction of the optical axis of the photographic lens of the camera.

The camera 10 is provided, at its left top as viewed in FIGS. 1 and 2, with a shutter release (release button) 13. The camera 10 is provided, at an upper part of a front side wall 11a of the camera body 11, with a flash window 15, an AF window 16, a finder objective window 17 and a photometric window 18, in this order from left to right as viewed from the front of the camera 10. The front side wall 11a is provided with a rectangular opening 20 below the aforementioned windows 15 through 18. The front of the front side wall 11a extends substantially parallel to a rear surface (back surface) 11b of the camera body 11.

Figure 5:
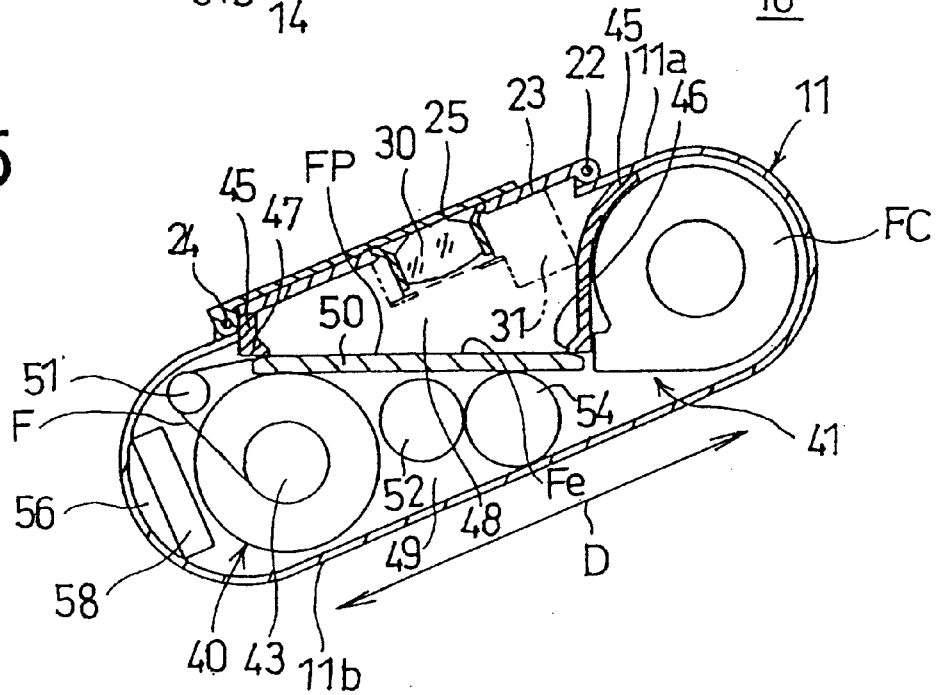
FIG. 5 is a sectional view of the lens shutter type camera taken along line V—V of FIG. 2.

A lens base plate 23, which supports a photographic lens (photographic optical system) 30, is pivoted about a first vertical shaft 22 (see FIG. 3) fixed to the front side wall 11a along a left end of the opening 20 as viewed in FIG. 1. The lens base plate 23 is formed sufficiently large enough so as to cover the opening 20 so that the opening 20 is closed by the lens base plate 23 when the lens base plate 23 is in a closed position (lens-retreated position) as shown in FIGS. 2 or 5. The opening 20 is uncovered when the lens base plate 23 is in an open position (photographable position) as shown in FIGS. 1, 3 or 4. The lens base plate 23 is manually rotatable between the closed and open positions. A first vertical shaft 22 extends in a vertical direction of the camera 10 (i.e., the vertical direction as viewed in FIGS. 1 or 2, or the direction perpendicular to the drawing surface of FIG. 3). The first vertical shaft 22 also extends in a direction perpendicular to the direction of movement of a film F (i.e., in the direction normal to the drawing surface of FIG. 3).

Figure 6:
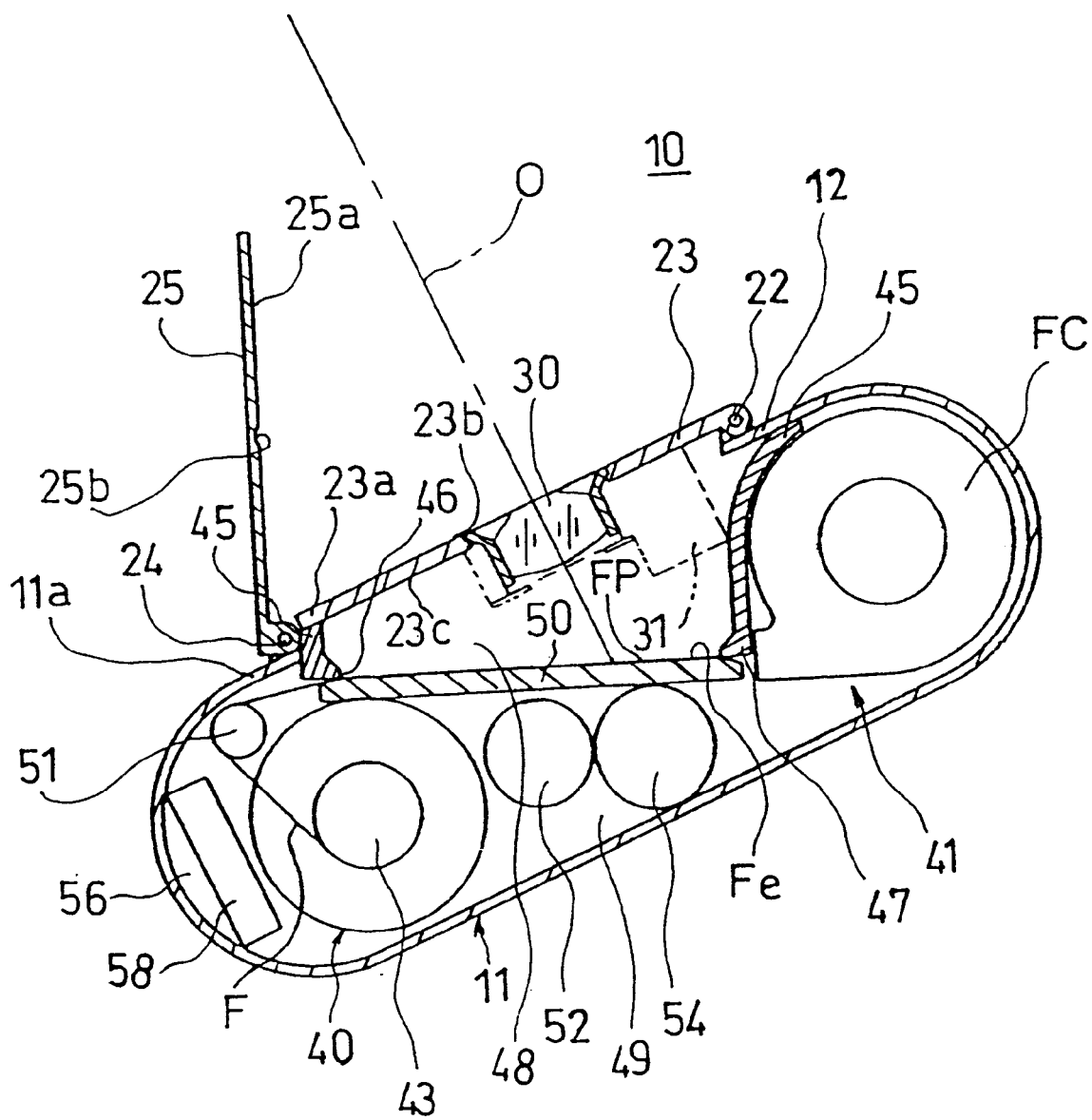
FIG. 6 is a sectional view of the lens shutter type camera shown in FIG. 1 wherein a lens base plate is in a closed position while a cover plate is in an open position.

A cover plate 25, smaller than the lens base plate 23 in width, is pivoted about a second vertical shaft 24 parallel to the first vertical shaft 22 and fixed to the front side wall 11a along a right end of the opening 20 as viewed in FIG. 1. Accordingly, the first and second vertical shafts 22 and 24 are arranged in parallel on respective sides of a photographic light path including a photographic optical axis O. The cover plate 25 is manually rotatable between an open position thereof shown in FIGS. 1, 3 or 4 and a closed position thereof shown in FIGS. 2 or 5, and any further rotational movement of the cover plate 25 in an opening direction (i.e., counterclockwise direction as viewed in FIG. 3) from the open position is rendered impossible. FIG. 6 shows the camera 10 in a state where the lens base plate 23 is in the closed position while the cover plate 25 is in the open position.

Rotating the cover plate 25 to the closed position thereof after rotating the lens base plate 23 to the closed position thereof makes the camera 10 fall into the lens-retracted state shown in FIGS. 2 or 5. The cover plate 25 overlaps the closed lens base plate 23 to cover the front of the photographic lens 30, so that the front surface of the photographic lens 30 is effectively prevented from being scratched or damaged while in the lens-retracted state. In the lens-retracted state, the front of the camera 10 becomes almost flat, and each of the lens base plate 23 and the cover plate 25 extends substantially parallel to the rear surface 11b of the camera body 11. When the camera 10 is in the lens-retracted state, rotating the lens base plate 23 to the open position thereof after having rotated the cover plate 25 to the open position thereof places the camera 10 into the photo-ready (active) state shown in FIGS. 1, 3 or 4.

When the lens base plate 23 is rotated from the closed position to the open position with the cover plate 25 in the open position, the lens base plate 23 rotates about the first vertical shaft 22 while a free end 23a of the lens base plate 23 slides along an inner surface 25a of the cover plate 25. When the lens base plate 23 reaches the open position after such a sliding movement of the free end 23a, the free end 23a is fitted in a vertical groove 25b formed on the inner surface 25a for defining the open position of the lens base plate 23. The lens base plate 23 is precisely positioned in the predetermined open position where the lens base plate 23 extends parallel to a pressure plate 50 fixed to the camera body 11 there inside.

The lens base plate 23 is provided with an AF/AE shutter unit 31 (shown by double-dotted lines in FIGS. 3, 5 or 6) which is fixed to a rear surface 23c of the lens base plate 23. The AF/AE shutter unit 31 is provided with the photographic lens 30, which constitutes a photographic optical system of the camera 10. The lens base plate 23 is provided at an approximate center thereof with a circular opening 23b which is aligned with the photographic lens 30. Its diameter is larger than that of the photographic lens 30 so that the front of the photographic lens 30 is not covered by the lens base plate 23 in the direction of the photographic optical axis O. The AF/AE shutter unit 31 is fixed to the lens base plate 23 such that a photographic optical axis O of the photographic lens 30 extends in a direction perpendicular to the lens base plate 23. Accordingly, when the camera 10 is in the photo-ready state, the photographic optical axis O is horizontally inclined to a right/left (lengthwise) direction of the camera 10 (direction shown by an arrow "D") as can be seen in FIG. 3. When the camera 10 is in the lens-retracted state, the photographic optical axis O extends in a direction substantially normal to the rear surface 11b of the camera body 11.

In order to prevent ambient light from entering into a photographic light path which is formed between the photographic lens 30 and a surface Fe of the film F (which is equivalent to an image plane), to be exposed during a shutter release immediately in front of the pressure plate 50 when the camera 10 is in the photo-ready state (not shown) bellows serving as a flexible light-interceptive member are provided between the upper edge of the lens base plate 23 and a corresponding portion of the front side wall 11a. Similar bellows (not shown) are also provided extending between the lower edge of the lens base plate 23 and a corresponding portion of the front side wall 11a. Accordingly, even when the lens base plate 23 and the cover plate 25 are both in the respective open positions, no ambient light enters the photographic light path due to the arrangement of the aforementioned upper and lower bellows. When the lens base plate 23 is closed, i.e., in the closed position, the upper and lower bellows are each folded up and retracted into a substantially wedge-shaped space 48 formed between the front of the camera body 11 (the lens base plate 23 in the closed position) and the pressure plate 50 in the camera body 11.

As shown in FIG. 4, the camera 10 is provided inside the camera body 11 with a flashlight emitter 32, an AF sensor unit 33, a finder optical system 34 and a photometering sensor unit 35 which are respectively positioned behind the flash window 15, the AF window 16, the finder objective window 17 and the photometric window 18. The optical axis of each of the flashlight emitter 16, the AF sensor unit 33, the finder optical system 34 and the photometering sensor unit 35 is arranged substantially in parallel to the photographic optical axis O in the photo-ready state. Accordingly, the optical axis of each of the flashlight emitter 16, the AF sensor unit 33, the finder optical system 34 and the photometering sensor unit 35 is inclined to the right/left direction of the camera 10, similar to the photographic optical axis O in the photo-ready state.

The finder optical system 34 is formed such that the finder optical axis thereof bends left at a right angle and subsequently bends rearwardly at a right angle as viewed in FIG. 4. A subject-side end portion 34a of the finder optical system 34 faces the finder objective window 17 while an eyepiece-side end portion 34b of the same faces an eyepiece window 14 (see FIGS. 4 and 8) provided on the rear of the camera body 11 at an upper corresponding portion thereof.

Figure 7:
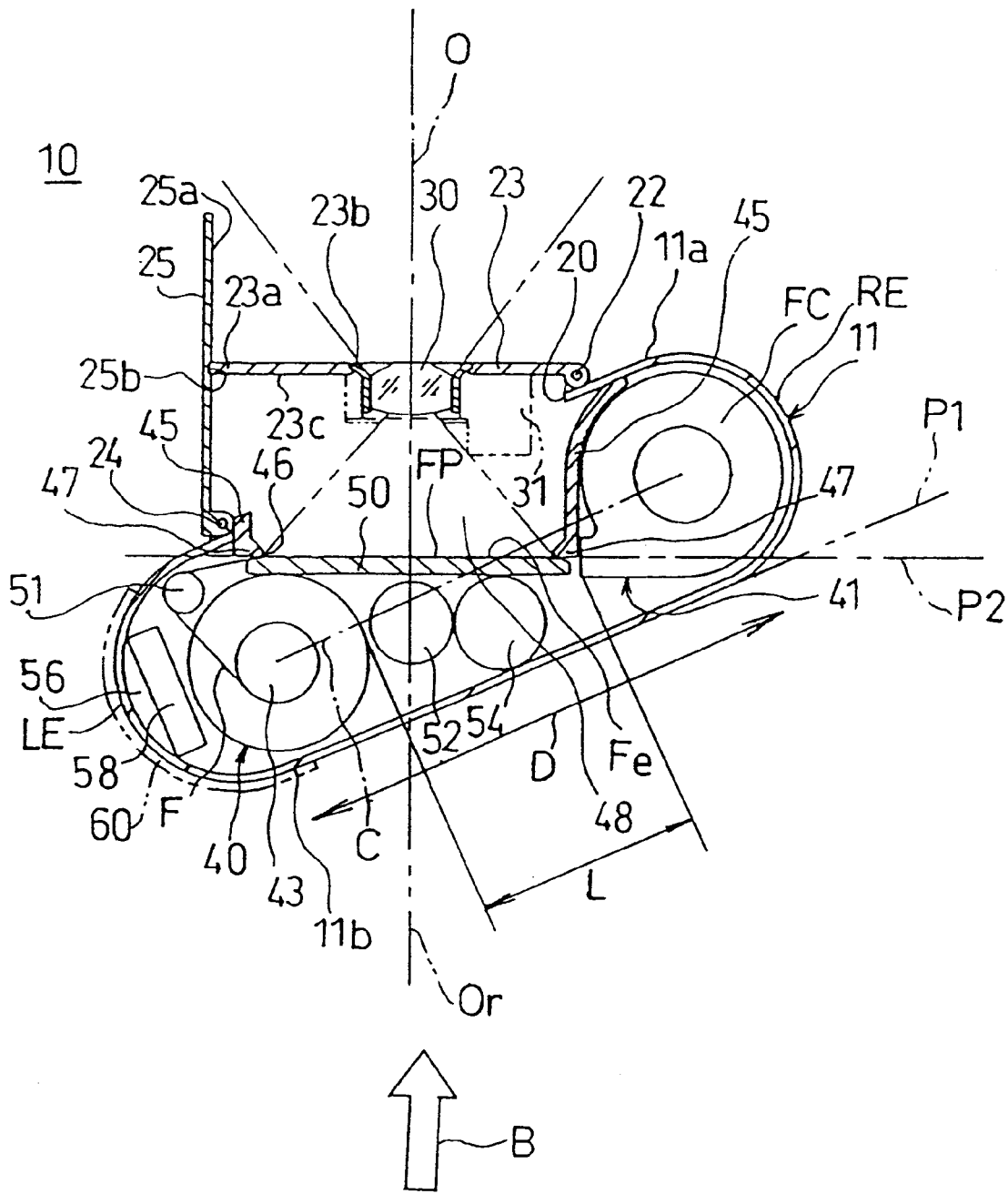
FIG. 7 is a sectional view of the lens shutter type camera taken along line III—III of FIG. 1.
Figure 8:
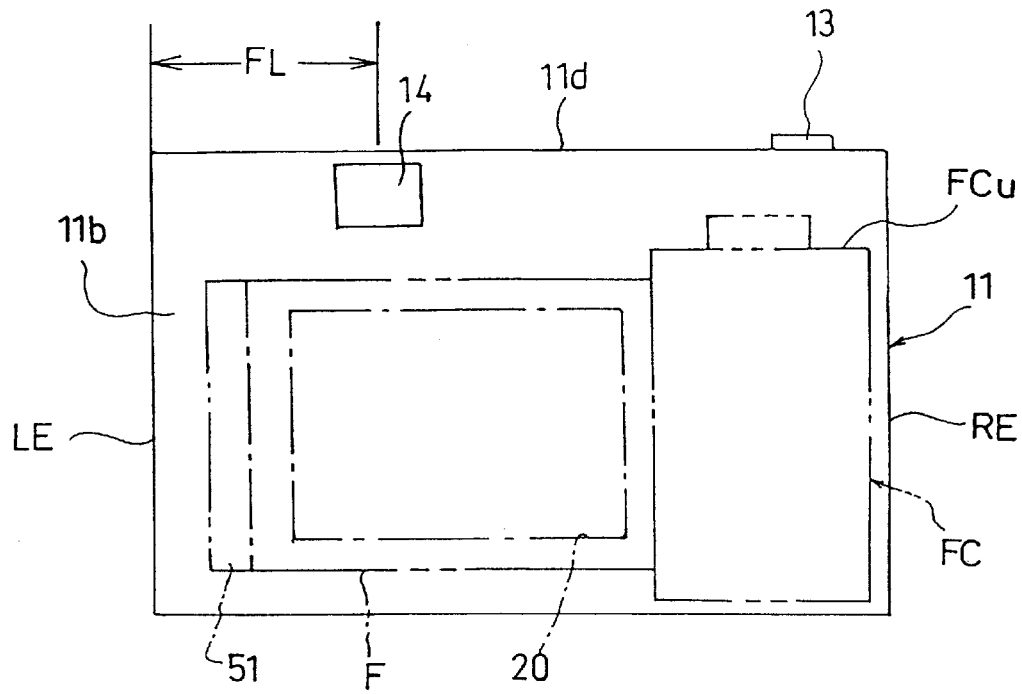
FIG. 8 is a rear side view of the lens shutter type camera shown in FIG. 1 as viewed in the direction of an arrow B shown in FIG. 7.
Figure 9:
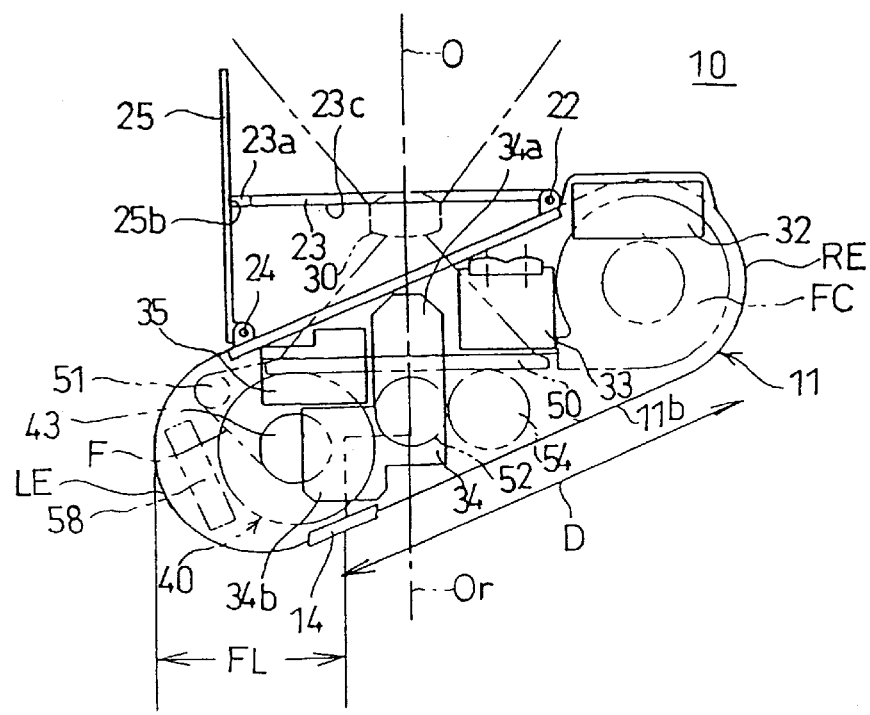
FIG. 9 is a sectional view of the lens shutter type camera taken along line IV—IV of FIG. 1.

The eyepiece window 14 is positioned on the rear surface 11b of the camera body 11 at an upper left portion thereof as viewed from the back of the camera 10 as shown in FIG. 8. In other words, the eyepiece window 14 is positioned on a lower rear portion of the rear surface 11b relative to a rearwardly extended axis Or (see FIGS. 7 and 9) of the photographic optical axis O, as viewed in FIG. 7 or 9. Namely, the eyepiece window 14 is positioned on a left side of the rear surface 11b which is located rearwardly with respect to a right side of the rear surface 11b in the direction of the optical axis O. Accordingly, the eyepiece window 14 is positioned at an upper left portion of the rear surface 11b in the vicinity of a left curved side end LE of the camera body 11.

In a direction (lateral direction as viewed in FIG. 9) perpendicular to the photographic optical axis O and in parallel to the widthwise direction of a rectangular photographic aperture 46, the distance FL (see FIGS. 8 and 9) between the leftmost end of the left curved side end LE (i.e., the leftmost end of the camera body 11) and the center of the eyepiece window 14 is predetermined to be approximately 20 mm. The distance FL is preferably within the range of about 5 mm to 30 mm. Providing the eyepiece window 14 at a position on the rear surface 11b within the aforementioned limit range makes it easier for a user (photographer) to look into the eyepiece window 14 in the case where the user looks into the same with their right eye, due to the reasons which will be hereinafter discussed with reference to FIGS. 10 and 11.

Figure 10:
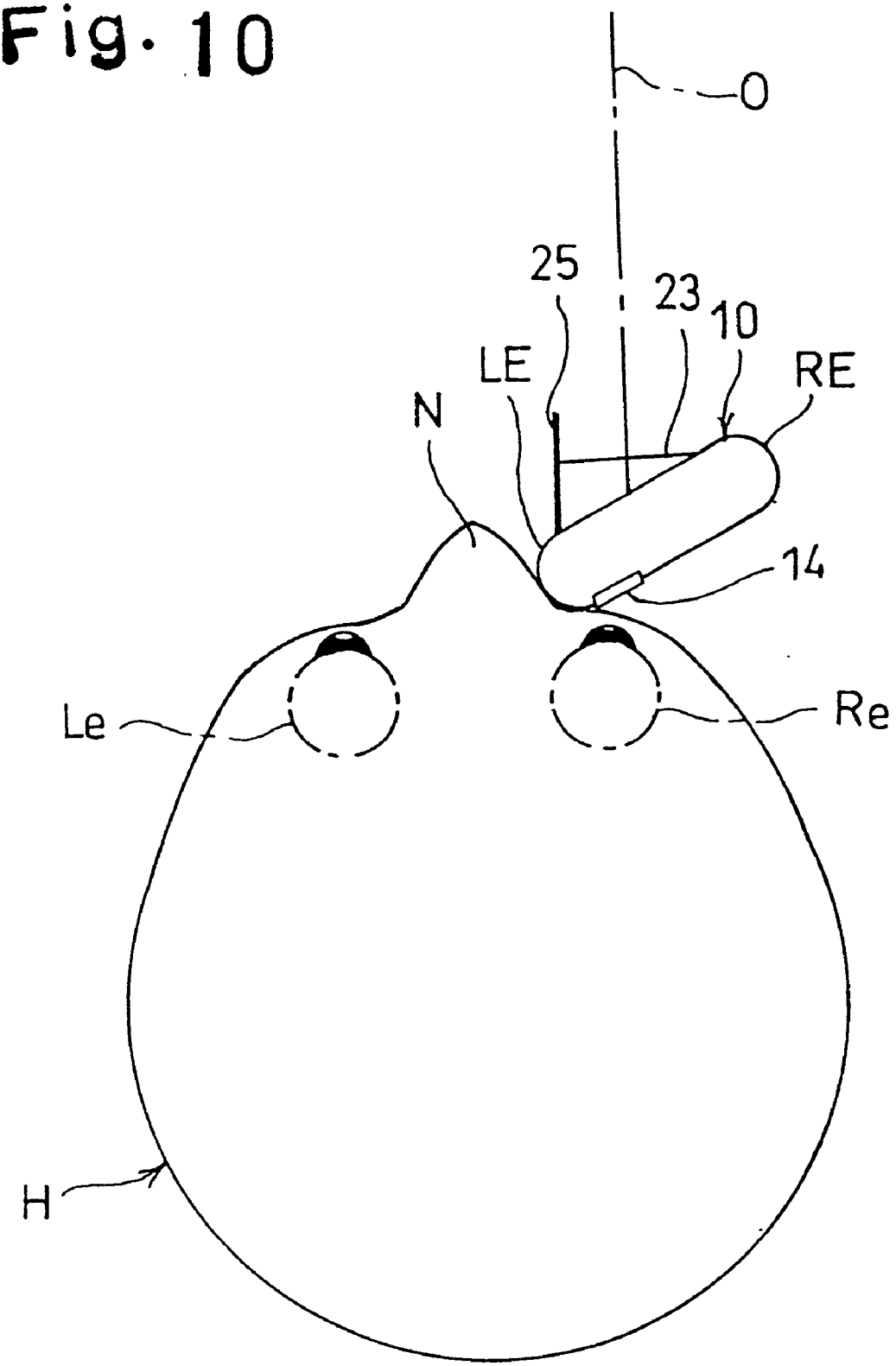
FIG. 10 is an explanatory view illustrating a positional relationship between the camera shown in FIG. 1 and the head of a user who is holding the camera while looking into an eyepiece window thereof.

FIG. 10 shows a positional relationship between the camera 10 and the head H of the user who is holding the camera 10 while looking into the eyepiece window 14 using his or her right eye Re.

In general, when taking a photo, the user holds the camera 10 in the photo-ready state while directing the photographic optical axis O toward a subject (not shown) as shown in FIG. 10. In this case, the user usually takes the following camera-holding posture: holding the camera body 11 in his or her right hand (not shown) with the palm of his or her hand touching a right curved side end RE of the camera body 11, and at the same time, having the left curved side end LE touch the user's face on the right-hand side of his or her nose N, as shown in FIG. 10. In order to more firmly hold the camera 10, the user may use their other hand (left hand) to hold the camera body 11 in the vicinity of the left curved side end LE. In the case where the user holds the camera 10 using both hands, i.e., holds the camera 10 with their right and left hands respectively holding the right and left sides of the camera body 11, the user can hold the camera 10 in the vicinity of the right-hand side of their nose N without having the left curved side end LE touch the user's face on the right-hand side of their nose N, as shown in FIG. 11.

Figure 11:
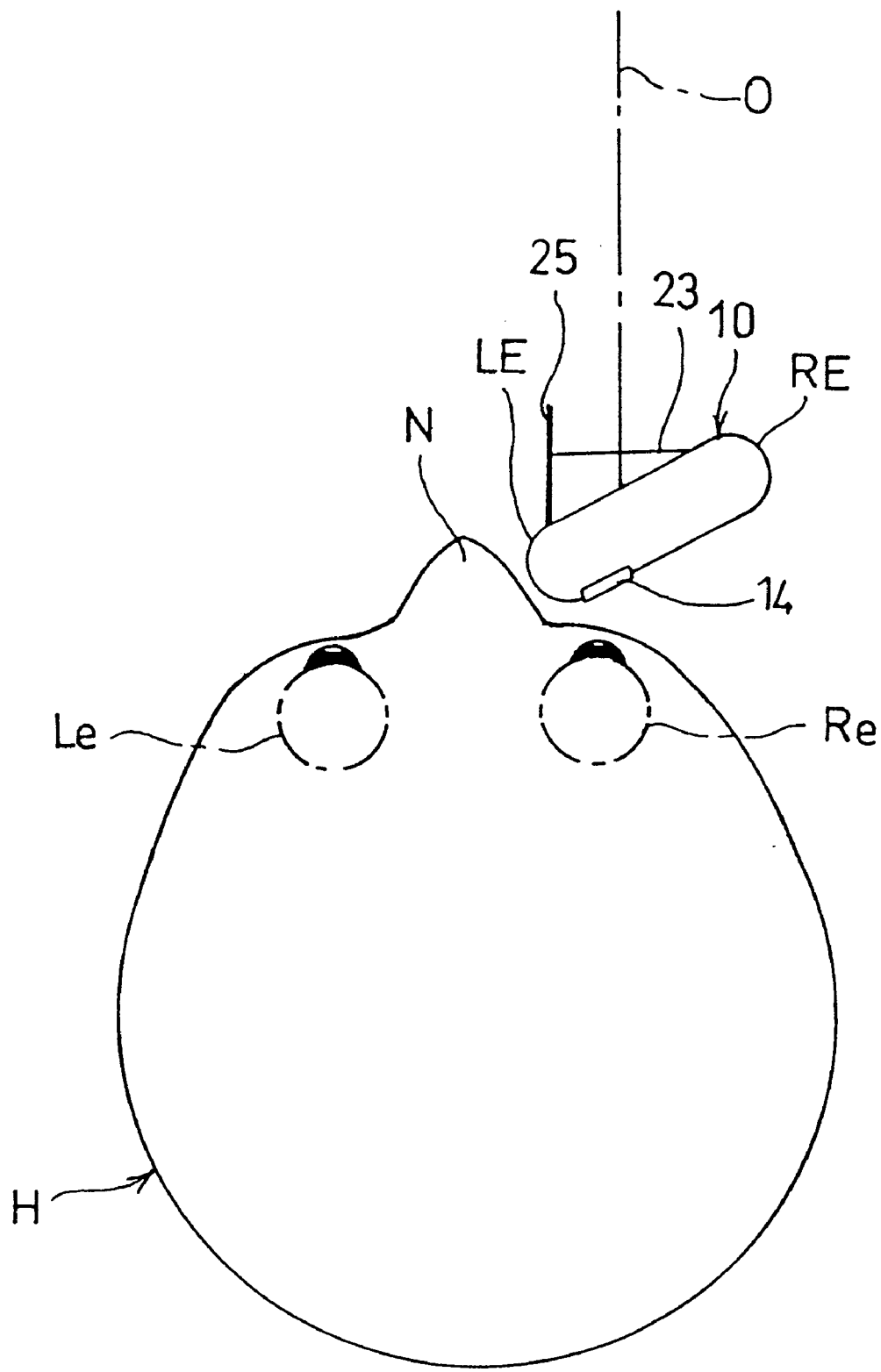
FIG. 11 is an explanatory view illustrating a positional relationship between the camera shown in FIG. 1 and the head of a user who is holding the camera while looking into an eyepiece window thereof in a manner different from that shown in FIG. 10.

When the user holds the camera 10 using the posture shown in FIGS. 10 or 11, the eyepiece window 14 is located right in front of the right eye Re of the user. Accordingly, the user of the camera 10 can easily look into the eyepiece window 14, which results in an easy handling of the camera 10. If the eyepiece window 14 were provided on the rear surface 11b out of the aforementioned limit range (the range of about 5 mm to 30 mm), e.g., at about the upper center of the rear surface 11b or on the upper front side thereof relative to the rearwardly extended axis Or, the user's nose N would obstruct the user from looking into the eyepiece window 14 using their right eye Re. According to the camera 10, since the eyepiece window 14 is provided on an upper left portion of the back of the camera body 11 in the vicinity of the left curved side end LE, such a problem does not occur.

The peripheral surface of each of the right and left curved side ends RE and LE is formed as a curved surface having a substantially arc shape in a cross section. As has been noted above, the user of the camera 10 usually holds the camera body 11 by having the left curved side end LE touch the user's face on the right-hand side of their nose N when taking a photo. Due to this, it is preferable to form the peripheral surface of the left curved side end LE to have a curved or arc shape so as to increase the comfort of the left curved side end Le with respect to the user's face. To improve comfort, a sheet cushioning member 60 (shown by double-dotted lines in FIG. 7) may be fixed to the peripheral surface of the left curved side end LE. The sheet cushioning member 60 may be made of polyurethane foam, rubber or the like.

A cartridge chamber 41 that accommodates a film cartridge FC, and a spool chamber (film take-up chamber) 40 that accommodates a film take-up spool 43 which takes up the film F from the cartridge FC, are respectively formed on right and left side of the camera body 11 as viewed in FIG. 3. The cartridge chamber 41 is formed in the vicinity of a right side end of the camera body 11, which is located in the forward end of the corner with respect to a left side end of the camera body 11 in the direction of the photographic optical axis O, as viewed in FIG. 3. The spool chamber 40 is formed in the vicinity of the left side end of the camera body 11. The film cartridge FC is a conventional 35 mm film cassette and is loaded in the camera 10 by manually inserting the cassette FC in the cartridge chamber 41 in a predetermined direction through a cartridge insertion opening 72 (see FIG. 19) formed on the bottom of the camera body 11 at a corresponding portion thereof.

A distance L (see FIG. 3) between the spool chamber 40 and the cartridge chamber 41 is shorter than the width of the aforementioned photographic aperture 46 which is positioned immediately in front of the pressure plate 50. The photographic aperture 46 determines the limits of each frame exposed, i.e., determines the area of the surface Fe of the film F. Specifically, in the preferred embodiment the dimension of the rectangular photographic aperture 46 is 36 mm by 24 mm, i.e., the width of the rectangular photographic aperture 46 is 36 mm, whereas the distance L is approximately 28 mm.

The camera 10 is provided with a frame 45 fixed to the camera body 11 which extends inwardly from the rectangular opening 20 so as to surround the aforementioned photographic light path formed between the photographic lens 30 and the surface Fe. An aperture frame 47 having the aforementioned photographic aperture 46 in the center thereof is integrally formed on the frame 45 at the rear end thereof. The pressure plate 50 is positioned behind the aperture frame 47 to form a film passage FP of a predetermined thickness therebetween. The film F drawn out of the film cartridge FC is guided from the cartridge chamber 41 to the spool chamber 40 through the film passage FP. The aperture frame 47 lies in a plane which extends in the vertical direction of the camera 10 and which is inclined to the right/left direction of the camera 10. The lens base plate 23 in the open position and the aperture frame 47 are in parallel to each other, so that the photographic optical axis O in the photo-ready state extends perpendicular to a plane in which the aperture frame 47 lies.

The aperture frame 47 is provided, on a rear surface at upper and lower portions thereof, with upper and lower film-guiding rails (not shown) parallel to each other, respectively. Accordingly, strictly speaking, the aforementioned film passage FP is formed between the upper and lower film-guiding rails on the aperture frame 47 and the pressure plate 50. The photographic aperture 46 is formed on the aperture frame 47 between the upper and lower film-guiding rails. Accordingly, an area on the film F to be exposed which lies on the pressure plate 50 and faces the photographic lens 30 through the photographic aperture 46, i.e., the surface Fe to be exposed during a shutter release, is in parallel to the lens base plate 23 in the open position. Therefore, the surface Fe lies in a plane which is inclined to the right/left direction of the camera 10. Further, the surface Fe intersects a plane C (shown by single-dotted lines in FIG. 3) which connects the axial center of the film take-up spool 43 with the axial center of a cartridge spool 44 of the film cartridge FC. The rear surface 11*b* of the camera body 11 is arranged substantially in parallel to the plane C. Accordingly, a plane P1 in which the rear surface 11*b* of the camera body 11 lies intersects a plane P2 in which the surface Fe lies (see FIG. 7).

As can be seen from FIGS. 3 through 6, a space in the camera body 11 which is surrounded by the frame 45 between the front lens base plate 23 in the closed position and the pressure plate 50 is provided as the aforementioned wedge-shaped space 48. The AF/AE shutter unit 31 retracts in the space 48 when the lens base plate 23 is closed.

The camera body 11 is provided therein with a guide roller 51 adjacent to one end (left end as viewed in FIG. 3) of the pressure plate 50 and the spool chamber 40. The guide roller 51 is rotatable about its axis thereof and extends in the vertical direction of the camera 10. The film F is drawn out of the film cartridge FC to reach the guide roller 51; this leads the film F to be wound by the film take-up spool 43 in a counterclockwise direction as viewed in FIG. 3.

A cylindrical motor 52 and a cylindrical condenser 54 are arranged side by side in a substantially wedge-shaped space 49 between the spool chamber 40 and the cartridge chamber 41 behind the pressure plate 50. The motor 52 drives the film take-up spool 43 and the cartridge spool 44 to rotate for a film winding or rewinding operation. The condenser 54 supplies electrical power to the flashlight emitter 32. Such a space-efficient arrangement of the cylindrical motor 52 and the cylindrical condenser 54 in the wedge-shaped space 49 formed between the surface Fe and the rear surface 11*b* of the camera body 11 contributes to downsizing camera body 11.

Figure 63:
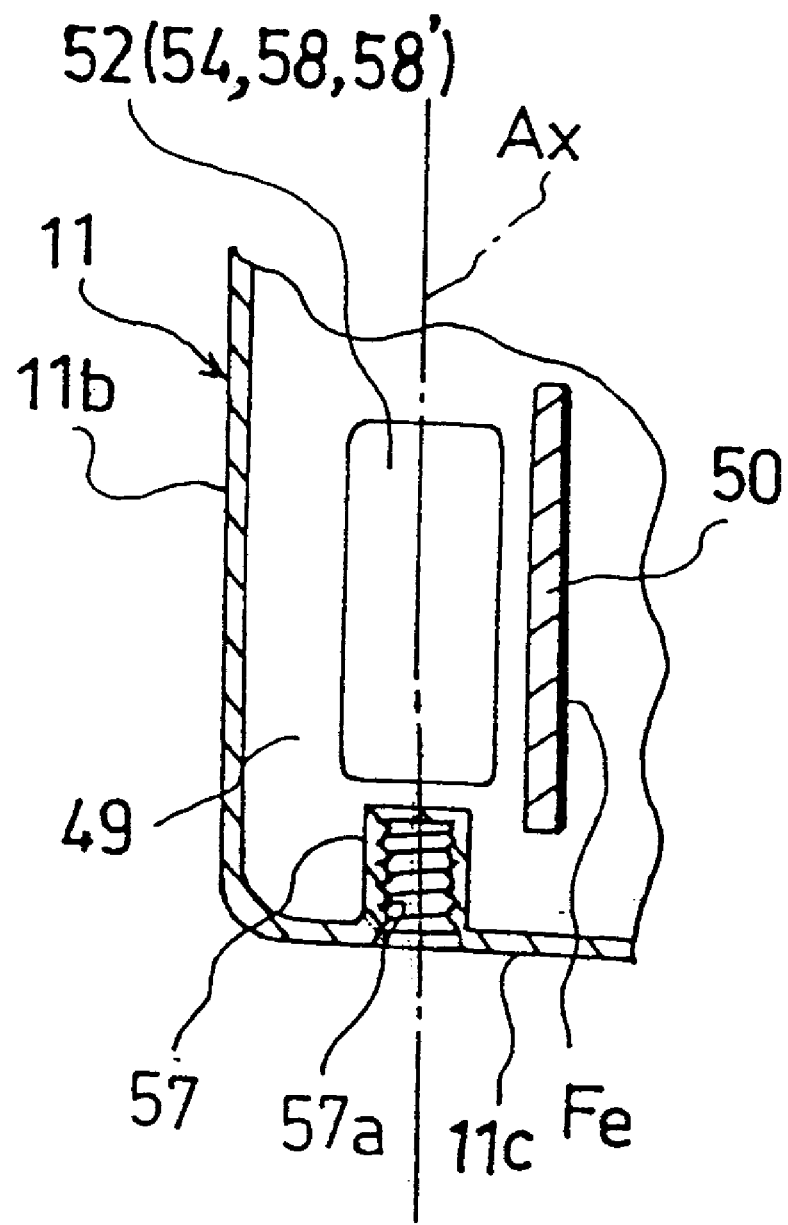
FIG. 63 is a cross sectional view of a part of the camera shown in FIG. 1.

As shown in FIG. 63, the camera body 11 is provided with a cylindrical projection 57 which projects upwards from a bottom surface 11*c* of the camera body 11 into the wedge-shaped space 49. A female screw thread 57*a* is formed on an inner peripheral surface of the cylindrical projection 57. When the camera 10 is used with a tripod (not shown), a male screw of the tripod for connecting the tripod to the camera 10 is engaged with the female screw thread 57*a*. The cylindrical motor 52 is arranged in the wedge-shaped space 49 above the cylindrical projection 57 with the cylindrical motor 52 and the cylindrical projection 57 being arranged substantially on a common axis Ax extending in the vertical direction of the camera 10. Such a space-efficient arrangement of the cylindrical motor 52 and the cylindrical projection 57 in the wedge-shaped space 49 on the common axis Ax contributes to downsizing the camera body 11. Instead of the cylindrical motor 52, the cylindrical condenser 54 may be arranged above the cylindrical projection 57 on the common axis Ax to obtain a similar effect.

A battery chamber 56 is formed between the spool chamber 40 and the camera body 11. In the battery chamber 56 a rectangular rechargeable battery 58 such as an Ni—Cd battery, an Ni—MH battery, a Lithium-Ion battery, or the like serving as a power source of the camera 10 is stored. The battery 58 is inserted in the battery chamber 56 in a predetermined direction through a battery insertion opening (not shown) formed on the bottom of the camera body 11 at a corresponding portion thereof.

As can be understood from the foregoing, according to the first embodiment of the camera 10 having the aforementioned structures, the rectangular surface Fe of the film F to be exposed is arranged in a plane which is inclined to the right/left direction of the camera 10 (direction shown by the arrow "D"), not in a plane substantially parallel to the right/left direction of the camera 10, and the surface Fe is arranged to intersect the aforementioned plane C. Due to the unique arrangements to the camera 10, the distance L between the spool chamber 40 and the cartridge chamber 41 is much shorter than the width of the rectangular photographic aperture 46. This contributes to the reduction of size of the camera 10 when not in use, especially for reducing the width of the camera 10 in the right/left direction thereof.

Moreover, according to the camera 10 having the aforementioned structures, since the eyepiece window 14 is arranged on the back of the camera body 11 at a position within the aforementioned limit range, the user can easily look into the eyepiece window 14. In addition, the user can hold the camera body 11 in their right hand while having the left curved side end LE touch their face on the right-hand side of their nose N without using their left hand. The user can firmly hold the camera 10 between their right hand and face when taking a photo, reducing handshaking which can cause a blurry photographed image.

Figure 12:
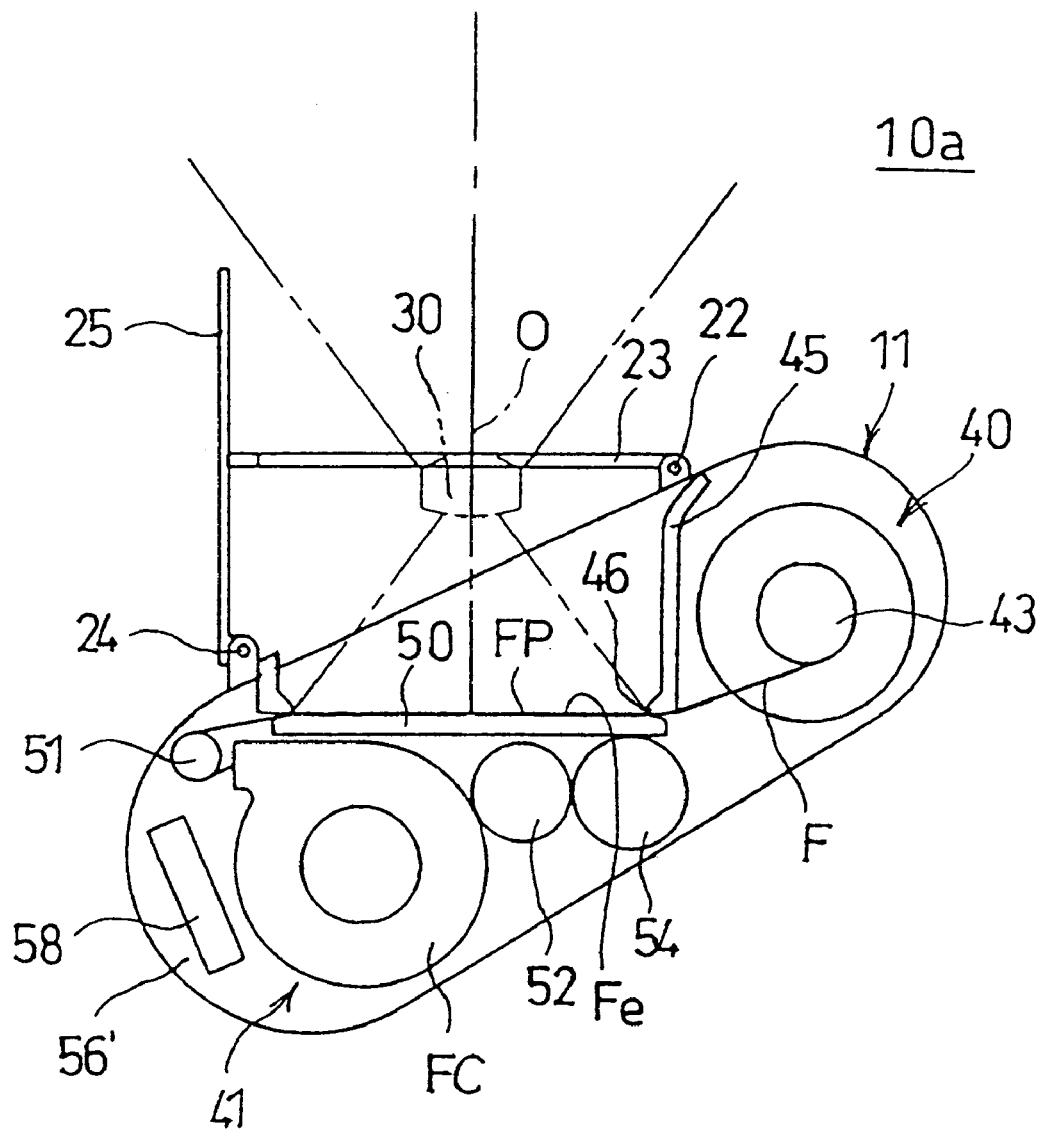
FIG. 12 is a schematic illustration of a modification of the first embodiment of the lens shutter type camera in a photo-ready state.

FIG. 12 shows a modification of the camera 10, i.e., a camera 10a, in a photo-ready state. In the camera 10a the spool chamber 40 and cartridge chamber 41 are reversed in the camera body 11 as compared with the camera 10, i.e., the spool chamber 40 and the cartridge chamber 41 are formed right and left in the camera body 11, respectively, as viewed in FIG. 12. Further, a battery chamber 56' which corresponds to the battery chamber 56 of the camera 10 is formed in the camera body 11 between the cartridge chamber 41 and the camera body 11, and the film F drawn out of the film cartridge FC is positioned on the guide roller 51 to lead the film F to the spool chamber 40. Except for these structural differences, the camera 10a is substantially identical to the camera 10.

Figure 13:
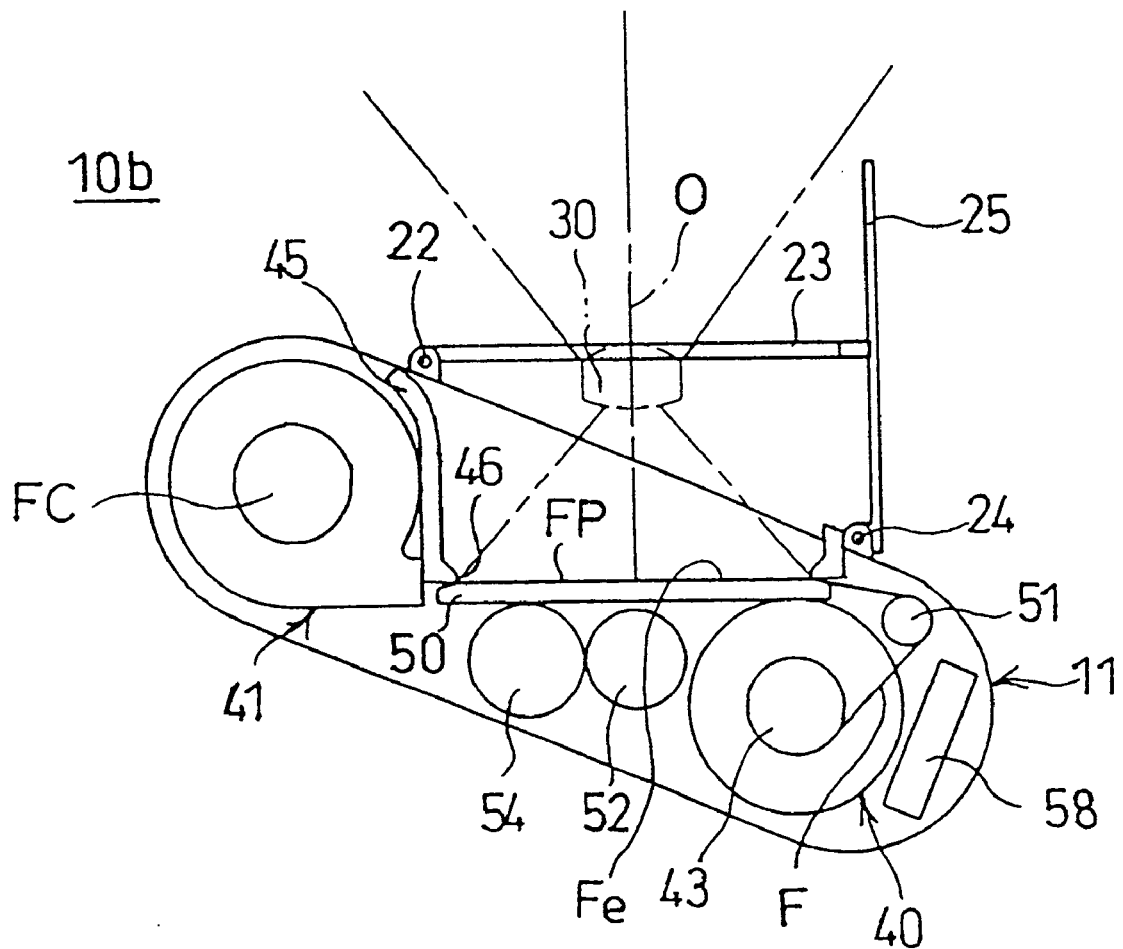
FIG. 13 is a schematic illustration of another modification of the first embodiment of the lens shutter type camera in a photo-ready state.
Figure 14:
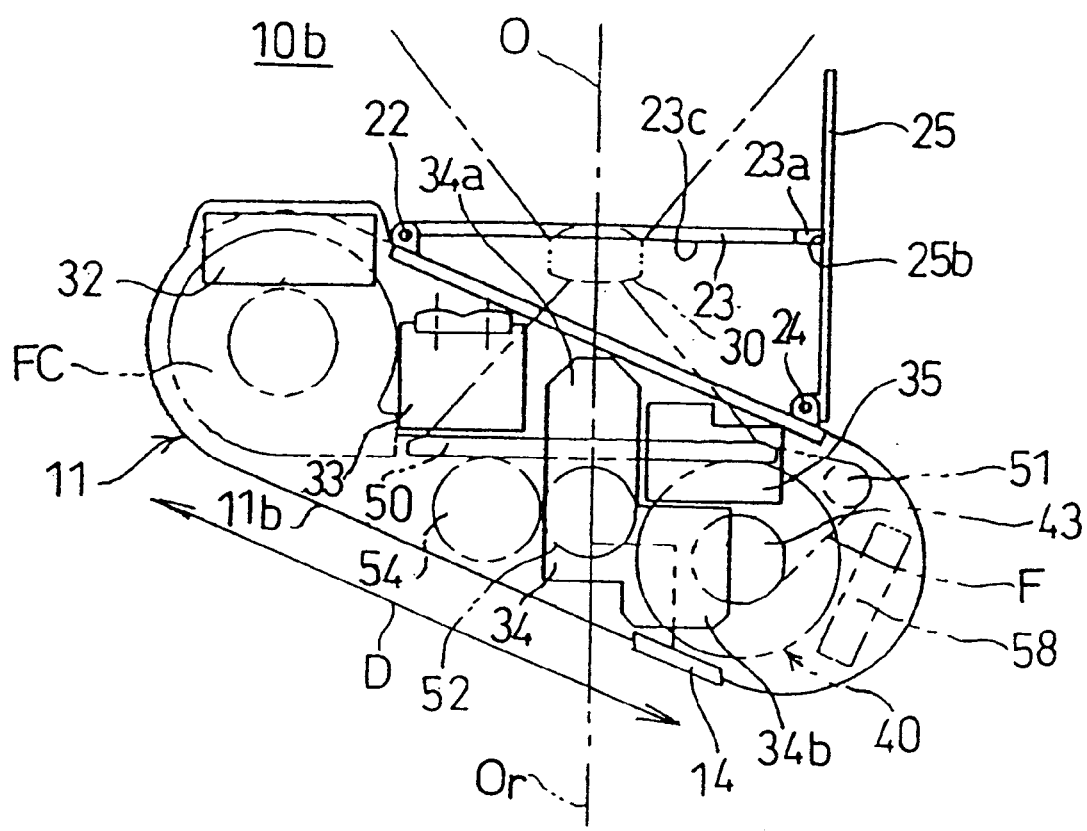
FIG. 14 is a schematic illustration of the lens shutter type camera shown in FIG. 13.

FIGS. 13 and 14 show another modification of the camera 10, i.e., a camera 10b, in a photo-ready state. In the camera 10b, all the components are reversed right and left as compared with the camera 10, i.e., the camera 10b is a mirror image of the camera 10.

Figure 15:
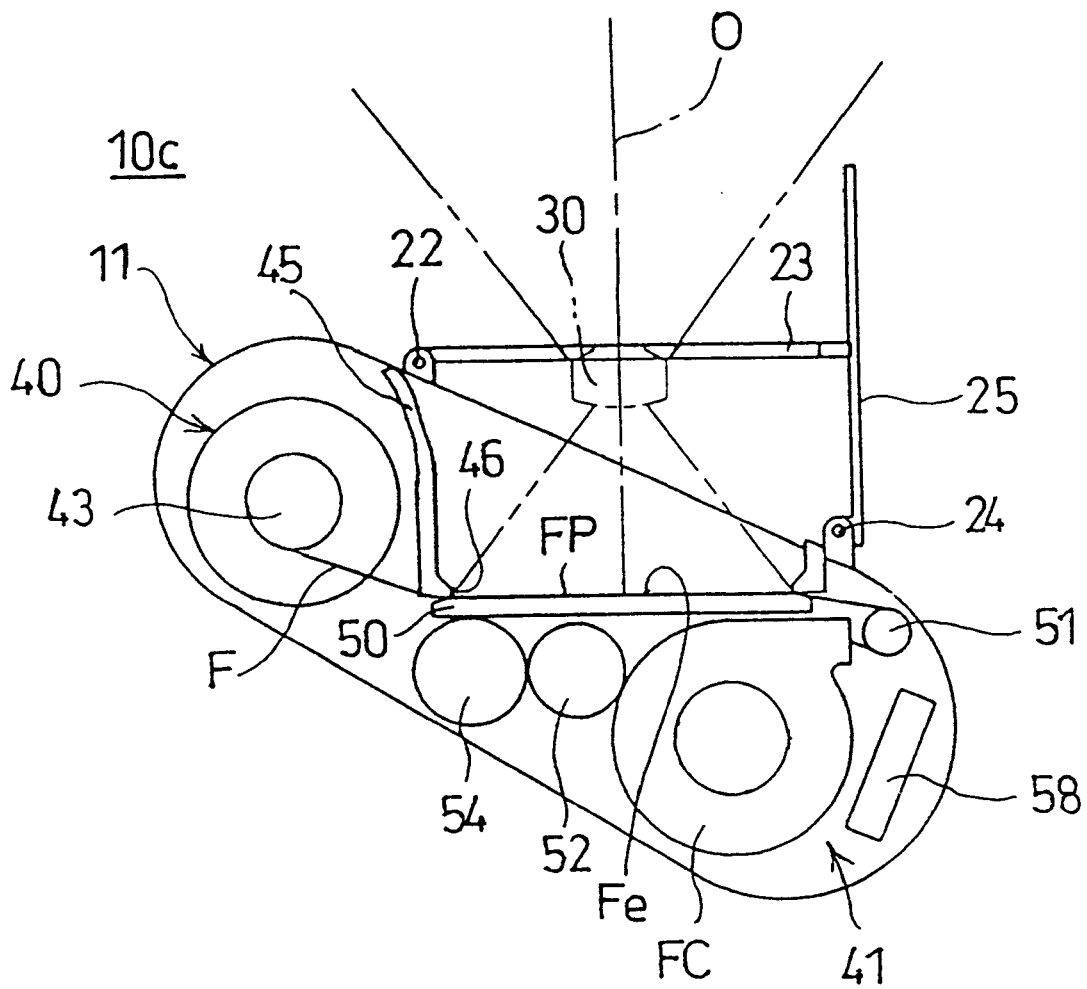
FIG. 15 is a schematic illustration of yet another modification of the first embodiment of the lens shutter type camera in a photo-ready state.

FIG. 15 shows still another modification of the camera 10, i.e., a camera 10c, in a photo-ready state. In the camera 10c the spool chamber 40 and cartridge chamber 41 are reversed as compared with the camera 10b, i.e., the spool chamber 40 and the cartridge chamber 41 are formed left and right in the camera body 11, respectively, as viewed in FIG. 15. The camera 10c is a mirror image of the camera 10a.

Figure 16:
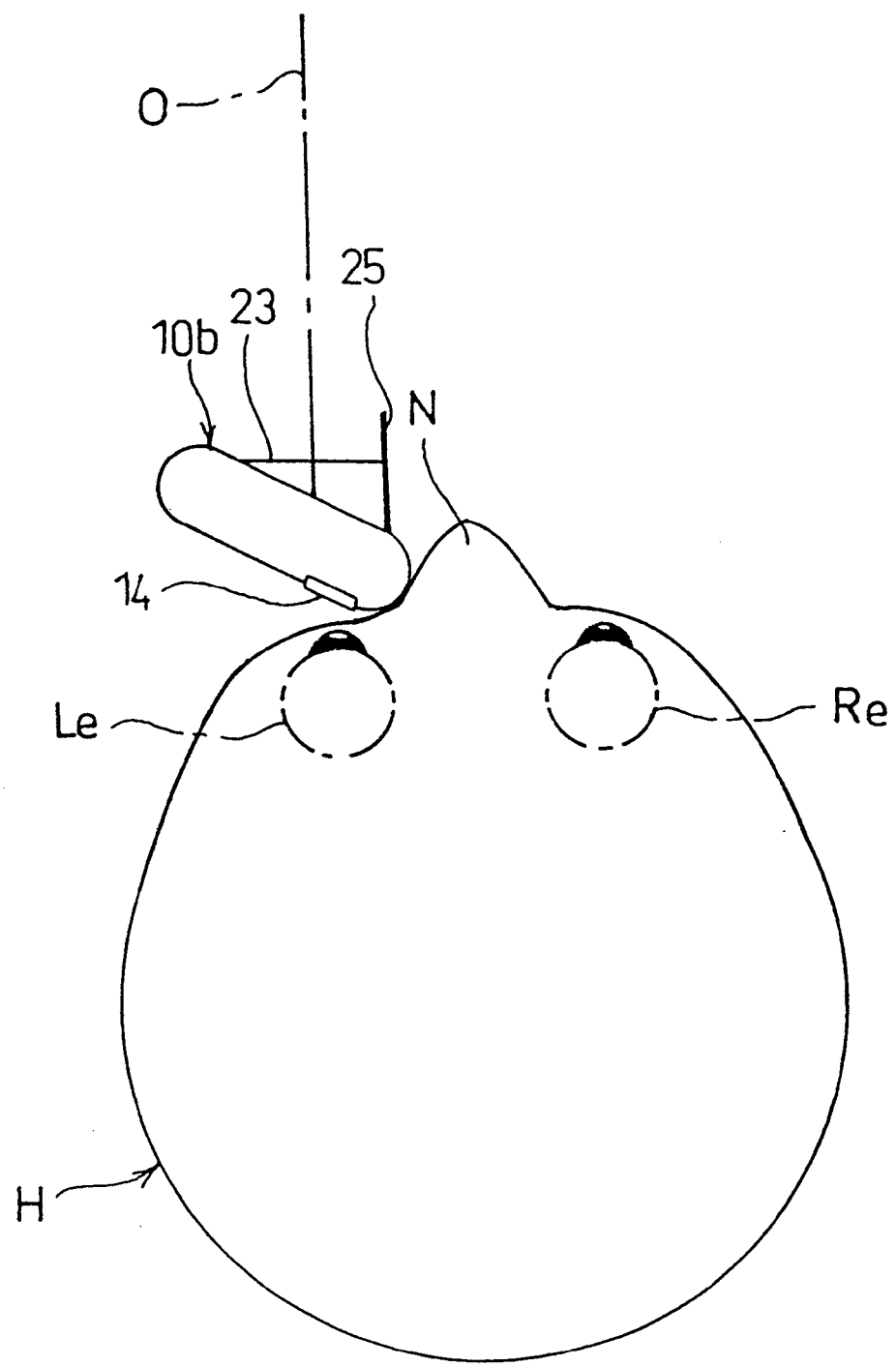
FIG. 16 is an explanatory view illustrating a positional relationship between the camera shown in FIGS. 13 or 14 and the head of a user who is holding the camera while looking into an eyepiece window thereof.

Either the camera 10b or 10c is suitable to the user who desires to look into the eyepiece window 14 using their left eye Le. When the user holds the camera 10 while looking into the eyepiece window 14 using their left eye Le, the user will look into the eyepiece window 14 in a manner such as shown in FIG. 16.

Although the camera body 10 is formed such that the right and left curved side ends RE and LE each have a curved peripheral surface, considering to make the portion of the camera, which may be brought into contact with the user's face when taking a photo, to be soft-and not be a nuisance to the user's face, it is sufficient to form only one of the right and left curved side ends RE and LE which is located closer to the eyepiece window 14 to have such a curved peripheral surface. Accordingly, the peripheral surface of the other of the right and left curved side ends RE and LE may be formed in a different shape. Only that part of the peripheral surface of the right or left curved side end RE or LE which may contact the user's face when taking a photo may be formed in a curved shape so as not to be a nuisance to the user's face. Such a part may be a lower rearmost part of the camera body 11 relative to the photographic optical axis O. Even if such modifications in shape are made to the camera body 11, the user of the camera 10 can have a similar comfort to that of the first embodiment of the camera 10, 10a, 10b or 10c.

In the first embodiment, the film cartridge FC used for the camera 10, 10a, 10b or 10c is a 35 mm cassette as noted above. The film cartridge FC is not limited solely to the 35 mm cassette but may be any other type of film cartridge which contains a film rolled therein, such as an IX240 cassette recently developed for the Advanced Photo System.

Each camera 10, 10a, 10b or 10c is a single focal point type of an AF compact lens shutter type camera, but may be modified to be designed as a focal-point variable type (e.g., selectable between a wide angle position and a telephoto position) of an AF compact lens shutter type camera, or an AF compact lens shutter type camera having a zoom lens. Moreover, each camera 10, 10a, 10b or 10c may be modified to be designed as an SLR camera.

Figure 17:
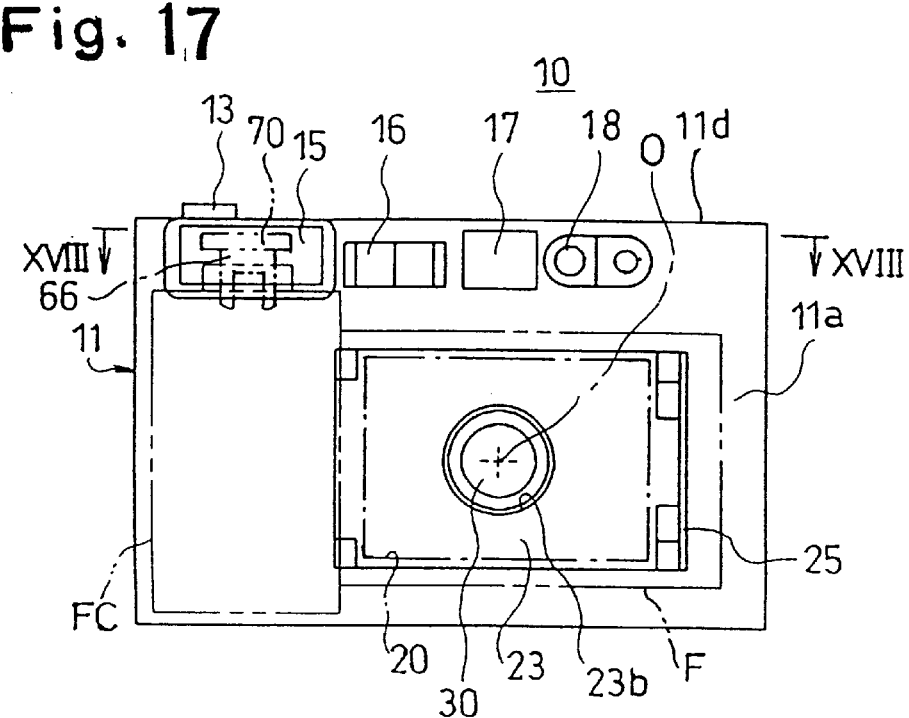
FIG. 17 is a front side view of the first embodiment of the lens shutter type camera in a photo-ready state as viewed from the front in the direction of the optical axis of the photographic lens of the camera.
Figure 18:
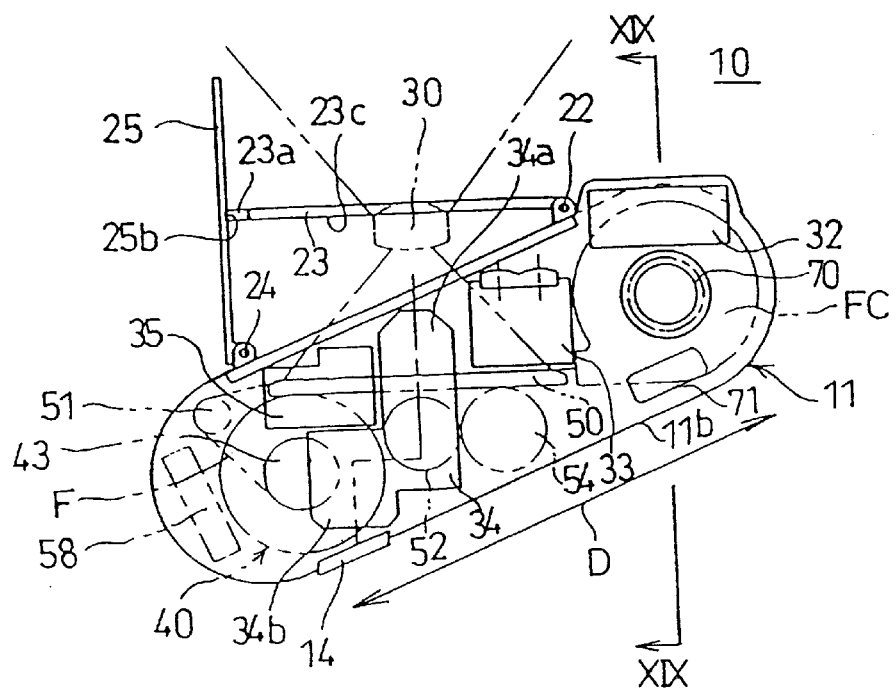
FIG. 18 is a sectional view of the lens shutter type camera taken along line XVIII—XVIII of FIG. 17.

Details of the structure of the camera 10 around the cartridge chamber 41 will be hereinafter discussed with reference to mainly FIGS. 17, 18 and 19.

Figure 19:
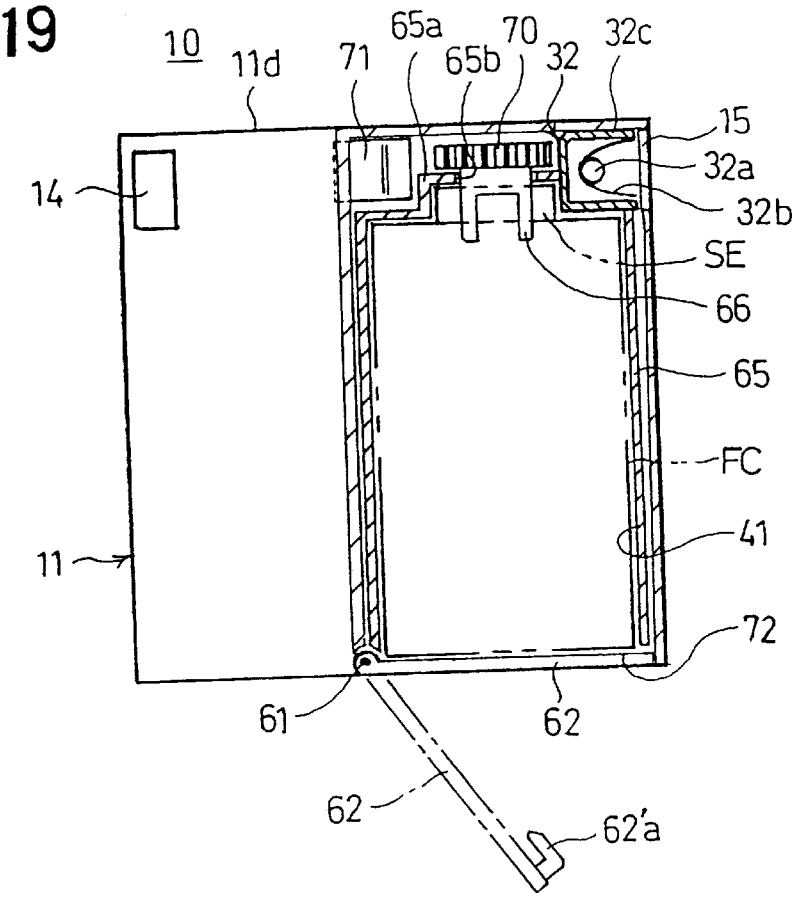
FIG. 19 is a sectional view of the lens shutter type camera taken along line XIX—XIX of FIG. 18.

As shown in FIG. 19, the cartridge insertion opening 72 is opened or closed by a lid 62 which is pivoted about a shaft 61 fixed to the bottom of the camera body 11. The lid 62 is provided at a free end on an inner surface thereof with a claw portion 62a. When the lid 62 is manually closed, the claw portion 62a is engaged with an engaging portion (not shown) formed on a corresponding portion of the camera body 11 to thereby lock the lid 62 in a closed position thereof. In FIG. 19, the lid 62 in the closed position is shown by a solid line while the lid 62 in an open position is shown by single-dotted lines.

The cartridge chamber 41 is surrounded by a frame member 65 positioned in and fixed to the camera body 11. The frame 45 is formed integral with the frame member 65. The frame member 65 is provided at an upper end thereof with a raised portion 65a which projects upwards from the upper end of the frame member 65. The raised portion 65a is provided at an approximate center thereof with a circular opening 65b. Through the circular opening 65b an engaging fork (rotational engaging projection) 66 which is engageable with one end SE of the cartridge spool 44, projects into the cartridge chamber 41. When the film cartridge FC is inserted in the cartridge chamber 41 in the predetermined direction, the end SE of the cartridge spool 44 is engaged with the engaging fork 66.

A fork drive gear 70 is arranged in a space in the camera body 11 between an upper wall 11d of the camera body 11 and the raised portion 65a. The fork drive gear 70 is formed integral with the aforementioned engaging fork 66 such that the upper end of the engaging fork 66 is coaxially secured to the fork drive gear 70. The fork drive gear 70 is driven to rotate by the motor 52 through a gear train (not shown) which connects the fork drive gear 70 with a drive pinion (not shown) of the motor 52, so that the engaging fork 66 is driven to rotate when the motor 52 is actuated.

The flashlight emitter 32 is arranged in a space in the camera body 11 which is formed immediately in front of the raised portion 65a, i.e., in front of the engaging fork 66. The flashlight emitter 32 consists of a xenon flash tube 32a, a reflector 32b and a casing 32c in which the xenon flash tube 32a and the reflector 32b are supported thereon. The casing 32c is secured on the frame member 65. Owing to such an arrangement of the flashlight emitter 32 positioned in the space in the camera body 11 in front of the engaging fork 66, the limited inner space of the camera body 11 is space-effectively utilized, which contributes to the reduction in size of the camera 10.

A flash circuit block (circuit block) 71 for controlling an emission of the xenon flash tube 32a is arranged in the camera body 11 in a space formed immediately behind the raised portion 65a, i.e., behind the engaging fork 66. The xenon flash tube 32a is electrically connected to the flash circuit block 71. Owing to such an arrangement of the flash circuit block 71 positioned in the space in the camera body 11 behind the engaging fork 66, the limited inner space of the camera body 11 is space-effectively utilized, which contributes to the reduction in size of the camera 10, similar to the arrangement of the flashlight emitter 32.

Figure 20:
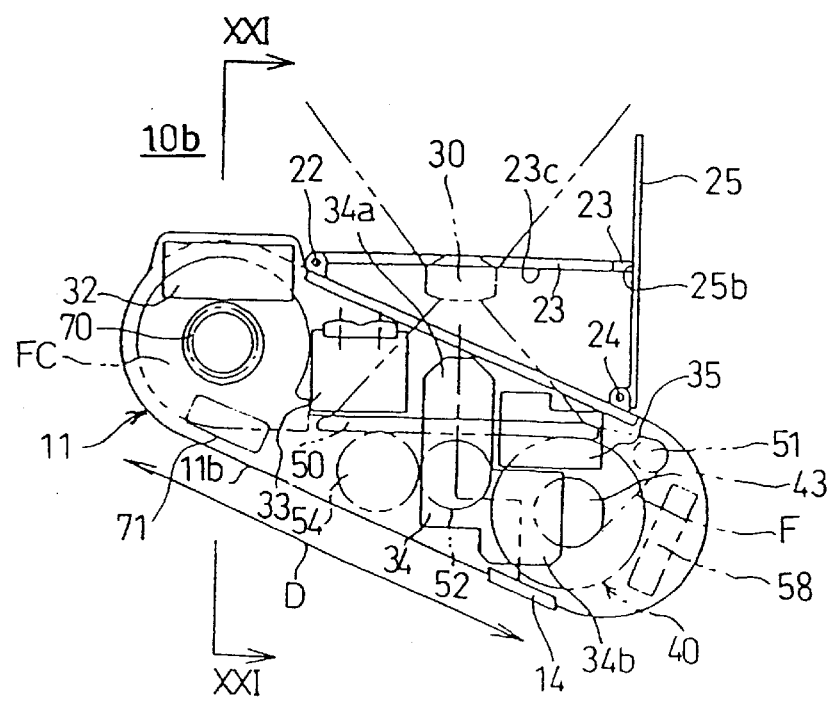
FIG. 20 is a schematic illustration of the lens shutter type camera shown in FIG. 14.
Figure 21:
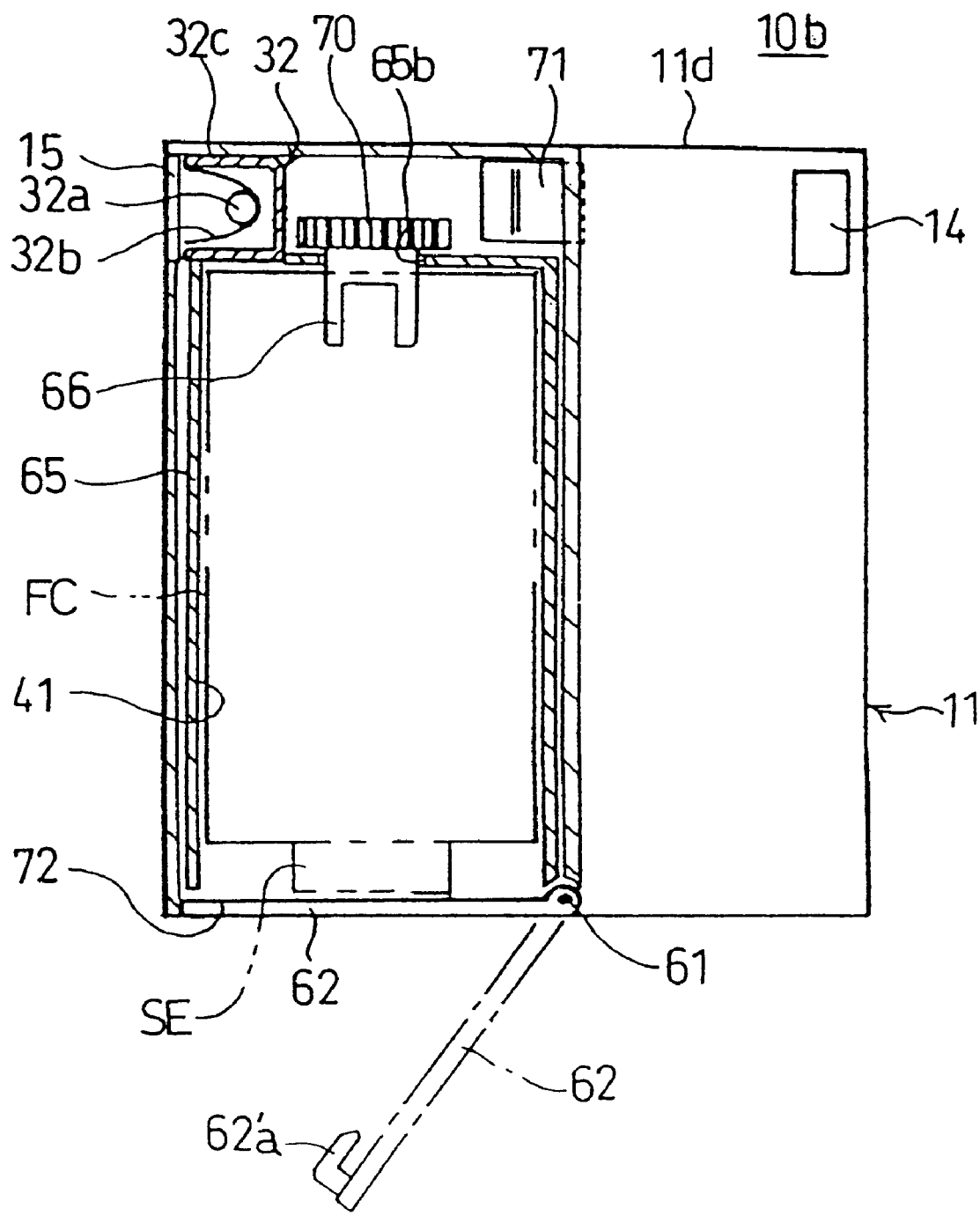
FIG. 21 is a sectional view of the lens shutter type camera taken along line XXI—XXI of FIG. 20.

FIGS. 20 and 21 show the structure of the camera 10b around the cartridge chamber 41. The flashlight emitter 32 and the flash circuit block 71 are also space-efficiently arranged in the camera 10b, similar to the camera 10.

In the case of the camera 10b, as shown in FIG. 21, the film cartridge FC must be inserted in a reverse direction in the cartridge chamber 41 as compared with the case of the camera 10. Since the film slot of the cartridge FC is thus facing the surface Fe, a portion corresponding to the raised portion 65a of the camera 10 is not provided at the upper end of the frame member 65 (since the one end SE of the cartridge spool 44 is not engaged with the engaging fork 66, but rather the other end of the cartridge spool 44 is engaged with the engaging fork 66 when the film cartridge FC is inserted in the cartridge chamber 41).

In the above illustrated embodiments, although the flash circuit block 71 is arranged in the space in the camera body behind the engaging fork 66, any other circuit block may be arranged in that space.

In the above illustrated embodiments, although the cartridge insertion opening 72 and the lid 62 are arranged at the bottom of the camera body 11, they may be arranged at the back of the camera body 11.

In the above illustrated embodiments, the engaging fork 66 has a specific shape, i.e., a bifurcating shape. With such a shape the engaging fork 66 can engage with the corresponding end of the cartridge spool of a conventional 35 mm cassette. However, in the case where the camera 10, 10a, 10b or 10c is constructed so as to use an IX240 cassette, not a conventional 35 mm cassette, the engaging fork 66 has an appropriate shape to engage with the corresponding end of the cartridge spool of the IX240 cassette. Accordingly, the shape of the engaging fork 6 is not limited solely to the bifurcating shape such as shown in FIG. 19, but may be any other appropriate shape.

FIGS. 22 through 25 show a second embodiment of a lens shutter type camera. This second embodiment of the camera 10d is identical to the first embodiment of the camera 10 except that the camera 10d is not provided with a member corresponding to the cover plate 25 of the camera 10. The structure of the camera 10d around the lens base plate 23 is also slightly different from that of the camera 10. For this reason, regarding the camera 10d, only those aspects unique to the second embodiment will be hereinafter discussed.

The camera 10d is provided with bellows 73 made of rubber serving as a flexible light-interceptive member, instead of the cover plate 25 that the camera 10 has. The camera 10d is further provided with a positioning projection 23d formed integral with the lens base plate 23.

The bellows 73 are provided between the lens base plate 23 and the front of the camera body 11 such that the front end 73a of the bellows 73 is secured to the free end 23a of the lens base plate 23 along the inner side thereof. The rear end 73b of the bellows 73 is secured to a part of the frame 45 at the left end of the rectangular opening 20 as viewed in FIG. 23. The bellows 73 prevents ambient light from entering the photographic light path between the free end 23a and the corresponding left end of the rectangular opening 20 when the lens base plate 23 is in the open position.

As mentioned above, the bellows (not shown) extend between the upper edge of the lens base plate 23 and a corresponding portion of the front side wall 11a. Similar bellows (not shown) extend between the lower edge of the lens base plate 23 and a corresponding portion of the front side wall 11a. The bellows 73 are integrally formed with those upper and lower bellows. Therefore, when the lens base plate 23 is in the open position, ambient light is prevented from entering between the lens base plate 23 and the front side wall 11a of the camera body 11. When the lens base plate 23 is in the closed position, the bellows 60 and the upper and lower bellows are retracted in the wedge-shaped space 48.

The lens base plate 23 is provided, on the rear surface 23c in the vicinity of the first vertical shaft 22, with the aforementioned engaging projection 23d which projects rearwardly at a predetermined angle with respect to the lens base plate 23. A projecting portion 23e projecting upwards is formed integral with the rear free end of the engaging projection 23d. When the lens base plate 23 is moved from the closed position to the open position, the projecting portion 23e of the engaging projection 23d is engaged with a corresponding portion of the front side wall 11a at the upper end of the opening 20 so as to determine the open position of the lens base plate 23.

Figure 22:
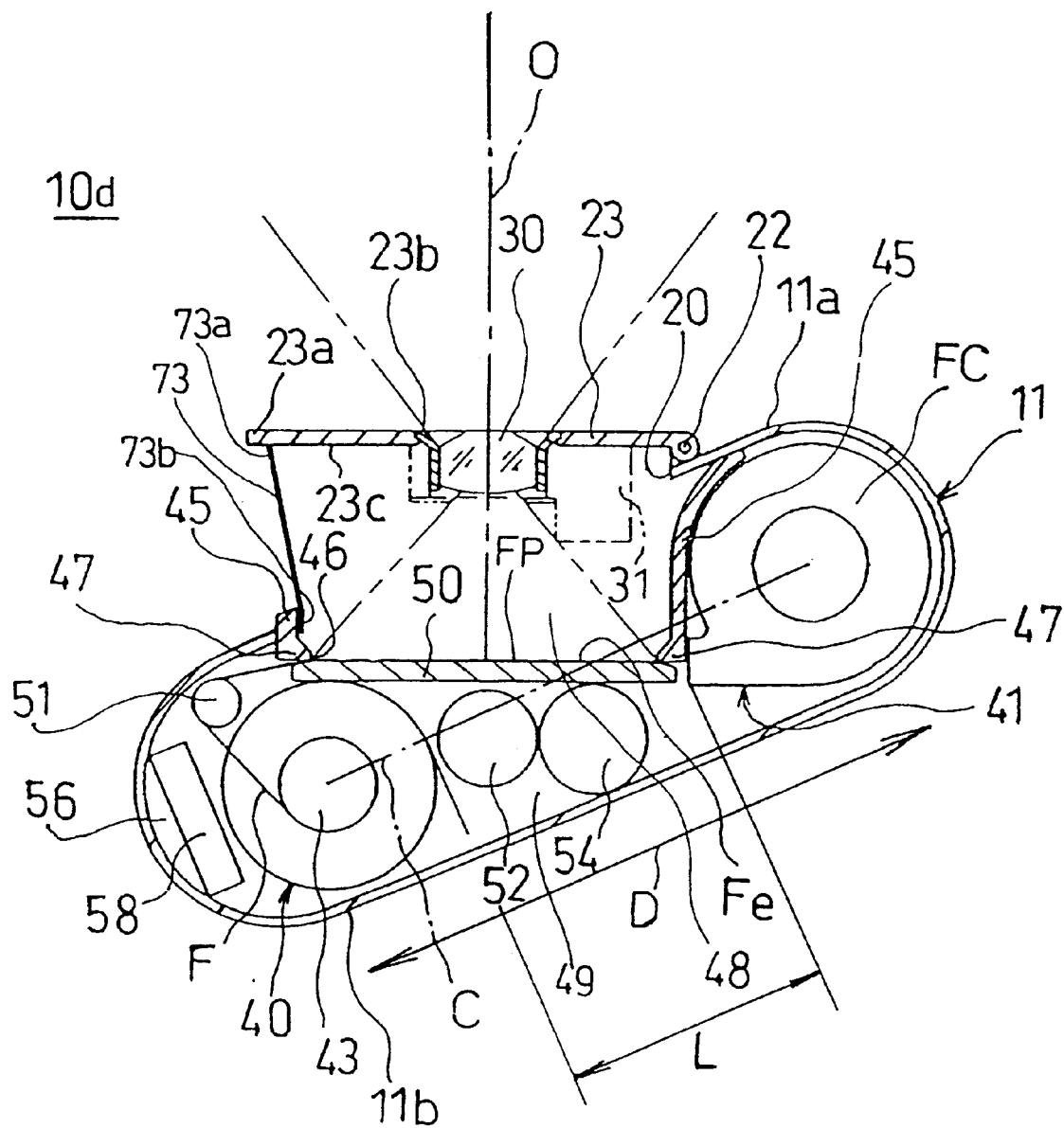
FIG. 22 is a sectional view of a second embodiment of a lens shutter type camera, which corresponds to the sectional view shown in FIG. 3, in a photo-ready state.
Figure 23:
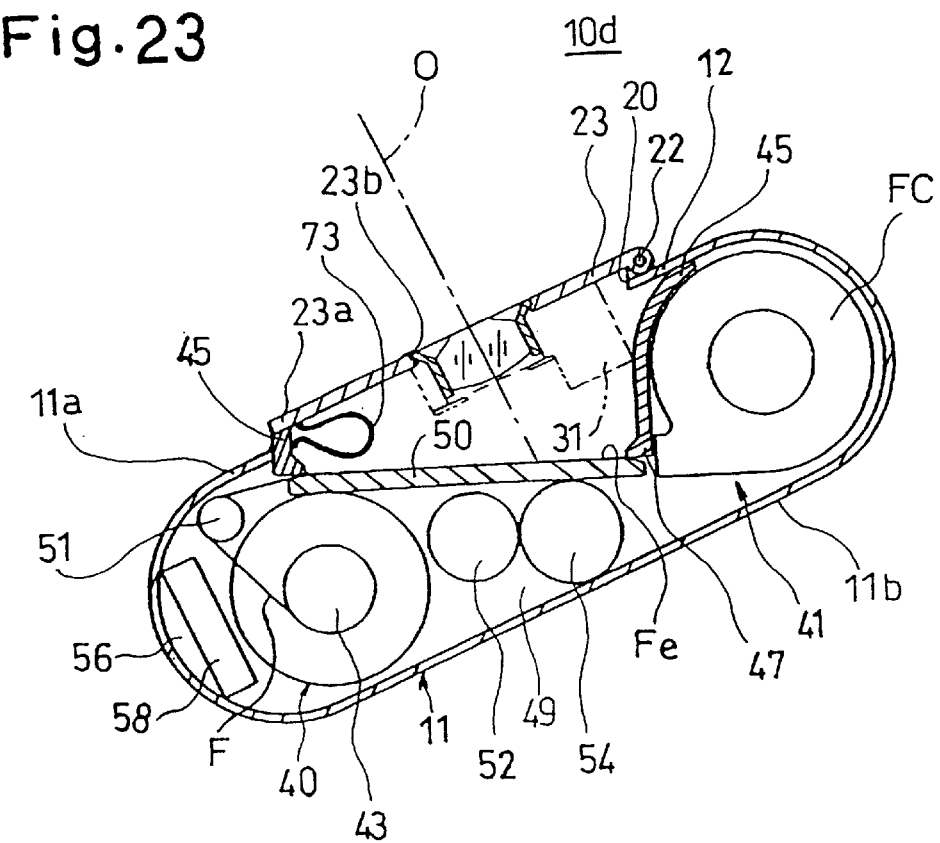
FIG. 23 is a sectional view of the lens shutter type camera shown in FIG. 22, taken along the same plane as that of FIG. 22, in a lens-retracted state.
Figure 24:
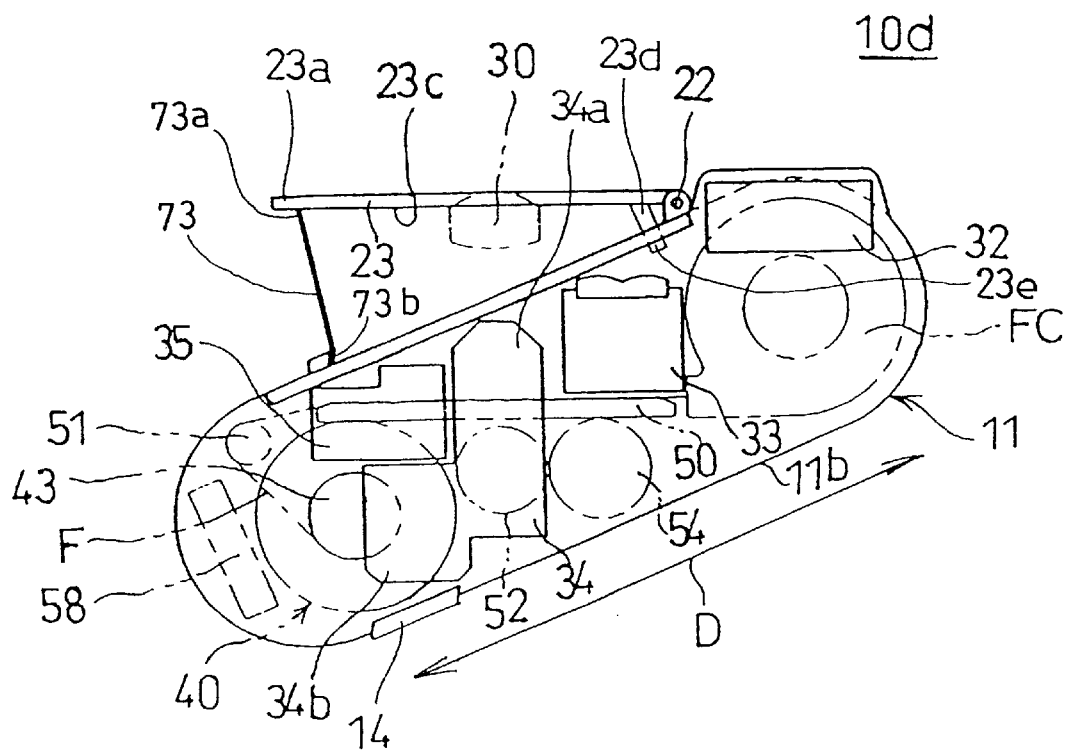
FIG. 24 is a sectional view of the lens shutter type camera shown in FIG. 22, which corresponds to the sectional view shown in FIG. 4, in a photo-ready state.
Figure 25:
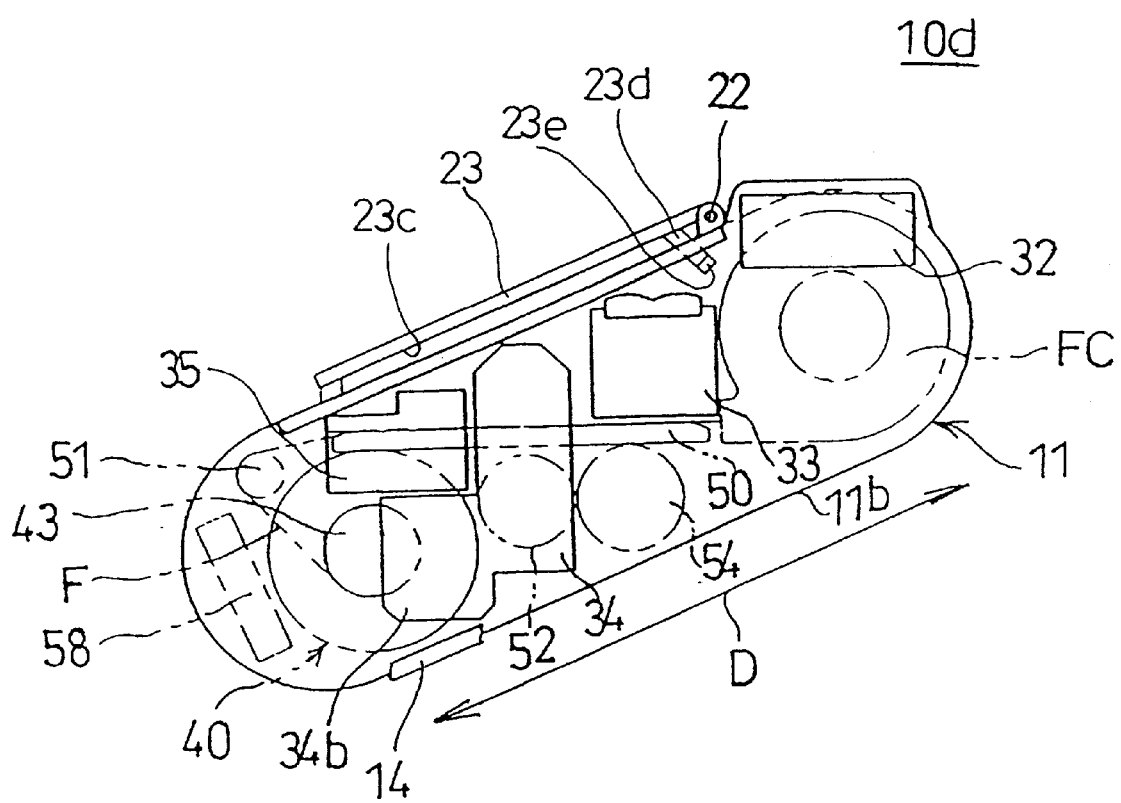
FIG. 25 is a sectional view of the lens shutter type camera shown in FIG. 22 in a lens-retracted state.

The lens base plate 23 of the camera 10d may be continuously biased to rotate in a clockwise direction as shown in FIG. 22 toward the open position by a biasing member such as a torsion coil spring (not shown). In this case, the camera 10d is preferably provided with a locking mechanism for locking the lens base plate 23 at its closed position, so that the lens base plate 23 automatically moves to the open position when the locking mechanism is unlocked due to the biasing force of the aforementioned biasing member.

According to the second embodiment of the camera 10d, effects similar to those of the first embodiment of the camera 10 can be expected. Similarly to the camera 10, the camera 10d may be modified by reversing the positions of the spool chamber 40 and the cartridge chamber 41, or by arranging all the components reversely right and left or the like, similar to the camera 10a, 10b or 10c.

FIGS. 26 through 39 show a third embodiment of a lens shutter type of camera. This third embodiment of the camera 10e is provided with many parts identical to those of the first embodiment of the camera 10, so that the explanations for such identical parts are herein omitted and only those aspects unique to the third embodiment will be hereinafter discussed.

In addition to the features of the camera 10, the camera 10e has an additional feature which makes a perspective control possible. The perspective control is realized using a lens-shifting mechanism with which the camera 10e is provided. With the lens-shifting mechanism, the photographic lens 30 can be manually shifted sideways in a direction perpendicular to the direction of the photographic optical axis O. Details of the lens-shifting mechanism will be hereinafter discussed.

Figure 32:
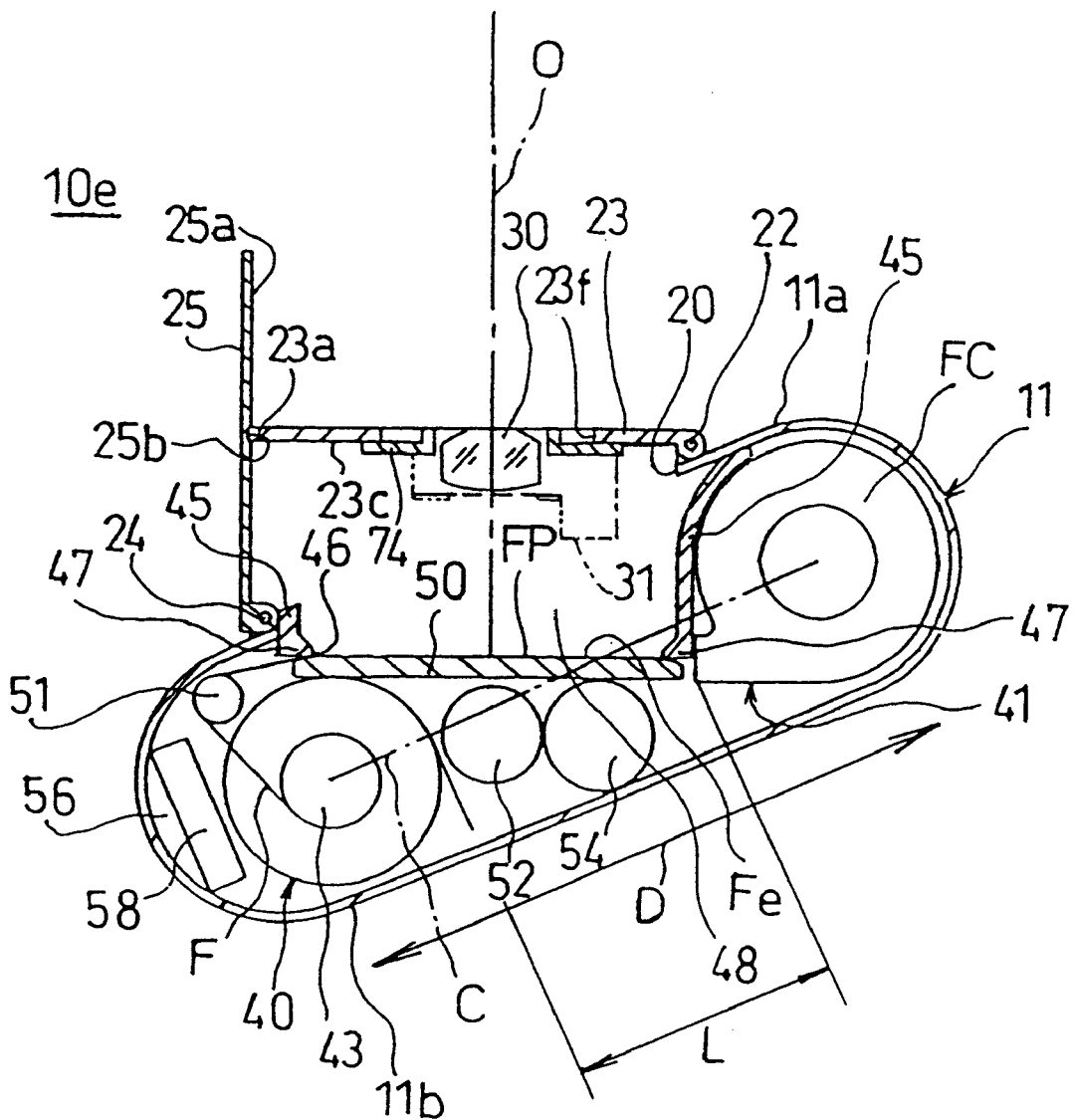
FIG. 32 is a sectional view of the camera taken along line XXXII—XXXII of FIG. 26.
Figure 33:
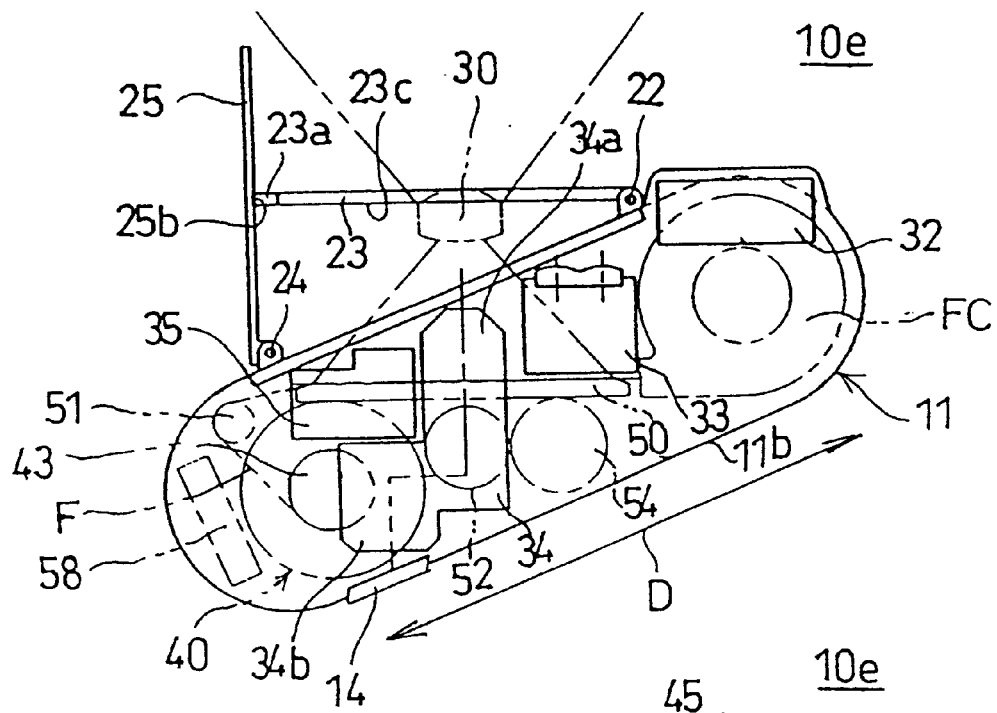
FIG. 33 is a sectional view of the camera taken along line XXXIII—XXXIII of FIG. 26.
Figure 34:
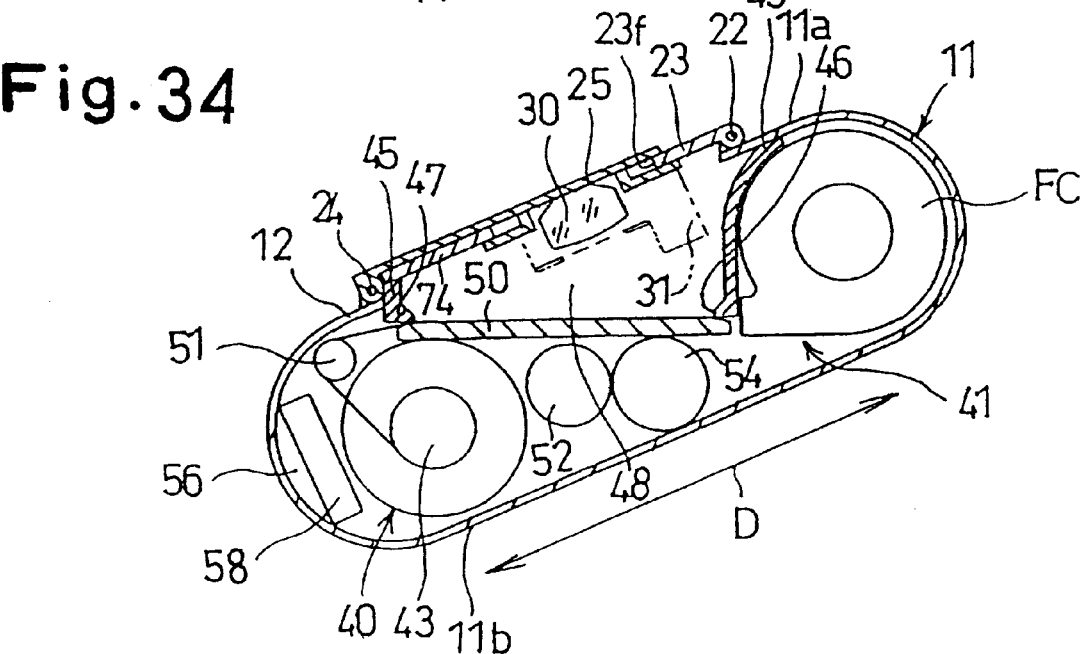
FIG. 34 is a sectional view of the camera shown in FIG. 26 in a lens-retracted state.
Figure 35:
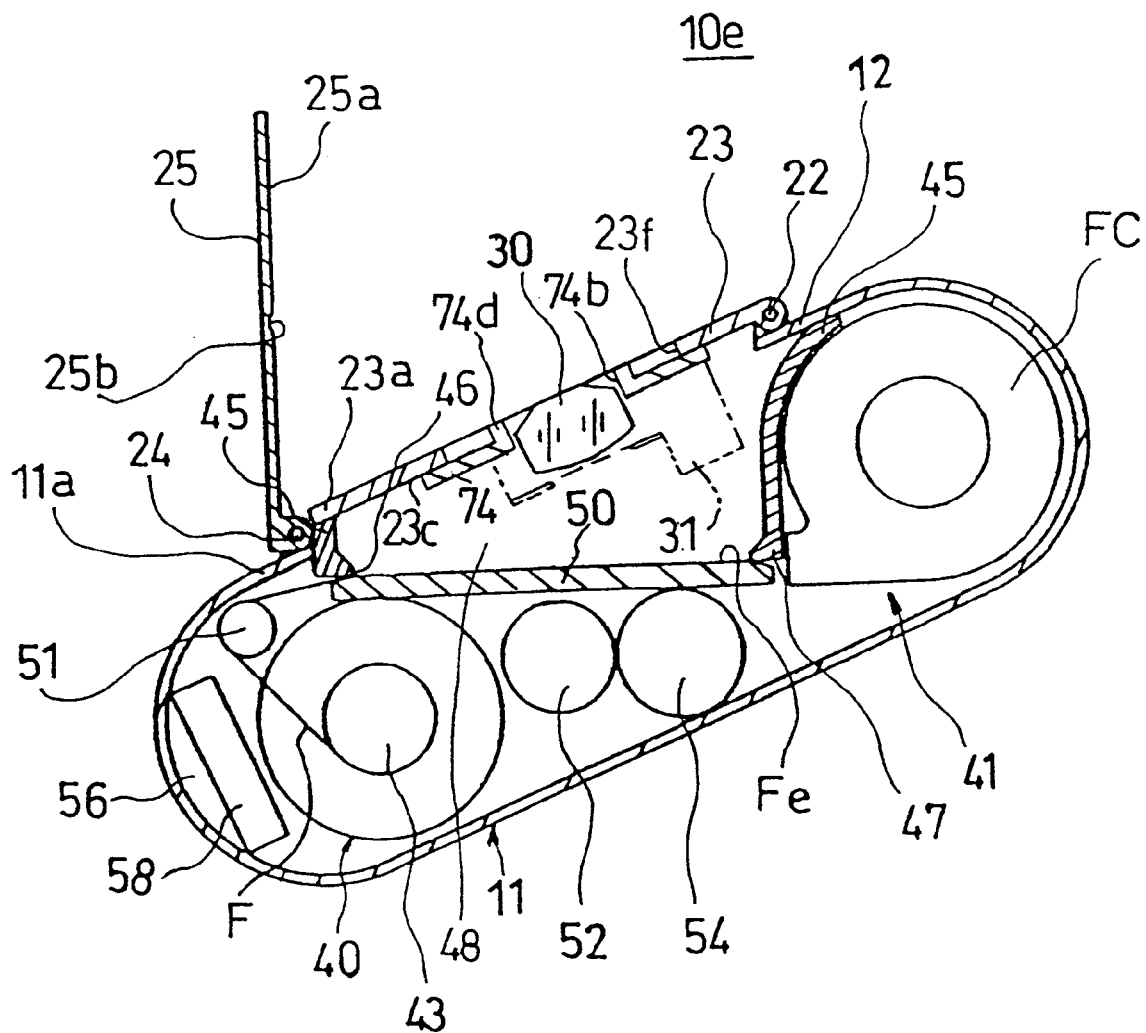
FIG. 35 is a sectional view of the camera shown in FIG. 26 wherein the lens base plate is in a closed position while the cover plate is in an open position.

The lens base plate 23 is provided on the rear surface 23c thereof with a pair of upper and lower guiding rails 23f (see FIG. 29) extending parallel to each other in a direction perpendicular to the axial direction of the first vertical shaft 22. Between the upper and lower guiding rails 23f a lens supporting plate 74 which supports the photographic lens 30 is slidably held. The AF/AE shutter unit 31 (shown by double-dotted lines in FIG. 29) is secured to the rear surface of the lens supporting plate 74. The lens supporting plate 74 is provided with a circular opening 74b whose diameter is slightly larger than that of the photographic lens 30. The photographic lens 30 is arranged such that the photographic optical axis O thereof extends perpendicular to the lens base plate 23 with a front part of the photographic lens 30 positioned in the circular opening 74b. Accordingly, the photographic lens 30 is indirectly held by the lens base plate 23 with the photographic optical axis O extending perpendicular to the lens base plate 23. Therefore, when the camera 10e is in the photo-ready state, the photographic optical axis O is inclined to the right/left direction of the camera 10 (direction shown by an arrow "D") as can be seen in FIG. 32.

The lens base plate 23 is provided on the rear surface 23c, specifically on the upper and lower guiding rails 23f, with upper and lower pressing plates 67 and 68, respectively, which are respectively secured to the upper and lower guiding rails 23f through set screws 69 screwed in the lens base plate 23. The pressing plates 67 and 68 are each made of a flexible material, such as a springy steel and slightly press the respective upper and lower ends of the lens supporting plate 74 against the rear surface 23c to prevent the lens supporting plate 74 from falling out from between the upper and lower guiding rails 23f.

Figure 26:
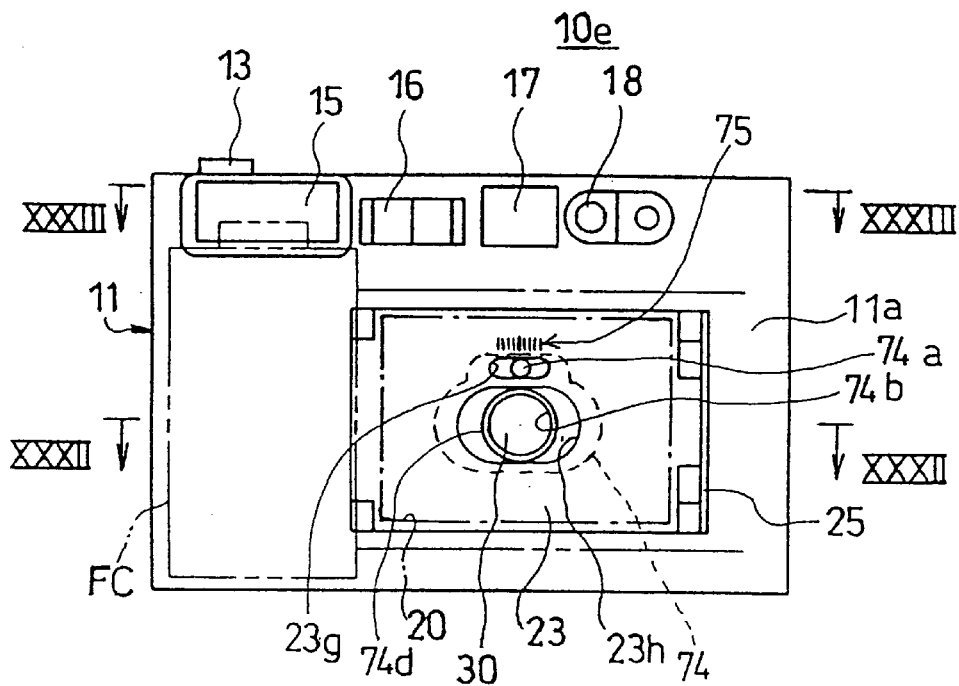
FIG. 26 is a front side view of the third embodiment of the lens shutter type camera in a photo-ready state as viewed from the front in the direction of the optical axis of the photographic lens of the camera.
Figure 27:
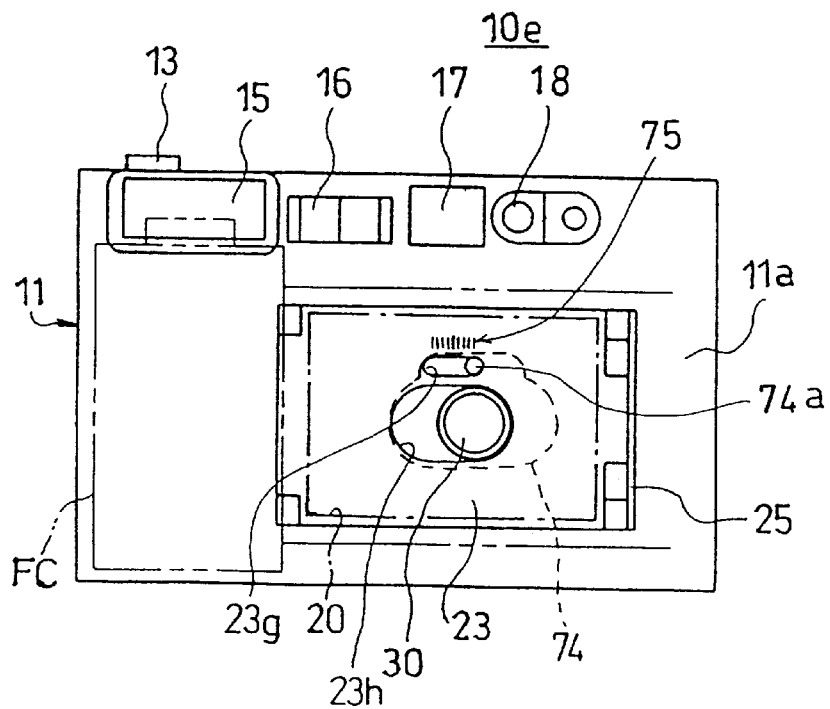
FIG. 27 is a front side view of the camera shown in FIG. 26 in a state where the photographic lens thereof has been shifted to one end of the shiftable range in the widthwise direction of an image plane.
Figure 28:
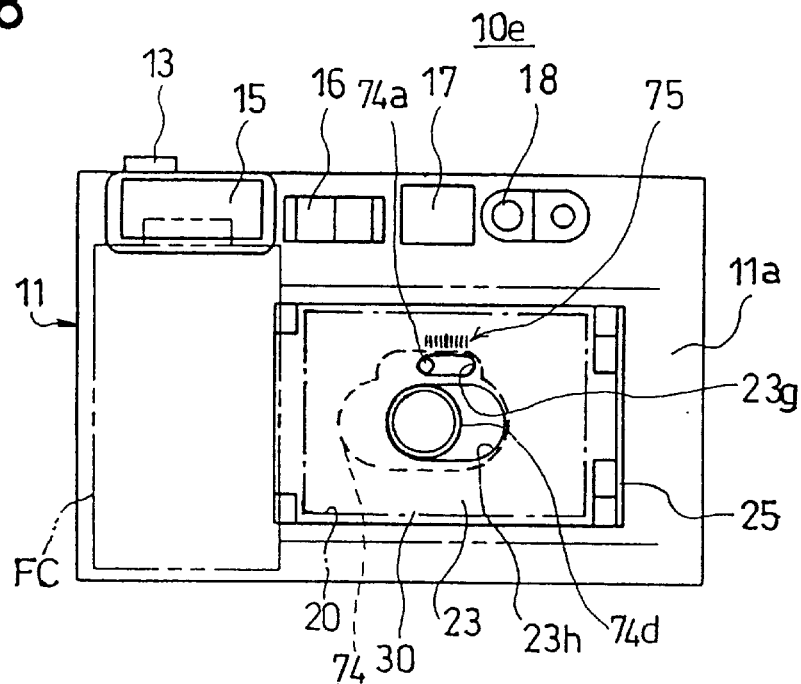
FIG. 28 is a front side view of the camera shown in FIG. 26 in a state where the photographic lens thereof has been shifted to the other end of the shiftable range in the widthwise direction of an image plane.
Figure 29:
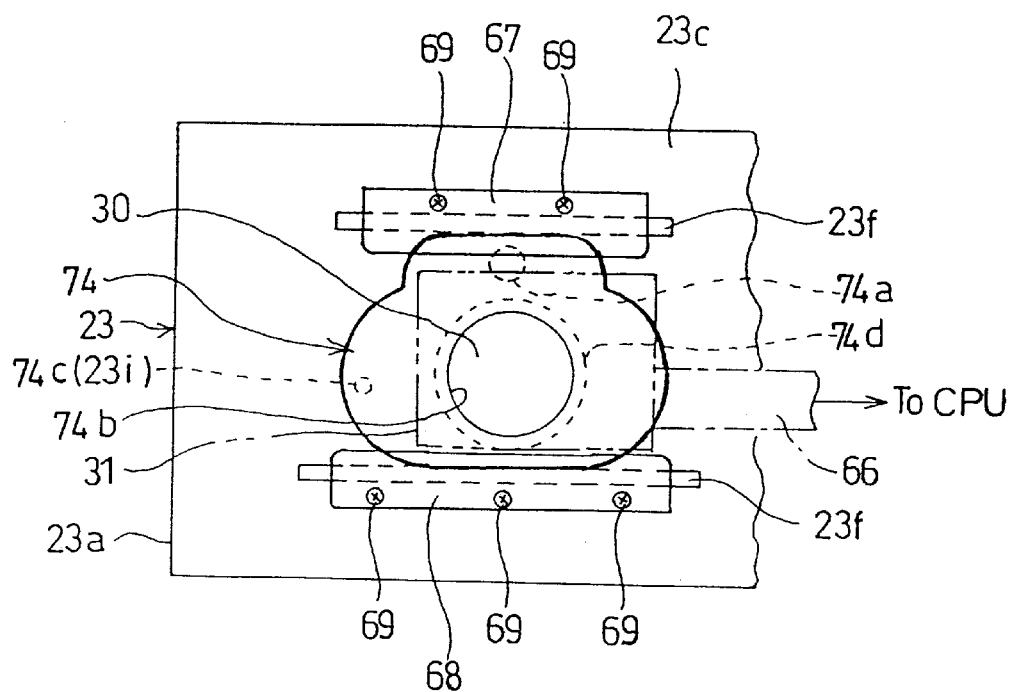
FIG. 29 is a plan view of a lens-shifting mechanism of the camera shown in FIG. 26 as viewed from the rear of a lens base plate thereof.
Figure 30:
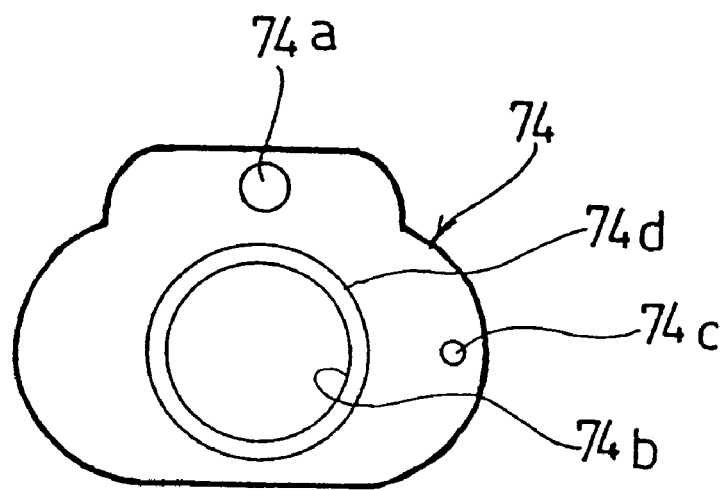
FIG. 30 is a front view of a lens supporting plate shown in FIG. 29.
Figure 31:
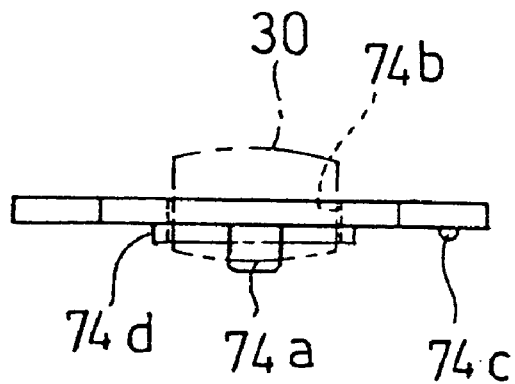
FIG. 31 is a top view of the lens supporting plate shown in FIG. 29 as viewed from the top of FIG. 29.

The lens supporting plate 74 is provided on the front surface thereof with an operational pin 74a which projects forwardly from the front surface of the lens supporting plate 74. The operational pin 74a is positioned in a lateral slot 23g formed on the lens base plate 23 and extends parallel to the guiding rails 23f. The lens base plate 23 is further provided with a laterally elongated opening 23h formed below the lateral slot 23g and extends parallel to the guiding rails 23f. The lens supporting plate 74 is provided with a circular projecting portion 74d formed along the circular opening 74b to project forwardly by a predetermined amount corresponding to the thickness of the lens base plate 23. The outer diameter of the circular projecting portion 74d is substantially the same as the height of the elongated opening 23h. The circular projecting portion 74d is fitted in the elongated opening 23h so that the projecting portion 74d is slidable sideways in the elongated opening 23h. Each side end of the elongated opening 23h is formed curved to correspond to the curvature of the circular projecting portion 74d, so that an outer peripheral surface of the circular projecting portion 74d firmly contacts either end of the elongated opening 23h when moved thereto. When the operational pin 74a is manually moved along the lateral slot 23g, the lens supporting plate 74 moves in the same direction along the upper and lower guiding rails 23f. In the case where the operational pin 74a is moved along the lateral slot 23g to the right end of the slot 23g as viewed in FIG. 26, the circular projecting portion 74d contacts the right end of the elongated opening 23h as shown in FIG. 27. Conversely, in the case where the operational pin 74a is moved along the lateral slot 23g to the left end of the slot 23g as viewed in FIG. 26, the circular projecting portion 74d contacts the left end of the elongated opening 23h as shown in FIG. 28. Accordingly, the slidable range of the lens supporting plate 74 is determined by the length of each of the lateral slot 23g and the elongated opening 23h. The lens supporting plate 74 shifts sideways along the guiding rails 23f when the operational pin 74a is manually moved along the lateral slot 23g. This shifts the photographic lens 30 sideways in a direction perpendicular to the direction of the photographic optical axis O so as to shift the photographic optical axis O in the widthwise direction of the surface Fe.

A scale 75 for indicating the position of the lens supporting plate 74 relative to the lens base plate 23 is engraved immediately above the lateral slot 23g. When the operational pin 74a is located in the middle of the lateral slot 23g, the axial center of the operational pin 74a is located right below the center line marking of the scale 75 as shown in FIG. 26. In such a condition as shown in FIG. 26, the photographic lens 30 is in a normal photographic position i.e., not shifted relative to the surface Fe. Accordingly, the user of the camera 10e can visually establish whether the photographic lens 30 has been shifted by observing the position of the operational pin 74a relative to the scale 75. In addition, the user of the camera 10e can visually establish the amount of shift of the photographic lens 30 by reading the scale 75.

Between the lens base plate 23 and the lens supporting plate 74 a click-stop mechanism is provided for click-stopping the lens supporting plate 74 on the lens base plate 23 when the operational pin 74a is located in the middle of the lateral slot 23g at the position corresponding to the center line marking of the scale 75, i.e., when the photographic lens 30 is in the normal photographic position. The click-stop mechanism includes a projection 74c formed integral on the front surface of the lens supporting plate 74, and a recessed portion 23i which is formed correspondingly on the rear surface 23c of the lens base plate 23 to receive the projection 74c therein (see FIGS. 29, 30 and 31). From the state where the photographic lens 30 is in a shifted position, in the case where the operational pin 74a is manually moved to the middle of the lateral slot 23g, the projection 74c clicks in the recessed portion 23i. Due to such a click-stop mechanism, after the photographic lens 30 has been shifted, the photographic lens 30 can be easily moved back to the normal photographic position.

Since the AF/AE shutter unit 31 is secured to the rear surface of the lens supporting plate 74, the AF/AE shutter unit 31 and the lens supporting plate 74 move as a whole when the operational pin 74a is operated. The AF/AE shutter unit 31 is electrically connected to a controller composed of a CPU (not shown) through an FPC wiring strip 66, an end of which is connected to the AF/AE shutter unit 31. The CPU controls the overall operations of the camera 10e.

The aforementioned upper and lower guiding rails 23f, the lens supporting plate 74, the lens pressing plates 67 and 68, etc. together constitute the lens-shifting mechanism of the camera 10e.

Figure 36:
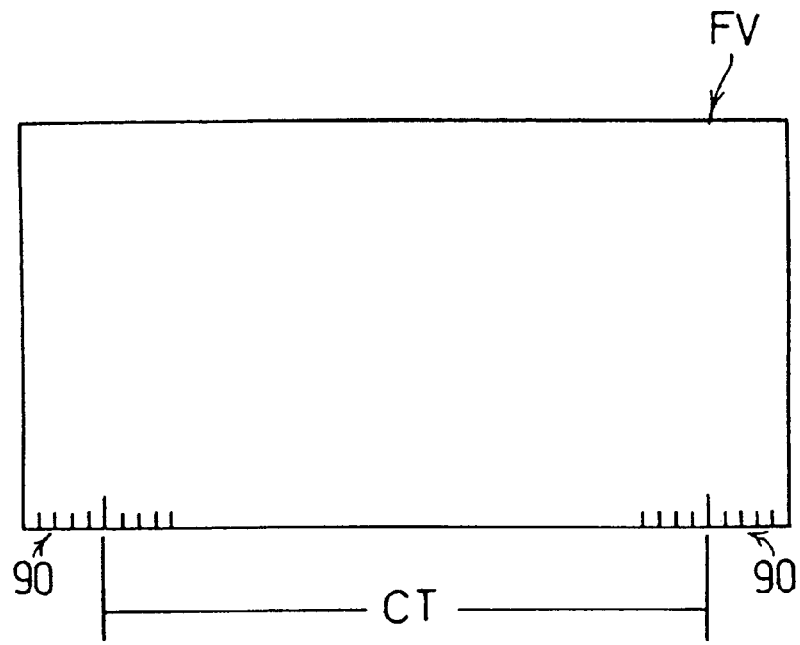
FIG. 36 is a finder view seen when looking into an eyepiece window of the camera shown in FIG. 26.
Figure 37:
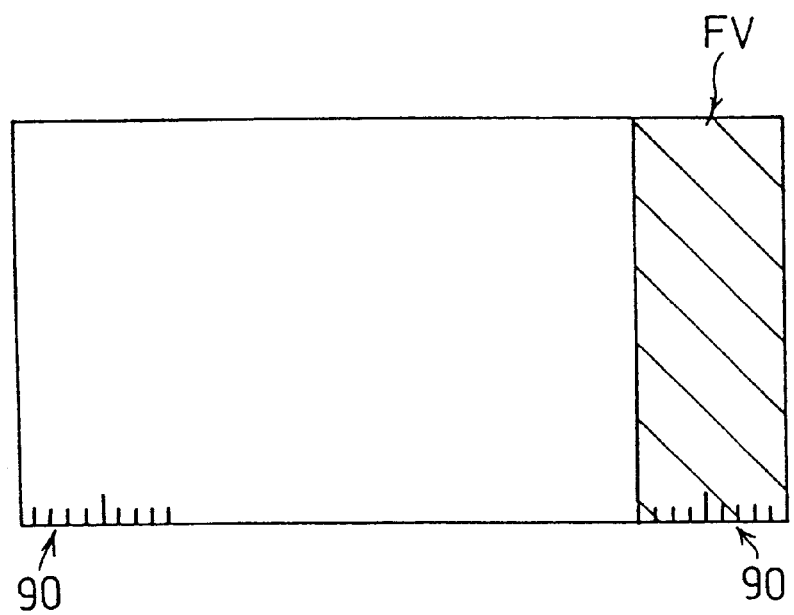
FIG. 37 is the finder view shown in FIG. 36, illustrating a non-oblique lined area to correspond to the image plane in the case where the photographic lens is shifted in such a manner as shown in FIG. 27.
Figure 38:
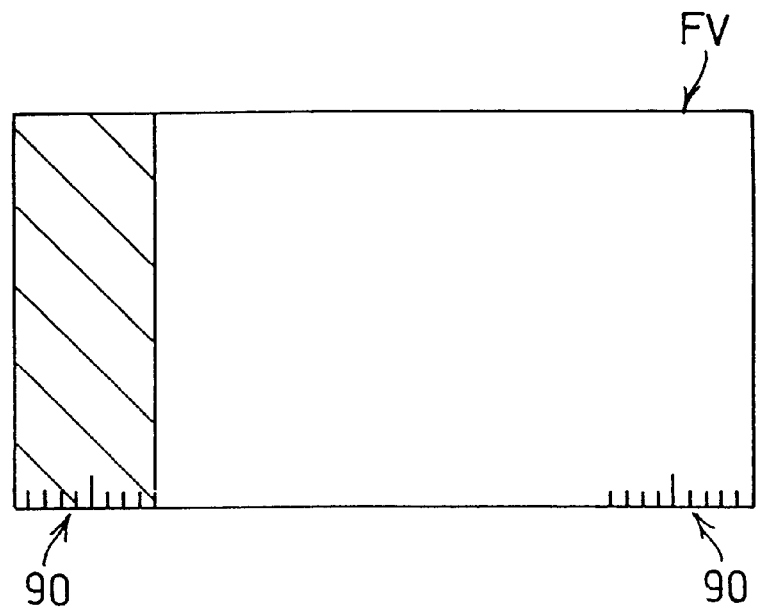
FIG. 38 is the finder view shown in FIG. 36, illustrating a non-oblique lined area to correspond to the image plane in the case where the photographic lens is shifted in such a manner as shown in FIG. 28.
Figure 39:
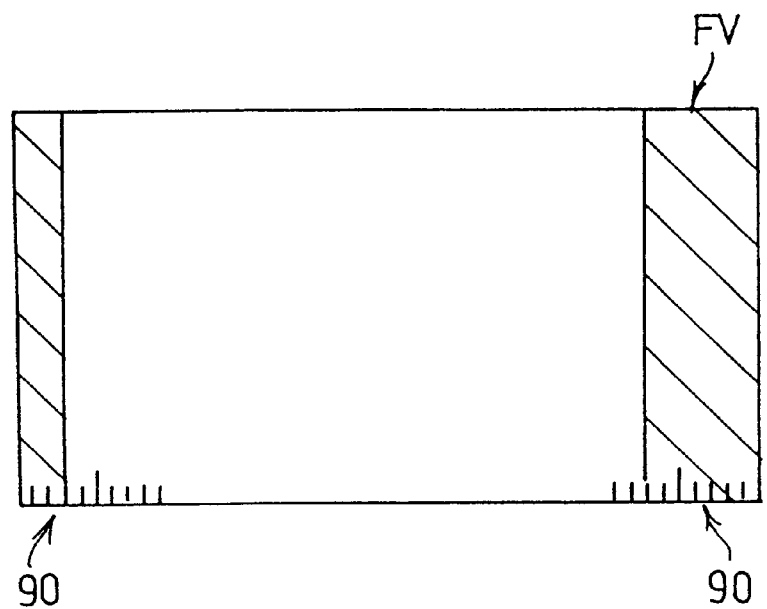
FIG. 39 is the finder view shown in FIG. 36, illustrating a non-oblique lined area to correspond to the image plane in the case where the photographic lens is shifted in a manner different from that shown in FIGS. 27 or 28.

FIG. 36 shows a finder view FV seen when looking into the eyepiece window 14 of the camera 10e. The finder optical system 34 of the camera 10e is made such that the finder view FV is larger than a normal finder view corresponding to the size of the surface Fe during normal photography (non-shifted photography) in the widthwise direction of the finder view by a predetermined amount at each side end thereof since the normal finder view should be shifted in accordance with a shift of the photographic lens 30. The aforementioned predetermined amount at each side end of the finder view corresponds to the maximum amount of shift to the corresponding right or left end of the shiftable range of the photographic lens 30.

In the finder view FV a scale 90 is visually provided at the bottom on each side end thereof. Each scale 90 is provided at the center thereof with a center longer line marking, and an area CT of the finder view FV defined between the right and left center longer line markings corresponds to a normal finder view during normal photography. It can be understood that subject images (not shown) seen in the finder view FV remain the same even if the photographic lens 30 is shifted right or left due to the fact that the finder optical system 34 is independent from the photographic lens 30. However, when the photographic lens 30 is shifted right or left, the normal finder view area shifts in the same direction by an amount corresponding to the shifted amount of the photographic lens 30.

Each scale 90 is designed to correspond to the scale 75 engraved on the lens base plate 23. When the photographic lens 30 is shifted to one end of its shiftable range as shown in FIG. 27, a transparent lined area in the finder view FV shown in FIG. 37 becomes a finder view area which corresponds to the surface Fe. When the photographic lens 30 is shifted to the other end of its shiftable range as shown in FIG. 28, a transparent lined area in the finder view FV shown in FIG. 38 becomes a finder view area which corresponds to the surface Fe. Accordingly, the user of the camera 10e always has to bear it in mind in advance of taking a photo that the amount of shift of the photographic lens 30 which is indicated by the scale 75 corresponds to the amount of shift of the finder view area in the finder view FV which corresponds to the surface Fe. The finder view area in the finder view FV which corresponds to the surface Fe shifts correspondingly in the same direction by a corresponding amount when the photographic lens 30 is shifted. For example, when the user shifts the operational pin 74a from center to right by an amount of two line markings as viewed in FIG. 26, a transparent lined area in the finder view FV shown in FIG. 39 becomes a finder view area which corresponds to the surface Fe, which is what the user has to bear in mind when taking a photo with such a shift of the photographic lens 30.

A light-transmissive type of LCD panel (not shown) which allows light to pass therethrough may be fixed in the vicinity of a focal plane formed by an objective optical system of the finder optical system 34. The LCD panel indicates the finder view area in the finder view FV which corresponds to the surface Fe in accordance with a shift of the photographic lens 30. In this case, it is not necessary to provide the scales 90 in the finder view FV. Furthermore, a device for detecting the amount of shift of the lens supporting plate 74 relative to the lens base plate 23 is preferably provided to control the LCD panel to indicate the finder view area in the finder view FV which corresponds to the surface Fe in accordance with the result of detection of the detecting device.

According to the third embodiment of the camera 10e, effects similar to those of the first embodiment of the camera 10 can be expected. In addition, due to the lens-shifting mechanism which is constituted by the upper and lower guide rails 23f, the lens supporting plate 74, the pressing plates 67 and 68, etc., photography with a perspective control in which the photographic optical axis O is shifted sideways in the widthwise direction of the surface Fe can be easily carried out.

FIGS. 40 through 48 show a fourth embodiment of a lens shutter type camera. This fourth embodiment of the camera 10f is also provided with a lens-shifting mechanism which makes a perspective control possible. The camera 10f is identical to the camera 10e of the third embodiment except that the lens-shifting mechanism of the camera 10f is different from that of the camera 10e. For this reason, regarding the camera 10f, only those aspects unique to the fourth embodiment will be hereinafter discussed.

The lens-shifting mechanism of the camera 10f makes it possible to manually shift the photographic optical axis O not only sideways, but also up and down (rise and fall) in the heightwise direction of the surface Fe (in the vertical direction of the camera 10). Details of the lens-shifting mechanism of the camera 10f will be hereinafter discussed.

Figure 44:
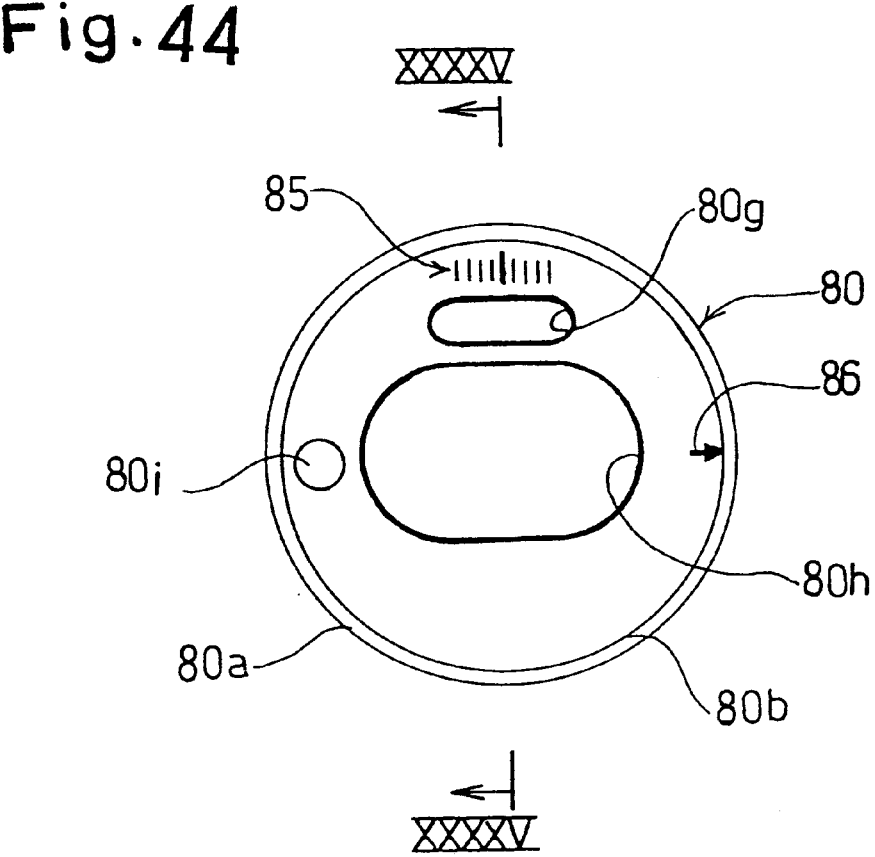
FIG. 44 is a front side view of the disc member shown in FIG. 40.
Figure 45:
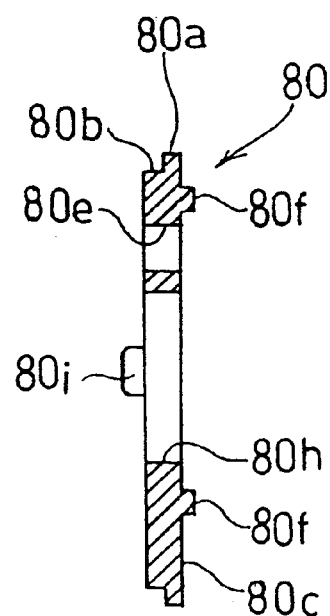
FIG. 45 is a cross sectional view of the disc member shown in FIG. 44 taken along line XXXXV—XXXXV of FIG. 44.

The lens base plate 23 is provided at an appropriate center thereof with a circular opening 81 in which a circular disc member 80 is fitted. The front surface of the disc member 80 and the front surface of the lens base plate 23 substantially lie in a common plane.. As shown in FIGS. 44 and 45, the disc member 80 is provided along the whole peripheral edge thereof with a rear flange 80a having a diameter larger than that of the circular opening 81. The disc member 80 is further provided with a front circular portion 80b positioned in front of the flange 80a and having a diameter slightly smaller than that of the circular opening 81. The disc member 80 is engaged with the circular 81. The front circular portion 80b is fitted in the circular opening 81, the front surface of the flange 80a contacts the rear surface 23c of the lens base plate 23 so as to be rotatable relative to the circular opening 81 about the photographic optical axis O which is not shifted from its normal position.

The disc member 80 is prevented from falling out of the circular opening 81 by four supporting plates 82 which are fixed to the rear surface 23c around the circular opening 81 by respective set screws 83. The flange 80a is held between inner end portions of the supporting plates 82 and the rear surface 23c along the circular opening 81. Each supporting plate 82 is made of a flexible material, such as a springy steel, to slightly press the flange 80a against the rear surface 23c of the lens base plate 23. This prevents the disc member 80 from falling out of the circular opening 81.

On the disc member 80, a mechanism substantially identical to the lens-shifting mechanism of the third embodiment of the camera 10e is provided. Namely, a pair of upper and lower guiding rails 80f which have the same function as the upper and lower guiding rails 23f of the camera 10e are formed on a rear surface 80c of the disc member 80. The lens supporting plate 74 which carries the AF/AE shutter unit 31 thereon is held between the upper and lower guiding rails 80f so that the lens supporting plate 74 is shiftable on the rear surface 80c of the disc member 80 along the guiding rails 80f.

The disc member 80 is provided on the rear surface 80c, specifically on the upper and lower guiding rails 80f, with upper and lower pressing plates 85 and 86, respectively in these are respectively secured to the upper and lower guiding rails 80f through set screws 87 screwed in the disc member 80. The pressing plates 85 and 86 are each made of a flexible material, such as a springy steel and slightly press the respective upper and lower ends of the lens supporting plate 74 against the rear surface 23c to prevent the lens supporting plate 74 from falling out of the upper and lower guiding rails 80f.

The operational pin 74a of the lens supporting plate 74 is positioned in a lateral slot 80g formed on the disc member 80 and extends parallel to the guiding rails 80f. The disc member 80 is further provided with a laterally elongated opening 80h formed below the lateral slot 80g and extends parallel to the guiding rails 80f. The lateral slot 80g and the elongated opening 80h correspond to the lateral slot 23g and the elongated opening 23h, respectively, and each extend parallel to the guiding rails 80f. The circular projecting portion 74d is fitted in the elongated opening 80h so that the projecting portion 74d is slidable sideways in the elongated opening 80h. When the operational pin 74a is manually moved along the lateral slot 80g, the lens supporting plate 74 moves in the same direction along the upper and lower guiding rails 80f. Accordingly, the lens supporting plate 74 shifts sideways along the guiding rails 80f when the operational pin 74a is manually moved along the lateral slot 80g. This shifts the photographic lens 30 sideways in a direction perpendicular to the direction of the photographic optical axis O so as to shift the photographic optical axis O in the widthwise direction of the surface Fe.

Figure 40:
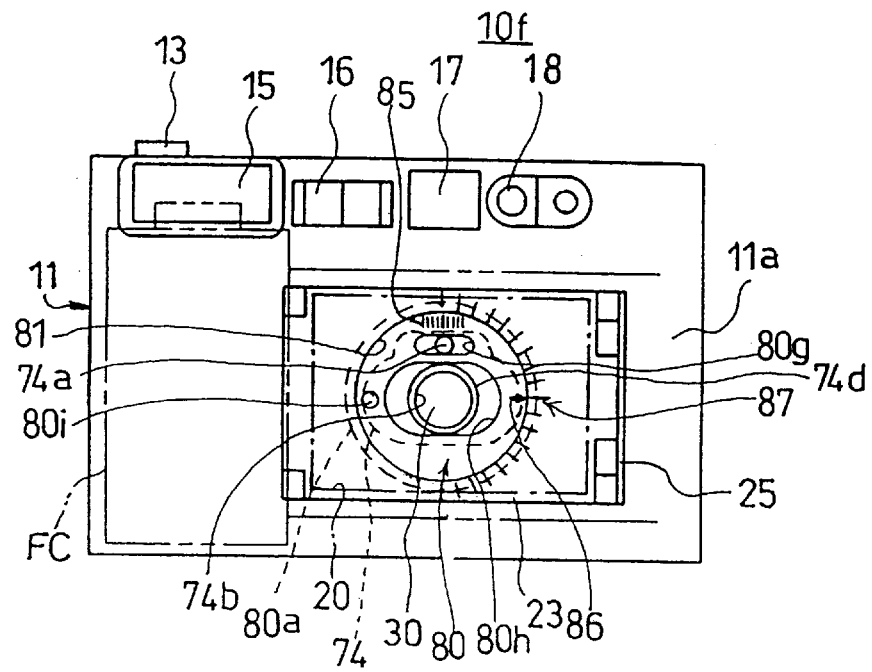
FIG. 40 is a front side view of the fourth embodiment of the lens shutter type camera in a photo-ready state as viewed from the front in the direction of the optical axis of the photographic lens of the camera.

The disc plate 80 is provided, on a front surface thereof in the vicinity of one end (left end as viewed in FIG. 40) of the elongated opening 80h, with an operational knob 80i for manually rotating the disc plate 80 relative to the circular opening 81. A scale 185 similar to the scale 75 of the camera 10e is engraved on a front surface of the disc member 80 immediately above the lateral slot 80g. The scale 185 indicates the position of the lens supporting plate 74 relative to the disc member 80. An arrow marking 186 directed outwardly in a radial direction of the disc member 80 is engraved on a front surface of the disc member 80 in the vicinity of the other end of (right end as viewed in FIG. 40) of the elongated opening 80h. A scale 187 is engraved on the lens base plate 23 along the circular opening 81. The arrow marking 86 is directed to the scale 187 to indicate the rotational position (angular position) of the disc member 80 relative to the lens base plate 23. The scale 187 extends along approximately half of the circular opening 81, i.e., over a range of about 180 degrees of the circular opening 81. When the disc member 80 is in its normal (initial) position as shown in FIG. 40, the arrow marking 186 coincides with the center line marking of the scale 187 which extends in the widthwise direction of the lens base plate 23. In this state, the photographic lens 30 is in a position where the photographic optical axis O is not at all shifted in the heightwise direction of the surface Fe. Accordingly, in the case where the arrow marking 186 does not coincide with the center line marking of the scale 187, i.e., where the arrow marking 186 is located above or below the center line marking of the scale 187, it can be visually checked that the disc member 80 is not in its initial state and accordingly that the photographic optical axis O has been shifted in the heightwise direction of the surface Fe. Further, the amount of rotation of the disc member 80 relative to the lens base plate 23 can be visually checked by reading the scale 187.

Between the disc member 80 and the lens supporting plate 74 a click-stop mechanism similar to the aforementioned click-stop mechanism of the camera 10e is provided for click-stopping the lens supporting plate 74 on the disc member 80 when the operational pin 74a is located in the middle of the lateral slot 80g at the position corresponding to the center line marking of the scale 185, i.e., when the photographic lens 30 is in a position where the photographic optical axis O is not at all shifted in the widthwise direction of the surface Fe. The click-stop mechanism of the camera 10f includes the projection 74c of the lens supporting plate 74, and a recessed portion 80i which is formed correspondingly on the rear surface 80c of the disc member 80 to receive the projection 74c therein (see FIG. 43).

The AF/AE shutter unit 31 is electrically connected with a controller CPU (not shown) through several bundled wiring cords 88, each end of which is connected to the AF/AE shutter unit 31. The CPU controls the overall operations of the camera 10f. Although the FPC wiring strip 66 is used to connect the AF/AE shutter unit 31 with the controller in the case of the camera 10e, the wiring cords 88 are used in the case of the camera 10f because the AF/AE shutter unit 31 can be rotated together with the lens supporting plate 74.

In FIG. 40, the photographic lens 30 is in a normal photographic position where the photographic lens 30 is not at all shifted relative to the surface Fe, namely, the photographic optical axis O is not shifted in either the heightwise or widthwise direction of the surface Fe from the center of the surface Fe. In such a state, the arrow marking 86 is directed to the center line marking of the scale 87, and the center of the operational pin 74a is located right below the center line marking of the scale 75. From such a normal photographic position, in the case where the operational pin 74a is manually moved sideways along the lateral slot 80g, the lens supporting plate 74 correspondingly shifts sideways along the guiding rails 80f to thereby shift the photographic lens 30 sideways in a direction perpendicular to the direction of the photographic optical axis O. This shifts the photographic optical axis O in the widthwise direction of the surface Fe, similar to that of the camera 10e. The photographic optical axis O is not shifted in any direction even if the disc member 80 rotates in the state shown in FIG. 40 since the disc member 80 rotates about the photographic optical axis O standing at its normal position.

Figure 41:
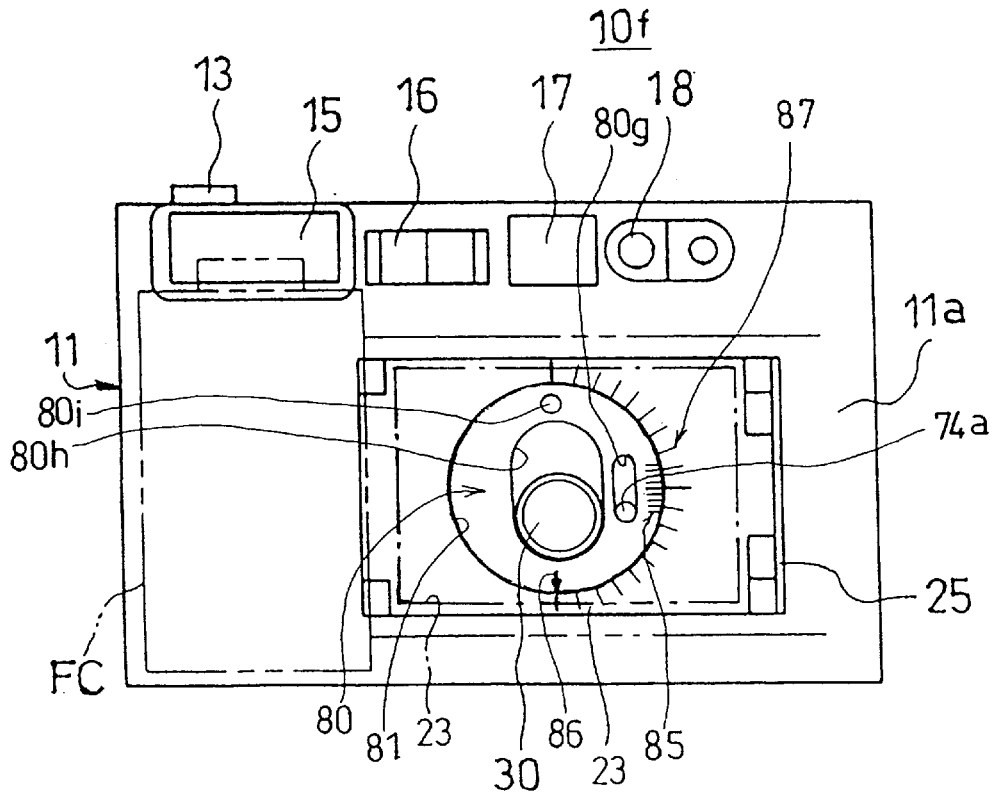
FIG. 41 is a front side view of the camera shown in FIG. 40 in a state where a disc member has been rotated by 90 degrees and the lens supporting plate has been shifted down to one end of its shiftable range.

From the state shown in FIG. 40, in the case where the operational pin 74a is manually moved along the lateral slot 80g after the disc member 80 is manually rotated through the operational knob 80i in either clockwise or counterclockwise direction by 90 degrees, the lens supporting plate 74 moves in the vertical direction of the camera 10f. The photographic lens 30 moves in the vertical direction of the camera 10f so as to shift the photographic optical axis O in the heightwise direction of the surface Fe. With such a shifting operation, a perspective control of rise or fall can be carried out. FIG. 41 shows a state of the camera 10f where the disc member 80 has been rotated in the clockwise direction as viewed in FIG. 41 by 90 degrees and the operational pin 74a has been moved to one end (lower end as viewed in FIG. 41) of the lateral slot 80g to shift the photographic optical axis O downwards in the heightwise direction of the surface Fe.

Figure 42:
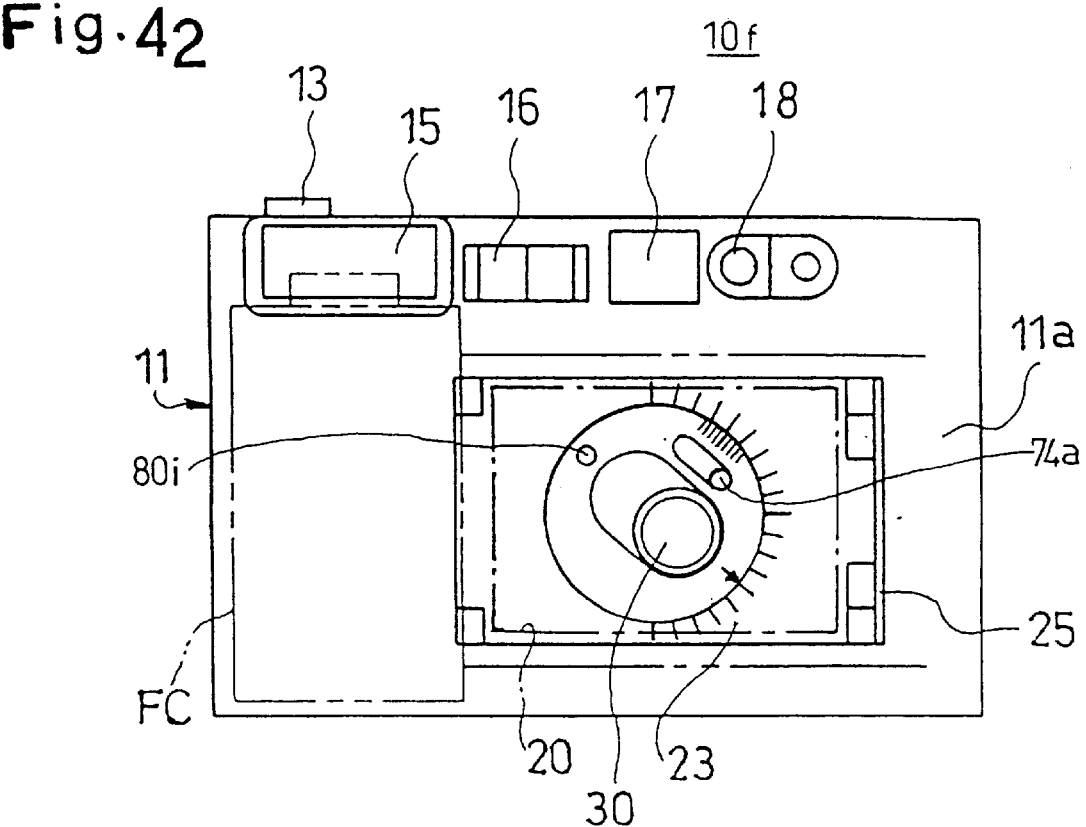
FIG. 42 is a front side view of the camera shown in FIG. 40 in a state where the disc member has been rotated by 45 degrees and the lens supporting plate has been shifted down to one end of its shiftable range.
Figure 43:
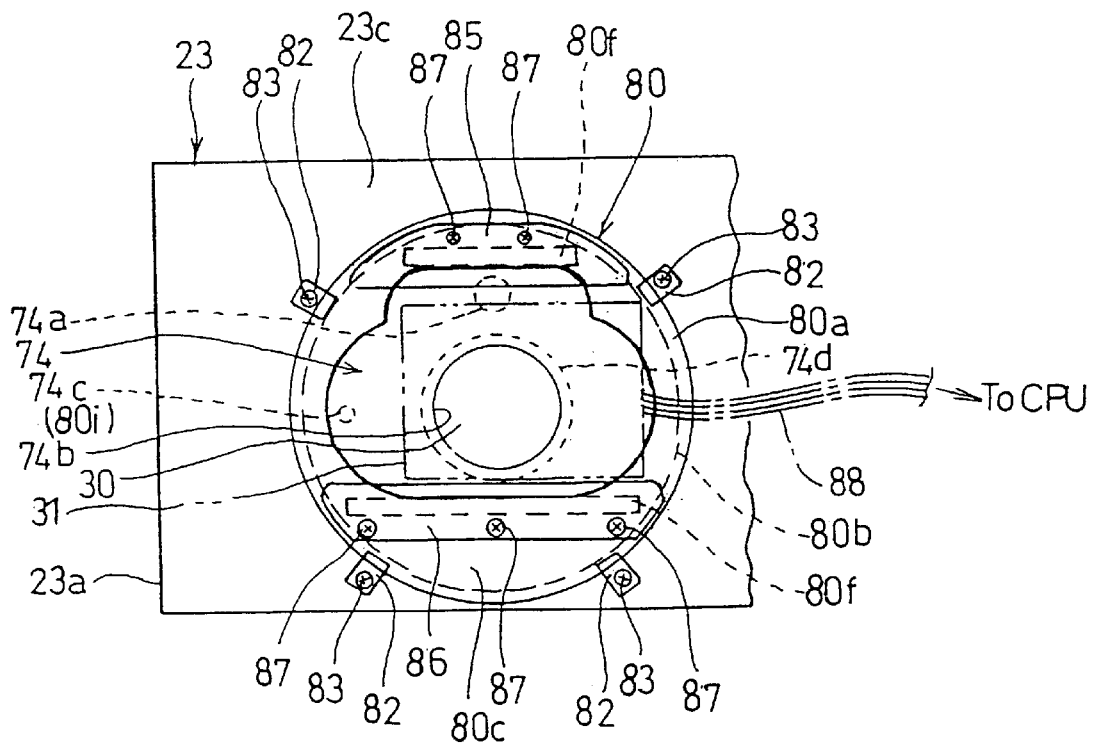
FIG. 43 is a plan view of a lens-shifting mechanism of the camera shown in FIG. 40 as viewed from the rear of a lens base plate thereof.

By a combination of a rotation of the disc member 80 relative to the lens base plate 23 with a shift of the lens supporting plate 74 relative to the disc member 80, the photographic optical axis O can be shifted in any direction while maintaining the photographic optical axis O to extend normal to the surface Fe. FIG. 42 shows a state of the camera 10f where the lens supporting plate 74 has been rotated in the clockwise direction as viewed in FIG. 41 by 45 degrees and the operational pin 74a has been moved to one end (lower end as viewed in FIG. 42) of the lateral slot 80g to shift the photographic optical axis O downwards to the right relative to the surface Fe.

Figure 46:
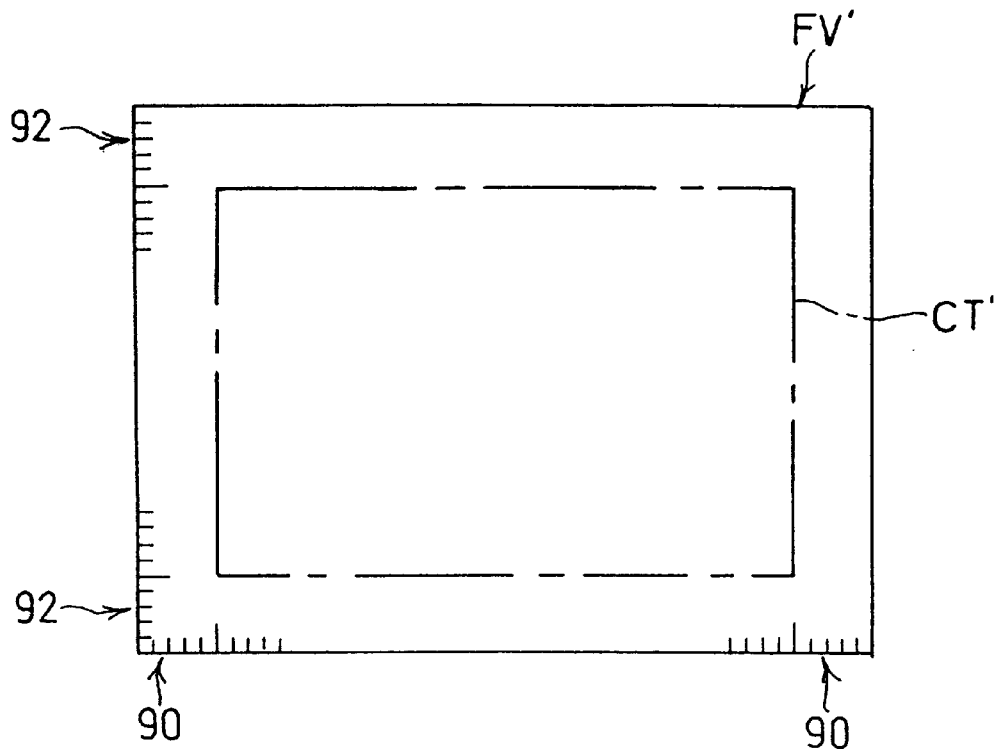
FIG. 46 is a finder view seen when looking into an eyepiece window of the camera shown in FIG. 40.
Figure 47:
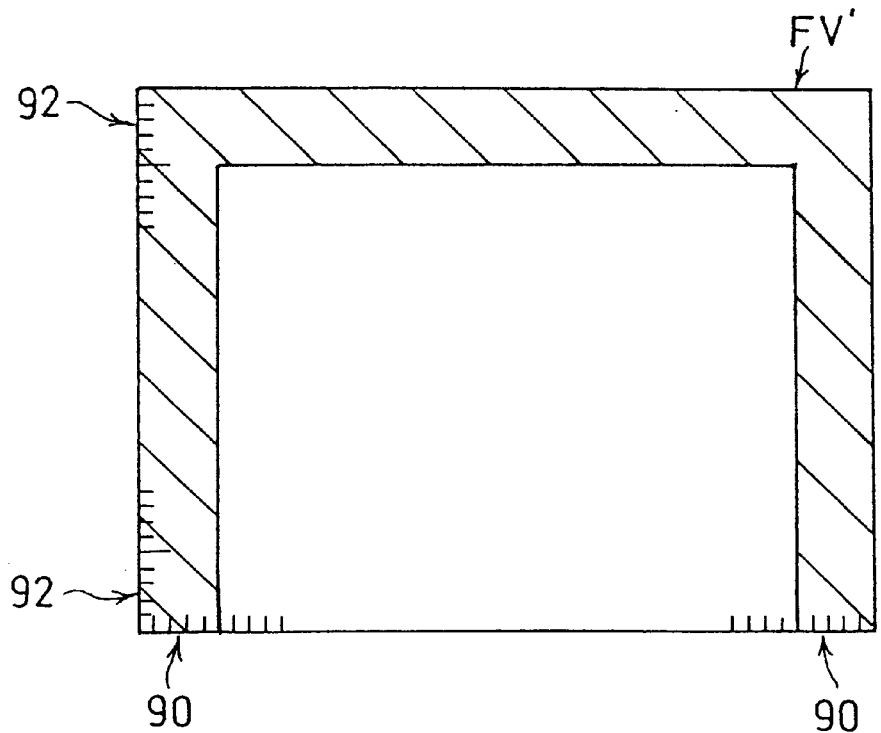
FIG. 47 is the finder view shown in FIG. 46, illustrating a non-oblique lined area to correspond to the image plane in the case where the photographic lens is shifted in such a manner as shown in FIG. 41.
Figure 48:
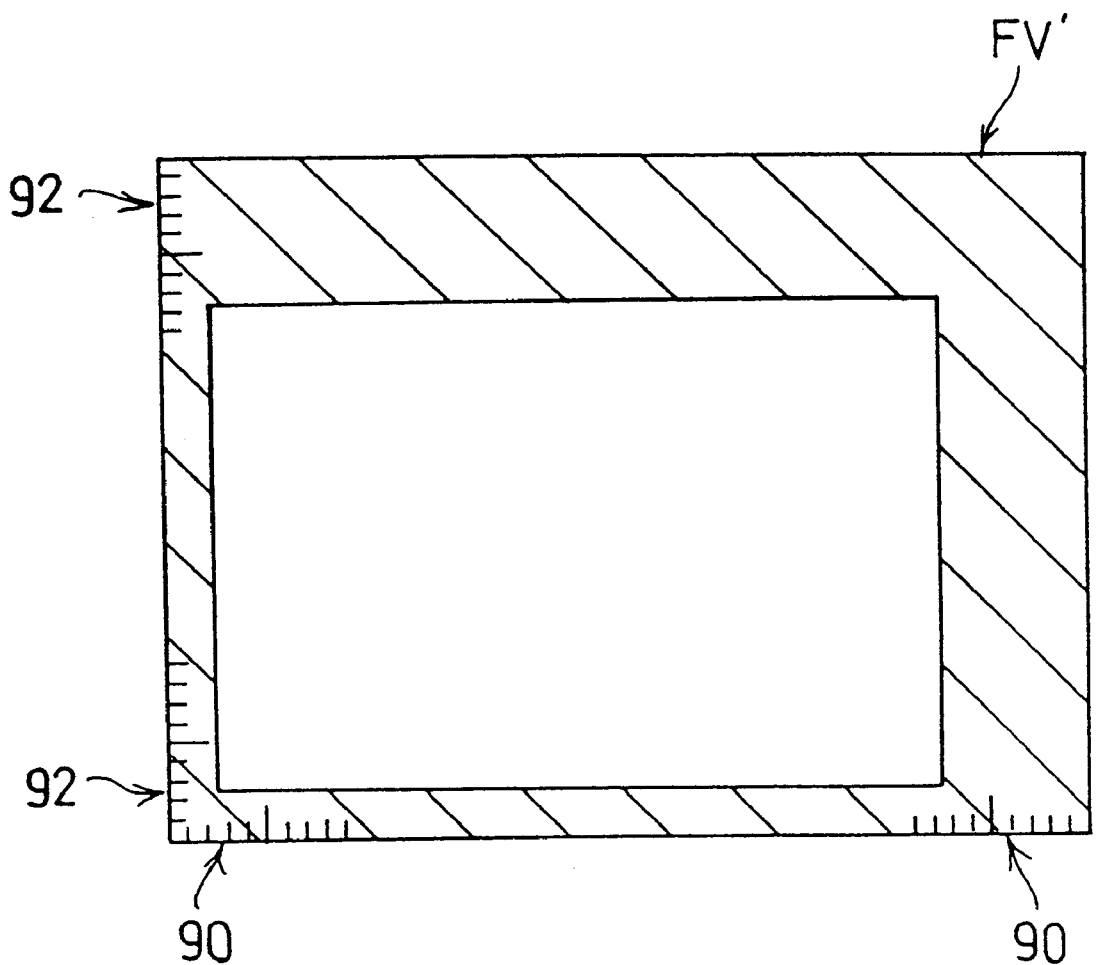
FIG. 48 is the finder view shown in FIG. 46, illustrating a non-oblique lined area to correspond to the image plane in the case where the photographic lens is shifted in such a manner as shown in FIG. 42.
Figure 49:
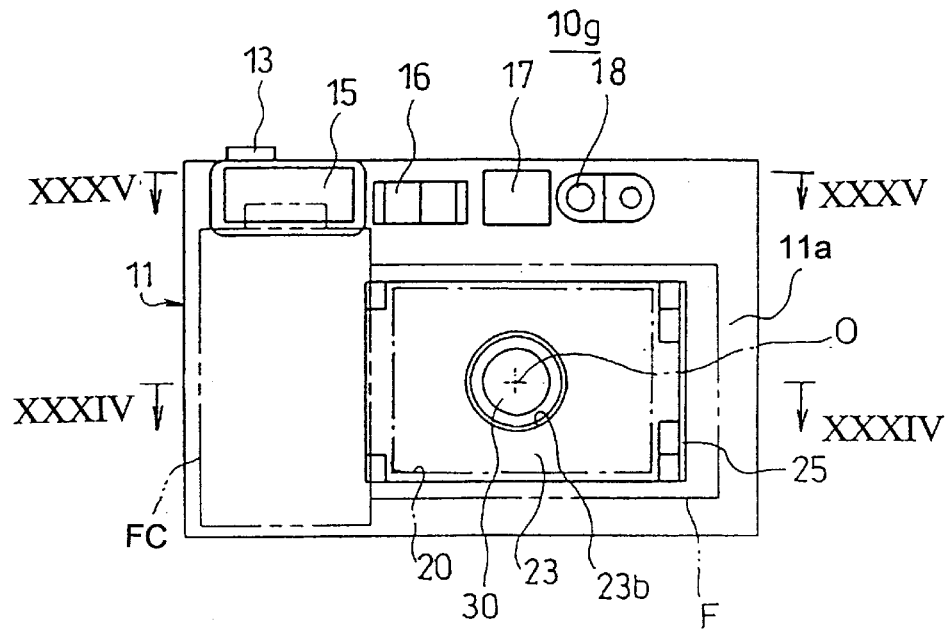
FIG. 49 is a front side view of a fifth embodiment of a lens shutter type camera in a photo-ready state as viewed from the front in the direction of the optical axis of the photographic lens of the camera.
Figure 50:
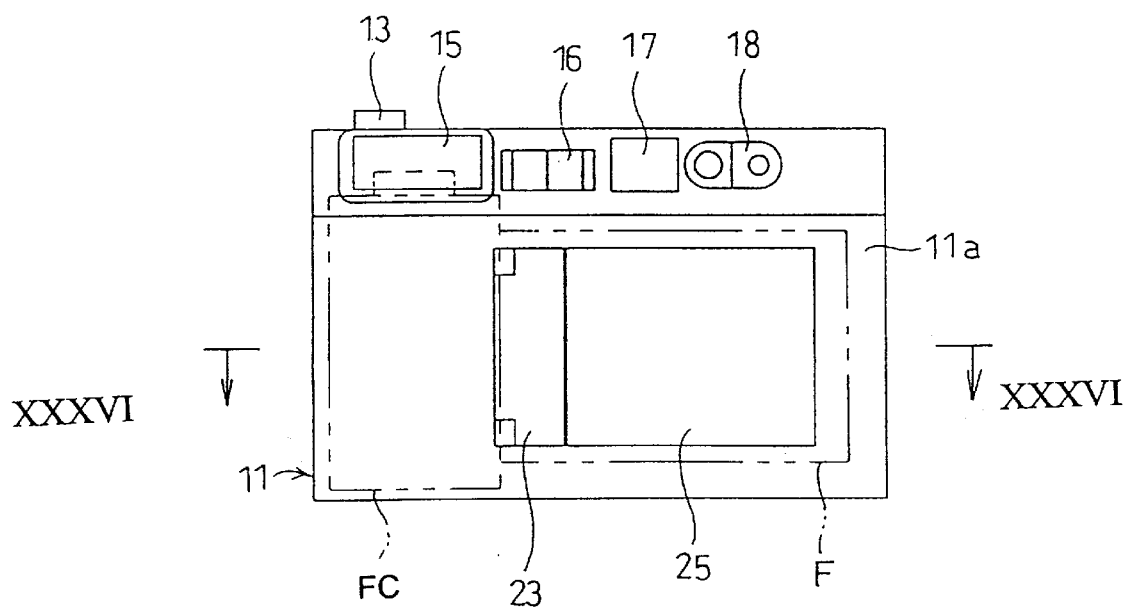
FIG. 50 is a front side view of the lens shutter type camera shown in FIG. 49 in a lens-retracted state as viewed from the front in the direction of the optical axis of the photographic lens of the camera.

FIG. 46 shows a finder view FV' seen when looking into the eyepiece window 14 of the camera 10f. The finder optical system 34 of the camera 10f is made such that the finder view FV' is larger than the normal finder view corresponding to the size of the surface Fe during normal photography (non-shifted photography). View FV' is longer in both the widthwise and heightwise direction of the finder view by a predetermined amount since the normal finder view should be shifted in accordance with a shift of the photographic lens 30. The aforementioned predetermined amount corresponds to the shiftable range of the photographic lens 30.

In the finder view FV' the scale 90 is visually provided at the bottom on each side end thereof, similar to the finder view FV of the camera 10e. In addition to the scales 90, another scale 92 is visually provided at the upper and lower ends on the left side of the finder view FV'. Each of the scales 92 is provided at the center thereof with a center longer line marking, similar to each scale 90. An area (area surrounded by single-dotted lines in FIG. 46) CT' of the finder view FV' defined between the right and left center line markings of the scales 90 and between the upper and lower center line markings of the scales 92 corresponds to a normal finder view during normal photography. It can be understood that subject images (not shown) seen in the finder view FV' remain the same even if the photographic lens 30 is shifted right, left, up or down due to the fact that the finder optical system 34 is independent from the photographic lens 30. However, in the case where the photographic lens 30 is shifted in a certain direction, the normal finder view area shifts in the same direction and by an amount corresponding to the shifted amount of the photographic lens 30.

Each scale 90 is designed to correspond to the scale 185 on the disc member 80 in its non-rotated position shown in FIG. 40, while each scale 92 is designed to correspond to the scale 185 on the disc member 80 has been rotated by 90 degrees in either a clockwise or a counterclockwise direction. When the photographic lens 30 is shifted in a manner such as shown in FIG. 41, a transparent lined area in the finder view FV' shown in FIG. 47 becomes a finder view area which corresponds to the surface Fe. When the photographic lens 30 is shifted in a manner such as shown in FIG. 42, a transparent lined area in the finder view FV' shown in FIG. 48 becomes a finder view area which corresponds to the surface Fe. Accordingly, the user of the camera 10f always has to bear it in mind in advance of taking a photo that the amount of shift of the photographic lens 30 which is indicated by the scales 185 and 187 corresponds to the amount of shift of the finder view area in the finder view FV' which corresponds to the surface Fe. The finder view area in the finder view FV which corresponds to the surface Fe shifts correspondingly in the same direction (a composite shifting direction of the widthwise and heightwise shifting directions of the photographic lens 30) by a corresponding amount when the photographic lens 30 is shifted.

Similarly to the case of the camera 10e, in the case of the camera 10f, a light-transmissive type of LCD panel (not shown) which allows light to pass therethrough, may be fixed in the vicinity of a focal plane formed by an objective optical system of the finder optical system 34 for the purpose of having the LCD panel indicate the finder view area in the finder view FV' which corresponds to the surface Fe in accordance with a shift of the photographic lens 30. In this case, it is unnecessary to provide either scales 90 or 92 in the finder view FV'. Furthermore, a device for detecting the amount of shift of the lens supporting plate 74 relative to the disc member 80 and a device for detecting the amount of rotation of the disc member 80 relative to the lens base plate 23 are preferably provided to control the LCD panel. This indicates the finder view area in the finder view FV' which corresponds to the surface Fe in accordance with the result of detection of those two detecting devices.

The aforementioned upper and lower guiding rails 80f, the lens supporting plate 74, the lens pressing plates 85 and 86, the disc member 80, the circular opening 81, the supporting plates 82, the set screws 83, etc. together constitute the lens-shifting mechanism of the camera 10f.

According to the fourth embodiment of the camera 10f, effects similar to those of the first embodiment of the camera 10 can be expected. In addition, due to the lens-shifting mechanism, photography with a perspective control in which the photographic optical axis O is shifted right or left in the widthwise direction of the surface Fe, up or down in the heightwise direction of the surface Fe, or a diagonal direction of the surface Fe can be easily carried out.

FIGS. 49 through 57 show a fifth embodiment of a lens shutter type camera. This fifth embodiment of the camera 10g is identical to the first embodiment of the camera 10 except for several different minor structures. For this reason, regarding the camera 10g, only those aspects unique to the fifth embodiment will be hereinafter discussed.

Figure 57:
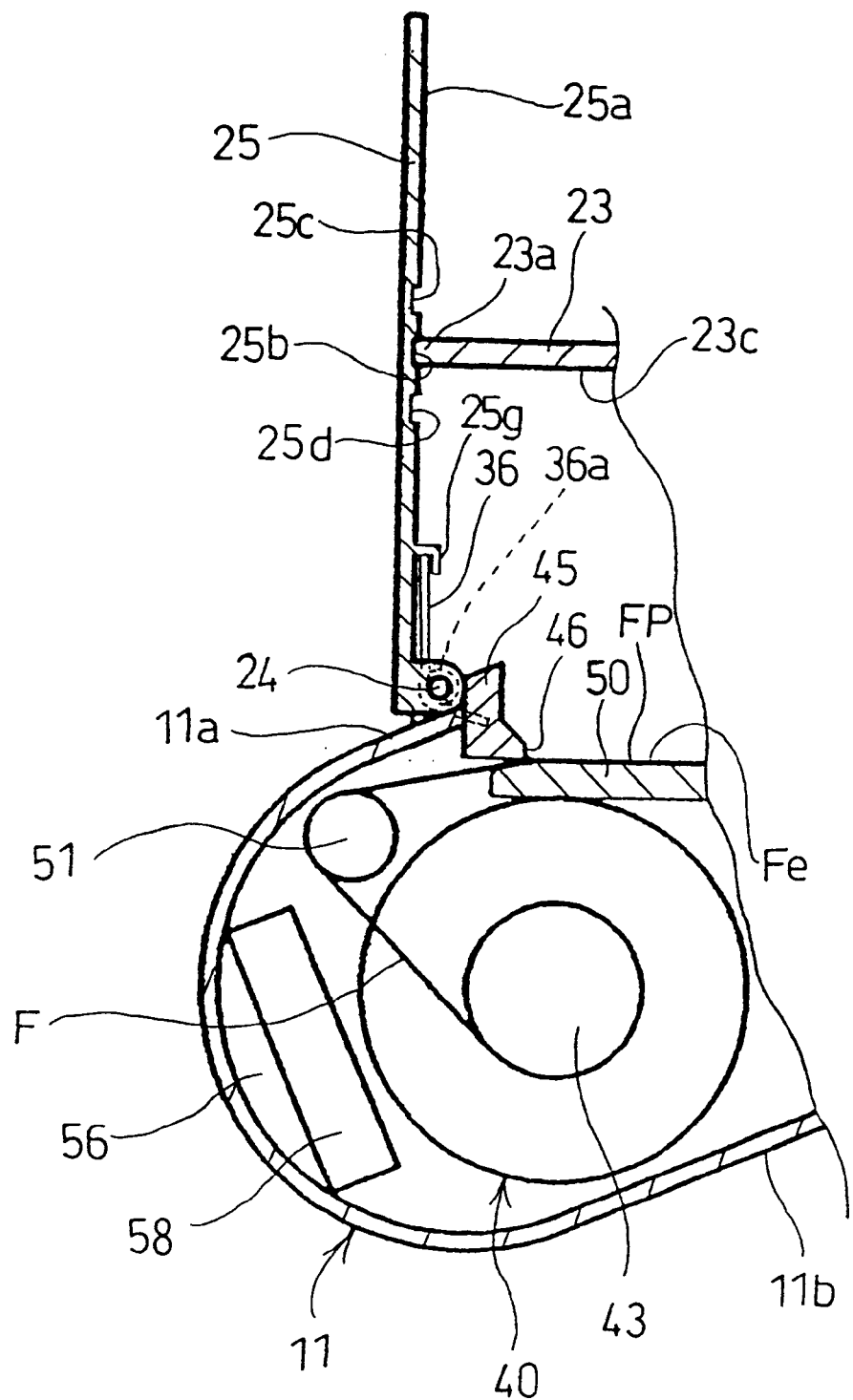
FIG. 57 is an enlarged sectional view of a part of the sectional view shown in FIG. 51.

The cover plate 25 of the camera 10g is continuously biased to rotate toward the closed position thereof by a torsion coil spring 36 (see FIG. 57). The torsion spring 36 is arranged such that a coil portion 36a thereof is fitted on the second vertical shaft 24. One end of the torsion spring 36 is engaged with a part of the front side wall 11a of the camera body 11. The other end is engaged with a hook portion 25g formed integral with the cover plate 25 on the rear surface 25a thereof. When the camera 10g is in the photo-ready state shown in FIG. 49, 51 or 52, the cover plate 25 is automatically closed by the biasing force of the torsion coil spring 36 after the lens base plate 23 is closed.

In addition to the features of the camera 10, the camera 10g has an additional feature which makes perspective control possible. Perspective control is realized using a lens-tilting mechanism with which the camera 10g is provided. With the lens-tilting mechanism, the optical axis O of the photographic lens 30 can be manually tilted horizontally relative to the surface Fe. The lens-tilting mechanism includes the lens base plate 23, the cover plate 25, a plurality of vertical grooves 25b, 25c and 25d, etc. Details of the lens-tilting mechanism will be hereinafter discussed.

In the camera 10g, in a state where the free end 23a of the lens base plate 23 is fitted in the vertical groove 25b, the lens base plate 23 is positioned in an open position where the lens base plate 23 extends parallel to the pressure plate 50. Namely, the lens base plate 23 is positioned in a normal photographic position where the optical axis O of the photographic lens 30 is not tilted relative to the surface Fe. In such a normal photographic position, the photographic optical axis O extends normal to the surface Fe at the center thereof.

Figure 55:
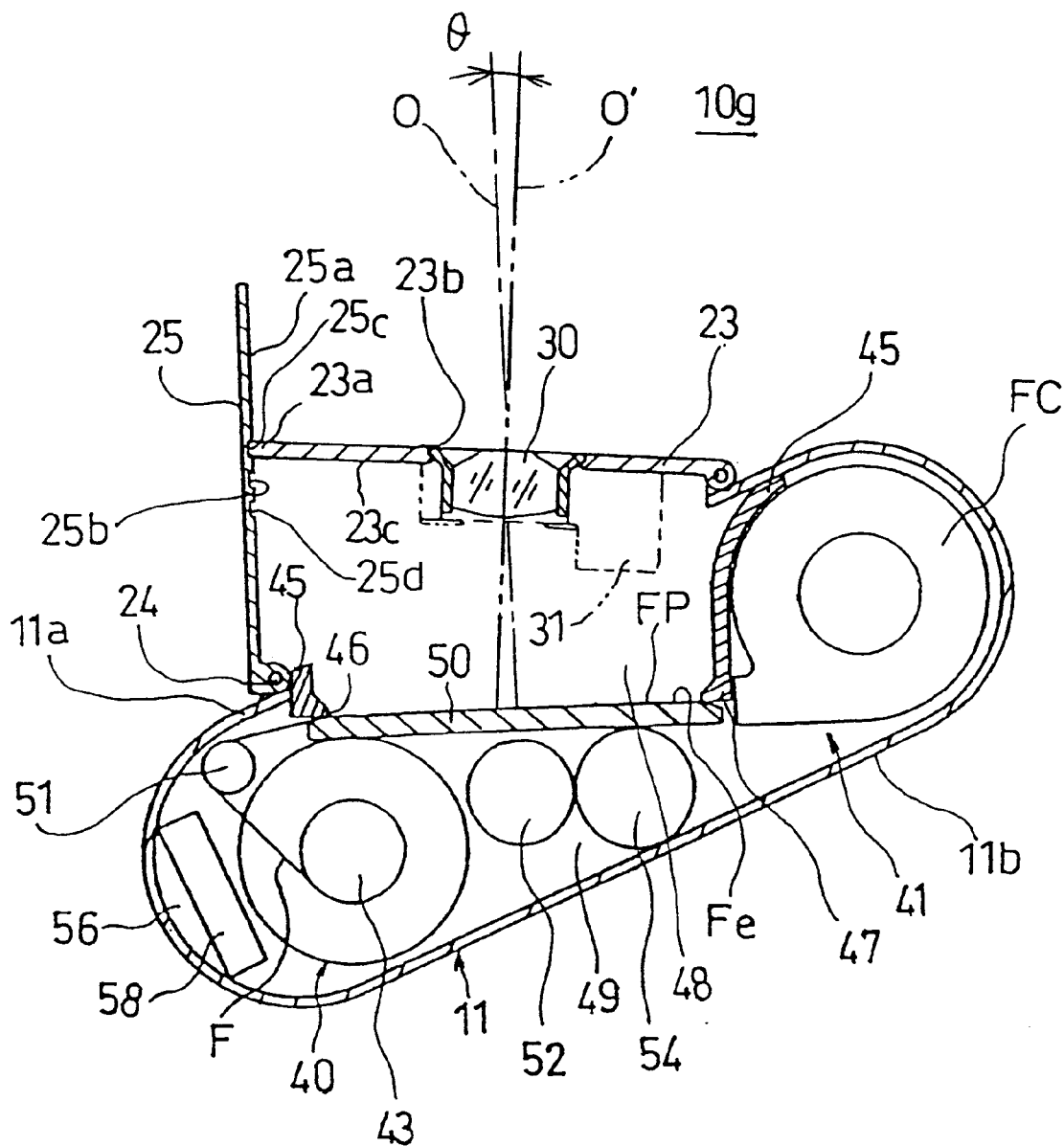
FIG. 55 is a sectional view of the lens shutter type of camera shown in FIG. 49 in a state where the optical axis of the lens is horizontally tilted to the right.
Figure 56:
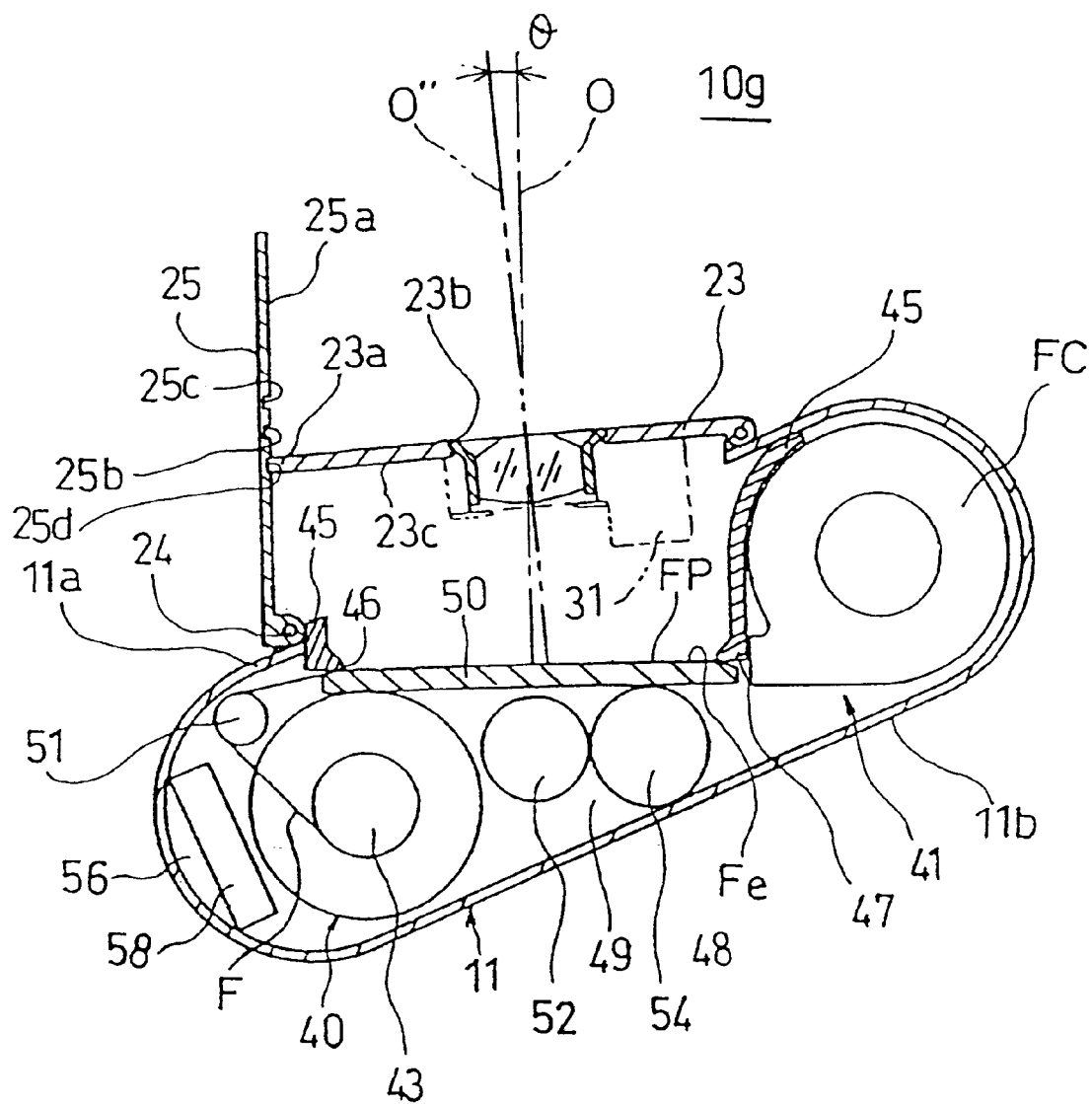
FIG. 56 is a sectional view of the lens shutter type of camera shown in FIG. 49 in a state where the optical axis of the lens is horizontally tilted to the left.

The vertical grooves 25c and 25d are formed on respective sides of the vertical groove 25b with the vertical groove 25b. Each of the vertical grooves 25c and 25d is separated from the vertical groove 25b by a predetermined distance. The free end 23a of the lens base plate 23 can be fitted in either the vertical groove 25c or the vertical groove 25d as well as the vertical groove 25b. FIG. 55 shows a state where the free end 23a of the lens base plate 23 is fitted in the vertical groove 25c. FIG. 56 shows a state where the free end 23a of the lens base plate 23 is fitted in the vertical groove 25d. Since the vertical grooves 25b, 25c and 25d are aligned in a direction from a subject side to an image side (from an upper side to a lower side as viewed in FIG. 51) when the cover plate 25 is in the open position, the vertical grooves 25b, 25c and 25d of the camera 10g will be hereinafter referred to as the center vertical groove 25b, the front vertical groove 25c and the rear vertical groove 25d, respectively.

Figure 51:
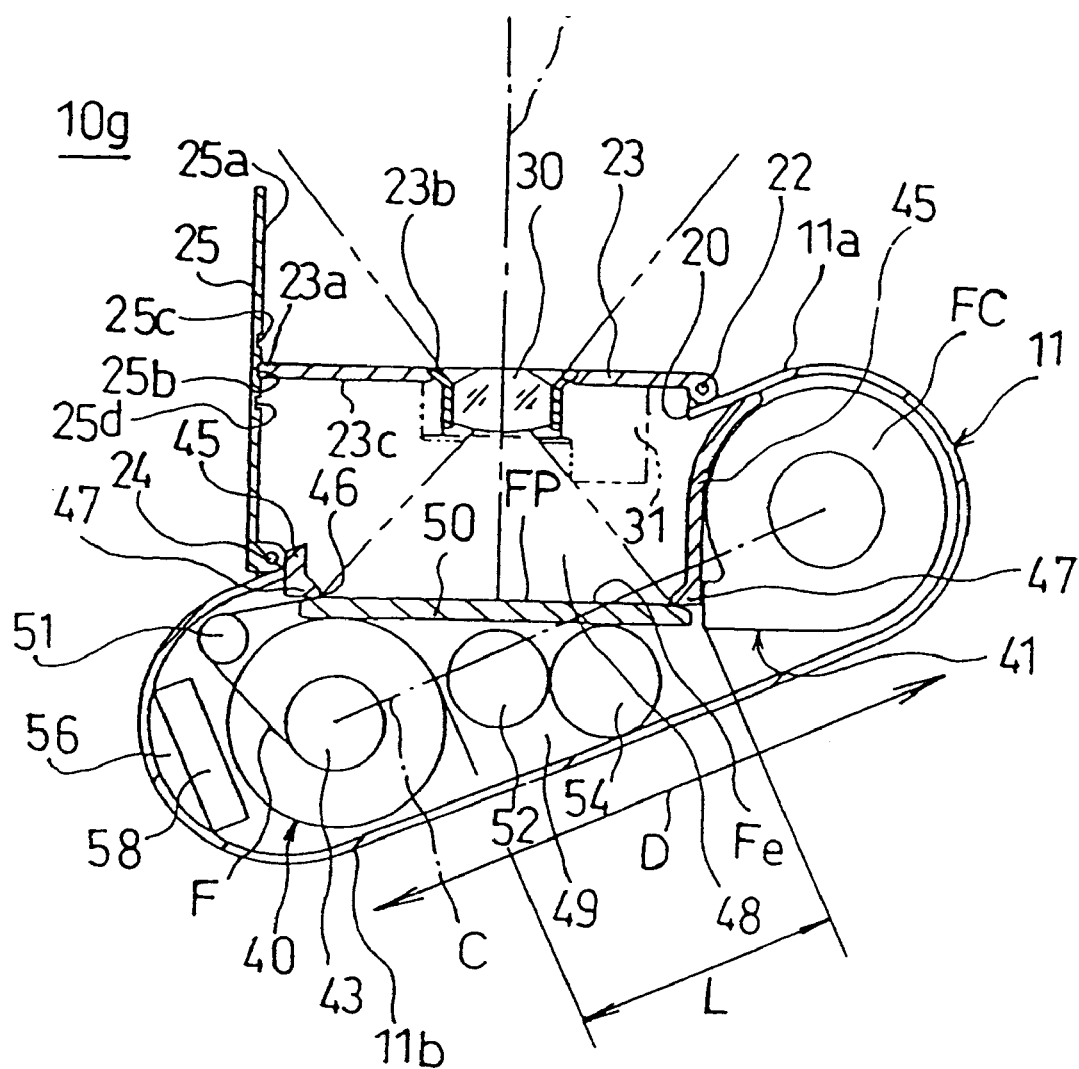
FIG. 51 is a sectional view of the lens shutter type camera taken along line Q—Q of FIG. 49.
Figure 52:
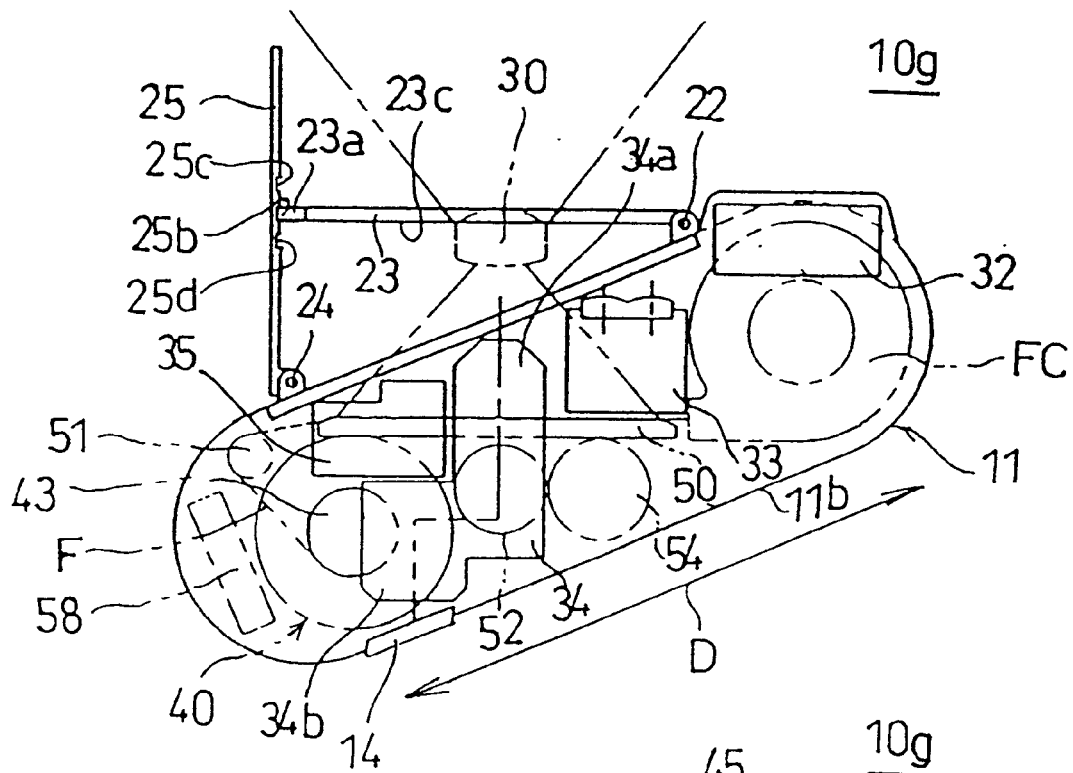
FIG. 52 is a sectional view of the lens shutter type camera taken along line R—R of FIG. 49.
Figure 53:
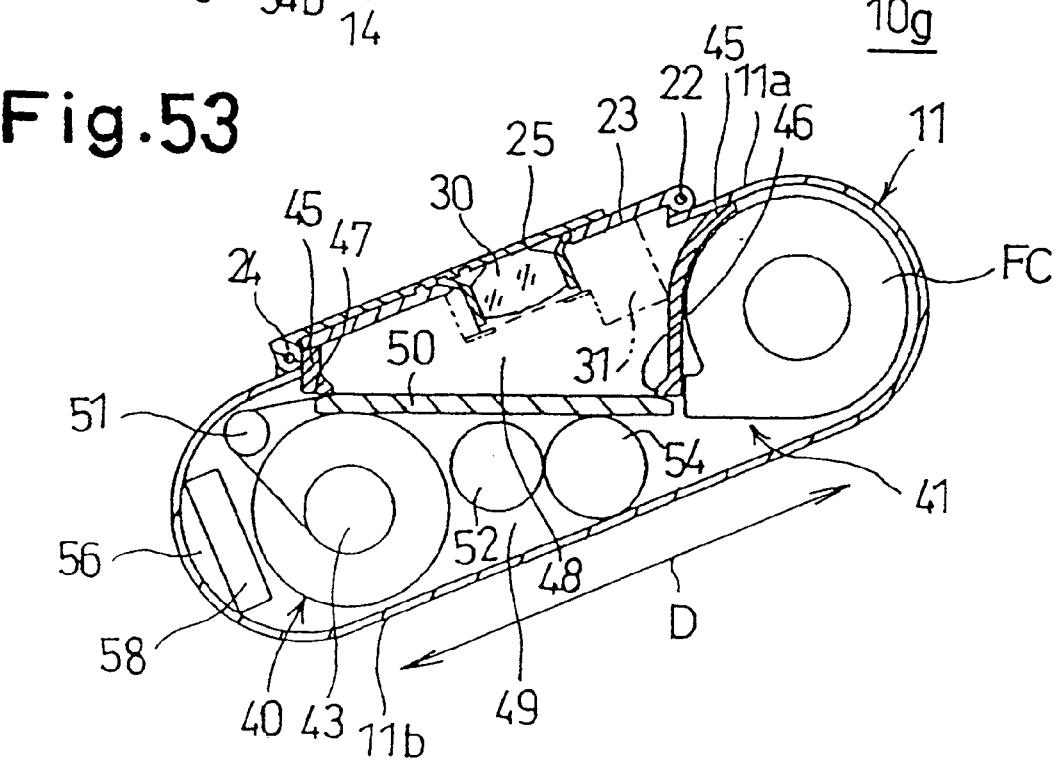
FIG. 53 is a sectional view of the lens shutter type camera taken along line S—S of FIG. 50.
Figure 54:
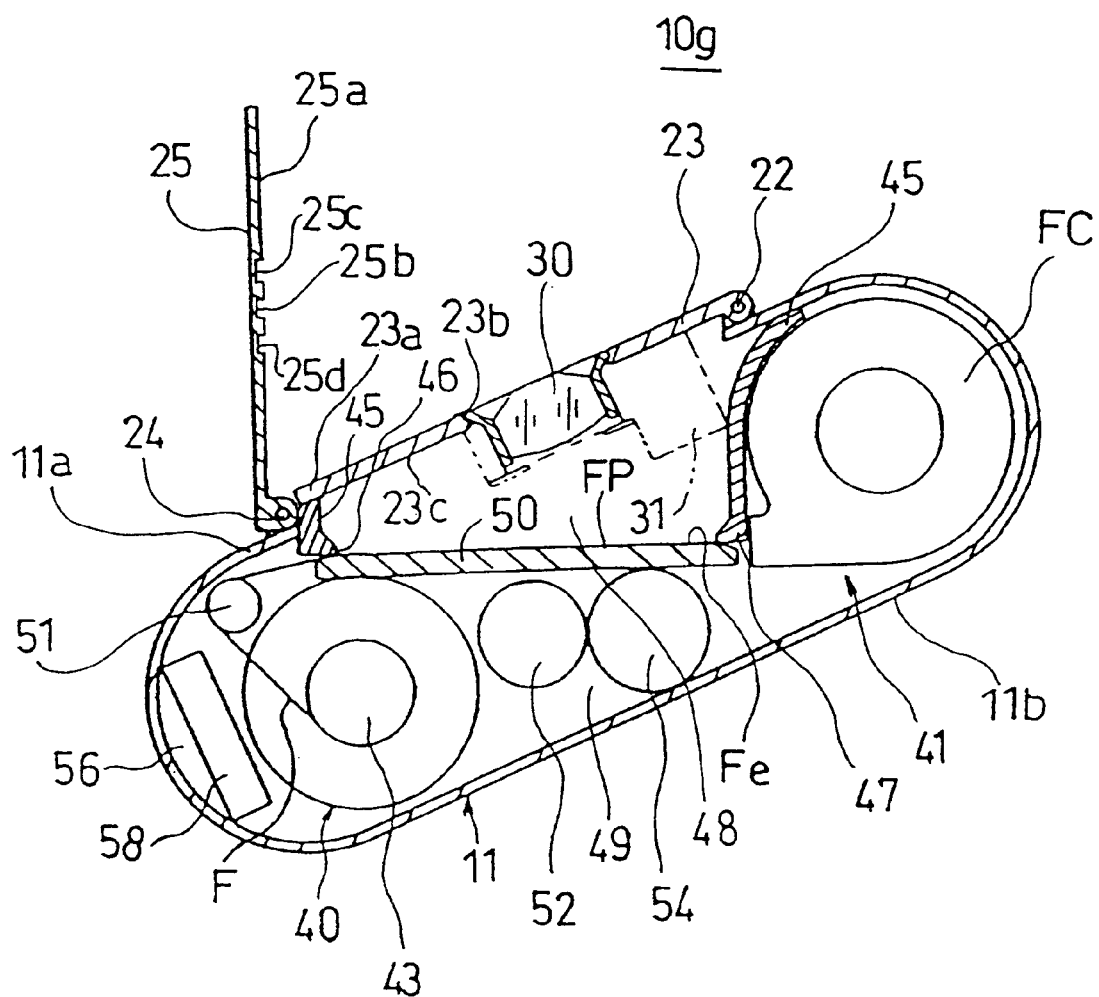
FIG. 54 is a sectional view of the lens shutter type camera shown in FIG. 49 in a state where a lens base plate is in a closed position while a cover plate is in an open position.

In the case where the free end 23a of the lens base plate 23 is engaged with the front vertical groove 25c as shown in FIG. 55, the lens base plate 23 is located at a position of having been rotated in a clockwise direction as viewed in FIG. 55 by a predetermined angle from the position shown in FIG. 51. The tilted optical axis O of the photographic lens 30 in the case shown in FIG. 55, that is, a photographic optical axis O', is inclined relative to the optical axis O of normal photography (shown by single-dotted lines in FIG. 55) by an angle θ° (degree) towards the right side as viewed in FIG. 55. In addition, the position of the photographic optical axis O' on the surface Fe deviates from that of the photographic optical axis O of normal photography towards the left side as viewed in FIG. 55 by a predetermined amount in the widthwise direction of the surface Fe as shown in FIG. 55. Accordingly, in the case where the free end 23a of the lens base plate 23 is engaged with the front vertical groove 25c as shown in FIG. 55, a photo can be taken with the optical axis O of the photographic lens 30 being horizontally tilted to the right.

In the case where the free end 23a of the lens base plate 23 is engaged with the rear vertical groove 25d as shown in FIG. 56, the lens base plate 23 is located at a position of having been rotated in a counterclockwise direction as viewed in FIG. 56 by a predetermined angle from the position shown in FIG. 51. The tilted optical axis O of the photographic lens 30 in the case shown in FIG. 56, that is, a photographic optical axis 0", is inclined relative to the optical axis O of normal photography (shown by single-dotted lines in FIG. 55) by an angle θ° (degree) towards the left side as viewed in FIG. 56. In addition, the position of the photographic optical axis O" on the surface Fe deviates from that of the photographic optical axis O of the normal photography towards the right side as viewed in FIG. 56 by a predetermined amount in the widthwise direction of the surface Fe as shown in FIG. 56. Accordingly, in the case where the free end 23a of the lens base plate 23 is engaged with the rear vertical groove 25d as shown in FIG. 56, a photo can be taken with the optical axis O of the photographic lens 30 being horizontally tilted to the left.

As can be understood from the foregoing, according to the fifth embodiment of the camera 10g, when taking a photo without tilting the optical axis O, the user of the camera 10g only needs to bring the free end 23a into engagement with the center vertical groove 25b. When taking a photo with the optical axis O being horizontally tilted to the right, the user of the camera 10g only needs to bring the free end 23a into engagement with the front vertical groove 25c. When taking a photo with the optical axis O being horizontally tilted to the left, the user of the camera 10g only needs to bring the free end 23a into engagement with the rear vertical groove 25d. Each of the lens base plate 23 and the cover plate 25 is maintained at its open position by the engagement of the free end of the lens base plate 23 with one of the center, front and rear vertical grooves 25b, 25c and 25d. Namely, the open position of the lens base plate 23 is determined by the position of the center, front or rear vertical groove 25b, 25c or 25d. A positioning device for selectively positioning the lens base plate 23 at any one of a plurality of angular positions relative to the camera body 11 of the camera 10g is includes the free end 23a of the lens base plate 23, the center, front and rear vertical grooves 25b, 25c and 25d, etc.

Figure 58:
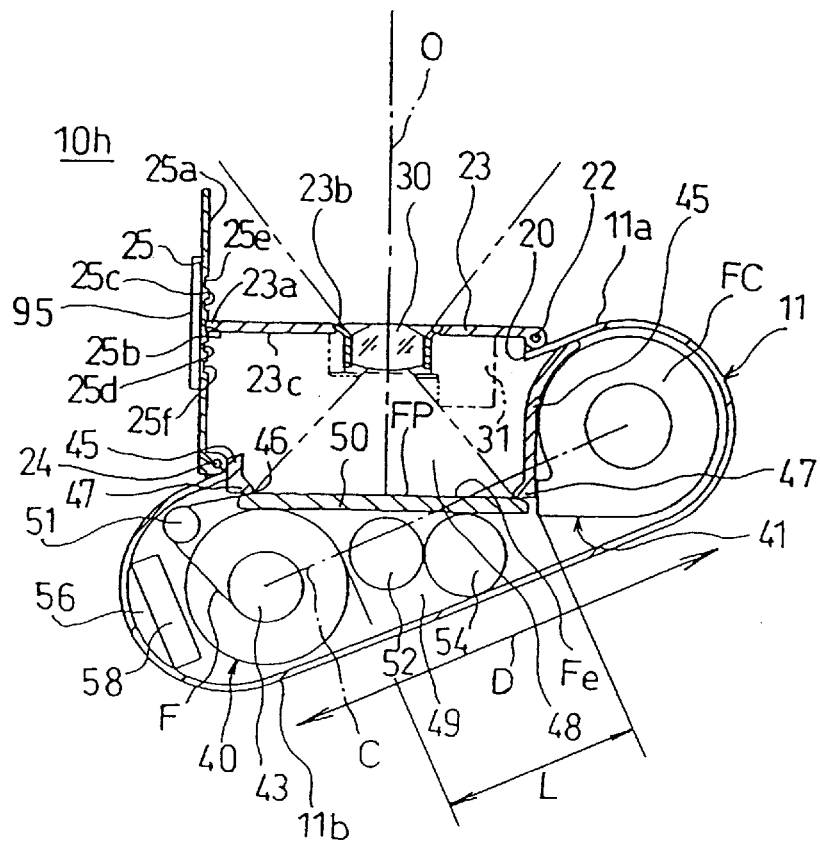
FIG. 58 is a sectional view of a sixth embodiment of a lens shutter type camera.
Figure 59:
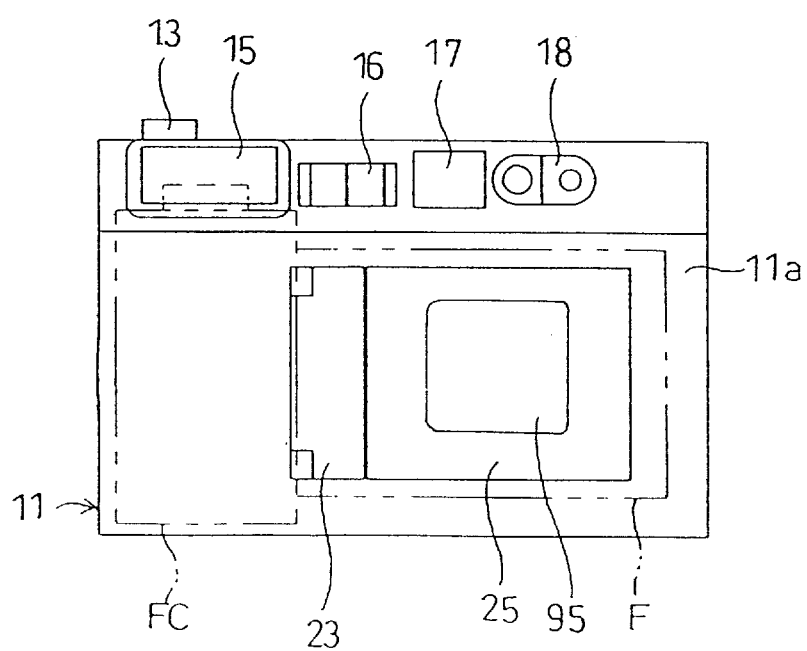
FIG. 59 is a front side view of the lens shutter type camera shown in FIG. 58 in a lens-retracted state as viewed from the front in the direction of the optical axis of the photographic lens of the camera.

Although the camera 10g is provided on the cover plate 25 with the three vertical grooves 25b, 25c and 25d, more than three vertical grooves including the center vertical groove 25b may be formed on the cover plate 25. FIG. 58 shows a sixth embodiment of the camera having five vertical grooves 25b, 25c, 25d, 25e and 25f on the rear surface 25a of the cover plate 25. The camera 10h of this embodiment is identical to the camera 10g except that the camera 10h is further provided on the rear surface 25a of the cover plate 25 with a frontmost vertical groove 25e and a rearmost vertical groove 25f. An LCD panel 95 is fixed to the front surface of the cover plate 25.

The vertical grooves 25b, 25c, 25d, 25e and 25f are formed on the rear surface 25a of the cover plate 25 at regular intervals, and extend in parallel to each other in the vertical direction of the camera 10h. The lens base plate 23 can thus be tilted stepwisely by one or two steps forward or backward from the normal position, relative to the camera body 11. On the LCD panel 95, various photographic information (e.g., film number, date, time, strobe ON/OFF information, battery information, etc.) is indicated.

When the user of the camera 10h holds the camera 10h by using their right hand, the user holds the camera 10h with the thumb contacting the rear surface 11b of the camera body 11. The index finger contacts the release button 13. The remaining fingers (middle, ring and little fingers) contact the front surface of the camera body 11. Since the camera body 11 of the camera 10h is small, a major part of the rear surface 11b of the camera 10h is covered by the thumb of the right hand of the user which contacts the rear surface 11b. Due to this reason, if the LCD panel 95 is fixed on the rear surface 11b, the possibility would exist that the LCD panel 95 would be mostly covered by the thumb of the right hand of the user, which prevents the user from reading the various photographic information. It is not practical to provide the LCD panel 95 on the upper surface of the camera body 11 because the upper surface is not sufficiently large. Since the camera 10h has the aforementioned structure in which the LCD panel 95 is fixed to the front surface of the cover plate 25, the LCD panel 95 will not be covered by any fingers when the user holds the camera 10h in his right hand, so that the various photographic information indicated 25 on the LCD panel 95 can always be seen clearly. The LCD panel 95 may be provided not only on the cover plate 25 of the camera 10h but also on the cover plate 25 of any one of the aforementioned cameras 10 through 10x (except the camera 10d).

The current angular position of the lens base plate 23 relative to the camera body 11 may be indicated on the LCD panel 95. In this case, for example, the tilted angle of the lens base plate 23 from the normal photographic position thereof can be indicated on the LCD panel 95 by a numerical value. The amount of tilt of the lens base plate 23 from the normal photographic position thereof can also be indicated on the LCD panel 95 by an increase or decrease of the activated number of continuously arranged plurality of segments on the LCD panel 95.

According to either the fifth or sixth embodiment of the camera 10g or 10h, effects similar to those of the first embodiment of the camera 10 can be expected. In addition, the optical axis O of the photographic lens 30 can be manually tilted horizontally to take a photo with a perspective control.

Figure 60:
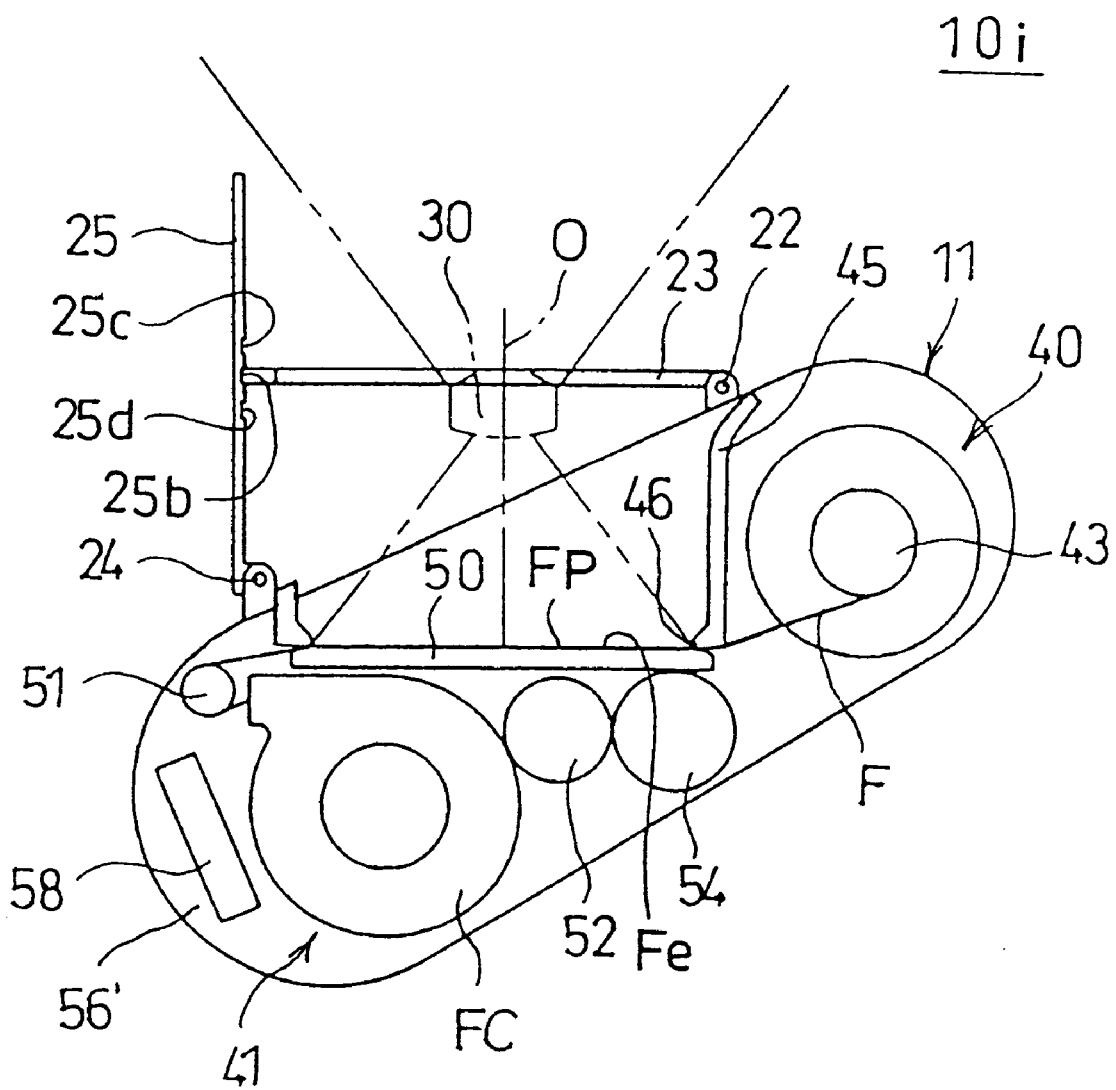
FIG. 60 is a schematic illustration of a modification of the fifth embodiment of the lens shutter type camera in a photo-ready state.

FIG. 60 shows a modification of the camera 10g, i.e., a camera 10i, in a photo-ready state. In the camera 10i the spool chamber 40 and cartridge chamber 41 are reversed in the camera body 11 as compared with the camera 10g, i.e., the spool chamber 40 and the cartridge chamber 41 are formed right and left in the camera body 11, respectively, as viewed in FIG. 60. Further, a battery chamber 56' which corresponds to the battery chamber 56 of the camera 10g is formed between the cartridge chamber 41 and the camera body 11. Film F drawn out of the film cartridge FC is positioned on the guide roller 51 to lead the film F to the spool chamber 40. Except for these structural differences, the camera 10i is substantially identical to the camera 10g.

Figure 61:
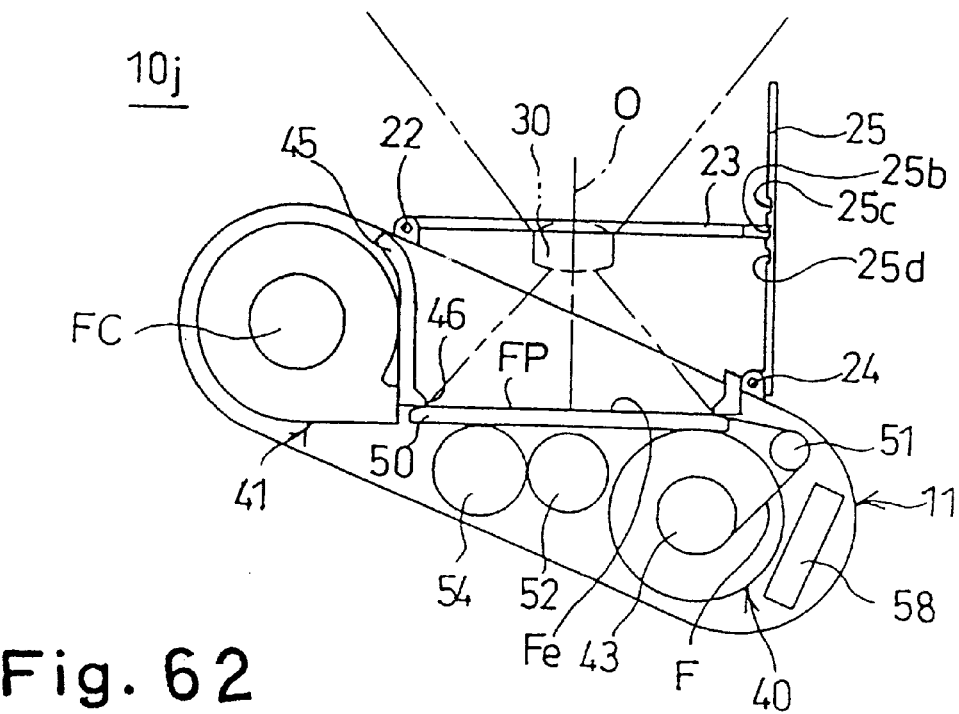
FIG. 61 is a schematic illustration of another modification of the fifth embodiment of the lens shutter type camera in a photo-ready state.

FIG. 61 shows another modification of the camera 10g, i.e., a camera 10j, in a photo-ready state. In the camera 10j, all the components are reversed right and left as compared with the camera 10g, i.e., the camera 10j is a mirror image of the camera 10g.

Figure 62:
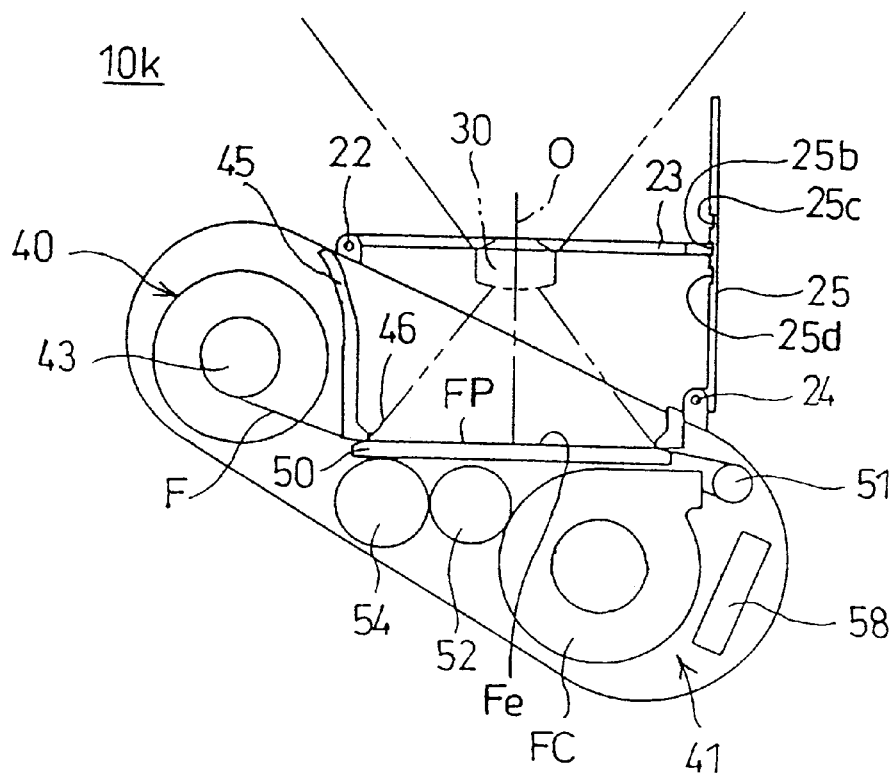
FIG. 62 is a schematic illustration of still another modification of the fifth embodiment of the lens shutter type camera in a photo-ready state.

FIG. 62 shows still another modification of the camera 10g, i.e., a camera 10k, in a photo-ready state. In the camera 10k the spool chamber 40 and cartridge chamber 41 are reversed as compared with the camera 10j, i.e., the spool chamber 40 and the cartridge chamber 41 are formed left and right in the camera body 11, respectively, as viewed in FIG. 62. The camera 10k is a mirror image of the camera 10i.

Although each of the cameras 10i, 10j and 10k is provided on the cover plate 25 with the three vertical grooves 25b, 25c and 25d, more than three vertical grooves including the center vertical groove 25b may be formed on the cover plate 25 of each of the cameras 10i, 10j and 10k. Five grooves including the center vertical groove 25b may be formed on the cover plate 25 in a similar manner to that of the sixth embodiment of the camera 10h.

Figure 64:
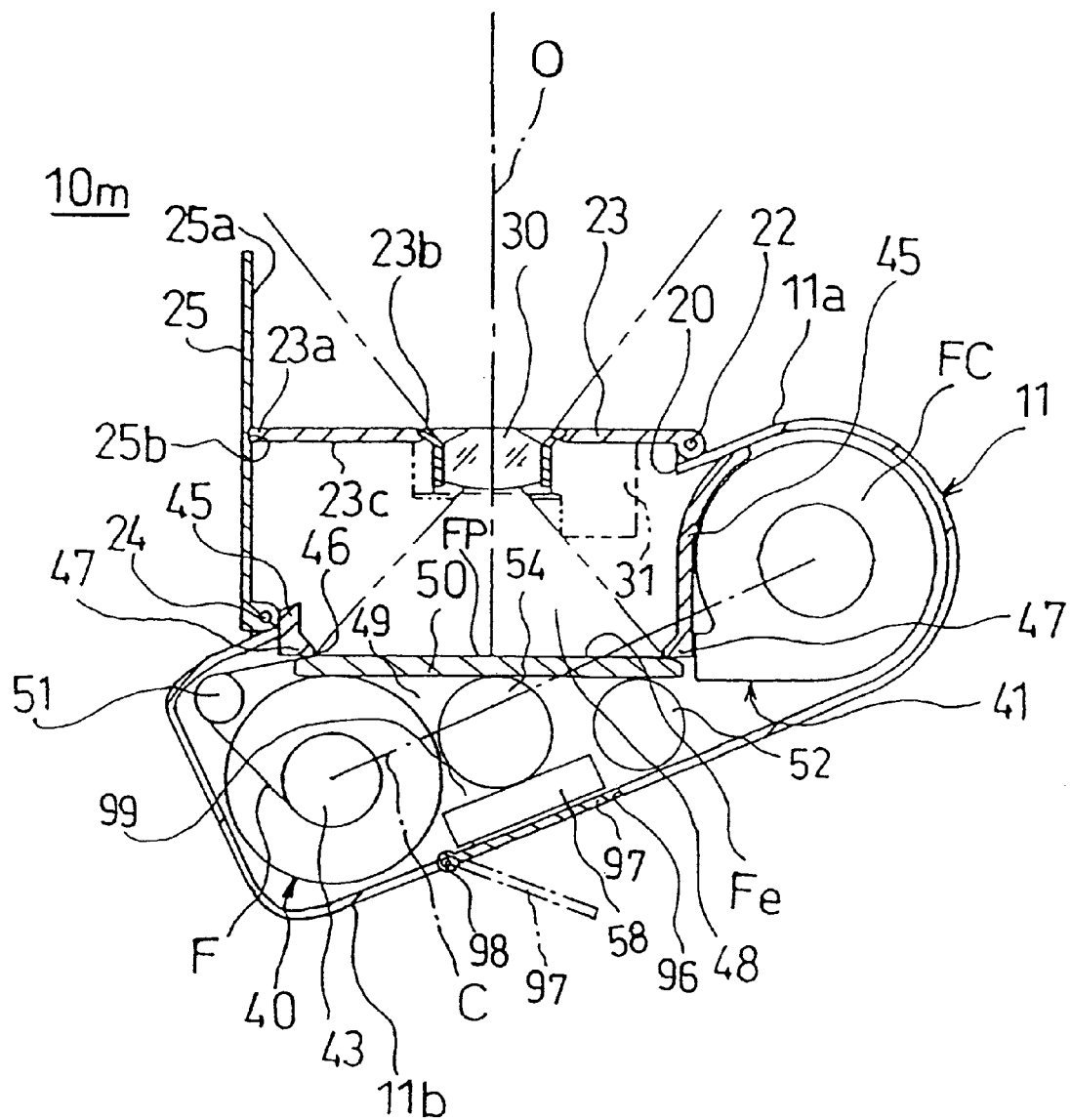
FIG. 64 is a sectional view of a seventh embodiment of a lens shutter type camera in a photo-ready state.

FIG. 64 shows a seventh embodiment of a lens shutter type camera. This seventh embodiment of the camera 10m is identical to the first embodiment of the camera 10 except for several different minor structures. For this reason, regarding the camera 10m, only those aspects unique to the seventh embodiment will be hereinafter discussed.

In this seventh embodiment of the camera 10m, the cylindrical motor, condenser 52 and 54, and battery 58 are arranged in the wedge-shaped space 49 to reduce the width of the camera body 11. Since battery 58 is arranged in the wedge-shaped space 49, a left side end portion of the camera body 11 is shorter. Accordingly, the width of the camera body 11 is shorter in this seventh embodiment, as compared with the camera body 11 of the camera body 10. The battery 58 is accommodated in a battery chamber 99 formed in the wedge-shaped space 49. The camera body 11 is provided on the rear thereof with an opening 96 through which the battery 58 is inserted or taken out. A lid 97 is pivoted about a shaft 98 which is secured to one side end of the opening 96 to extend in the vertical direction of the camera 10m. In FIG. 64, closed and open states of the lid 97 are respectively shown by a solid line and single-dotted lines. In this seventh embodiment, the battery 58 may be arranged above the cylindrical projection 57 (see FIG. 63) in place of the motor 52 or the condenser 54 to be substantially coaxial with the axis Ax. In addition, instead of pivotally fixing the lid 97 to the rear side wall of the camera body 11, the lid 97 may be formed as a detachable lid which can be fitted on or taken out of the rear side wall of the camera body 11.

Figure 65:
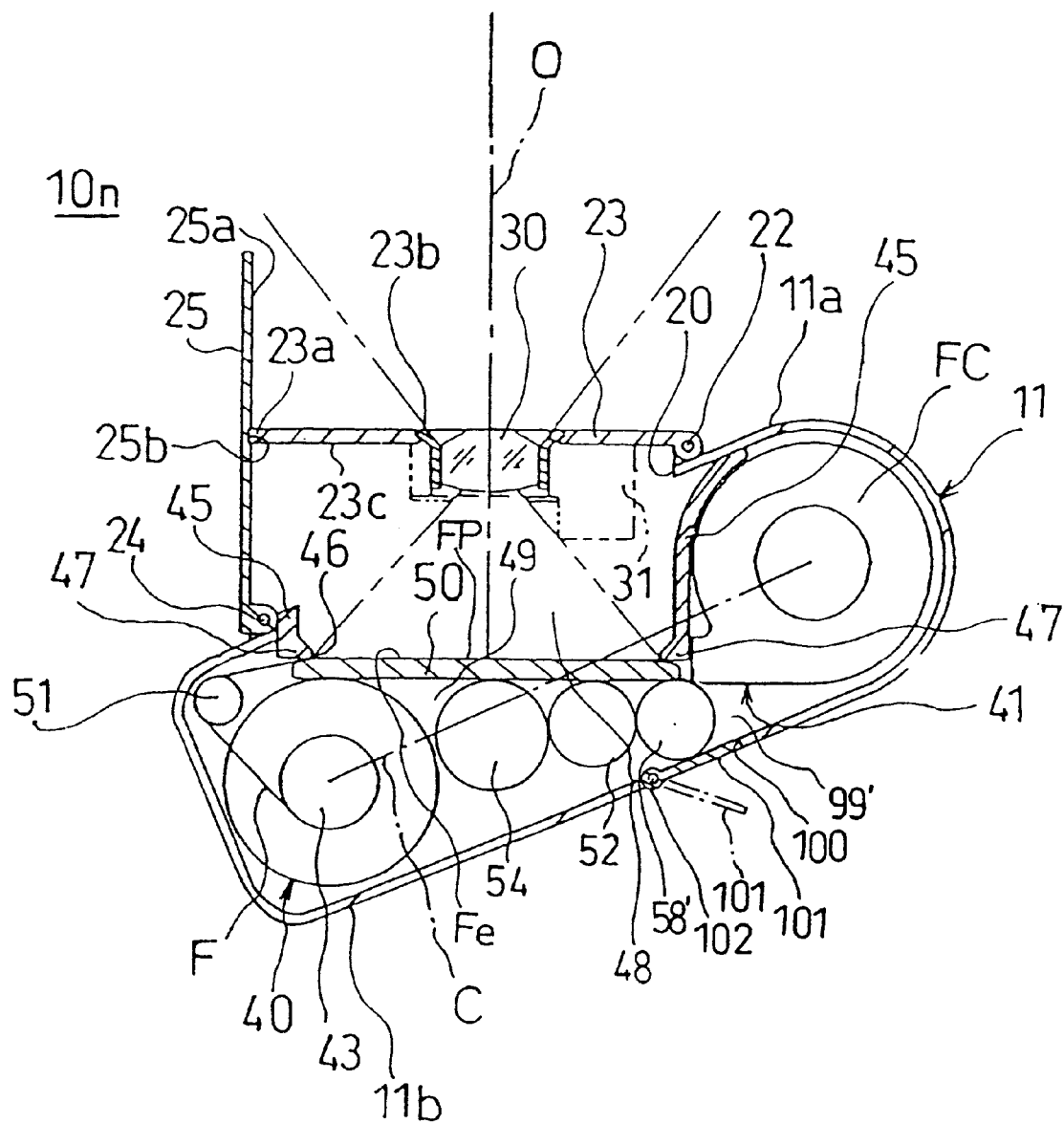
FIG. 65 is a sectional view of an eighth embodiment of a lens shutter type camera in a photo-ready state.

FIG. 65 shows an eighth embodiment of a lens shutter type camera. This eighth embodiment of the camera 10n is identical to the first embodiment of the camera 10 except for several different minor structures. For this reason, regarding the camera 10n, only those aspects unique to the eighth embodiment will be hereinafter discussed.

In this eighth embodiment of the camera 10n, a cylindrical battery 58' is used instead of the rectangular rechargeable battery 58. The cylindrical battery 58' has a substantially identical capacity and performance to that of the battery 58 and is arranged in the wedge-shaped space 49 together with the cylindrical motor 52 and the condenser 54. This reduces the width of the camera body 11 similar to the seventh embodiment of the camera 10m, so that a left side end portion of the camera body 11 is shorter in this eight embodiment, similar to the seventh embodiment. Accordingly, similarly to the seventh embodiment, the width of the camera body 11 is shorter in this eighth embodiment, as compared with the camera body 11 of the camera body 10.

The cylindrical battery 58' is accommodated in a battery chamber 99' formed in the wedge-shaped space 49 adjacent to the cartridge chamber 41. The camera body 11 is provided on the rear thereof with an opening 100 through which the battery 58' is inserted or taken out. A lid 101 is pivoted about a shaft 102 which is secured to one side end of the opening 100 to extend in the vertical direction of the camera 10n. In FIG. 65, a closed state and an open state of the lid 101 are respectively shown by a solid line and single-dotted lines. In this eighth embodiment, the battery 58, may be arranged above the cylindrical projection 57 (see FIG. 63) in place of the motor 52 or the condenser 54 to be substantially coaxial with the axis Ax. In addition, instead of pivotally fixing the lid 101 to the rear side wall of the camera body 11, the lid 101 may be formed as a detachable lid which can be fitted on or taken out of the rear side wall of the camera body 11, similar to the lid 97 of the seventh embodiment.

As will be understood from the above seventh and eighth embodiments, the arrangement of the motor 52 and the condenser 54 (and the battery 58 or 58' in the case of the camera 10m or 10n) in the wedge-shaped space 49 is not limited solely to the particular arrangement of each of the cameras 10 through 10n. Any other arrangement may be acceptable as long as the motor 52 and the condenser 54 (and the battery 58 or 58' in the case of the camera 10m or 10n) are space-efficiently arranged in the wedge-shaped space 49. Furthermore, the motor 52, the condenser 54 and the battery 58 or 58' may consist of more than one motor, one condenser or one battery, respectively.

According to either the seventh or the eighth embodiment, of course effects similar to those of the first embodiment of the camera 10 can be expected.

Figure 66:
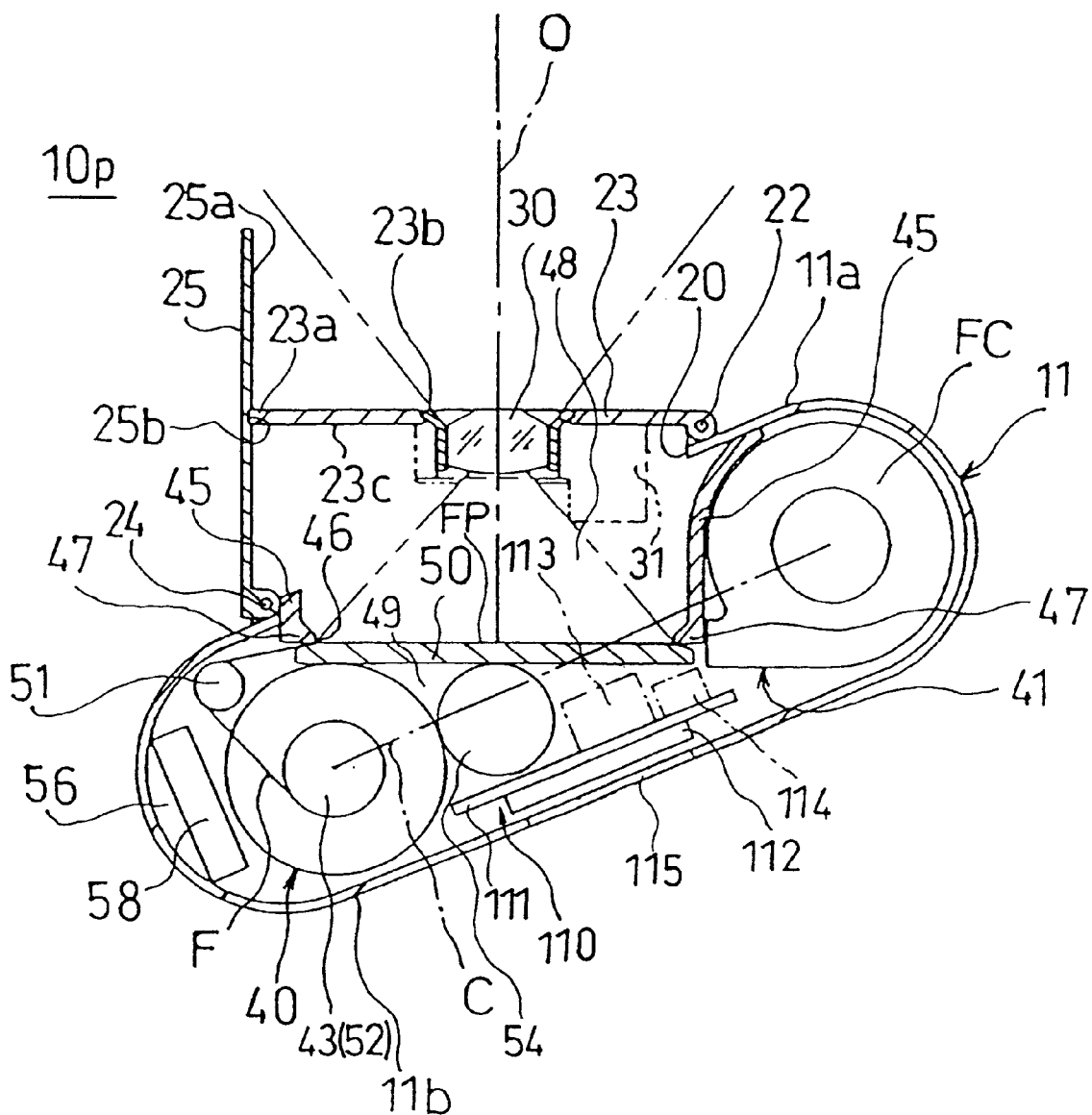
FIG. 66 is a sectional view of a ninth embodiment of a lens shutter type camera in a photo-ready state.
Figure 67:
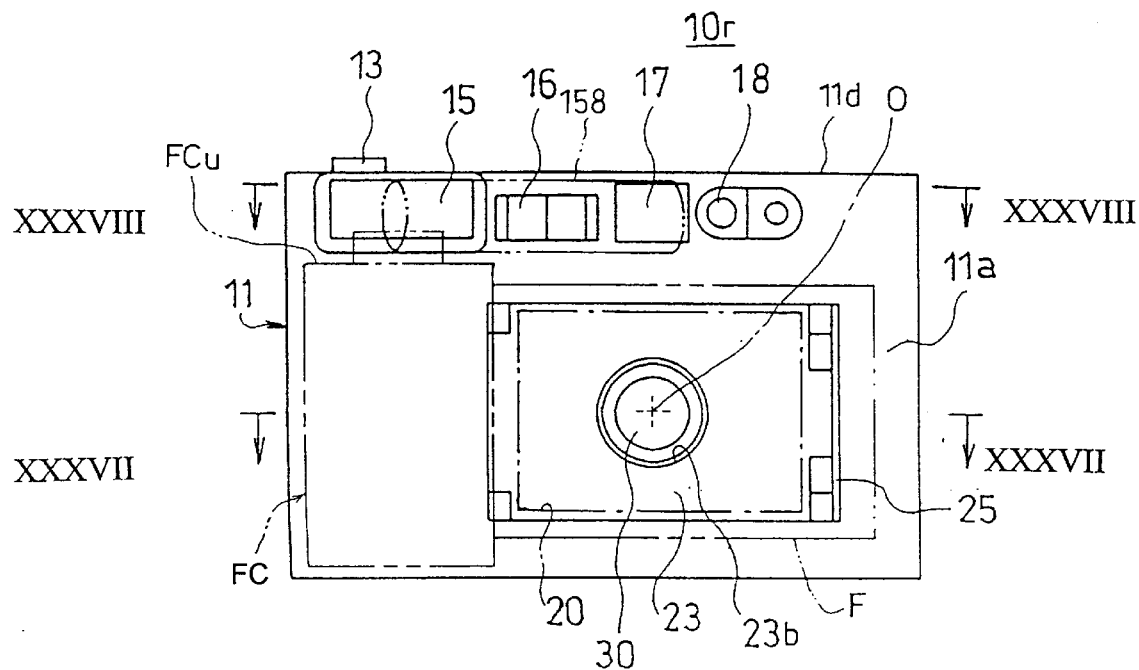
FIG. 67 is a front side view of a tenth embodiment of a lens shutter type camera in a photo-ready state as viewed from the front in the direction of the optical axis of the photographic lens of the camera.
Figure 68:
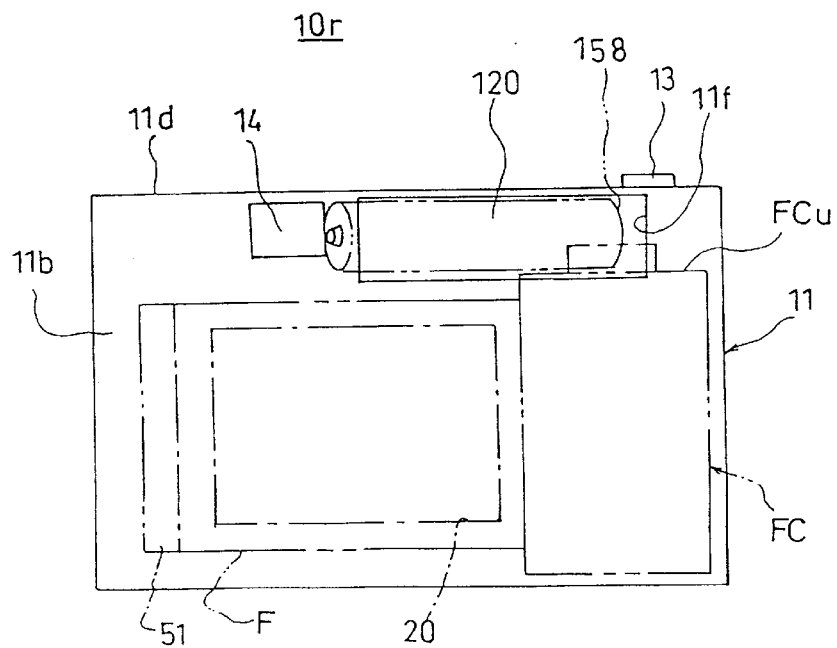
FIG. 68 is a rear side view of the lens shutter type camera shown in FIG. 67 as viewed in the direction of an arrow B shown in FIG. 69.
Figure 69:
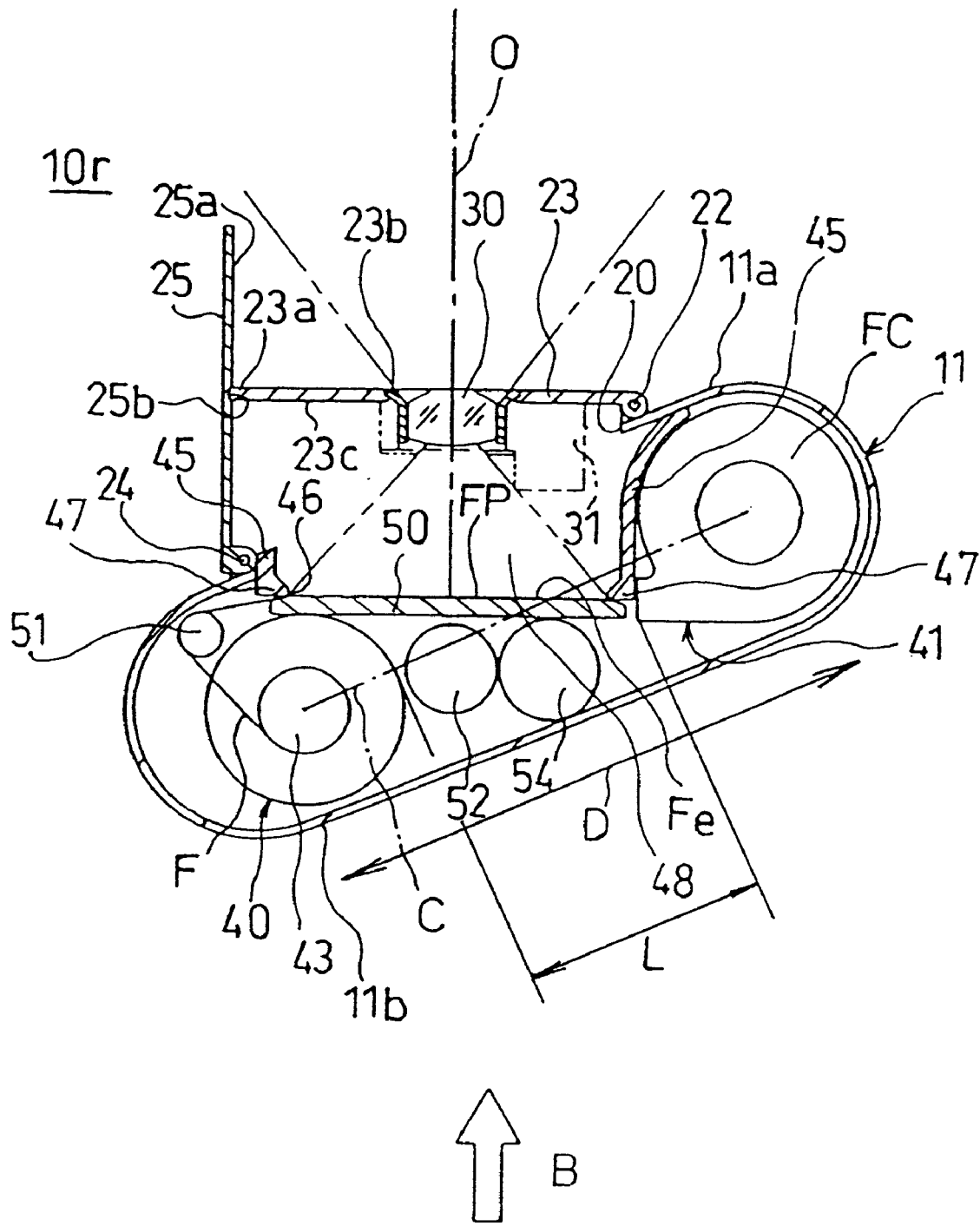
FIG. 69 is a sectional view of the lens shutter type camera taken along line T—T of FIG. 67.
Figure 70:
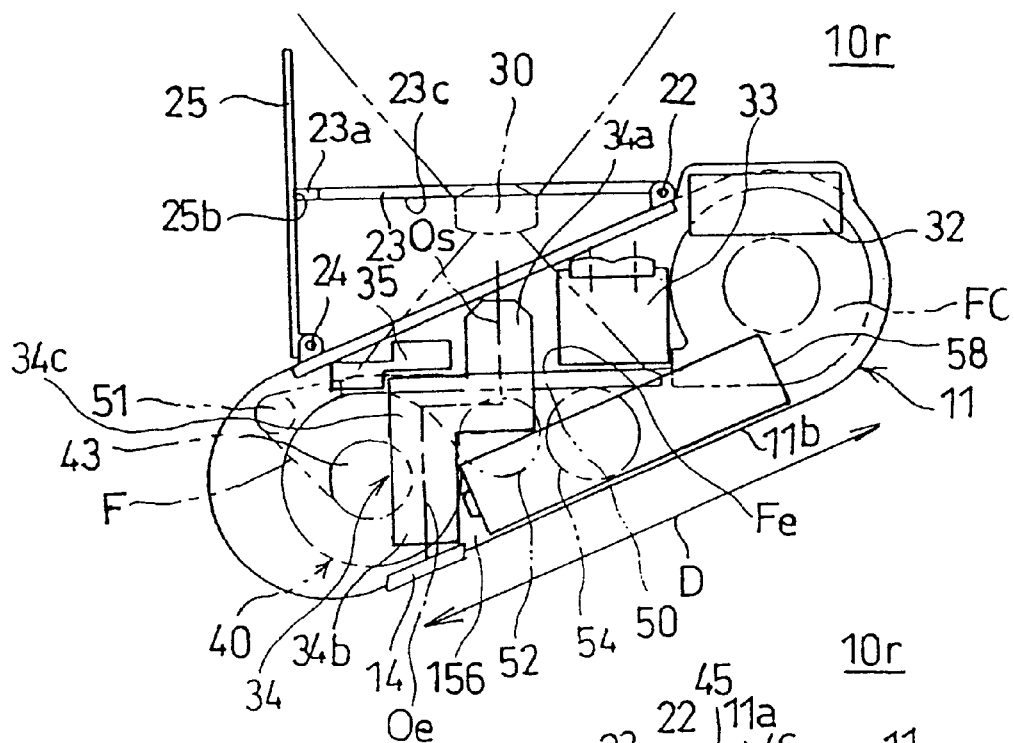
FIG. 70 is a sectional view of the lens shutter type camera taken along line U—U of FIG. 67.
Figure 71:
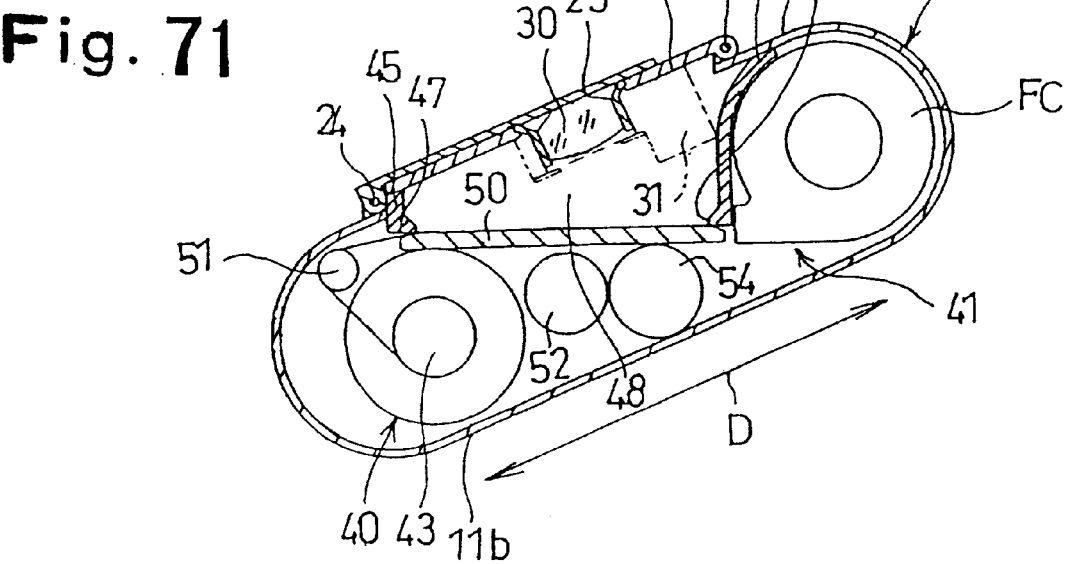
FIG. 71 is a sectional view of the lens shutter type camera shown in FIG. 67 in a lens-retracted state where a lens base plate and a cover plate are both closed.
Figure 72:
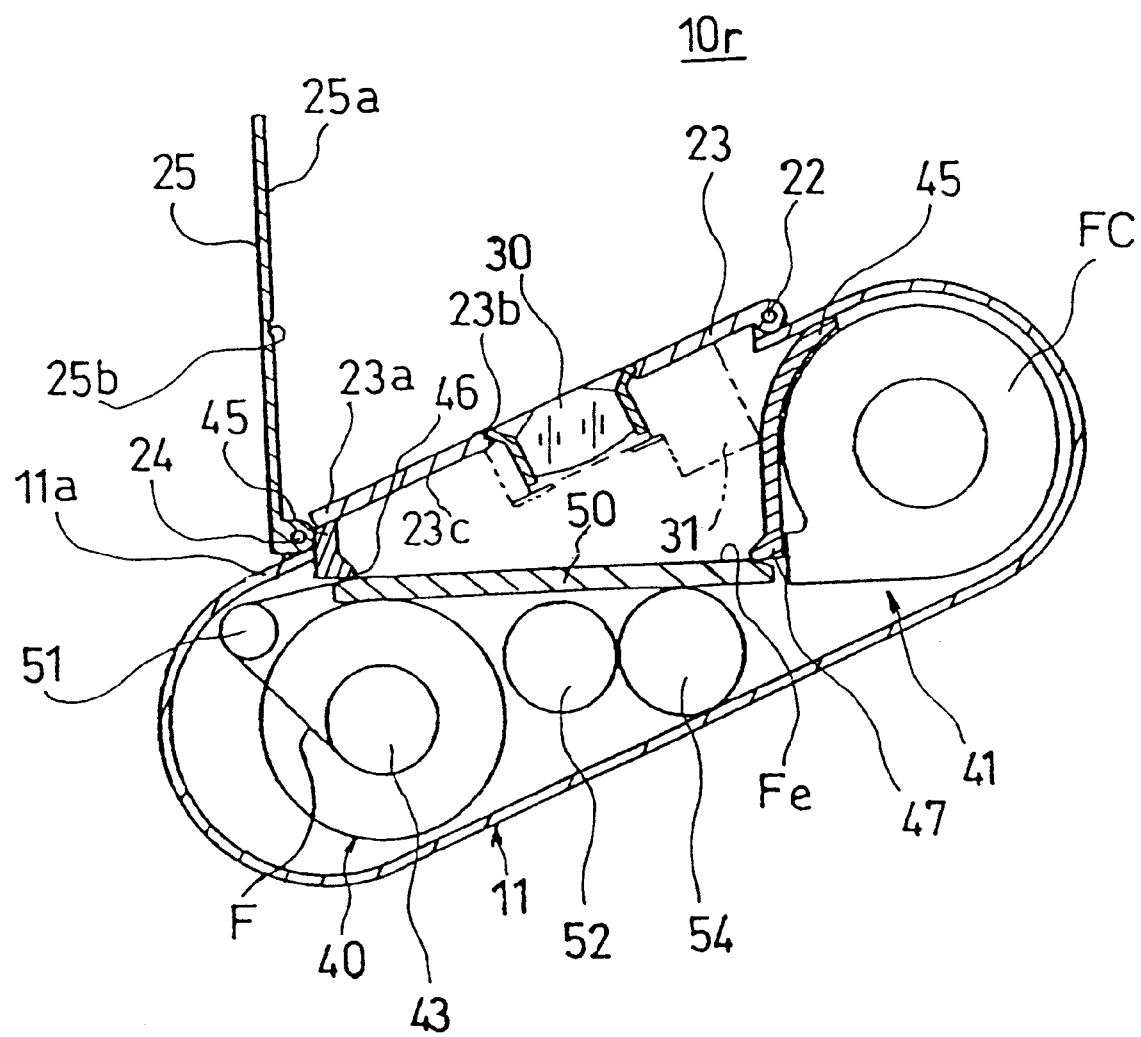
FIG. 72 is a sectional view of the lens shutter type camera shown in FIG. 67 wherein the lens base plate is in a closed position while the cover plate is in an open position.
Figure 73:
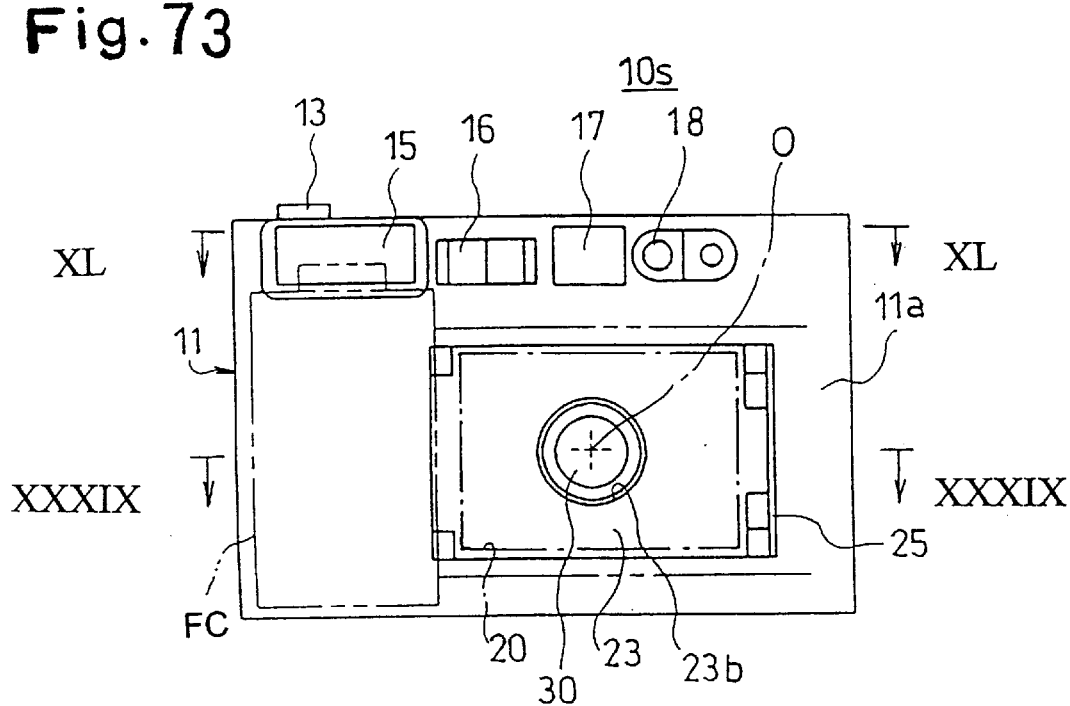
FIG. 73 is a front side view of an eleventh embodiment of a lens shutter type camera in a photo-ready state as viewed from the front in the direction of the optical axis of the photographic lens of the camera.
Figure 74:
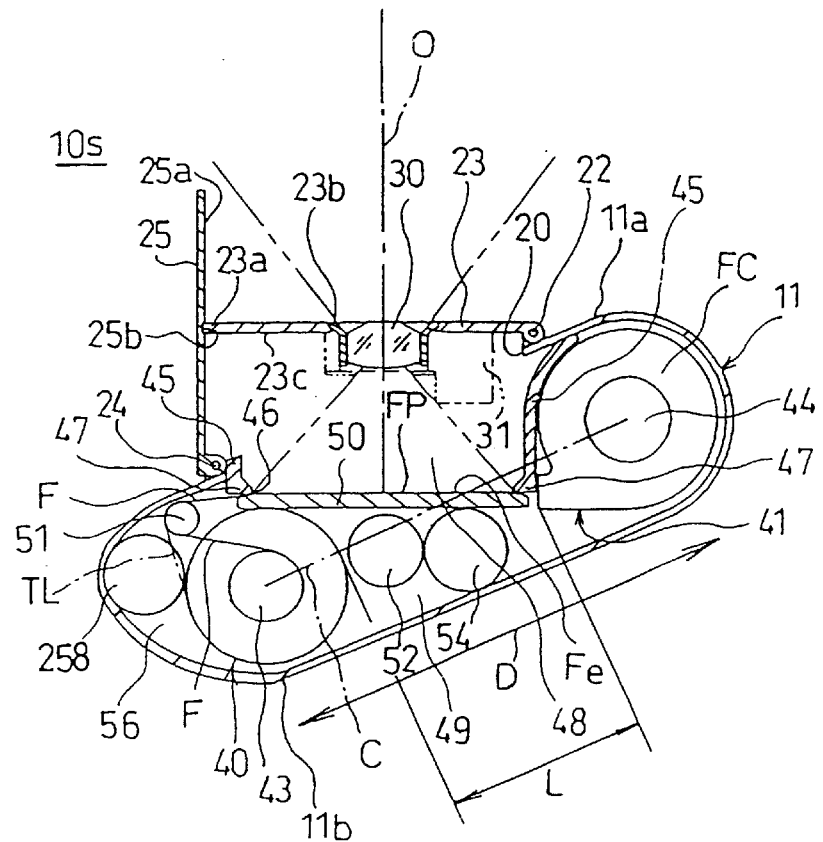
FIG. 74 is a sectional view of the lens shutter type camera taken along line W—W of FIG. 73.
Figure 75:
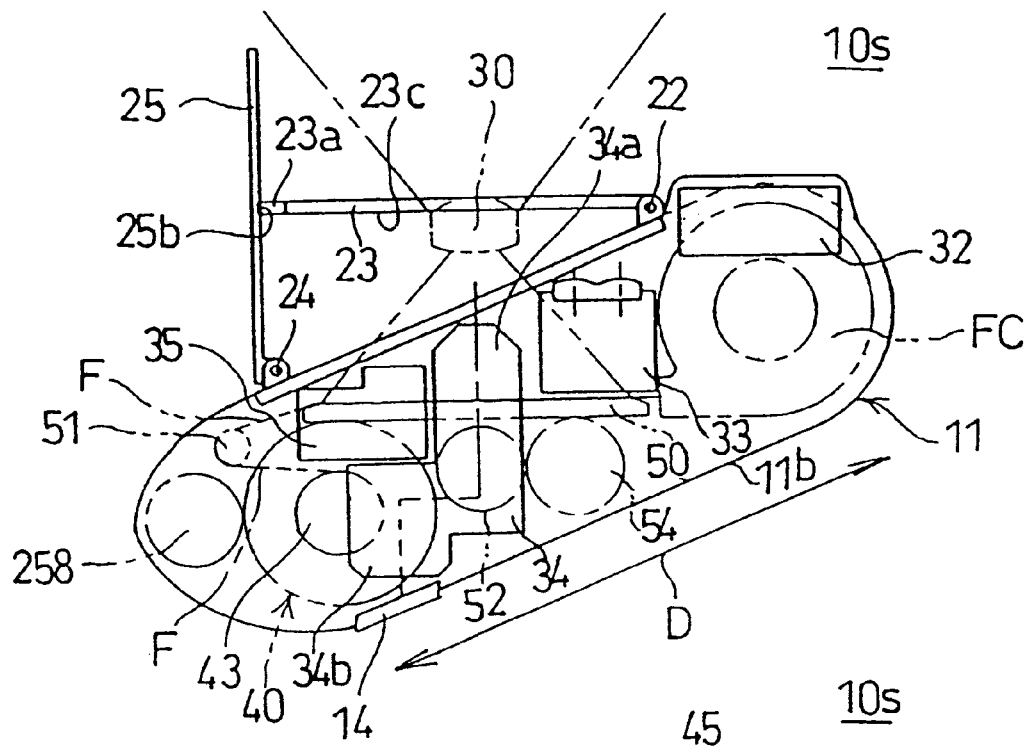
FIG. 75 is a sectional view of the lens shutter type camera taken along line Y—Y of FIG. 73.
Figure 76:
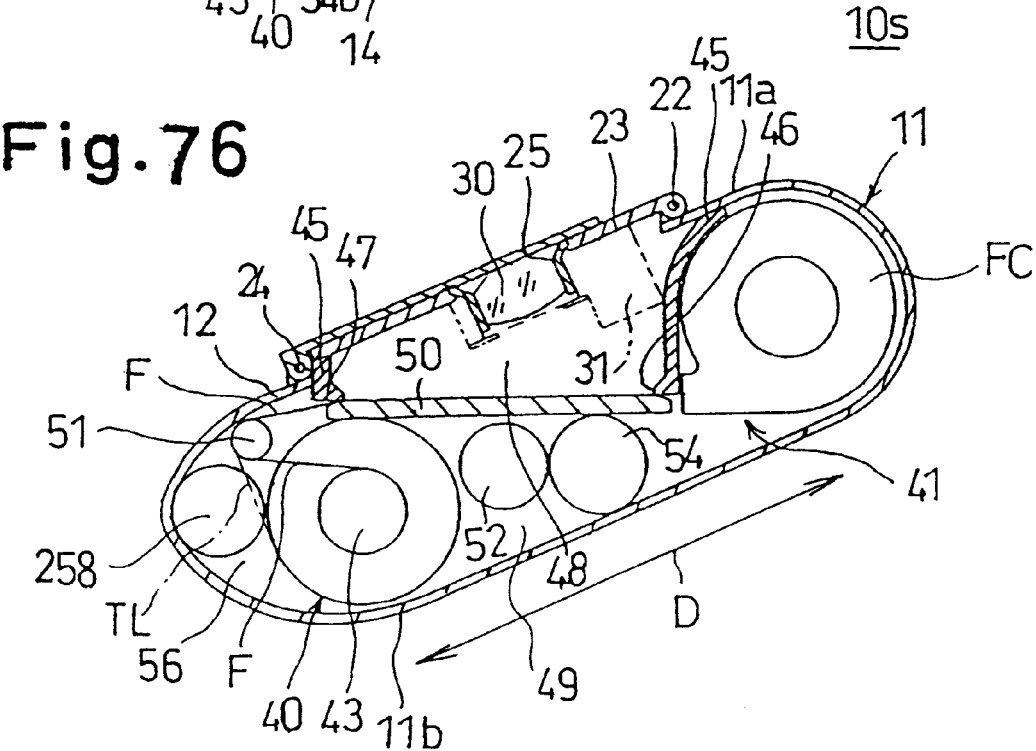
FIG. 76 is a sectional view of the lens shutter type camera shown in FIG. 73 in a lens-retracted state where a lens base plate and a cover plate are both closed.
Figure 77:
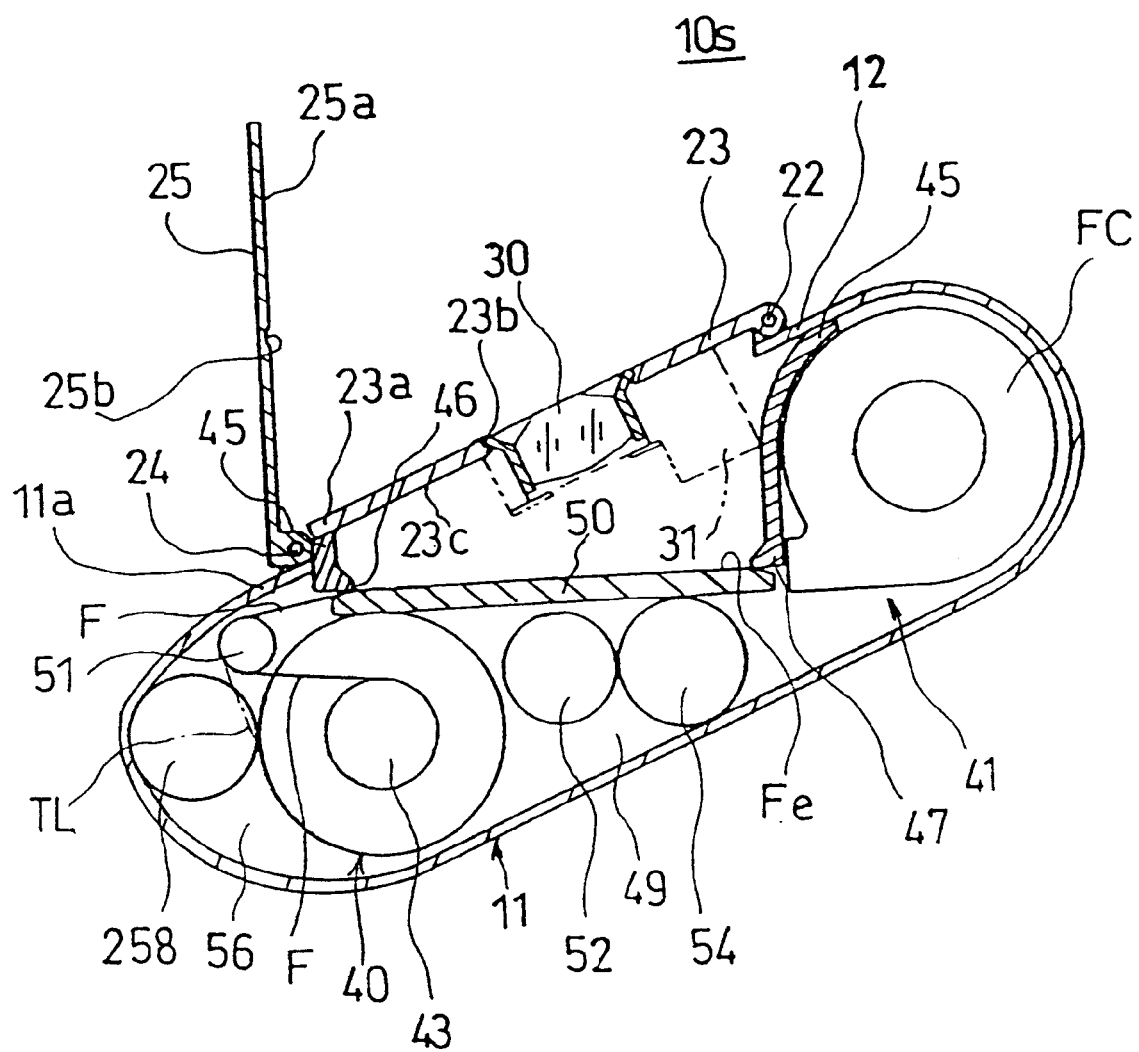
FIG. 77 is a sectional view of the lens shutter type camera shown in FIG. 73 wherein the lens base plate is in a closed position while the cover plate is in an open position.

FIG. 66 shows a ninth embodiment of a lens shutter type camera. This ninth embodiment of the camera 10p is identical to the first embodiment of the camera 10 except for several different structures. For this reason, regarding the camera 10p, only those aspects unique to the ninth embodiment will be hereinafter discussed.

In the ninth embodiment, the motor 52 is coaxially arranged in the film take-up spool 43. The condenser 54 and a circuit board 110 are space-efficiently arranged in the wedge-shaped space 49 to reduce the size of the camera body 11. Of course, effects similar to those of the first embodiment of the camera 10 can be expected in this ninth embodiment.

The circuit board 110 is provided with a base plate 111 which extends in the right/left direction of the camera 10p. An LCD panel 112 is secured to the rear surface of the base plate 111. The LCD panel 112 can be seen through a transparent window plate 115 formed on the rear side wall of the camera body 11. On the LCD panel 112 various photographic information (number of film frames, date, time, strobe information, battery warning information, etc.)

is indicated. Circuit parts 113 and 114 are secured to the front surface of the base plate 111. The circuit parts 113 and 114 may include a CPU or the like for controlling the LCD panel 112. As illustrated in FIG. 66, any parts or members like the circuit board 110 may be arranged in the wedge-shaped space 49 together with the motor 52, the condenser 54, the battery 58, etc. to space-efficiently use the wedge-shaped space 49. In the ninth embodiment, although the motor 52 is arranged in the film take-up spool 43, the condenser 54 or any other parts can be arranged in the film take-up spool 43 in place of the motor 52 to space-efficiently use the inner space of the film take-up spool 43. The circuit board 110 may carry any other parts or members thereon. Furthermore, also in this ninth embodiment, the motor 52, the condenser 54 and the battery 58 may consist of more than one motor, one condenser or one battery, respectively.

FIGS. 67 through 72 show a tenth embodiment of a lens shutter type camera. This tenth embodiment of the camera 10r is identical to the first embodiment of the camera 10 except for several different structures. For this reason, regarding the camera 10r, only those aspects unique to the tenth embodiment will be hereinafter discussed.

Differences between the cameras 10 and 10r are in the type of battery used and the arrangement of the battery in the camera body 11. That is, the camera 10 uses the rectangular rechargeable battery 58 accommodated in the battery chamber 56 formed adjacent to the spool chamber 40 as explained above, whereas the camera 10r uses a different type of battery, i.e., a cylindrical battery (AA size battery) 158 accommodated in a battery chamber 156 (see FIG. 70) formed in an upper rear space in the camera body 11 immediately below the upper wall 11d.

Since the battery chamber 156 is formed in such a limited space in the camera body 11, the finder optical system 34 and the photometering sensor unit 35 in the camera 10r are each formed somewhat different in shape from those in the camera 10 of the first embodiment but are designated by the common reference numerals because these are functionally identical to those in the camera body 10.

The finder optical system 34 is provided, between the subject-side end portion 34a and the eyepiece-side end portion 34b, with an optical path bending portion 34c (see FIG. 70) which connects the subject-side end portion 34a with the eyepiece-side end portion 34b to lead light entering the subject-side end portion 34a to the eyepiece-side end portion 34b. Due to the optical path bending portion 34c, an optical axis Oe of the eyepiece-side end portion 34b is shifted to the left side as viewed in FIG. 70 from an optical axis of the subject-side end portion 34a Os by a predetermined amount.

The aforementioned battery chamber 156, formed in an upper rear space in the camera body 11, extends in the right/left direction of the camera body 11. The cylindrical battery 158 accommodated in the battery chamber 156 is, e.g., an AA size manganic battery, an AA size alkaline battery or an AA size rechargeable battery (Ni—cd, Ni—MH, Lithium-Ion, etc.). The camera body 11 is provided on the rear side wall thereof with a rectangular opening 11f through which the battery 158 is inserted or taken out. A lid 120 is detachably attached to the rear side wall of the camera body 11 so as to close the opening 11f. In the case of the lid 120 being attached to close the opening 11f, the outer surface of the lid 120 lies in a common plane in which the rear surface 11b of the camera body 11 lies.

The battery chamber 156 is formed in the camera body 11 such that the longitudinal direction (axial direction) of the battery 158 accommodated in the battery chamber 156 is inclined to the surface Fe and substantially parallel to the rear surface 11b of the camera body 11. Moreover, the battery chamber 156 is formed in the camera body 11 such that the battery 158 accommodated therein is positioned above the upper edge of the film F (see FIGS. 67 and 68).

The battery chamber 156 is formed in the camera body 11 such that one end (left end as viewed in FIG. 70) of the battery 158 is positioned between the optical path bending portion 34c and the rear side wall of the camera body 11. The other end of the battery 158 is positioned between the upper wall lid of the camera body 11 and an upper end Fcu of the film cartridge FC (see FIGS. 67 and 68).

According to the tenth embodiment of the camera 10r, effects similar to those of the first embodiment of the camera 10 can be expected. In addition, since the finder optical system 34 is space-efficiently formed such that the optical axis Oe of the eyepiece-side end portion 34b is shifted from the optical axis of the subject-side end portion 34a Os to obtain sufficient space for the battery chamber 156, the cylindrical battery 158 is accommodated in a very limited space in the camera body 11 without enlarging the camera. This contributes to reducing the size of the camera 10r.

In the camera 10r, an AA size cylindrical battery is used as mentioned above. However, any other types of batteries or two or more than two cylindrical or pill-shaped batteries connected in series may be used instead, as long as they can be accommodated in the small-sized battery chamber 156.

In the camera 10r, although the battery 158 is accommodated in the upper rear space in the camera body 11 immediately below the upper wall 11d, either the motor 52 or the condenser 54 may be accommodated in the upper rear space in the camera body 11 instead of the battery 158. Namely, in the camera 10r, the battery 158 and the motor 52 may be reversed in the camera body 11, or the battery 158 and the condenser 54 may be reversed in the camera body 11.

FIGS. 73 through 77 show an eleventh embodiment of a lens shutter type camera. This eleventh embodiment of the camera 10s is identical to the first embodiment of the camera 10 except for several different structures. For this reason, regarding the camera 10s, only those aspects unique to the eleventh embodiment will be hereinafter discussed.

The rectangular rechargeable battery 58 is arranged in the camera body 11 of the camera 10 whereas a cylindrical battery 258 is arranged in the camera body 11 of the camera 10s. In the camera 10 the film F which is led to the film take-up spool 43 by the guide roller 51 is wound on the film take-up spool 43 in a counterclockwise direction as viewed in FIG. 3. In the camera 10s, the film F is wound on the film take-up spool 43 in a clockwise direction as viewed in FIG. 74. That is, in the camera 10s, the film F which passes over the pressure plate 50 to proceed to the guide roller 51 is turned back substantially toward the film cartridge FC by the guide roller 51 to be wound on the film take-up spool 43 from a side thereof closer to the surface Fe, not from an opposite rear side closer to the rear side wall of the camera body 11. The diameter of the battery 258 is much larger than the thickness of the battery 58, so that the camera body 11 of the camera 10s is formed to have a slightly different shape at a left end portion thereof as viewed in FIG. 74 so as to correspond to the cylindrical shape of the battery 258 accommodated in the battery chamber 56.

The battery 258 is, e.g., a manganic battery, an alkaline battery or a rechargeable battery (Ni—cd, Ni—MH, Lithium-Ion, etc.). The battery 258 is accommodated in the battery chamber 56 such that a part (the right extremity as viewed in FIG. 74) of the battery 258 is positioned closer to the center of the camera 10s than the rest of the battery between the guide roller 51 and the spool chamber 40. Namely, a part of the battery 258 intersects a tangent plane TL (see FIGS. 74, 76 or 77) which is tangential to both the guide roller 51 and the spool chamber 40.

According to the eleventh embodiment of the camera 10s, effects similar to those of the first embodiment of the camera 10 can be expected. In addition, the aforementioned arrangement of the guide roller 51 and the film take-up spool 43 in the camera 10s reduces the size of the camera 10s, especially for shortening the width of the camera body 11 in the right/left direction thereof. This is due to the following reasons.

For the arrangement of the guide roller 51 and the film take-up spool 43 where the film F which is wound on the film take-up spool 43 from a side thereof further from the surface Fe (i.e., a side thereof closer to the rear side wall of the camera body 11) such as the case shown in FIG. 3, the film F extending from the guide roller 51 to the film take-up spool 43 would come quite close to the tangent plane TL which is tangent to both the guide roller 51 and the film take-up spool 43. Accordingly, if some member is positioned between the guide roller 51 and the spool chamber 40 over the tangent plane TL, the member (or the part thereof) would possibly contact the film F extending from the guide roller 51 to the film take-up spool 43 when the film F is fully wound by the film take-up spool 43. Therefore, the member should not overlap the tangent plane TL. This requires the camera body 11 to be formed larger in the right/left direction thereof so as to ensure a sufficient space for accommodating such a member in the specified limited space.

However, in the eleventh embodiment of the camera 10s, since the guide roller 51 and the film take-up spool 43 are arranged such that the film F which passes over the pressure plate 50 is turned back substantially toward the film cartridge FC by the guide roller 51, the film F extending from the guide roller 51 to the film take-up spool 43 does not come in close to the tangent plane TL. Hence, any element or elements of the camera 10s (or at least a part thereof), can be positioned between the guide roller 51 and the film take-up spool 43 over the tangent plane TL. In this particular embodiment, a part of the cylindrical battery 258 as an element of the camera 10s is positioned between the guide roller 51 and the film take-up spool 43 over the tangent plane TL, which contributes to making the camera body 11 short in the right/left direction thereof.

Figure 78:
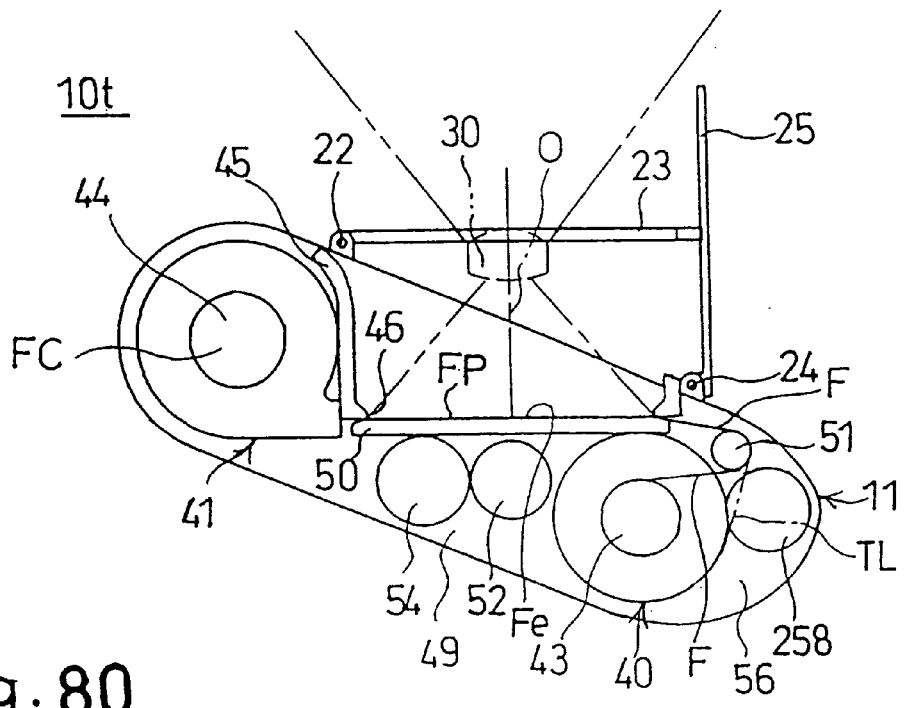
FIG. 78 is a schematic illustration of a modification of the eleventh embodiment of the lens shutter type camera in a photo-ready state.

FIG. 78 shows a modification of the camera 10s, i.e., a camera 10t, in a photo-ready state. In the camera 10t, all the components are reversed right and left as compared with the camera 10s, i.e., the camera 10t is a mirror image of the camera 10s. According to the camera 10t, effects similar to those of the camera 10s can be expected.

Figure 79:
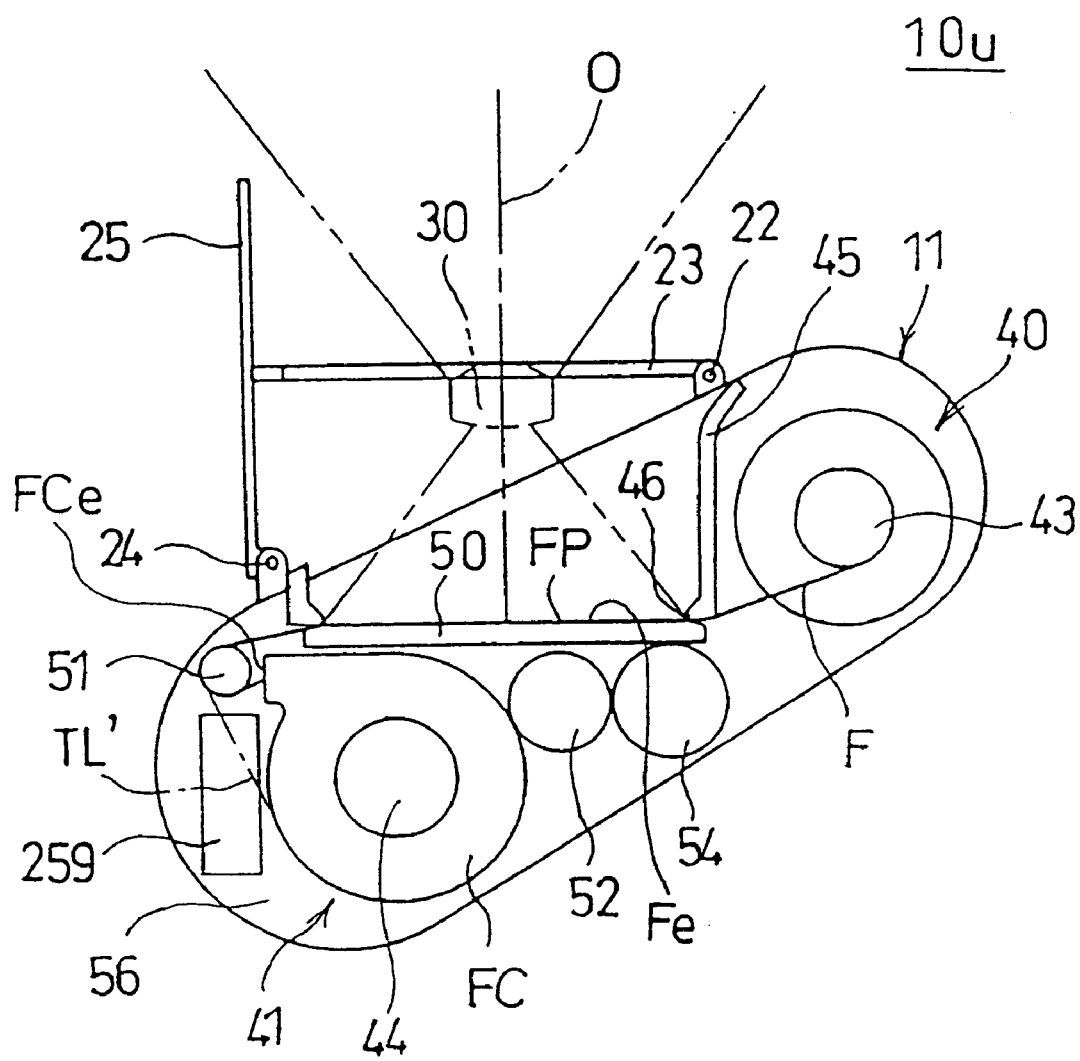
FIG. 79 is a schematic illustration of another modification of the eleventh embodiment of the lens shutter type camera in a photo-ready state.

FIG. 79 shows a modification of the camera 10s, i.e., a camera 10u, in a photo-ready state. In the camera 10u the spool chamber 40 and cartridge chamber 41 are reversed in the camera body 11 as compared with the camera 10s, i.e., the spool chamber 40 and the cartridge chamber 41 are formed right and left in the camera body 11, respectively, as viewed in FIG. 79. In the camera 10u the guide roller 51 is positioned in the vicinity of a film slot FCe of the film cartridge FC accommodated in the cartridge chamber 41 to extend in parallel to the film slot FCe. The film F coming out of the film slot FCe first proceeds in a direction away from the film take-up spool 43, and is subsequently turned back toward the film take-up spool 43 by the guide roller 51 to proceed to the surface Fe. Furthermore, in the camera 10u, an rectangular rechargeable battery 259 having a substantially identical capacity and performance to that of the cylindrical battery 258 is accommodated in the battery chamber 56 in a manner such that a part (top right-hand part as viewed in FIG. 79) of the battery 259 is positioned closer to the center of the camera 10u than the rest of the battery 259 between the guide roller 51 and the film cartridge FC. Namely, a part of the battery 259 intersects a tangent plane TL' which is tangential to both the guide roller 51 and the film cartridge FC. The film take-up spool 43 and the cartridge spool 44 in the camera 10u rotate in a common rotational direction, i.e., a clockwise or counterclockwise direction in either a film rewinding or winding operation as viewed in FIG. 79, respectively, similar to the film take-up spool 43 and the cartridge spool 44 of the camera 10s. According to the camera 10u, effects similar to those of the camera 10s can be expected.

Figure 80:
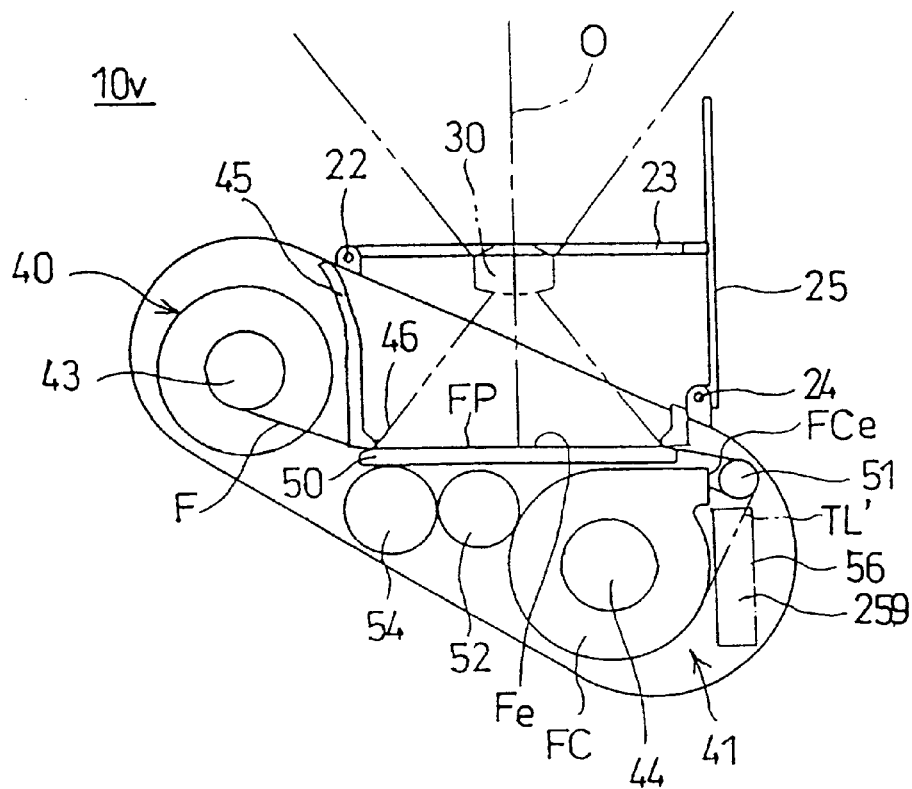
FIG. 80 is a schematic illustration of yet another modification of the eleventh embodiment of the lens shutter type camera in a photo-ready state.

FIG. 80 shows a modification of the camera 10u, i.e., a camera 10v, in a photo-ready state. In the camera 10v, all the components are reversed right and left as compared with the camera 10u, i.e., the camera 10v is a mirror image of the camera 10u. According to the camera 10v, effects similar to those of the camera 10s can be expected.

Although in each of the camera 10s, 10t, 10u or 10v, the battery 258 or 259 is arranged such that a part of the battery 258 or 259 is positioned closer to the center of the camera over the tangent plane TL or TL', the motor 52 or the condenser 54 and the battery 258 or 259 may be reversed in the camera body 11 such that a part of the motor 52 or the condenser 54 is positioned closer to the center of the camera over the tangent plane TL or TL'. Effects similar to those of the camera 10s can be expected also in such a reverse arrangement.

In each of the camera 10s, 10t, 10u or 10v, the battery 258 or 259 may have a different shape as long as at least a part thereof is positioned closer to the center of the camera over the tangent plane TL or TL'. At least a part of any other element or elements of the camera 10s, 10t, 10u or 10v in any shape may be positioned closer to the center of the camera over the tangent plane TL or TL'.

FIGS. 81 through 88 show a twelfth embodiment of a lens shutter type camera. This twelfth embodiment of the camera 10w is identical to the first embodiment of the camera 10 except for several different structures. For this reason, regarding the camera 10w, only those aspects unique to the twelfth embodiment will be hereinafter discussed.

Figure 81:
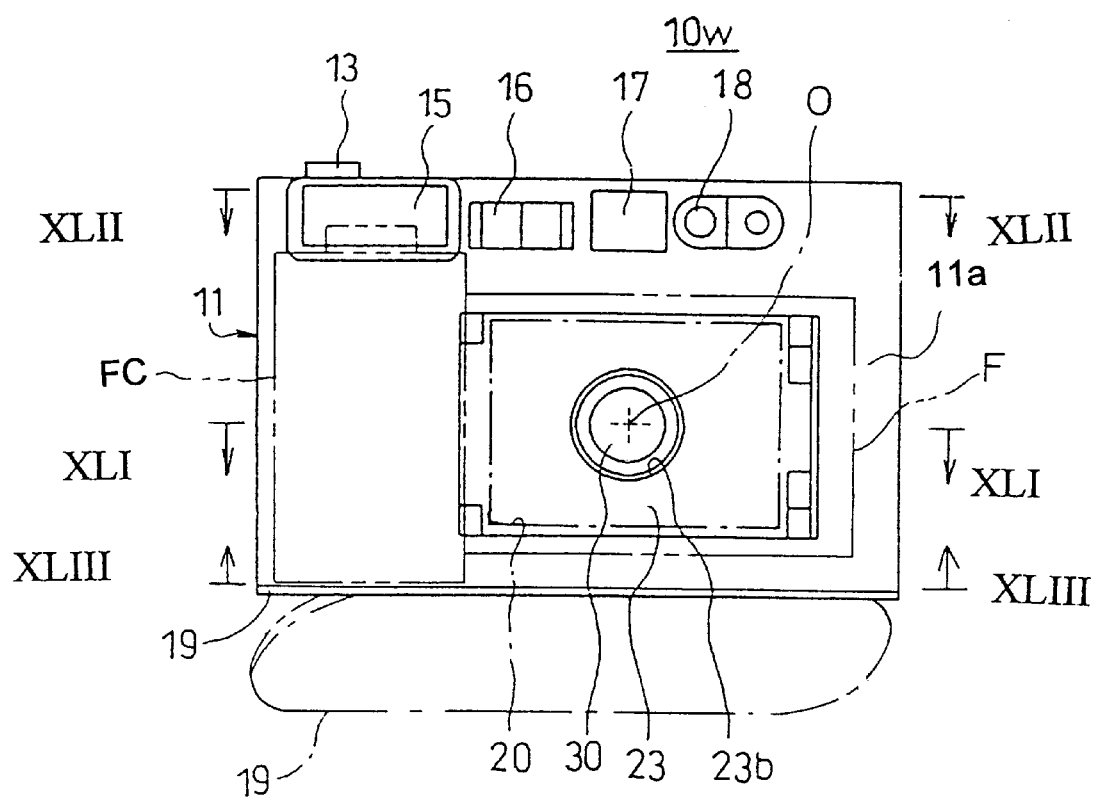
FIG. 81 is a front side view of a twelfth embodiment of a lens shutter type camera in a photo-ready state as viewed from the front in the direction of the optical axis of the photographic lens of the camera.
Figure 87:
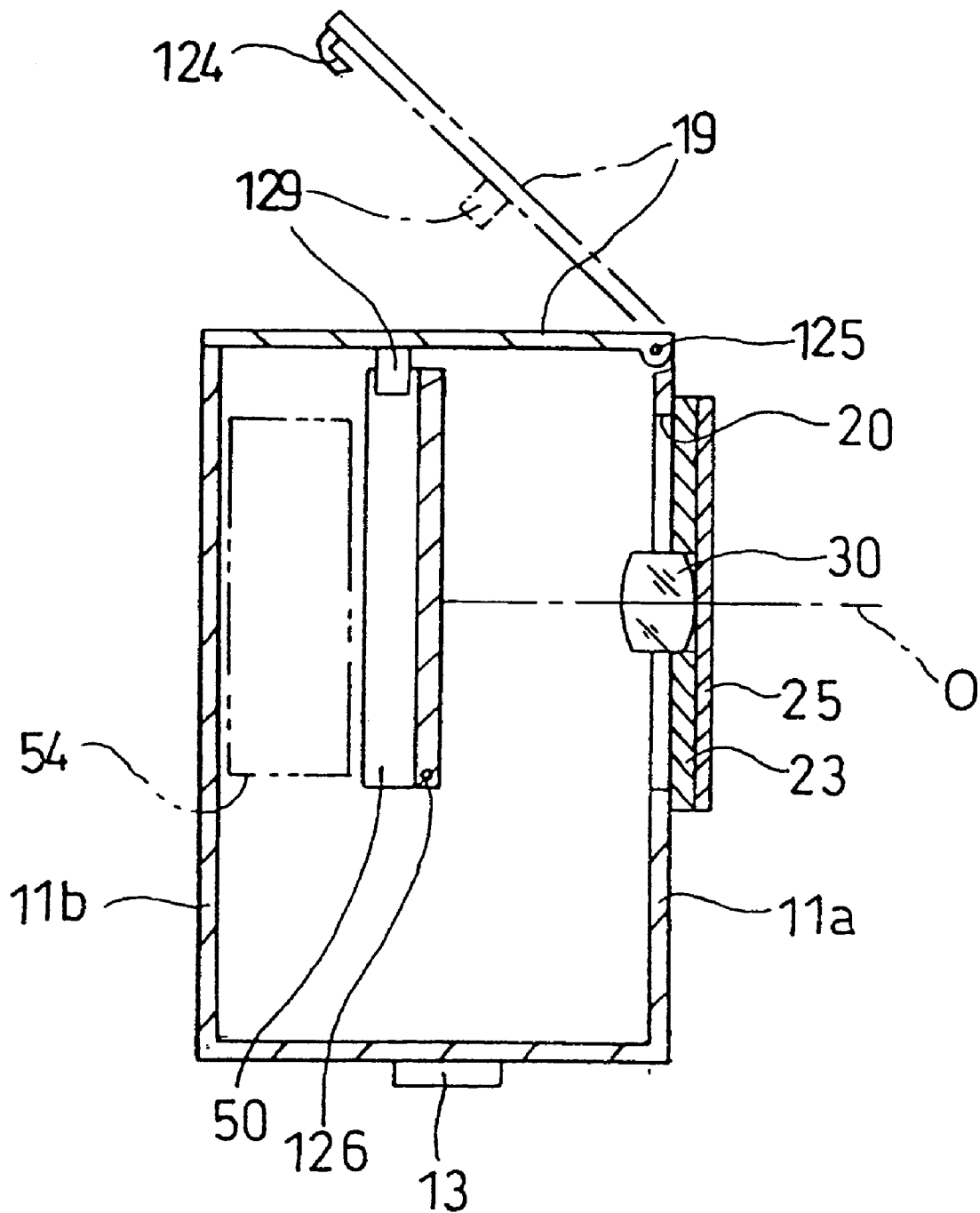
FIG. 87 is a sectional view of the lens shutter type camera taken along line DD—DD of FIG. 86.
Figure 88:
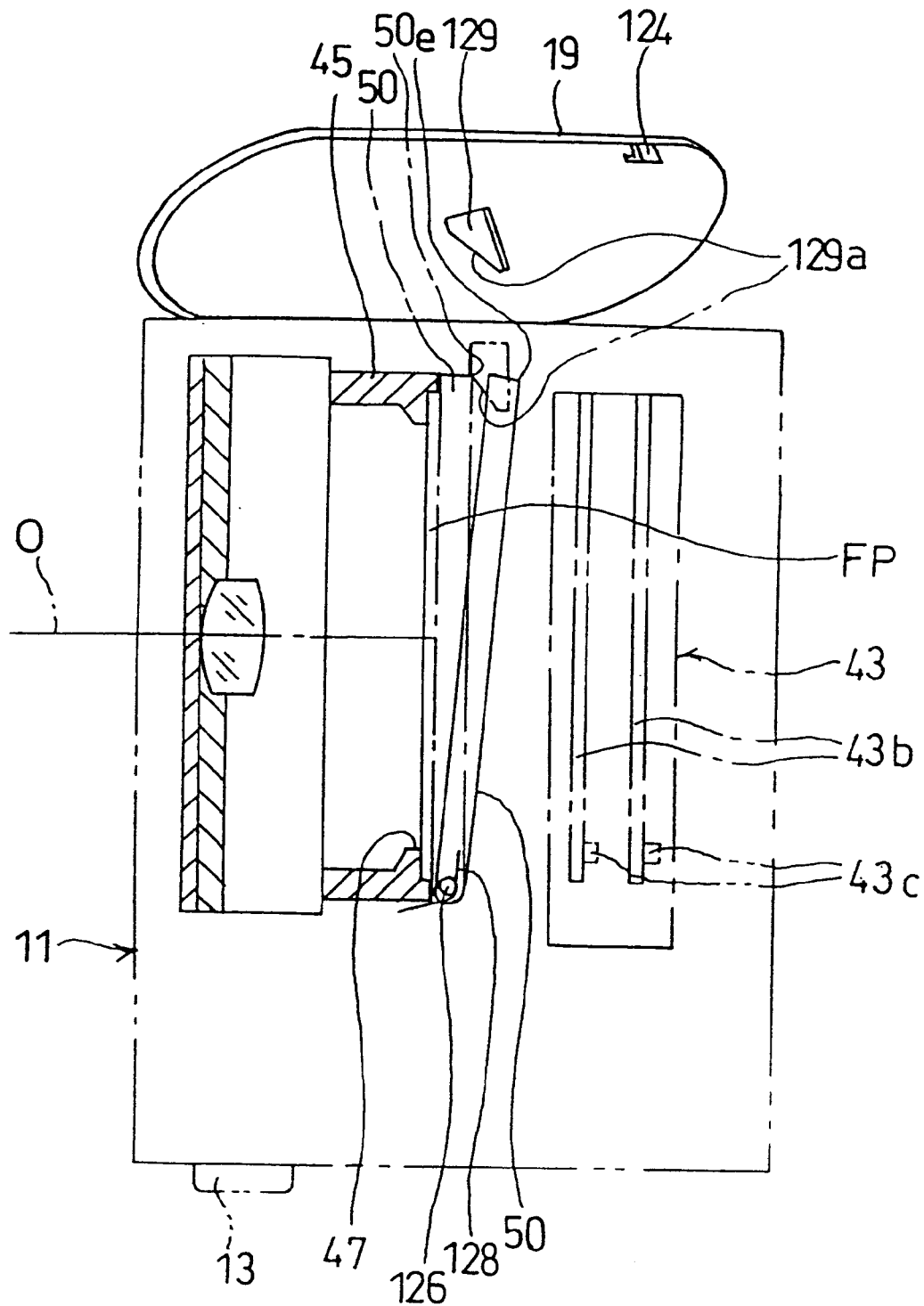
FIG. 88 is a sectional view of the lens shutter type camera taken along line EE—EE of FIG. 86 when a bottom lid of the camera body is open.
Figure 89:
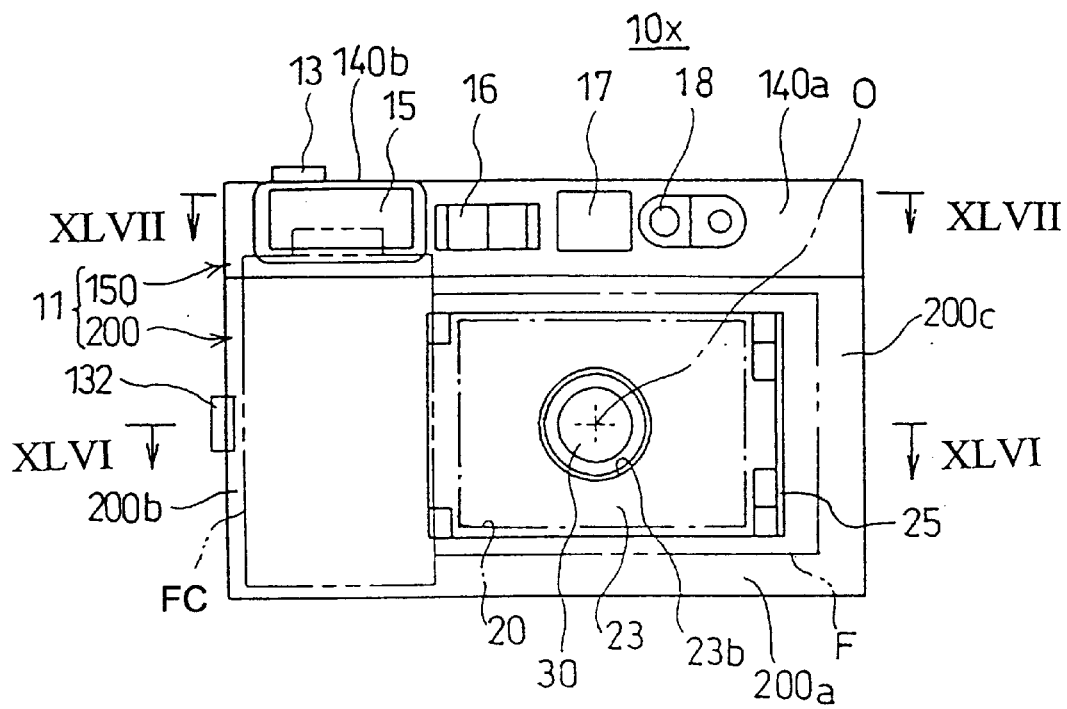
FIG. 89 is a front side view of a thirteenth embodiment of a lens shutter type camera in a photo-ready state as viewed from the front in the direction of the optical axis of the photographic lens of the camera.

The camera body 11 of the camera 10w is provided at a bottom thereof with a bottom lid 19 which is opened or closed when the film cartridge FC is loaded in or taken out of the camera body 11. In this particular embodiment, a conventional 35 mm type film cartridge is used as the film cartridge FC. The bottom lid 19 serves as a bottom wall of the camera 10, and is pivoted about a shaft 125 (see FIG. 87) supported by the camera body 11 at a lower end of the front side wall 11a. The shaft 125 extends in the right/left direction of the camera 10 along the lower end of the front side wall 11a. In FIGS. 81 and 87, the bottom lid 19 in an open position is shown by single-dotted lines while the bottom lid 19 in a closed position is shown by solid lines. In FIG. 88, the bottom lid 19 in the open state is shown by solid lines.

The bottom lid 19 is provided at a free end on an inner side thereof with an engaging claw 124 formed integral with the bottom lid 19. When the bottom lid 19 is closed, the engaging claw 124 is engaged with an engaging portion (not shown) formed on the camera body 11 at a corresponding position thereof to thereby lock the bottom lid 19. In order to open the bottom lid 19, a slidable knob (not shown) provided on an outer portion of the camera body 11 is manually operated to disengage the aforementioned engaging portion from the engaging claw 124. With such an disengagement the bottom lid 19 can be manually opened.

In a state where the bottom lid 19 is open, the spool chamber 40, the cartridge chamber 41, and other peripheral parts thereof are opened to the outside of the camera 10w. In such an open state of the bottom lid 19, the film cartridge FC is loaded in the cartridge chamber 41 in a predetermined direction.

The film take-up spool 43 is provided with a plurality of slots (six slots) 43b at substantially equi-angular intervals in a circumferential direction of the film take-up spool 43. The slots 43b extend in parallel to each other in the axial direction of the film take-up spool 43. Further, each slot 43b extends in a radial direction of an outer peripheral surface 43a of the film take-up spool 43, and the lower end (upper end as viewed in FIG. 88) of each slot 43b is formed to be opened downwardly so that a film tongue FT of the film F can be inserted into any one of the slots 43b from the corresponding open end thereof.

The film take-up spool 43 is further provided on the outer peripheral surface 43a with engaging projections 43c integrally formed thereon which catch perforations (not shown) of the film F.

Figure 86:
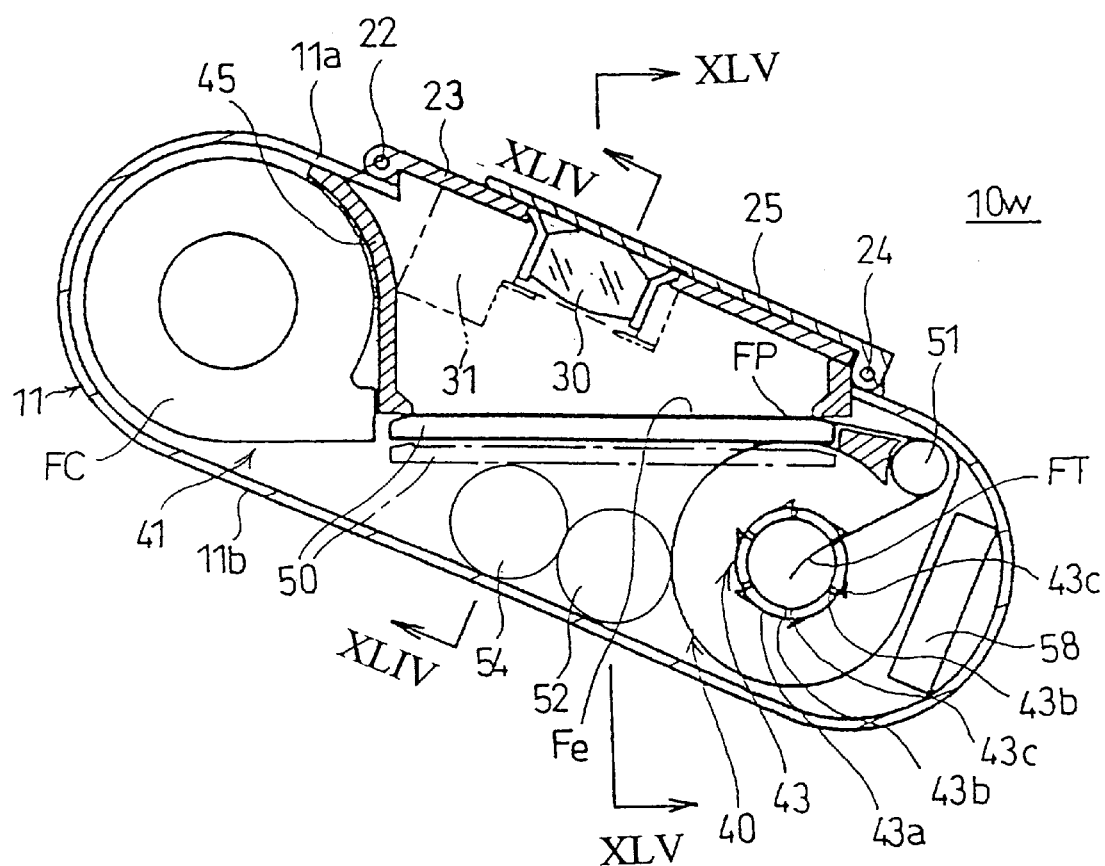
FIG. 86 is a sectional view of the lens shutter type camera taken along line CC—CC of FIG. 1 when the camera is in the lens-retracted state.

As shown in FIG. 88, an upper end (lower end as viewed in FIG. 88) of the pressure plate 50 is pivoted about a shaft 126 which is fixed to an upper end (lower end as viewed in FIG. 88) of the aperture frame 47 to extend substantially in parallel to a moving direction (direction perpendicular to the drawing surface of FIG. 88) of the film F which moves in the film passage FP. The film passage FP is formed between the film-guiding rails (not shown) formed on the aperture frame 47 and the pressure plate 50 in a closed position. The pressure plate 50 is rotatable between a closed position (shown by single-dotted lines in FIG. 88) and an open position (shown by solid lines in FIG. 88). The pressure plate 50 is continuously biased to rotate in a clockwise direction as viewed in FIG. 88 toward the open position by a torsion coil spring (biasing means) 128 fitted on the shaft 66. In a state where the bottom lid 19 and the pressure plate 50 are both open as shown by slid lines in FIG. 88, from the outside of the camera 10w, the film cartridge FC can be inserted in the cartridge chamber 41. At the same time the film F can be inserted in a space between the aperture frame 47 and the pressure plate 50. In FIG. 86 the pressure plate 50 in the closed position is shown by solid lines, and the pressure plate 50 in the open position is shown by single-dotted lines. The bottom lid 19 is provided on an inner surface thereof with a projection 129 in a predetermined shape which is integrally formed on the inner surface of the bottom lid 19 at a predetermined position.

Due to the biasing force of the torsion coil spring 128 the pressure plate 50 remains in the open position thereof when the bottom lid 19 is open. From this state, closing the bottom lid 19 brings the projection 129 into engagement with a lower end (free end) of the pressure plate 50, and further movement of the bottom lid 19 toward the closing position thereof against the biasing force of the torsion coil spring 128 makes the bottom lid 19 reach the closed position thereof. Specifically, the projection 129 is provided with a beveled surface 129a which is inclined rearwardly in a direction away from the inner surface of the bottom lid 19.

In the case where the bottom lid 19 is manually moved from the open position to the closed position, the beveled surface 129a firstly contacts a lower rear edge 50e (see FIG. 88) of the pressure plate 50. The beveled surface 129a subsequently presses the lower rear edge 50e in a direction to close the pressure plate 50 while the lower rear edge 50e is sliding on the beveled surface 129a to thereby close the pressure plate 50. In FIG. 88 the projection 129 in a position where the bottom lid 19 is closed is shown by single-dotted lines.

Figure 82:
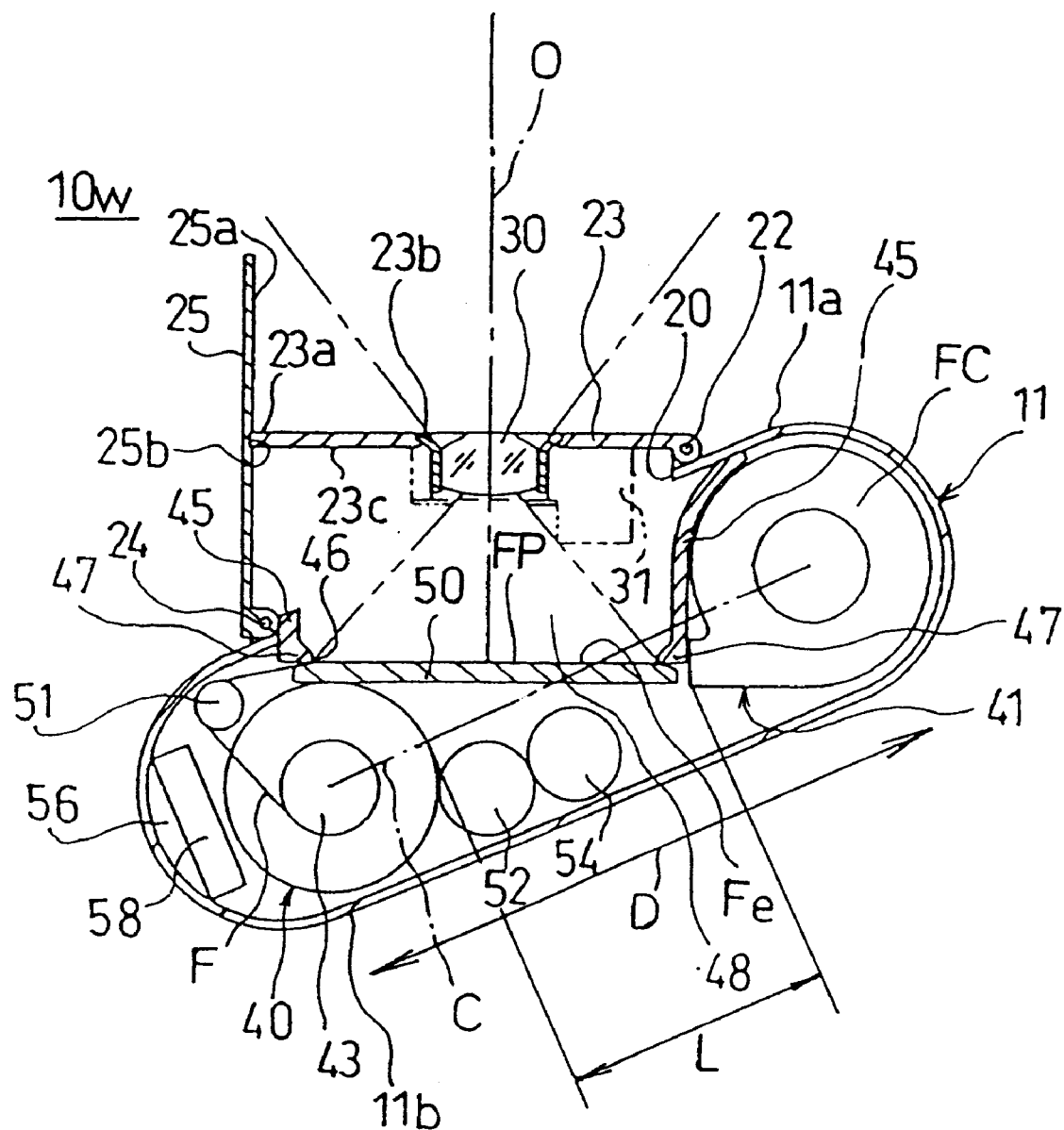
FIG. 82 is a sectional view of the lens shutter type camera taken along line AA—AA of FIG. 81.
Figure 83:
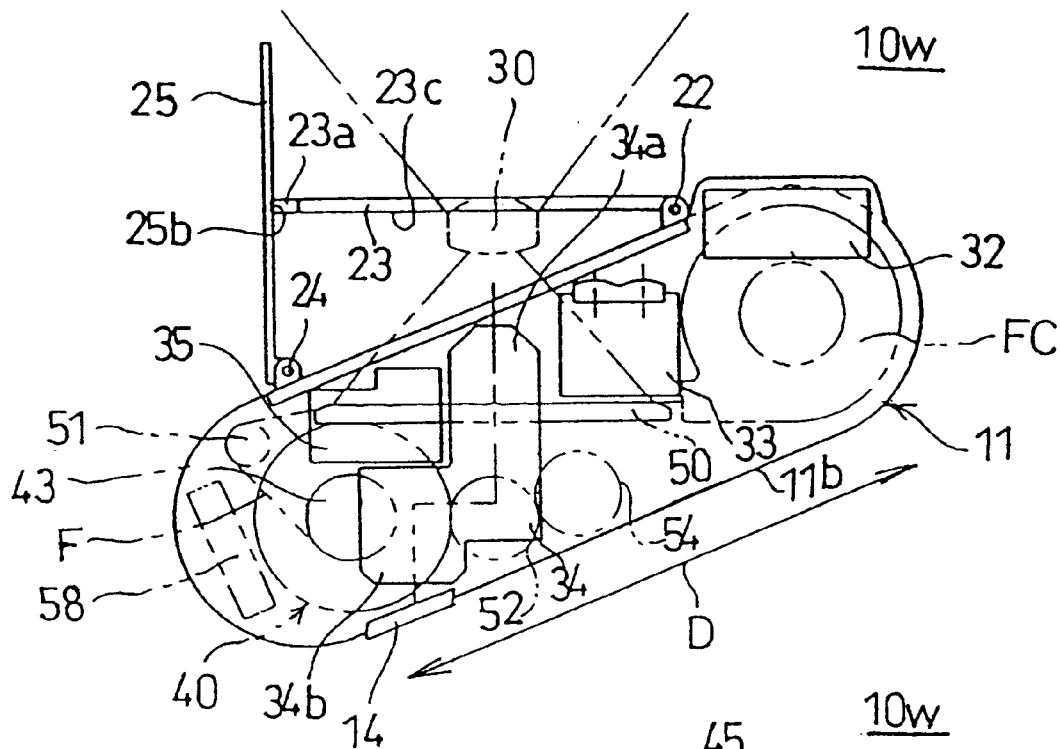
FIG. 83 is a sectional view of the lens shutter type camera taken along line BB—BB of FIG. 1.
Figure 84:
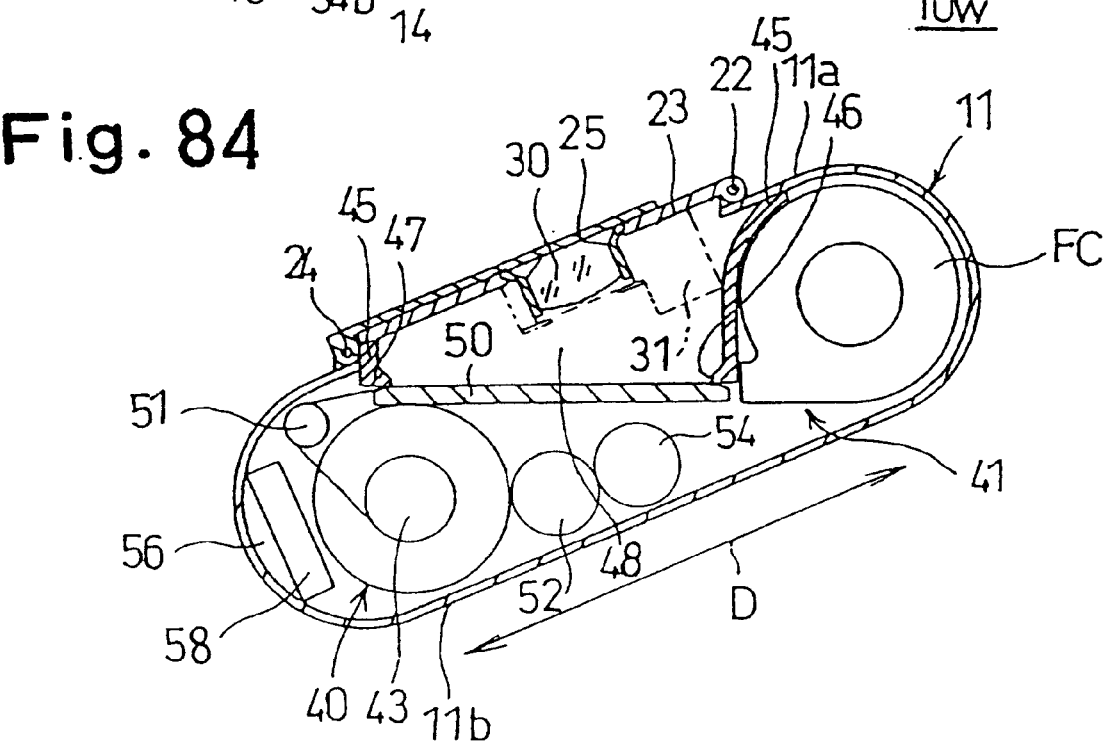
FIG. 84 is a sectional view of the lens shutter type camera shown in FIG. 81 in a lens-retracted state.
Figure 85:
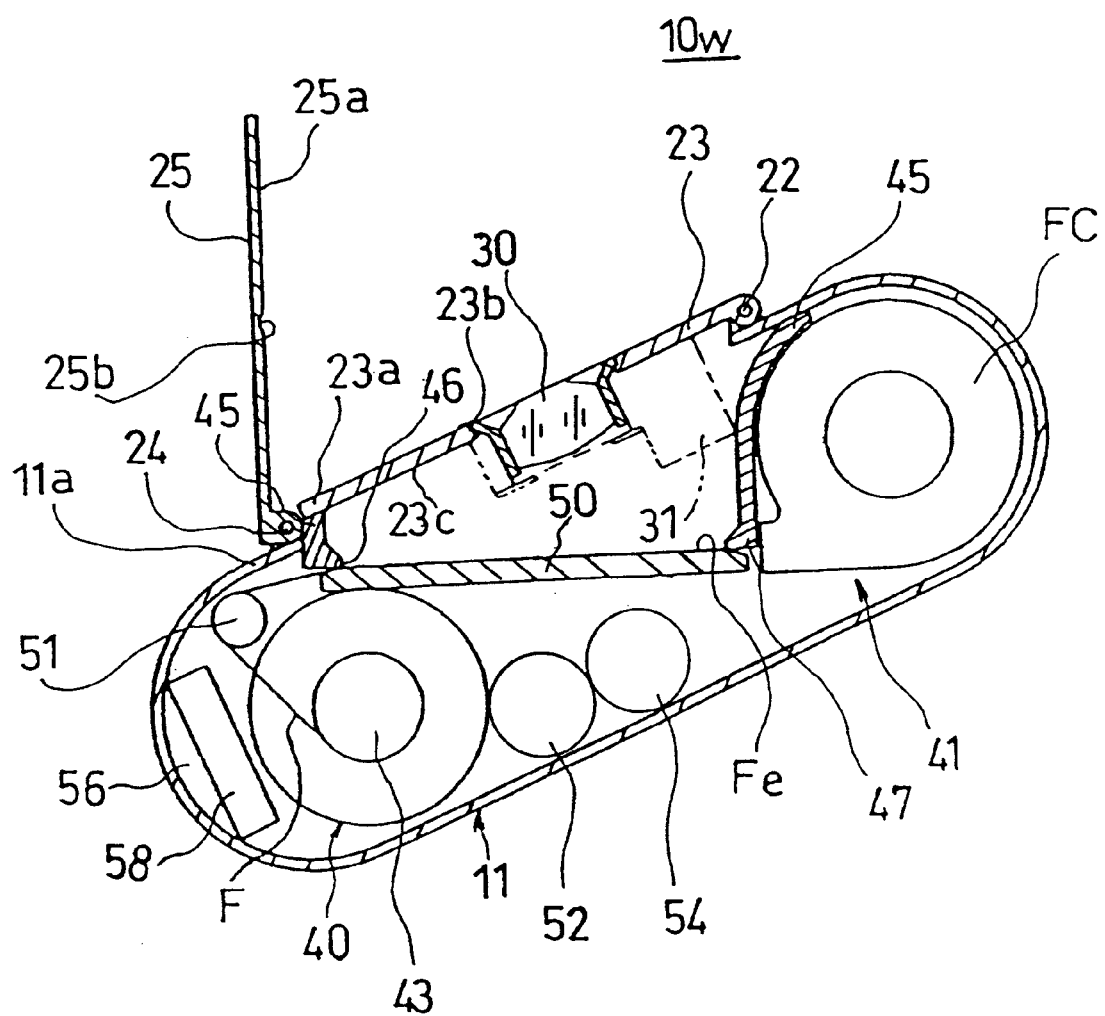
FIG. 85 is a sectional view of the lens shutter type camera shown in FIG. 81 wherein a lens base plate is in a closed position while a cover plate is in an open position.

Although in the first embodiment of the camera 10 the battery 58 is inserted in the battery chamber 56 in a predetermined direction through a battery insertion opening (not shown) formed on the bottom of the camera body 11, in the twelfth embodiment of the camera 10w the battery 58 is inserted in the battery chamber 56 in a predetermined direction through a battery insertion opening (not shown) formed on a left curved side end of the camera body 11 as viewed in FIG. 82.

In the camera 10w having the aforementioned structures, the film cartridge FC will be loaded in the camera 10w in a manner hereinafter discussed.

The bottom lid 19 is opened by operating the aforementioned slidable knob on the camera body 11. Subsequently, the film F is pulled from the film cartridge FC by a predetermined length. The film cartridge FC is then placed in the cartridge chamber FC while the pulled out film F is placed in the space between the aperture frame 47 and the pressure plate 50. At the same time the film tongue FT of the film F is inserted into any one of the slots 43b. Thereafter the bottom lid 19 is closed.

At the same time the bottom lid 19 is closed, the pressure plate 50 moves to the closed position by the projection 129 pressing the lower rear end 50e of the pressure plate 50. Due to this movement of the pressure plate to the closed position thereof, the film F placed between the aperture frame 47 and the pressure plate 50 is positioned in the film passage FP formed between the aperture frame 47 and the closed pressure plate 50. Upon having detected that the bottom lid 19 is closed, a CPU (not shown) which controls the overall operation of the camera 10w, controls the motor 52 to rotate the film take-up spool 43 in a film winding direction (counterclockwise direction as viewed in FIG. 82) so as to wind up the film F by a predetermined amount to thereby set a first frame of the film F, which completes a film loading operation.

According to the twelfth embodiment of the camera 10w, effects similar to those of the camera 10 can be expected. In addition, in the film loading operation of the camera 10w, since the film tongue FT of the film F is inserted into any one of the slots 43b before the bottom lid 19 is closed, the film tongue FT will be surely wound by the film take-up spool 43 after the bottom lid 19 is closed. This effectively prevents a film loading error from occurring.

The twelfth embodiment of the camera 10w may be modified similarly to the camera 10a, 10b or 10c shown in FIGS. 12, 13 or 15, respectively.

In the twelfth embodiment of the camera 10w, the number of slots 43b is not limited solely to six but may be any other number as long as the number is at least one.

FIGS. 89 through 96 show a thirteenth embodiment of a lens shutter type camera. This thirteenth embodiment of the camera 10x is similar to the first embodiment of the camera 10 in many respects. For this reason, regarding the camera 10x, only those aspects unique to the thirteenth embodiment will be hereinafter discussed.

Figure 91:
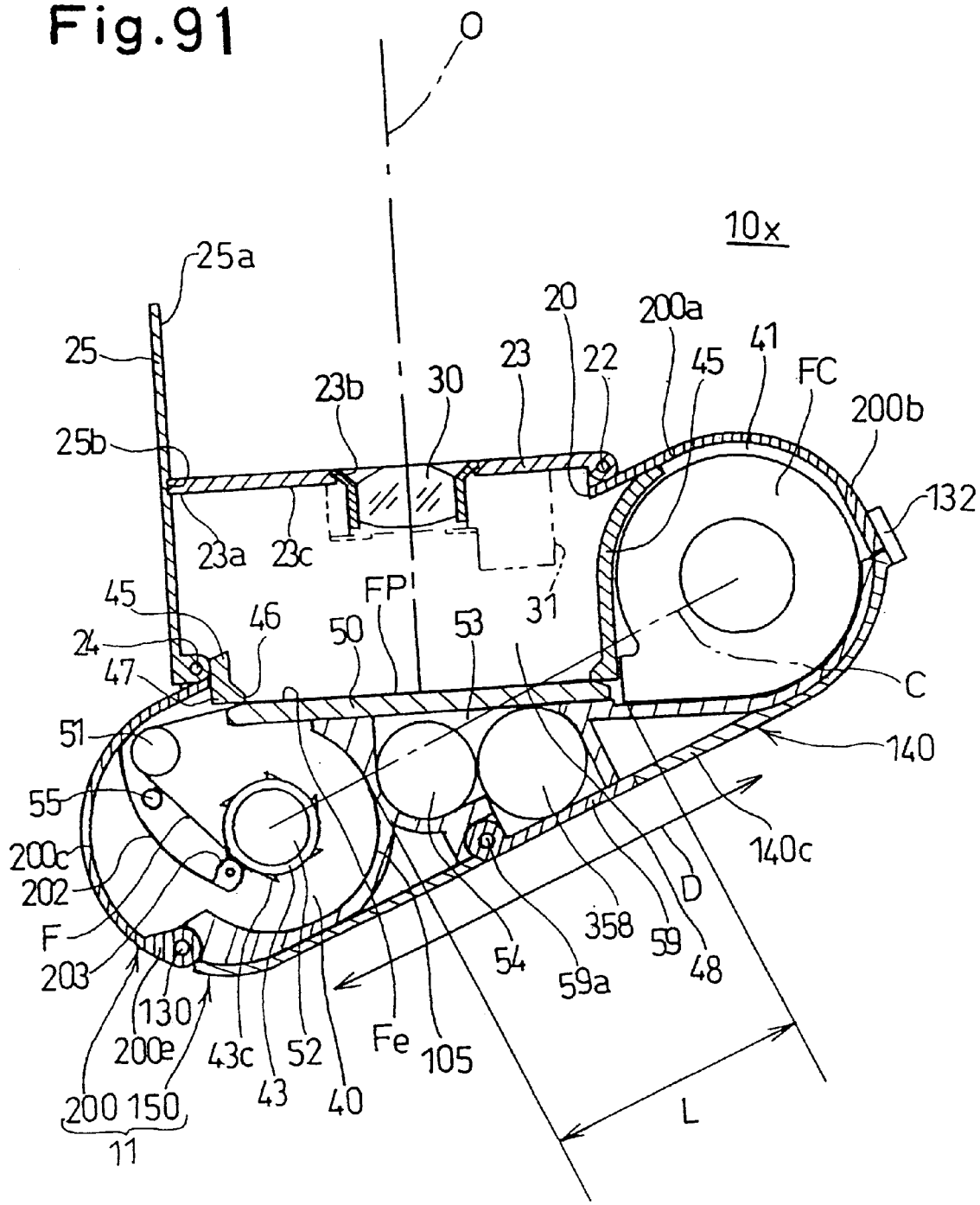
FIG. 91 is a sectional view of the lens shutter type camera taken along line FF—FF of FIG. 89.
Figure 93:
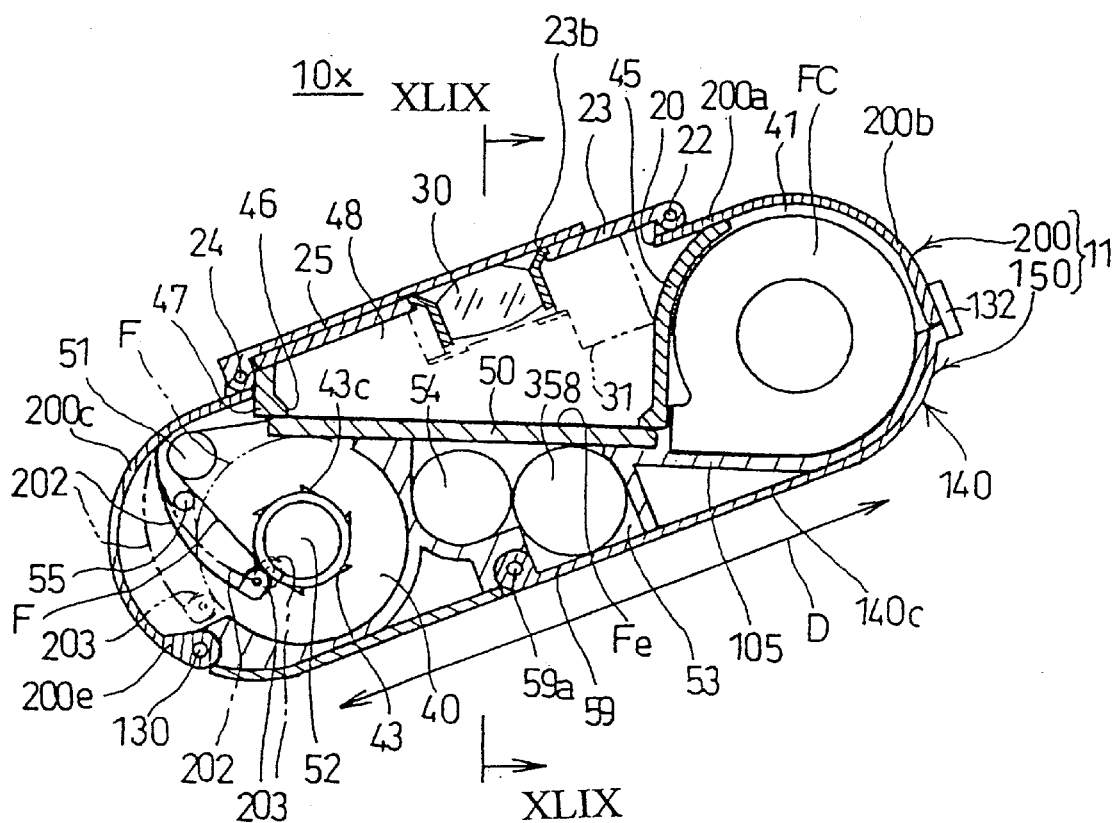
FIG. 93 is a sectional view of the lens shutter type camera taken along line HH—HH of FIG. 90.
Figure 95:
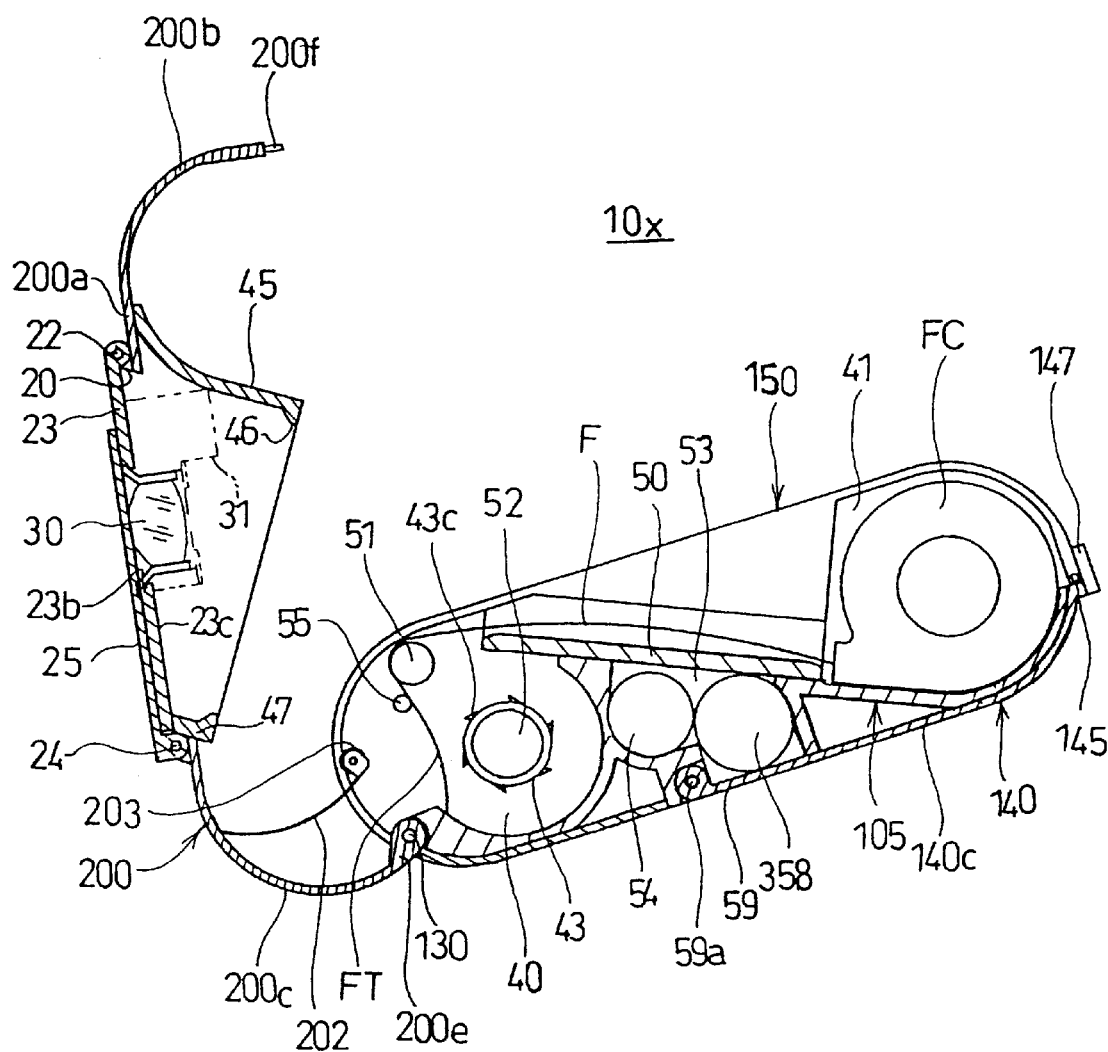
FIG. 95 is a sectional view of the lens shutter type camera shown in FIG. 89 wherein the lens base plate and the cover plate are both closed and wherein a sub-body is opened relative to a main body.

In this embodiment, a conventional 35 mm type film cartridge is used as the film cartridge FC. The camera body 11 of the camera 10x is provided with a main body (rear body piece) 150 and a sub-body 200 which covers a major part of the front of the main body 150. The sub-body 200 is pivoted about a shaft 130 fixed to a left end portion of the main body 150 as viewed in FIG. 91. The shaft 130 extends in a vertical direction of the camera 10x (i.e., the vertical direction as viewed in FIGS. 89 or 90, or the direction perpendicular to the drawing surface of FIG. 91). The shaft 130 is arranged to be positioned rearwardly, apart from the axial center of the film take-up spool 43 as shown in FIGS. 91 or 93. In a state shown in FIG. 93 where the camera 10x is in the lens-retracted state, fully opening the sub-body 200 relative to the main body 150 makes the camera 10x fall into the film loading state as shown in FIG. 95 where the inside of the camera 10x is opened to the outside of the camera 10x. In this state shown in FIG. 95 the film cartridge FC is inserted into or taken out of the camera 10x.

The main body 150 is provided at an upper front part thereof with a front upper wall 140a (see FIGS. 89 and 96) as an element of a front side wall of the camera body 11. The camera 10x is provided on the front upper wall 140a with the flash window 15, the AF window 16, the finder objective window 17 and the photometric window 18, in this order from left to right as viewed from the front of the camera 10x. The main body 150 is provided at its top with an upper wall 140b and is further provided on a left portion of the upper wall 140b as viewed in FIGS. 89 or 90 with the shutter release 13.

The sub-body 200 is formed to have a shape to be capable of totally covering the front of the main body 150 except for the front upper wall 140a. The sub-body 200 is provided with the photographic lens 30, the AF/AE shutter unit 31, etc. The sub-body 200 is provided with a front lower wall 200a, a right curved wall 200b and a left curved wall 200c. The front lower wall 200a and the front upper wall 140a together constitute a front side wall of the camera body 11. The right curved wall 200b extends rearwardly from the corresponding end (right end as viewed in FIG. 91) of the front lower wall 200a. The left curved wall 200c extends rearwardly from the corresponding end (left end as viewed in FIG. 91) of the front lower wall 200a. The end of the left curved wall 200c is pivoted about the aforementioned shaft 130. The front lower wall 200a in a state as shown in FIG. 93 (where the sub-body 200 is closed relative to the main body 150) lies in a common plane in which the front upper wall 140a lies.

The right curved wall 200b covers the cartridge chamber 41 when the sub-body 200 is closed relative to the main body 150 to constitute a part of a side wall for surrounding the cartridge chamber 41. The left curved wall 200c covers the spool chamber 40 when the sub-body 200 is closed relative to the main body 150 to constitute a part of a side wall for surrounding the spool chamber 40. The sub-body 200 is provided on an inner surface of the left curved wall 200c with a leaf spring 202 having a pressing roller 203 rotatably supported at a free end of the leaf spring 202. In a state where the sub-body 200 is closed relative to the main body 150, the pressing roller 203 is in pressing contact with the film take-up spool 43 by the biasing force of the leaf spring 202.

The right curved wall 200b is provided at an end thereof with an engaging claw 200f (see FIG. 95). The main body 150 has an engagement groove 145 at a position corresponding to the position of the engaging claw 200f with which the engaging claw 200f is engaged when the sub-body 200 is closed relative to the main body 150. With such structures, when the sub-body 200 is closed relative to the main body 150, the engaging claw 200f is engaged with the engaging groove 145 to lock the sub-body 200 so as not to be opened. With such a locking mechanism composed of the engaging claw 200f and the engaging groove 145 the sub-body 200 can be locked.

The main body 150 is provided in the vicinity of the engaging groove 145 with a lock releasing knob 147 for disengaging the engaging claw 200f from the engaging groove 145 to unlock the sub-body 200. By manually operating the lock releasing knob 147 the sub-body 200 can be unlocked. Therefore, when the film cartridge FC is loaded in or taken out of the camera 10x, the sub-body 200 is opened after the lock releasing knob 147 is manually operated.

The front lower wall 200a is provided at a substantially center thereof with the rectangular opening 20. The front lower wall 200a is further provided with the lens base plate 23. The lens base plate 23 is pivoted about the first vertical shaft 22 fixed to the front lower wall 200a along a left end of the opening 20 as viewed in FIG. 89.

The front lower wall 200a is further provided with the cover plate 25. The cover plate 25 is pivoted about the second vertical shaft 24 which is fixed to the front lower wall 200a along a right end of the opening 20 as viewed in FIG. 89.

In the lens-retracted state of the camera 10x as shown in FIG. 93, the front face of the camera 10 becomes almost flat, and each of the lens base plate 23 and the cover plate 25 extends substantially parallel to a rear side surface (i.e., the rear side surface of the camera 10x) of a rear side wall 140c of the main body 150. The rear side wall 140c is arranged such that the rear surface thereof extends substantially in parallel to the plane C (see FIG. 91), which connects the axial center of the film take-up spool 43 with the axial center of the cartridge spool 44.

In order to prevent ambient light from entering into a photographic light path which is formed between the photographic lens 30 and a rectangular surface Fe of the film F during a shutter release immediately in front of the pressure plate 50 when the camera 10x is in the photo-ready state, the aforementioned upper bellows (not shown) extend between the upper edge of the lens base plate 23 and a corresponding portion of the front lower wall 200a. The aforementioned similar lower bellows (not shown) also extend between the lower edge of the lens base plate 23 and a corresponding portion of the front lower wall 200a.

The camera 10x is provided inside an upper portion of the main body 150 with the flashlight emitter 32, the AF sensor unit 33, the finder optical system 34 and the photometering sensor unit 35 so as to be respectively positioned behind the flash window 15, the AF window 16, the finder objective window 17 and the photometric window 18.

The subject-side end portion 34a of the finder optical system 34 faces the finder objective window 17. The eyepiece-side end portion 34b of the same faces the eyepiece window 14 (see FIG. 92) provided on the rear side wall 140c of the main body 150 at an upper corresponding portion thereof.

The main body 150 is provided with a frame 105 which partly forms the spool chamber 40, the cartridge chamber 41, a compartment 53, etc. The main body 150 is further provided with an exterior cover 140 which is secured to the frame 105. The exterior cover 140 constitutes a part of the external form of the camera 10x. The front upper wall 140, the upper wall 140b and the rear side wall 140c are elements of the exterior cover 140.

The spool chamber 40 is formed in the main body 150 in the vicinity of one end (left end as viewed in FIG. 91) of the main body 150 at which the sub-body 200 is pivoted through the shaft 130, while the cartridge chamber 41 is formed in the main body 150 in the vicinity of the other end (right end as viewed in FIG. 91) of the main body 150. The motor 52 is coaxially arranged in the film take-up spool 43.

The frame 45 is fixed to the sub-body 200. The frame 45 extends inwardly from the rectangular opening 20 to surround the photographic light path formed between the photographic lens 30 and the surface Fe in a state where the sub-body 200 is in a closed position, i.e., where the sub-body 200 is closed relative to the main body 150.

Figure 96:
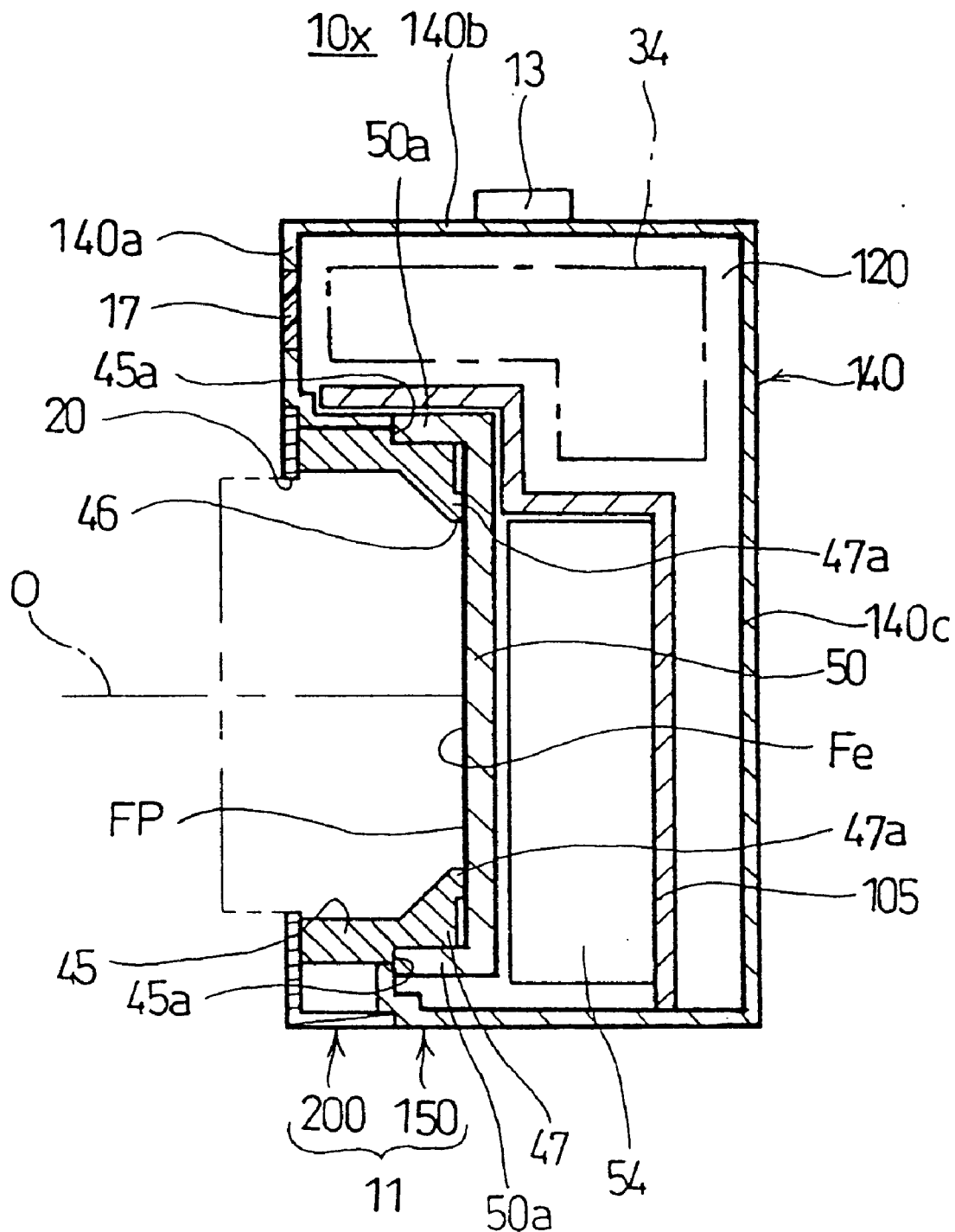
FIG. 96 is a sectional view of the lens shutter type camera taken along line JJ—JJ of FIG. 93.

The pressure plate 50 is secured to the frame 105 in place so as to be positioned immediately behind the aperture frame 47 in parallel to the same when the sub-body 200 is in the closed position. The pressure plate 50 is provided at each of upper and lower ends thereof with an extension 50a extending forwardly in parallel to each other (see FIG. 96). As shown in FIG. 96 the upper and lower extensions 50a are respectively fitted on rear upper and lower portions of the aperture frame 47 when the sub-body 200 is in the closed position in order to position the pressure plate 50 relative to the aperture frame 47. An inner surface of each extension 50a which faces the film F functions as a guide surface for guiding the film F in the film moving direction thereof while preventing the film F from moving upwardly or downwardly, i.e., in the vertical direction of the camera 10x.

In the camera 10x, the pressure plate 50 is fixed to the frame 105. However may be supported on the frame 105 to be biased forwardly in the direction of the photographic optical axis O by a biasing mechanism, such as a spring so that the pressure plate 50 presses the film F against the aperture frame 50 when the sub-body 200 is in the closed position. The aforementioned biasing mechanism for forwardly biasing the pressure plate 50 may be provided between the frame 105 and the pressure plate 50.

The aperture frame 47 is provided at upper and lower portions thereof with upper and lower film guide rails 47a (see FIG. 96), respectively, each extending parallel to the right/left direction of the camera 10x. The upper and lower film guide rails 47a are respectively positioned above and below the photographic aperture 46. In the state where the sub-body 200 is in the closed position, each of the extensions 50a of the pressure plate 50 contacts a corresponding positioning recess 45a formed on the frame 45 to form the film passage FP between the guide rails 47a and the front surface of the pressure plate 50. Through the film passage FP the film F passes. Accordingly, the surface Fe to be exposed when a shutter is released is in parallel to the lens base plate 23 in the open position. Therefore, the surface Fe lies in a plane which is inclined to the right/left direction of the camera 10x.

Figure 92:
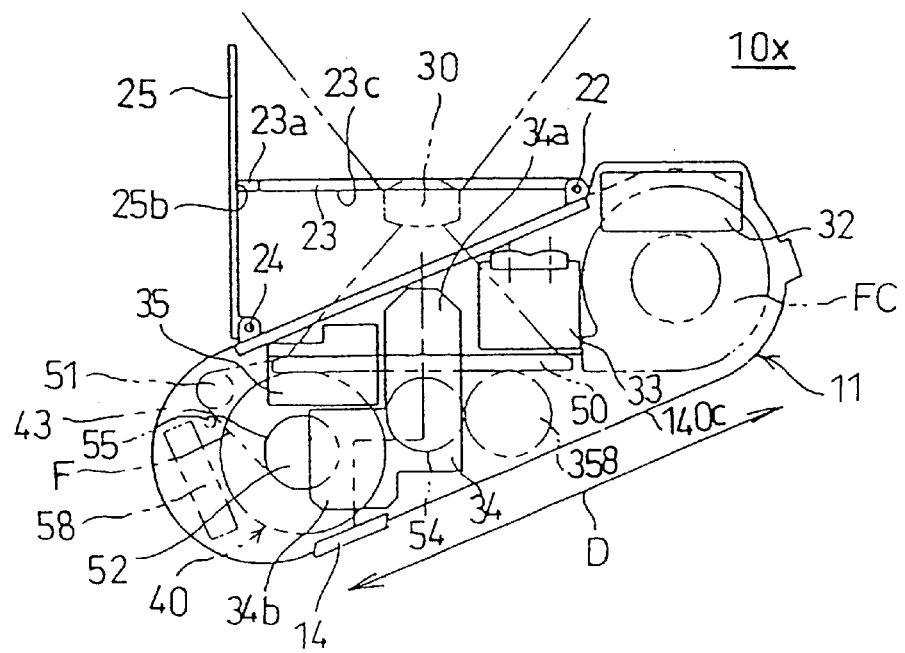
FIG. 92 is a sectional view of the lens shutter type camera taken along line GG—GG of FIG. 89.
Figure 90:
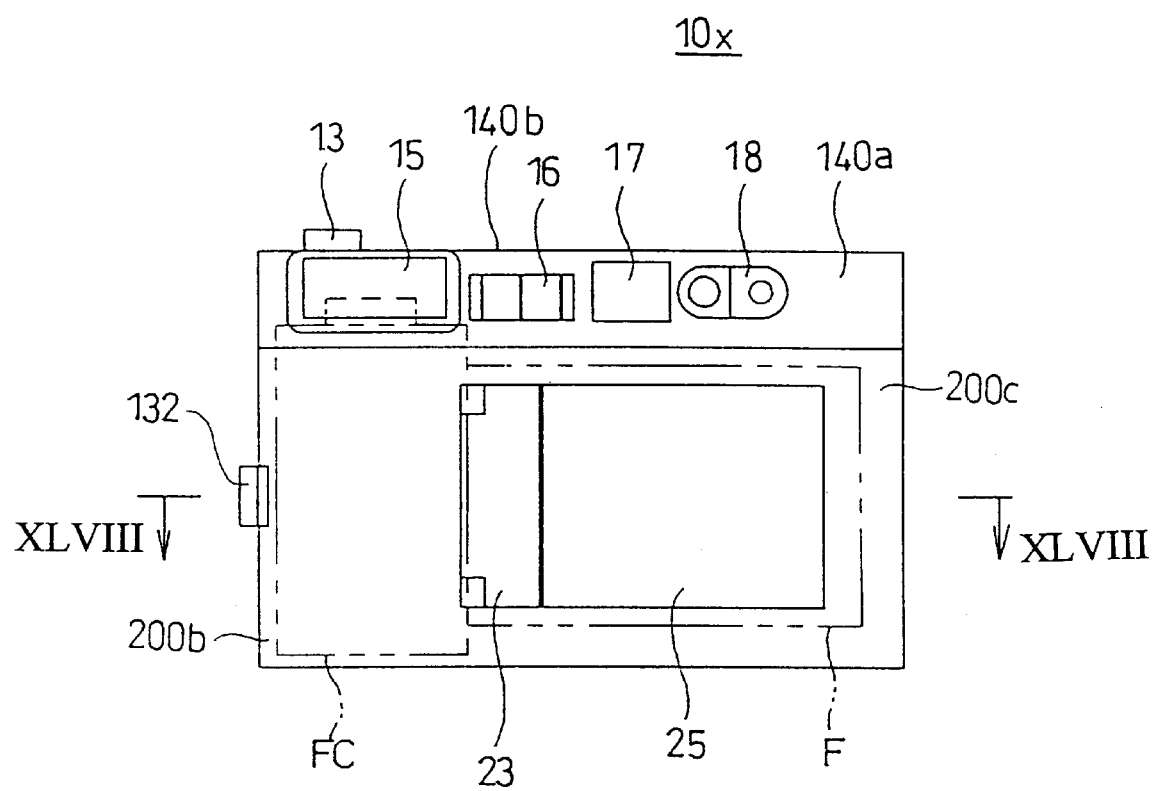
FIG. 90 is a front side view of the lens shutter type camera shown in FIG. 89 in a lens-retracted state as viewed from the front in the direction of the optical axis of the photographic lens of the camera.

As shown in FIGS. 91 through 93, the wedge-shaped space 48 is formed between the front of the camera body 11 (the lens base plate 23 in the closed position) and the pressure plate 50 in the camera body 11 when the sub-body 200 is in the closed position.

The main body 150 is provided therein with the guide roller 51 adjacent to a side end (left side end as viewed in FIG. 91) of the pressure plate 50 and the spool chamber 40. The main body 150 is further provided therein in the vicinity of the guide roller 51 with a sub-guide roller 55 which extends in the vertical direction of the camera 10x parallel to the guide roller 51. The sub-guide roller 55 is smaller than the guide roller 51 in diameter and is positioned behind the guide roller 51.

To load the film cartridge FC in the camera 10x the sub-body 200 is opened to the main body 150 as shown in FIG. 95. In this state, the film cartridge FC is placed in the cartridge chamber FC in a predetermined direction. The film F is subsequently pulled from the film cartridge FC by a sufficient length to place the film tongue FT in the spool chamber 40 after letting the film tongue FT pass through a gap between the guide roller 51 and the sub-guide roller 55. Thereafter the sub-body 200 is closed whereupon the pressing roller 203 presses the film tongue FT against the film take-up spool 43 with the biasing force of the leaf spring 202. At the same time the sub-body 200 is closed, i.e., the engaging claw 200f is firmly engaged with the engaging groove 145, the film take-up spool 43 rotates in the film winding direction (counterclockwise direction as viewed in FIG. 95) to thereby catch perforations (not shown) of the film F by the engaging projections 43c. The film F is wound by the film take-up spool 43 to set a first frame of the film F, which completes the film loading operation.

Figure 94:
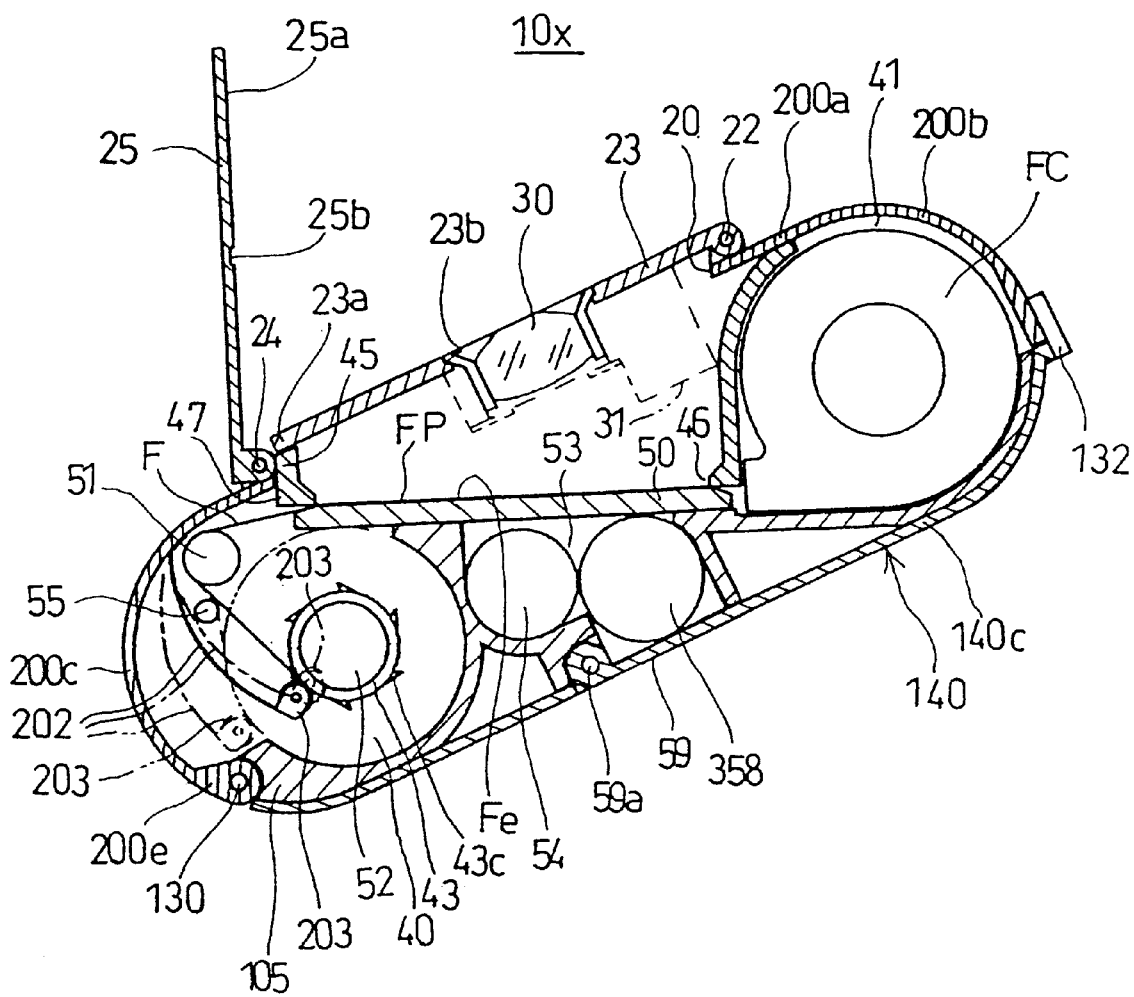
FIG. 94 is a sectional view of the lens shutter type camera shown in FIG. 89 wherein a lens base plate is in a closed position while a cover plate is in an open position.

In either FIGS. 93 or 94, the leaf spring 202 and the pressing roller 203 in a state immediately after the film loading operation is completed are each shown by solid lines. The leaf spring 202, the pressing roller 203 and the outermost peripheral film F wound on the film take-up spool 43 in another state where the film F is fully wound on the film take-up spool 43 are each shown by double-dotted lines. Furthermore, in either FIGS. 93 or 94, the leaf spring 202 and the pressing roller 203 in the case of assuming that the film take-up spool 43 does not exist in the spool chamber 40 when the sub-body 200 is in the closed position.

The main body 150 is provided between the frame 105 and the pressure plate 50 with a compartment 53 in which the cylindrical condenser 54 and a cylindrical battery 358 serving as a power source of the camera 10, are provided. The battery 358 is, e.g., a manganic battery, an alkaline battery or a rechargeable battery (Ni—cd, Ni—MH, Lithium-Ion, etc.). The main body 150 is provided on the back thereof with a lid 59 for opening and closing the compartment 53 to insert or pull out the battery 358. The lid 59 is pivoted about a shaft 59a supported by the frame 105. When the lid 59 is closed, the outer surface of the lid 59 and the rear side surface of the rear side wall 140c lie in a common plane.

According to the twelfth embodiment of the camera 10x, effects similar to those of the first embodiment of the camera 10 can be expected. In addition, the structure unique to the twelfth embodiment of the camera 10x where the camera body 11 is composed of the main body 150 and the sub-body 200 which are pivoted at a common shaft (i.e., the shaft 130), realizes an easy insertion or discharge of the film cartridge FC in or out of the camera 10x while maintaining the structure of the surface Fe intersecting the plane C.

Furthermore, since the shaft 130, which pivotally connects the main body 150 and the sub-body 200, is positioned rearwardly, separated from the axial center of the film take-up spool 43 as shown in FIGS. 91 or 93, the spool chamber 40 is widely opened to the outside of the camera 10x when the sub-body 200 is fully opened. This makes it easy to place the film tongue FT of the film F in the spool chamber 40 after letting the film tongue FT pass through a gap between the guide roller 51 and the sub-guide roller 55.

Figure 97:
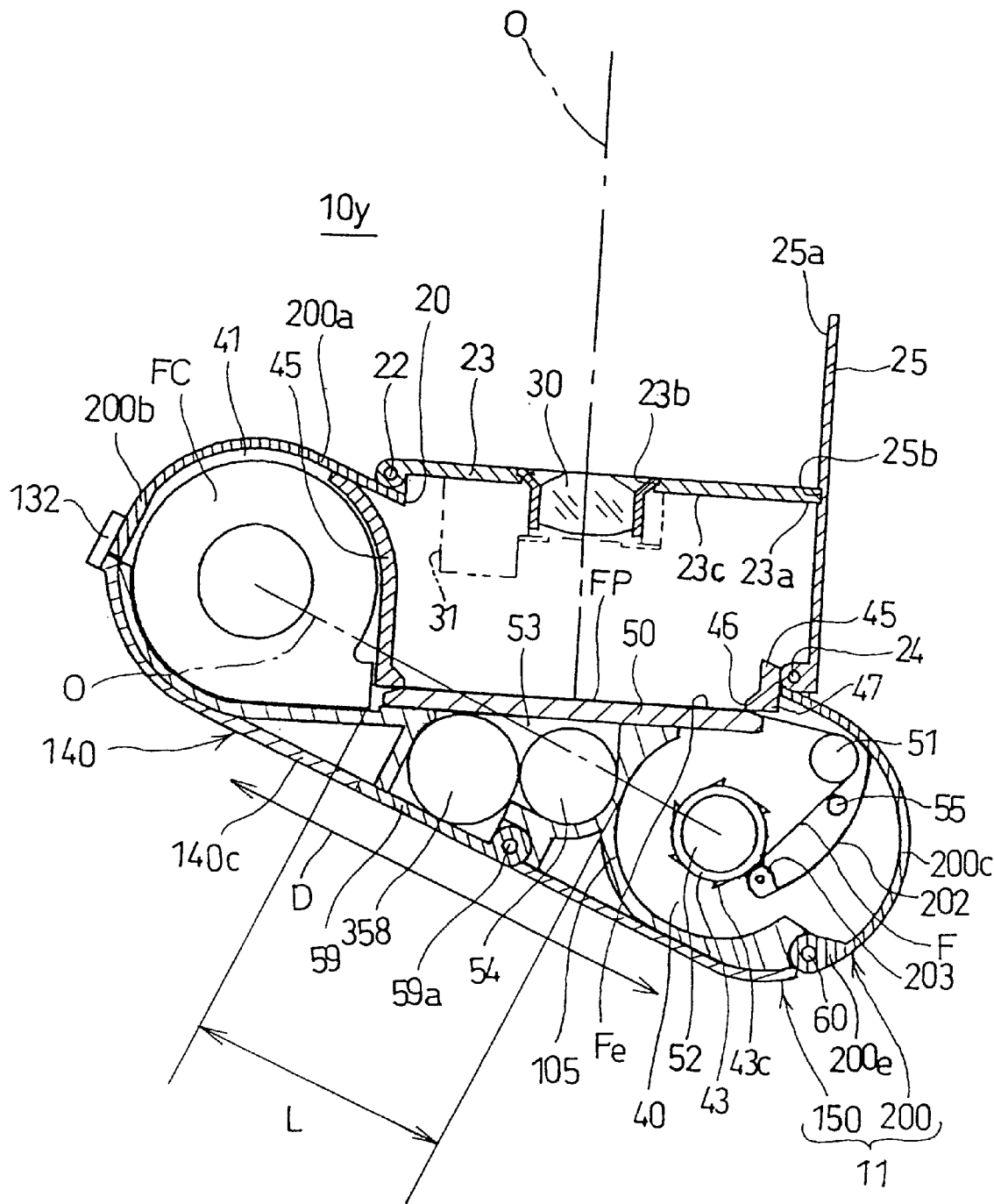
FIG. 97 is a sectional view of a modification of the thirteenth embodiment of the lens shutter type camera shown in FIG. 89 in a photo-ready state.

FIG. 97 shows a modification of the camera 10x, i.e., a camera 10y, in a photo-ready state. In the camera 10y, all the components are reversed right and left as compared with the camera 10x, i.e., the camera 10y is a mirror image of the camera 10x. According to the camera 10y, effects similar to those of the camera 10x can be expected.

In each of all the above-illustrated embodiments the film cartridge FC used is not limited solely to the 35 mm cassette but may be any other type of film cartridge which contains a rolled film therein. In each of all the above-illustrated embodiments except for the twelfth and thirteenth embodiments, i.e., the cameras 10w, 10x and 10y, an IX240 cassette may be used as the film cartridge FC.

Each of all the above-illustrated embodiments of the cameras is a single focal point type of AF compact lens shutter type camera, but may be modified to be designed as a pan-focus type compact lens shutter type camera, a focal-point variable type (e.g., selectable between a wide angle and a telephoto) of AF compact lens shutter type camera, or an AF compact lens shutter type camera having a zoom lens. Moreover, each of all the above-illustrated embodiments of the cameras may be modified to be designed as an SLR camera.

Obvious changes may be made in the specific embodiments of the present invention described herein, such modifications being within the spirit and scope of the invention claimed. It should be understood that all matter contained herein is illustrative and does not limit the scope of the present invention.

What is claimed is:

1. A camera, comprising:
    a camera body having a film take-up spool positioned in a spool chamber;
    said camera body having a rear surface, said rear surface including a generally planar portion extending over a majority of said rear surface, said generally planar portion of said rear surface being substantially parallel to a plane defined by an axial center of said film take-up spool with an axial center of a cartridge spool of a film cartridge; and
    a film passage formed in said camera body for guiding a film drawn out of said film cartridge to said spool chamber such that a surface of said film located in said film passage intersects said plane.

2. The camera according to claim 1, wherein said camera comprises a cartridge chamber formed in said camera body to accommodate said film cartridge therein,
    wherein said spool chamber and said cartridge chamber are positioned on respective sides of said surface of said film.

3. The camera according to claim 2, wherein a front surface of said camera body is substantially parallel to said rear surface.

4. The camera according to claim 3, further comprising a lens base plate which supports a photographic lens, one end of said lens base plate being pivotally mounted to a vertical shaft fixed to said camera body so that said lens base plate can pivot between either an open or closed position of said lens base plate, wherein an optical axis of said photographic lens is perpendicular to said surface of said film when said lens base plate is positioned in said open position.

5. The camera according to claim 1, wherein a front surface of said camera body extends substantially in parallel to said rear surface to form a wedge-shaped space in said camera body between said front surface and said surface of said film.

6. The camera according to claim 5, further comprising a lens base plate which supports a photographic lens, one end of said lens base plate being pivotally mounted to a first shaft fixed to said camera body so that said lens base plate can pivot between either an open or closed position of said lens base plate.

7. The camera according to claim 6, wherein said first shaft is fixed to said camera body substantially along an end of said wedge-shaped space to extend in a vertical direction of said camera.

8. The camera according to claim 6, wherein said photographic lens is retracted into said wedge-shaped space when said lens base plate moves from said open position of said lens base plate to said closed position of said lens base plate.

9. The camera according to claim 6, wherein an optical axis of said photographic lens is perpendicular to said surface of said film when said lens base plate is positioned in said open position of said lens base plate.

10. The camera according to claim 9, further comprising a finder optical system provided independent from said photographic lens, an optical axis of said finder optical system being parallel to said optical axis of said photographic lens when said lens base plate is positioned in said open position of said lens base plate.

11. The camera according to claim 9, wherein said lens base plate is substantially parallel to said surface of said film when said lens base plate is positioned in said open position of said lens base plate.

12. The camera according to claim 6, further comprising a shutter unit which supports said photographic lens, said shutter unit being fixed to said lens base plate.

13. The camera according to claim 12, wherein said shutter unit and said photographic lens are retracted into said wedge-shaped space when said lens base plate moves from said open position of said lens base plate to said closed position of said lens base plate.

14. The camera according to claim 7, further comprising a cover plate, one end of said cover plate being pivotally mounted to a second shaft fixed to said camera body so that said cover plate can be positioned in either an open or closed position, said second shaft being fixed to said camera body substantially along another end of said wedge-shaped space opposite to said one end of said wedge-shaped space and substantially parallel to said first shaft, wherein said cover plate covers at least a part of a front surface of said lens base plate when said cover plate is in said closed position of said cover plate after said lens base plate has been moved to said closed position of said lens base plate.

15. The camera according to claim 14, further comprising an LCD panel for indicating photographic information, said LCD panel being secured to an outer surface of said cover plate.

16. The camera according to claim 14, wherein said cover plate covers the front of said photographic lens when said cover plate is in said closed position of said cover plate after said lens base plate has been moved to said closed position of said lens base plate.

17. The camera according to claim 14, wherein the front of said camera body becomes substantially flat when said lens base plate and said cover plate are respectively positioned in said closed position of said lens base plate and said closed position of said cover plate.

18. The camera according to claim 14, wherein each of said lens base plate and said cover plate extends substantially parallel to said rear surface of said camera body when said lens base plate and said cover plate are respectively positioned in said closed position of said lens base plate and said closed position of said cover plate.

19. The camera according to claim 14, further comprising means for determining when said lens base plate is in said open position of said lens base plate, wherein a photographic optical axis of said photographic lens extends perpendicular to said surface of said film when said lens base plate is positioned in said open position of said lens base plate.

20. The camera according to claim 19, wherein said determining means includes a groove formed on a rear surface of said cover plate, a portion of said lens base plate being fitted in said groove when said lens base plate and said cover plate are respectively positioned in said open position of said lens base plate and said open position of said cover plate.

21. The camera according to claim 20, wherein said portion of said lens base plate is positioned at a free end of said lens base plate.

22. The camera according to claim 1, wherein a photographic optical axis of said camera is perpendicular to said surface of said film and inclined to said plane connecting said axial center of said film take-up spool with said axial center of said cartridge spool when said camera is in a photo-ready state.

23. The camera according to claim 1, further comprising:
an aperture frame fixedly positioned in said camera body parallel, to and immediately in front, of said surface of said film, said aperture frame including a rectangular photographic opening which determines the limits of each frame of said film to be exposed; and
a pressure plate fixedly positioned in said camera body parallels to, and immediately behind, said surface of said film such that said film passage is formed between said aperture frame and said pressure plate.

24. The camera according to claim 1, wherein a plane in which said surface of said film lies intersects a plane in which said rear surface of said camera body lies.

25. The camera according to claim 1, further comprising a finder optical system and an eyepiece window through which a finder view formed by said finder optical system can be seen, wherein said eyepiece window is positioned on one of a right and left side of said rear surface of said camera body in a lengthwise direction of said camera.

26. The camera according to claim 25, wherein said one of a right and left side of said rear surface, on which said eyepiece window is positioned, is located rearwardly with respect to the other side of said rear surface in a direction of a photographic optical axis.

27. The camera according to claim 26, wherein said camera body has slide ends, one of said slide ends being closer to said eyepiece window than the other side end, a distance between said one side end and a center of said eyepiece window is within a range of about 5 to 30 mm.

28. The camera according to claim 27, wherein at least a part of said one side end of said camera body has a curved surface with a substantially arc shaped cross section.

29. The camera according to claim 28, wherein said part of said one side end of said camera body is positioned at the rearmost section of said camera body relative to said photographic optical axis.

30. The camera according to claim 27, further comprising a cushioning member secured to said one side end of said camera body.

31. The camera according to claim 25, wherein said camera body has side ends, one of said ends being closer to said eyepiece window than the other of said side ends, said one side end of said camera body having a curved surface with a substantially arc shaped cross section, wherein said eyepiece window is positioned in a vicinity of said one side end of said camera body.

32. The camera according to claim 31, further comprising a cushioning member secured to said one side end of said camera body.

33. The camera according to claim 1, wherein a lengthwise direction of said camera body is horizontally tilted relative to a plane extending perpendicular to a photographic optical axis.

34. The camera according to claim 33, further comprising:
said cartridge chamber being formed in said camera body in a vicinity of a side end of said camera body, said side end of said camera body being located forwardly with respect to an opposite side end of said camera body in a direction of said photographic optical axis;
a rotational engaging projection for rotating said cartridge spool, said rotational engaging projection projecting into said cartridge chamber from an upper end thereof to engage with an end of said cartridge spool; and
a flashlight emitter provided in said camera body, positioned in a space formed in front of said rotational engaging projection in said camera body.

35. The camera according to claim 34, wherein said spool chamber is positioned in a vicinity of said opposite side end of said camera body.

36. The camera according to claim 34, further comprising a circuit block positioned in a space formed behind said rotational engaging projection in said camera body.

37. The camera according to claim 36, wherein said circuit block comprises means for electrically controlling an emission of said flashlight emitter.

38. The camera according to claim 34, further comprising a gear positioned between an upper wall of said camera body and said cartridge chamber, said rotational engaging projection being coaxially fixed to said gear.

39. The camera according to claim 38, wherein said rotational engaging projection is integrally formed on said gear.

40. The camera according to claim 4, further comprising a light-interceptive member provided between said lens base plate and said camera body to prevent ambient light from entering a photographic light path formed between said lens base plate and said surface of said film.

41. The camera according to claim 40, wherein said light-interceptive member is made of a flexible material.

42. The camera according to claim 41, wherein said flexible material comprises rubber.

43. The camera according to claim 40, wherein said light-interceptive member comprises bellows.

44. The camera according to claim 6, further comprising a light-interceptive member provided between said lens base plate and said camera body to prevent ambient light from entering a photographic light path formed between said lens base plate and said surface of said film,
wherein said light-interceptive member is retracted into said wedge-shaped space when said lens base plate moves from said open position of said lens base plate to said closed position of said lens base plate.

45. The camera according to claim 6, further comprising a lens-shifting device for shifting said photographic lens in a direction perpendicular to an optical axis of said photographic lens.

46. The camera according to claim 45, wherein said lens base plate is provided with said lens-shifting device, said lens-shifting device comprising:
a lens supporting member for supporting said photographic lens; and
means for guiding said lens supporting member in said direction perpendicular to said optical axis relative to said lens base plate.

47. The camera according to claim 46, further comprising a shutter unit which supports said photographic lens, said shutter unit being fixed to said lens supporting member.

48. The camera according to claim 46, wherein said guiding means comprises at least one guide rail formed on said lens base plate to guide said lens supporting member in said direction perpendicular to said optical axis.

49. The camera according to claim 46, wherein said guiding means comprises two parallel guide rails formed on said lens base plate to guide said lens supporting member, said lens supporting member being slidably held between said two parallel guide rails in said direction perpendicular to said optical axis.

50. The camera according to claim 45, further comprising means for visually indicating an amount of shift of said photographic lens.

51. The camera according to claim 50, wherein said indicating means comprises a scale.

52. The camera according to claim 50, wherein said indicating means comprises an LCD panel fixed on said camera body.

53. The camera according to claim 45, wherein said lens-shifting device shifts said photographic lens sideways relative to said lens base plate.

54. The camera according to claim 45, wherein said lens-shifting device shifts said photographic lens in a vertical direction of said camera relative to said lens base plate.

55. The camera according to claim 45, wherein said lens-shifting device shifts said photographic lens diagonally relative to said lens base plate.

56. The camera according to claim 45, said lens-shifting device comprising:
a rotational member which is supported by said lens base plate to rotate relative to said lens base plate about said optical axis of said photographic lens;
a member for supporting said photographic lens which is supported by said rotational member; and
means for guiding said lens supporting member in said direction perpendicular to said optical axis relative to said rotational member.

57. The camera according to claim 56, further comprising a shutter unit which supports said photographic lens, said shutter unit being fixed to said lens supporting member.

58. The camera according to claim 56, wherein said guiding means comprises at least one guide rail formed on said rotational member to guide said lens supporting member in said direction perpendicular to said optical axis.

59. The camera according to claim 56, wherein said guiding means comprises two parallel guide rails formed on said rotational member to guide said lens supporting member, said guide supporting member being slidably held between said two parallel guide rails in said direction perpendicular to said optical axis.

60. The camera according to claim 56, further comprising means for visually indicating a position of said lens supporting member relative to said rotational member.

61. The camera according to claim 60, wherein said indicating means comprises a scale.

62. The camera according to claim 60, wherein said indicating means comprises an LCD panel fixed on said camera body.

63. The camera according to claim 56, further comprising means for visually indicating a rotational position of said rotational member relative to said lens base plate.

64. The camera according to claim 63, wherein said indicating means comprises a scale.

65. The camera according to claim 63, wherein said indicating means is an LCD panel fixed on said camera body.

66. The camera according to claim 3, further comprising a lens base plate which supports a photographic lens, one end of said lens base plate being a vertical shaft fixed to said camera body so that said lens base plate can be selectively positioned in either a closed position or any one of a plurality of open positions which respectively correspond to a plurality of different angular positions of said lens base plate relative to said camera body.

67. The camera according to claim 6, further comprising a lens-tilting device for tilting an optical axis of said photographic lens relative to said surface of said film.

68. The camera according to claim 14, further comprising a lens-tilting device for tilting an optical axis of said photographic lens relative to said surface of said film,
wherein said open position of said lens base plate comprises a plurality of open settings which respectively correspond to a plurality of different angular positions of said lens base plate relative to said camera body, and
wherein said lens-tilting device comprises means for selectively positioning said lens base plate at any one of said plurality of open settings.

69. The camera according to claim 68, wherein said positioning means comprises a plurality of grooves formed on a rear surface of said cover plate to respectively correspond to said plurality of open settings such that a part of said lens base plate is fitted in a corresponding one of said plurality of grooves when said lens base plate is selectively positioned in any one of said plurality of open settings with said cover plate being positioned in said open position of said cover plate.

70. The camera according to claim 69, wherein said plurality of grooves are formed on said rear surface of said cover plate at substantially equi-intervals.

71. The camera according to claim 69, wherein said part of said lens base plate is formed at a free end of said lens base plate which is opposite to said pivoted one end of said lens base plate.

72. The camera according to claim 68, wherein said cover plate is continuously biased to rotate toward said closed position of said cover plate by a biasing member.

73. The camera according to claim 72, wherein said biasing member is a spring.

74. The camera according to claim 68, further comprising an LCD panel for indicating photographic information, said LCD panel being secured to an outer surface of said cover plate.

75. The camera according to claim 74, wherein said LCD panel indicates a current angular position of said lens base plate relative to said camera body.

76. The camera according to claim 1, further comprising at least one predetermined member positioned in said camera body in a space formed between said surface of said film and said rear surface of said camera body, said at least one predetermined member comprising at least one of the following members:
a motor for rotating said film take-up spool;
a condenser for supplying electrical power to a built-in flashlight emitter of said camera; and
a battery serving as a power source of said camera.

77. The camera according to claim 1, further comprising a battery as a power source of said camera, said battery being positioned in said camera body in a space formed between said surface of said film and said rear surface of said camera body, wherein said battery is inserted in or taken out of said space through an aperture formed on a rear wall of said camera body.

78. The camera according to claim 77, further comprising a lid supported by said rear wall for opening or closing said aperture.

79. The camera according to claim 77, wherein said space is wedge-shaped.

80. The camera according to claim 1, further comprising:
an LCD panel positioned in said camera body in a space formed between said surface of said film and said rear surface of said camera body; and
a see-through window provided on the rear surface of said camera body through which said LCD panel can be seen from the outside of said camera.

81. The camera according to claim 80, further comprising a circuit board positioned in said space, said LCD panel being secured to said circuit board.

82. The camera according to claim 1, further comprising at least one predetermined member positioned in said camera body such that a longitudinal direction of said at least one predetermined member is inclined with respect to said surface of said film while extending substantially in parallel to said rear surface of said camera body, said at least one predetermined member comprising at least one of the following members:
a motor for rotating said film take-up spool;
a condenser for supplying electrical power to a built-in flashlight emitter of said camera; and
a battery serving as a power source of said camera.

83. The camera according to claim 82, further comprising a finder optical system positioned in said camera body, said finder optical system comprising a subject side portion, a finder optical path bending portion and an eyepiece side portion in this order from a subject side to a user side in a direction of a photographic optical axis,
wherein said eyepiece side portion is separated from said subject side portion substantially in a moving direction of said film moving in said film passage,
and wherein said finder optical path bending portion is traverse to both said subject side portion and said eyepiece side portion to connect said subject side portion with said eyepiece side portion,
and further wherein at least a part of said at least one predetermined member is positioned between said finder optical path bending portion and an external wall of said camera body.

84. The camera according to claim 82, wherein said at least one predetermined member is positioned above an upper edge of said film.

85. The camera according to claim 1, further comprising a guide roller positioned in said camera body in a vicinity of said film take-up spool, and parallel to said film take-up spool,
wherein said film drawn out of said film cartridge is wound on said guide roller and subsequently wound on the film take-up spool from a side of said guide roller which is closer to said surface of said film.

86. The camera according to claim 85, further comprising a predetermined member positioned in said camera body adjacent to both said guide roller and said spool chamber,
wherein said predetermined member is arranged such that a part of said predetermined member intersects a plane which is tangential to both said guide roller and said spool chamber.

87. The camera according to claim 86, wherein said predetermined member comprises at least one of the following members:

a motor for rotating said film take-up spool;
a condenser for supplying electrical power to a built-in flashlight emitter of said camera; and
a battery serving as a power source of said camera.

88. The camera according to claim 85, wherein said film take-up spool and said cartridge spool are driven to rotate in a common rotational direction during one of a film winding and rewinding operation.

89. The camera according to claim 1, further comprising a guide roller positioned in said camera body in a vicinity of a film slot of said film cartridge and parallel to said film slot,
wherein film coming out of said film slot first proceeds in a direction away from said film take-up spool, and is subsequently turned back toward said film take-up spool by said guide roller.

90. The camera according to claim 89, further comprising a predetermined member positioned in said camera body adjacent to both said guide roller and said film cartridge,
wherein said predetermined member is arranged such that a part of said predetermined member intersects a plane which is tangent to both said guide roller and said film cartridge.

91. The camera according to claim 90, wherein said predetermined member comprises at least one of the following members:
a motor for rotating said film take-up spool;
a condenser for supplying electrical power to a built-in flashlight emitter of said camera; and
a battery serving as a power source of said camera.

92. The camera according to claim 89, wherein said film take-up spool and said cartridge spool are driven to rotate in a common rotational direction during one of a film winding and rewinding operation.

93. The camera according to claim 1, further comprising:
a cartridge chamber formed in said camera body to accommodate said film cartridge therein;
a bottom lid provided at the bottom of said camera body for simultaneously opening or closing said cartridge chamber, said spool chamber and said film passage; and
at least one slot formed on said film take-up spool in which a film leader of said film is inserted, said at least one slot extending in an axial direction of said film take-up spool and having an opening at a lower end of said at least one slot.

94. The camera according to claim 93, wherein said at least one slot comprises a plurality of slots positioned at substantially equi-angular intervals in a circumferential direction of said film take-up spool.

95. The camera according to claim 93, further comprising:
an aperture frame provided in said camera body positioned in parallel to, and immediately in front of, said surface of said film, said aperture frame comprising a rectangular photographic opening which determines the limits of each frame of said film to be exposed; and
a pressure plate positioned in said camera body in parallel to, and immediately behind, said surface of said film such that said film passage is formed between said aperture frame and said pressure plate,
wherein an upper end of said pressure plate is pivotally mounted to a shaft which is fixed in said camera body parallel to a direction of said film moving in said film passage so that said pressure plate can rotate away from said aperture frame when said bottom lid is opened.

96. The camera according to claim 95, further comprising:
means for continuously biasing said pressure plate to rotate away from said photographic opening; and means for rotating said pressure plate in the toward said opening to make said pressure plate move back to an initial position in which said pressure plate is parallel to said aperture frame to form said film passage when said bottom lid is closed.

97. The camera according to claim 96, wherein said biasing means comprises a spring.

98. The camera according to claim 96, wherein said rotating means includes a projection formed on said bottom lid to project into said camera body such that said projection contacts and pushes said pressure plate to rotate in toward said opening to define said passage when said bottom lid is closed.

99. The camera according to claim 86, wherein said projection comprises a beveled surface which contacts said pressure plate when said bottom lid is closed.

100. The camera according to claim 1, wherein said camera body comprises a front body piece and a rear body piece which are pivotally mounted about a pivotal shaft.

101. The camera according to claim 100, wherein corresponding vertical side ends of said front body piece and said rear body piece pivot about said pivotal shaft, which extends in a vertical direction of said camera.

102. The camera according to claim 100, wherein said front body piece comprises:

a photographic lens; and an aperture frame including a rectangular photographic opening which determines the limits of each frame of said film to be exposed, said aperture frame being positioned immediately in front of said surface of said film when said front body piece is closed relative to said rear body piece, and wherein said rear body piece includes a pressure plate positioned immediately behind said surface of said film to form said film passage between said pressure plate and said aperture frame; and a cartridge chamber for accommodating said film cartridge therein.

103. The camera according to claim 101, wherein said spool chamber is positioned in said vertical side end of said rear body piece behind said surface of said film.

104. The camera according to claim 103, wherein said pivotal shaft is separated from said axial center of said film take-up spool.

105. The camera according to claim 102, further comprising a lens base plate which supports said photographic lens, one end of said lens base plate being pivotally mounted to a first vertical shaft fixed to said front body piece so that said lens base plate can be positioned in either an open or closed position of said lens base plate, wherein said first vertical shaft extends in said vertical direction of said camera.

106. The camera according to claim 105, wherein an optical axis of said photographic lens extends normal to said surface of said film when said lens base plate is positioned in said open position of said lens base plate while said front body piece is closed relative to said rear body piece.

107. The camera according to claim 106, wherein said lens base plate extends substantially parallel to said surface of said film when said lens base plate is positioned in said open position of said lens base plate while said front body piece is closed relative to said rear body piece.

108. The camera according to claim 105, further comprising a wedge-shaped space formed in said camera body between a front surface of said front body piece and said surface of said film when said front body piece is closed relative to said rear body piece, wherein said first vertical shaft is fixed to said front body piece substantially along an end of said wedge-shaped space to extend in said vertical direction of said camera.

109. The camera according to claim 108, further comprising a cover plate, one end of said cover plate being pivoted about a second vertical shaft fixed to said front body piece so that said cover plate can be positioned in either an open position or a closed position of said cover plate, said second vertical shaft being fixed to said front body piece substantially along another end of said wedge-shaped space substantially parallel to said first vertical shaft, wherein said cover plate covers at least a part of a front surface of said lens base plate when said cover plate is in said closed position of said cover plate after said lens base plate has been moved to said closed position of said lens base plate.

110. The camera according to claim 105, further comprising a shutter unit which supports said photographic lens, said shutter unit being fixed to said lens base plate.

111. A camera, comprising:

a camera body in which a cartridge chamber for accommodating a film cartridge therein, and a film take-up chamber for accommodating a film drawn out of said film cartridge, are separated from each other; and a film passage formed in said camera body for guiding said film drawn out of said film cartridge to said film take-up chamber such that a surface of said film located in said film passage, between an aperture frame and at least one pressure plate of said camera body, lies in a plane horizontally tilted with respect to a widthwise direction of said camera body.

112. A camera, comprising:

a camera body in which a film is drawn out of a film cartridge to be wound by a film take-up spool, a lengthwise direction of said camera body being horizontally tilted relative to a plane which extends perpendicular to a photographic optical axis;

a cartridge chamber in which said film cartridge is accommodated, said cartridge chamber being formed in said camera body in a vicinity of a side end of said camera body, said side end of said camera body being located forward with respect to an opposite side end of said camera body in a direction of said photographic optical axis;

a rotational engaging projection for rotating a cartridge spool of said film cartridge accommodated in said cartridge chamber, said rotational engaging projection projecting in said cartridge chamber from an upper end thereof to engage with an end of said cartridge spool; and a flashlight emitter provided in said camera body, wherein said flashlight emitter is positioned in a space formed in front of said rotational engaging projection in said camera body.

113. The camera according to claim 112, further comprising a spool chamber in which film take-up spool is arranged, said spool chamber being formed in said opposite side end of said camera body.

114. The camera according to claim 112, further comprising a circuit block positioned in a space formed behind said rotational engaging projection in said camera body.

115. The camera according to claim 114, wherein said circuit block comprises means for electrically controlling an emission of said flashlight emitter.

116. The camera according to claim 112, further comprising a gear positioned between an upper wall of said camera body and said cartridge chamber, said rotational engaging projection being coaxially fixed to said gear.

117. The camera according to claim 116, wherein said rotational engaging projection being integrally formed on said gear.

118. A camera having a camera body in which a film is drawn out of a film cartridge to be wound by a film take-up spool, said camera comprising:
- a cartridge chamber formed in said camera body to accommodate said film cartridge therein;
- a spool chamber formed in said camera body in which said film take-up spool is positioned;
- a film passage formed in said camera body for guiding said film drawn out of said film cartridge to said spool chamber;
- a bottom lid provided at the bottom of said camera body for simultaneously opening or closing said cartridge chamber, said spool chamber and said film passage; and
- at least one slot formed on said film take-up spool in which a film leader of said film is inserted, said at least one slot extending in an axial direction of said film take-up spool and having an opening at a lower end of said at least one slot.

119. The camera according to claim 118, wherein said at least one slot comprises a plurality of slots positioned at substantially equi-angular intervals in a circumferential direction of said film take-up spool.

120. The camera according to claim 118, further comprising:
- an aperture frame comprising a rectangular photographic opening which determines the limits of each frame of said film to be exposed; and
- a pressure plate positioned in said camera body parallel to, and immediately behind, said surface of said film such that said film passage is formed between said aperture frame and said pressure plate,
- wherein an upper end of said pressure plate is pivoted about a shaft which is fixedly positioned in said camera body to extend parallel to a moving direction of said film moving in said film passage so that said pressure plate rotates in a direction away from said aperture frame when said bottom lid is opened.

121. The camera according to claim 120, further comprising:
- means for continuously biasing said pressure plate to rotate in said direction away from said photographic opening; and
- means for rotating said pressure plate in an opposite direction to make said pressure plate move back to an initial position in which said pressure plate is positioned parallel to said aperture frame to form said film passage when said bottom lid is closed.

122. The camera according to claim 121, wherein said biasing means comprises a spring.

123. The camera according to claim 121, wherein said rotating means comprises a projection formed on said bottom lid to project into said camera body such that said projection contacts and pushes said pressure plate to rotate in said opposite direction for forming said film passage when said bottom lid is closed.

124. The camera according to claim 123, wherein said projection comprises a beveled surface which contacts said part of said pressure plate when said bottom lid is closed.

125. A camera, comprising:
- a camera body having a film take-up spool positioned in a spool chamber;
- a rear surface of said camera body being substantially parallel to a plane defined by an axial center of said film take-up spool with an axial center of a cartridge spool of a film cartridge;
- a film passage formed in said camera body for guiding a film drawn out of said film cartridge to said spool chamber such that a surface of said film located in said film passage intersects said plane; and
- a front surface of said camera body extending substantially in parallel with said rear surface to form a wedge shaped spaced in said camera body between said front surface and said surface of said film.

126. A camera, comprising:
- a camera body having a film take-up spool positioned in a spool chamber;
- a rear surface of said camera body being substantially parallel to a plane defined by an axial center of said film take-up spool with an axial center of a cartridge spool of a film cartridge;
- a film passage formed in said camera body for guiding a film drawn out of said film cartridge to said spool chamber such that a surface of said film located in said film passage intersects said plane;
- a finder optical system and an eyepiece window through which a finder view formed by said finder optical system can be seen, said eyepiece window being positioned on one of a right and left side of said rear surface of said camera body in a lengthwise direction of said camera;
- said one of a right and left side of said rear surface, on which said eyepiece window is positioned, being located rearwardly with respect to the other side of said rear surface in a direction of a photographic optical axis; and
- said camera body having side ends, one of said side ends being closer to said eyepiece window than the other side end, a distance between said one side end and a center of said eyepiece window being within a range of about 5 to 30 mm.

127. A camera, comprising:
- a camera body having a film take-up spool positioned in a spool chamber;
- a rear surface of said camera body being substantially parallel to a plane defined by an axial center of said film take-up spool with an axial center of a cartridge spool of a film cartridge;
- a film passage formed in said camera body for guiding a film drawn out of said film cartridge to said spool chamber such that a surface of said film located in said film passage intersects said plane; and
- a lengthwise direction of said camera body being horizontally inclined relative to a plane extending perpendicular to a photographic optical axis of said camera.

128. A camera, comprising:
- a camera body having a film take-up spool positioned in a spool chamber;
- a rear surface of said camera body being substantially parallel to a plane defined by an axial center of said film take-up spool with an axial center of a cartridge spool of a film cartridge;
- a film passage formed in said camera body for guiding a film drawn out of said film cartridge to said spool chamber such that a surface of said film located in said film passage intersects said plane;
- a finder optical system and an eyepiece window through which a finder view formed by said finder optical system can be seen, said eyepiece window being positioned on one of a right and left side of said rear surface of said camera body in a lengthwise direction of said camera; and said camera body having side ends, one of said ends being closer to said eyepiece window than the other of said side ends, said one side end of said camera body having a curved surface with a substantially arc shaped cross section, wherein said eyepiece window is positioned in a vicinity of said one side end of said camera body.

129. A camera, comprising:

a camera body having a film take-up spool positioned in a spool chamber;

a rear surface of said camera body being substantially parallel to a plane defined by an axial center of said film take-up spool with an axial center of a cartridge spool of a film cartridge;

a film passage formed in said camera body for guiding a film drawn out of said film cartridge to said spool chamber such that a surface of said film located in said film passage intersects said plane;

at least one predetermined member positioned in said camera body in a space formed between said surface of said film and said rear surface of said camera body, said at least one predetermined member being at least one of a motor for rotating said film take-up spool, a condenser for supplying electrical power to a built in flash emitter of said camera, and a battery;

a projection extending from a bottom of said camera into said space;

a female screw coaxially formed in said projection; and said projection and at least one of said motor, condenser, and battery being substantially coaxially arranged in said space.

130. A camera, comprising:

a camera body having a film take-up spool positioned in a spool chamber;

a rear surface of said camera body being substantially parallel to a plane defined by an axial center of said film take-up spool with an axial center of a cartridge spool of a film cartridge;

a film passage formed in said camera body for guiding a film drawn out of said film cartridge to said spool chamber such that a surface of said film located in said film passage intersects said plane;

at least one predetermined member positioned in said camera body in a space formed between said surface of said film and said rear surface of said camera body, said at least one predetermined member being at least one of a motor for rotating said film take-up spool, a condenser for supplying electrical power to a built in flash emitter of said camera, and a battery; and said space being wedge-shaped.

131. A camera, comprising:

a camera body having a film take-up spool positioned in a spool chamber;

a rear surface of said camera body being substantially parallel to a plane defined by an axial center of said film take-up spool with an axial center of a cartridge spool of a film cartridge;

a film passage formed in said camera body for guiding a film drawn out of said film cartridge to said spool chamber such that a surface of said film located in said film passage intersects said plane;

a battery positioned in said camera body in a space defined by said surface of said film and said rear surface of said camera body; and said rear surface of said camera body having an aperture which permits insertion and removal of said battery.

132. A camera, comprising:

a camera body having a film take-up spool positioned in a spool chamber;

a rear surface of said camera body being substantially parallel to a plane defined by an axial center of said film take-up spool with an axial center of a cartridge spool of a film cartridge;

a film passage formed in said camera body for guiding a film drawn out of said film cartridge to said spool chamber such that a surface of said film located in said film passage intersects said plane;

an LCD panel positioned in said camera body in a space formed between said surface of said film and said rear surface of said camera body; and a see-through window provided on said rear surface of said camera body through such said LCD panel can be seen from the outside of said camera.

133. A camera, comprising:

a camera body having a film take-up spool positioned in a spool chamber;

a rear surface of said camera body being substantially parallel to a plane defined by an axial center of said film take-up spool with an axial center of a cartridge spool of a film cartridge;

a film passage formed in said camera body for guiding a film drawn out of said film cartridge to said spool chamber such that a surface of said film located in said film passage intersects said plane; and at least one predetermined member positioned in said camera body such that a longitudinal direction of said at least one predetermined member is inclined with respect to said surface of said film while extending substantially in parallel to said rear surface of said camera body, said at least one predetermined member being one of a motor for rotating said film take-up spool, a condenser for supplying electrical power to a built-in flash emitter, and a battery.

* * * * *